United States Patent [19]

Baker et al.

[11] Patent Number: 5,101,479
[45] Date of Patent: Mar. 31, 1992

[54] BUS DEVICE FOR GENERATING AND RESPONDING TO SLAVE RESPONSE CODES

[75] Inventors: Lauren D. Baker, Westford; Gary W. Stevens, Whitinsville; William C. Herbst, Franklin, all of Mass.

[73] Assignee: Clearpoint Research Corporation, Hopkinton, Mass.

[21] Appl. No.: 384,246

[22] Filed: Jul. 21, 1989

[51] Int. Cl.$^5$ .................. G06F 3/04; G06F 13/00
[52] U.S. Cl. .................. 395/325; 364/287.3; 364/240.9; 364/242.6; 364/260; 364/926.9
[58] Field of Search .................. 364/200, 900

[56] References Cited

U.S. PATENT DOCUMENTS

| | | | |
|---|---|---|---|
| 4,050,097 | 9/1977 | Miu et al. | 364/200 |
| 4,365,294 | 12/1982 | Stokken | 364/200 |
| 4,495,571 | 1/1985 | Staplin, Jr. et al. | 364/200 |
| 4,706,190 | 11/1987 | Bomba et al. | 364/200 |
| 4,833,600 | 5/1989 | Broosily | 364/200 |
| 4,870,704 | 9/1989 | Matelan et al. | 364/200 |
| 4,941,083 | 7/1990 | Gillett, Jr. et al. | 364/200 |
| 4,949,239 | 8/1990 | Gillett, Jr. et al. | 364/200 |

Primary Examiner—Michael R. Fleming
Assistant Examiner—Robert S. Hauser
Attorney, Agent, or Firm—Edward W. Porter

[57] ABSTRACT

A bus device of a first type is designed to work with a bus devices of a second type. A bus device of the second type, when it is a slave in a bus transaction, issues an ACK if it can respond to the command on time, a NO ACK if it can't respond at all, a STALL if it expects to be able to respond with only a short delay, and a RETRY if it expects to be able to respond, but only after a long delay. Slave Bus devices of the second type also monitor the length of time that they assert the STALL signal, and if they assert if for more than a predetermined period, they replace the STALL signal with a RETRY. Bus devices of the second type, when they are master in a bus transaction, respond to a NO ACK by terminating a transaction in one way and to a RETRY by terminating the transaction in a different way. The bus devices of the first type provided by the present invention, although they are designed for use in conjunction with the second type bus devices, have no means for replacing a STALL with a RETRY when they are slaves in a bus transaction, and no means for responding to a NO ACK and a RETRY by terminating a transaction in a different manner when they are masters in a bus transaction.

6 Claims, 45 Drawing Sheets

FIG. 2
(PRIOR ART)
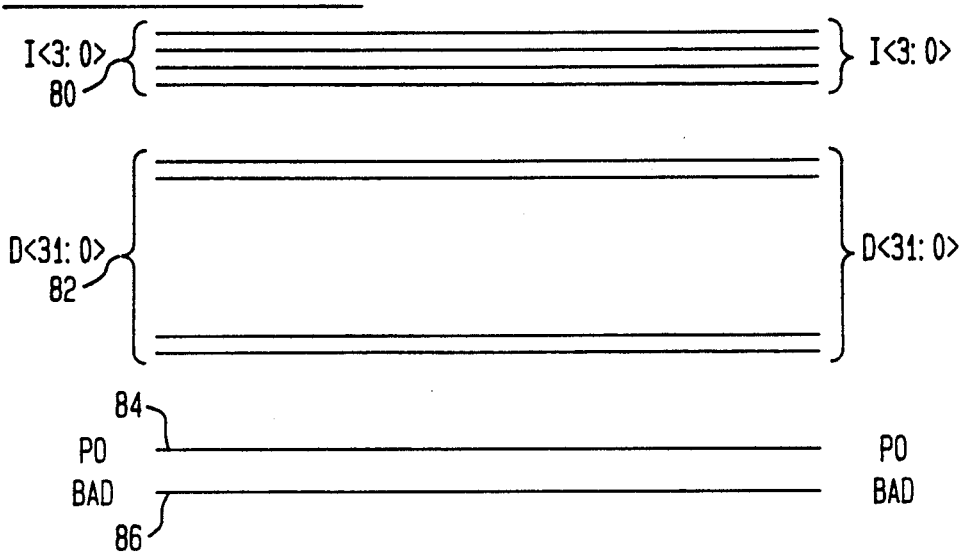
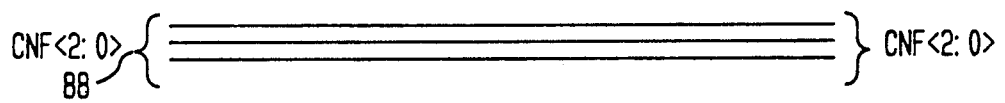
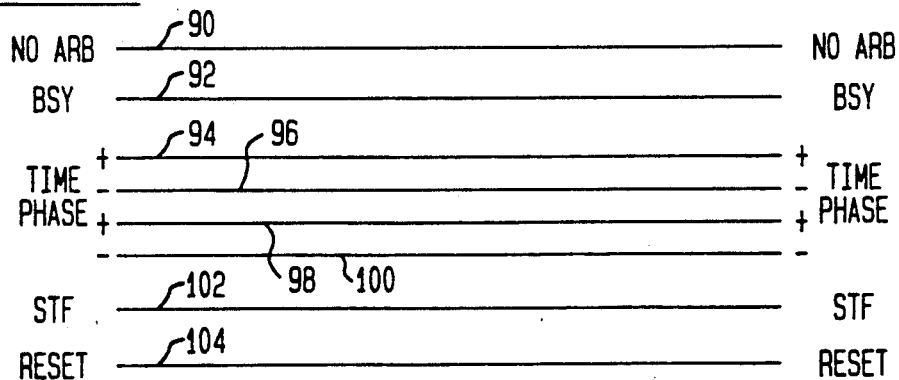
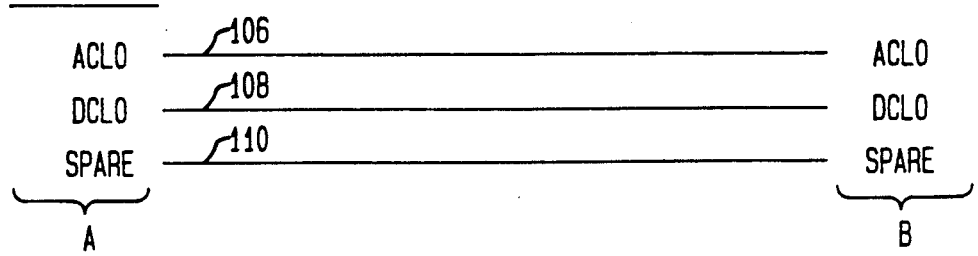

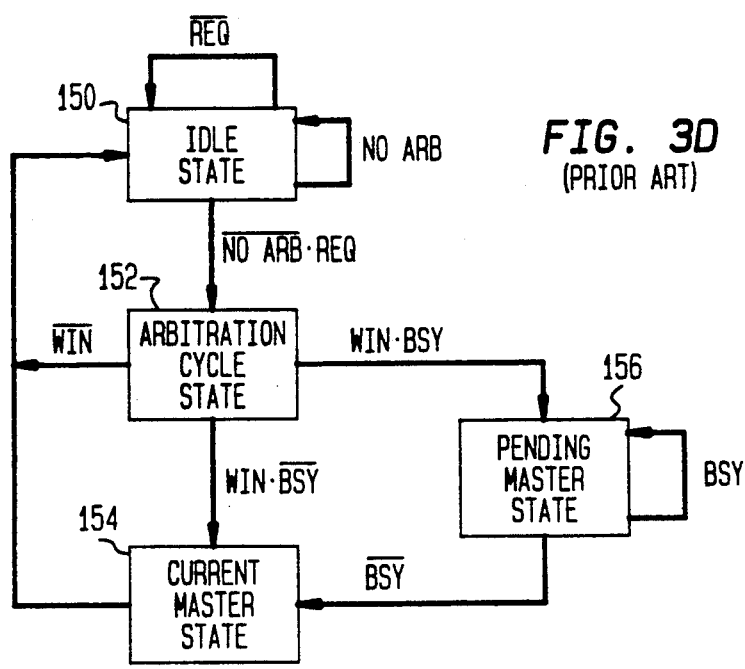
FIG. 3D
(PRIOR ART)
BSY AND NO ARB CONTROL STATE DIAGRAM
FIG. 3E
(PRIOR ART)
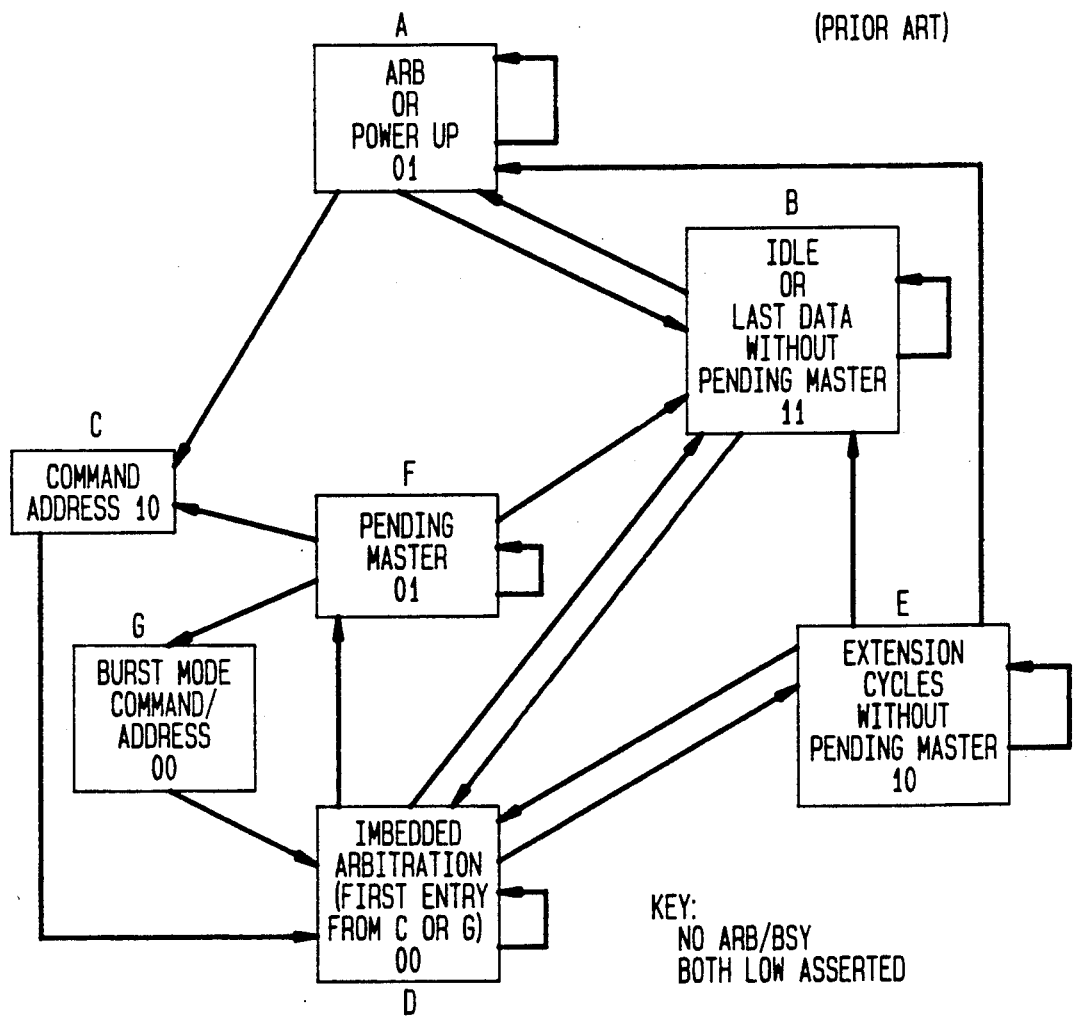
KEY:
NO ARB/BSY
BOTH LOW ASSERTED

FIG. 4A (PRIOR ART)

READ (READ WITH CACHE INTENT, INTERLOCK READ)

| Cycle | 180 Command Address | 182 Imbed. Arbit. | 184 Data 1 | 186 Data 2 | | | |
|---|---|---|---|---|---|---|---|
| I (3:0) | Command M | Master ID M | Data Status S | Data Status S | | | |
| D (31:0) | D (31:30) = Trans. Length  D (29:0) Device address  M | D (31:16) = Arb. (high)  D (15:0) = Arb. (Low)  AAD | D (31:0) = Data  S | D (31:0) = DATA  S | | | |
| CNF (3:0) | | | •Ack No Ack Stall Retry S | •Ack No Ack Stall  S | •Ack No Ack  M | •Ack No Ack  M | |
| No Arb | ⎯158⎯ | M, AAD | M, S, RM | PM | | | |
| BSY | ⎯160⎯ M | M, AAD | M, S | | | | |
| P Gen Chk | M AD | M AD | S M | S N | - | - | |

WRITE (WRITE WITH CACHE INTENT, WRITE MASK WITH CACHE INTENT, UNLOCK WRITE MASK)

FIG. 4C
(PRIOR ART)

Invalidate

| Cycle | Command Address | Imbed. Arbit. | Data 1 | | | | |
|---|---|---|---|---|---|---|---|
| I (3:0) | Command | Master ID<br>M | - | | | | |
| D (31:0) | D (31:30) Data Length Code<br><br>D (29:0) Data Start. Add.<br><br>M | D (31:16) = Arb. (low)<br><br>D (15:0) = Arb. (high)<br><br>M | - | | | | |
| CNF (2:0) | | | •Ack<br>No Ack<br><br>S | | | | |
| No Arb | | M, AAD | | | | | |
| BSY | ⎺⎹_M | _⎸⎺<br>M | | | | | |
| P Gen Chk | M<br>AD | M<br>AD | - | | | | |

FIG. 4E
(PRIOR ART)

Identify

| Cycle | Command Address | Imbed. Arbit. | (Data1 Master ID) | (Data2 Inter Arb.) | (Data3 Inter Vector) | | |
|---|---|---|---|---|---|---|---|
| I (3:0) | Command<br>M | Master ID<br>M | - | - | Vector Status<br>S | | |
| D (31:0) | D(19:16) = Ident Level<br><br>M | D(31:16) = Arb. (low)<br><br>D(15:0) = Arb. (high)<br><br>AAD | D(31:16) = Decoded Mstr ID<br><br>M | D(31:16) = Decoded Dev. ID<br><br>APS | D<br><br>D(13:2) = Decoded Vector<br><br>S | | |
| CNF (2:0) | | | - | - | ·Ack No Ack Stall Retry<br>S | ·Ack No Ack<br><br>M | ·Ack No Ack<br><br>M |
| No Arb | ⎴<br>M | M, AAD | M, APS | M, APS | | | |
| BSY | ⎴<br>M | M | M, APS | M, APS | | | |
| P Gen Chk | M<br>AD | M<br>AD | M<br>APS | - | S<br>M | | |

FIG. 4H
(PRIOR ART)

Broadcast

| Cycle | Command Address | Imbed. Arbit. | Data1 | Data2 | | | |
|---|---|---|---|---|---|---|---|
| I(3:0) | Command M | Master ID M | – | – | | | |
| D(31:0) | D(31:30) = Data Length Code<br><br>D(15:0) = Dest. Mask<br><br>M | D(31:16) = Arb. (low)<br><br>D(15:0) = Arb. (high)<br><br>AAD | D(31:0) Message<br><br>M | D(31:0) Message<br><br>M | | | |
| CNF (2:0) | | | •Ack No Ack<br><br>S | •Ack No Ack<br><br>S | •Ack No Ack<br><br>S | •Ack No Ack<br><br>S | |
| No Arb | | M, AAD | M, S | | | | |
| BSY | M | M | M, S | | | | |
| P Gen Chk | M AD | M AD | M S | M S | | | |

Command Codes

| Actual Values (Negative Logic) | Hex Values (Positive Logic) | Command Name |
|---|---|---|
| 0000 | F | IPINTR |
| 0001 | E | BROADCAST |
| 0010 | D | INVALIDATE |
| 0011 | C | STOP |
| 0100 | B | RESERVED |
| 0101 | A | RESERVED |
| 0110 | 9 | IDENT |
| 0111 | 8 | INTR |
| 1000 | 7 | WRITE MASK WITH CACHE INTENT |
| 1001 | 6 | UNLOCK WRITE MASK WITH CACHE INTENT |
| 1010 | 5 | WRITE WITH CACHE INTENT |
| 1011 | 4 | WRITE |
| 1100 | 3 | READ WITH CACHE INTENT |
| 1101 | 2 | INTERLOCK READ WITH CACHE INTENT |
| 1110 | 1 | READ |
| 1111 | 0 | RESERVED |

FIG. 5A (PRIOR ART)

Data Status Codes

| Code | Description |
|---|---|
| 0X00 | - |
| 0X01 | READ DATA |
| 0X10 | CORRECTED READ DATA |
| 0X11 | READ DATA SUBSTITUTE |
| 1X00 | - |
| 1X01 | READ DATA (DON'T CACHE) |
| 1X10 | CORRECTED READ DATA (DON'T CACHE) |
| 1X11 | READ DATA SUBSTITUTE (DON'T CACHE) |

Data Length Codes

| Code | Description |
|---|---|
| 00 | - |
| 01 | Longword (32 bits) |
| 10 | Quadword (64 bits) |
| 11 | Octaword (128 bits) |

Response Codes

| Code | Description |
|---|---|
| 000 | - |
| 001 | Retry |
| 010 | Stall |
| 011 | - |
| 100 | Ack |
| 101 | - |
| 110 | - |
| 111 | No Ack |

| | |
|---|---|
| 200 | DEVICE TYPE REGISTER |
| 202 | BI CONTROL AND STATUS REGISTER |
| 204 | BUS ERROR REGISTER |
| 206 | ERROR INTERRUPT CONTROL AND STATUS REGISTER |
| 210 | INTERRUPT DESTINATION REGISTER |
| 212 | INTERPROCESSOR INTERRUPT MASK REGISTER |
| 214 | INTERPROCESSOR INTERRUPT DESTINATION REGISTER |
| 216 | INTERPROCESSOR INTERRUPT SOURCE REGISTER |
| 218 | START ADDRESS REGISTER |
| 220 | END ADDRESS REGISTER |
| 222 | BCI CONTROL AND STATUS REGISTER |
| 224 | WRITE STATUS REGISTER |
| 226 | FORCE INTERPROCESSOR INTERRUPT / STOP COMMAND REGISTER |
| 228 | USER INTERRUPT CONTROL AND STATUS REGISTER |
| 230 | 1ST GENERAL PURPOSE REGISTER |
| 232 | 2ND GENERAL PURPOSE REGISTER |
| 234 | 3RD GENERAL PURPOSE REGISTER |
| 236 | 4TH GENERAL PURPOSE REGISTER |

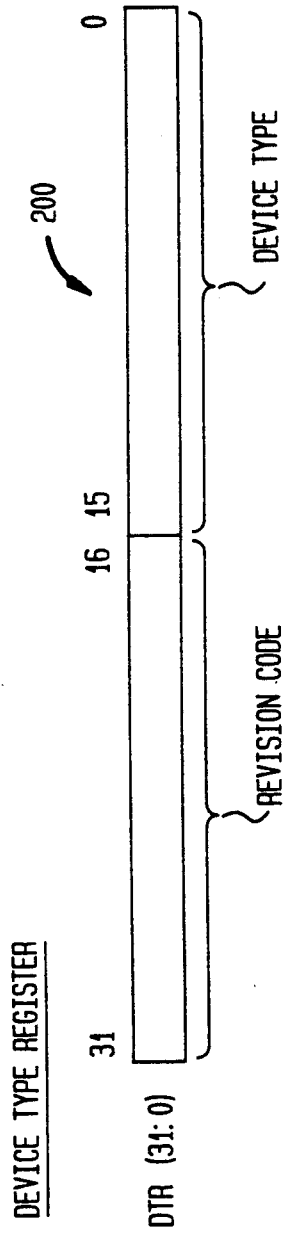
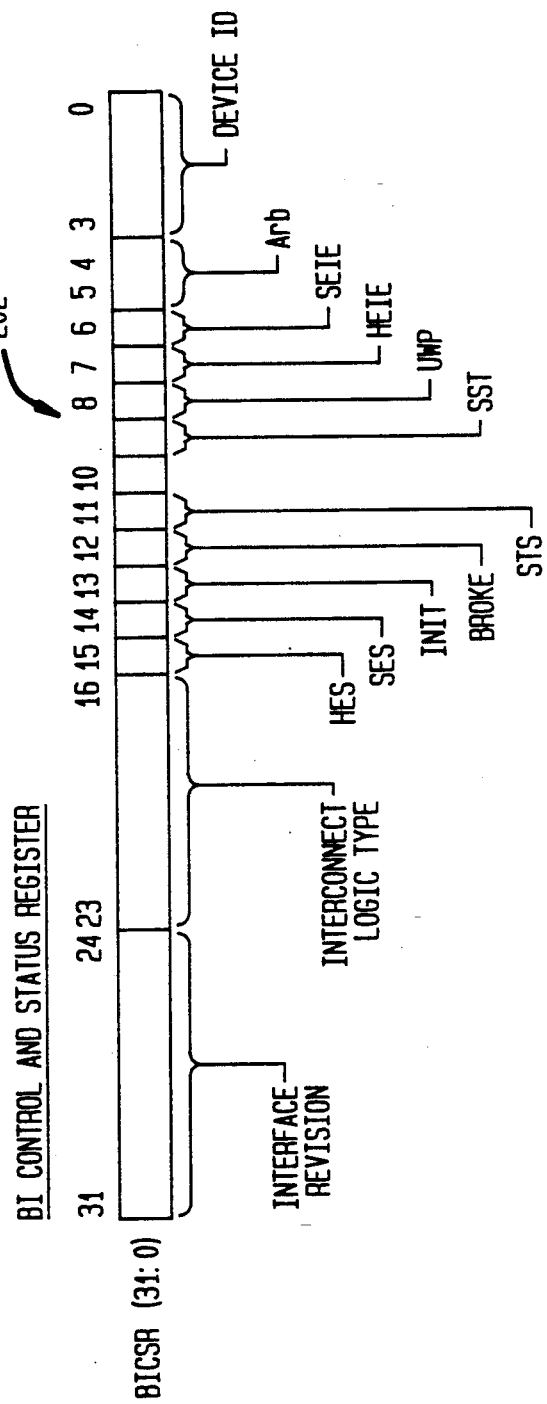

FIG. 7F
(PRIOR ART)

INTERRUPT DESTINATION REGISTER

INTRDES (31:0) — 210
- bits 31:16 = 0
- bits 15:0 = INTERRUPT DESTINATION

FIG. 7G
(PRIOR ART)

INTERPROCESSOR INTERRUPT MASK REGISTER

IPINTRMSK (31:0) — 212
- bits 31:16 = MASK
- bits 15:0 = 0

FIG. 7H
(PRIOR ART)

INTERPROCESSOR INTERRUPT DESTINATION REGISTER

IPINTRDES (31:0) — 214
- bits 15:0 = DESTINATION

FIG. 7I
(PRIOR ART)

INTERPROCESSOR INTERRUPT SOURCE REGISTER

IPINTRSRC (31:0) — 216
- bits 31:16 = SOURCE ID

WRITE STATUS REGISTER

FORCE INTERPROCESSOR INTERRUPT / STOP COMMAND REGISTER

GENERAL PURPOSE REGISTER

BUS MASTER JAMMING:

-IF IN JAMMING MODE THEN
  -IF THE DEVICE IS THE CURRENT BUS MASTER
    -IF CURRENT CYCLE IS A COMMAND/ADDRESS CYCLE THEN
      -ASSERT NO ARB FROM 75 TO 175 NS IN CURRENT CYCLE

TRI-CYCLE JAMMING:

- 492 -WAIT UNTIL RECEIVE RESET SIGNAL ON DCLO LINE
- 494 -RESET THE TRI-CYCLE COUNTER TO ZERO
- 496 -REPEAT THE FOLLOWING LOOP FOR EACH CYCLE
  - 498 -IF TRI-CYCLE COUNT IS LESS THAN 2
    - 500 -IF IN JAMMING MODE THEN
      - 502 -ASSERT NO ARB FROM 75 TO 175 NS IN CURRENT CYCLE
    - 504 -INCREMENT THE COUNT IN TRI-CYCLE COUNTER
  - -OTHERWISE
    - 506 RESET THE TRI-CYCLE COUNTER TO ZERO

FIG. 15

- 508 LOOP-BACK JAMMING:
- 510 -IF IN JAMMING MODE THEN
  - -REPEAT THE FOLLOWING LOOP FOR EACH CYCLE
    - 512 -IF BUSY_EDGE IS DETECTED IN A CYCLE IN WHICH DATA LINES ARE ACTIVE AND INSTRUCTIONS LINES ARE UNASSERTED
      - 514
      - 516 -WAIT UNTIL THE NEXT CYCLE DURING WHICH BUSY IS UNASSERTED THEN
      - 518 -ON THE NEXT BUSY-EDGE CYCLE ASSERT NO ARB FROM 75 TO 175 NS

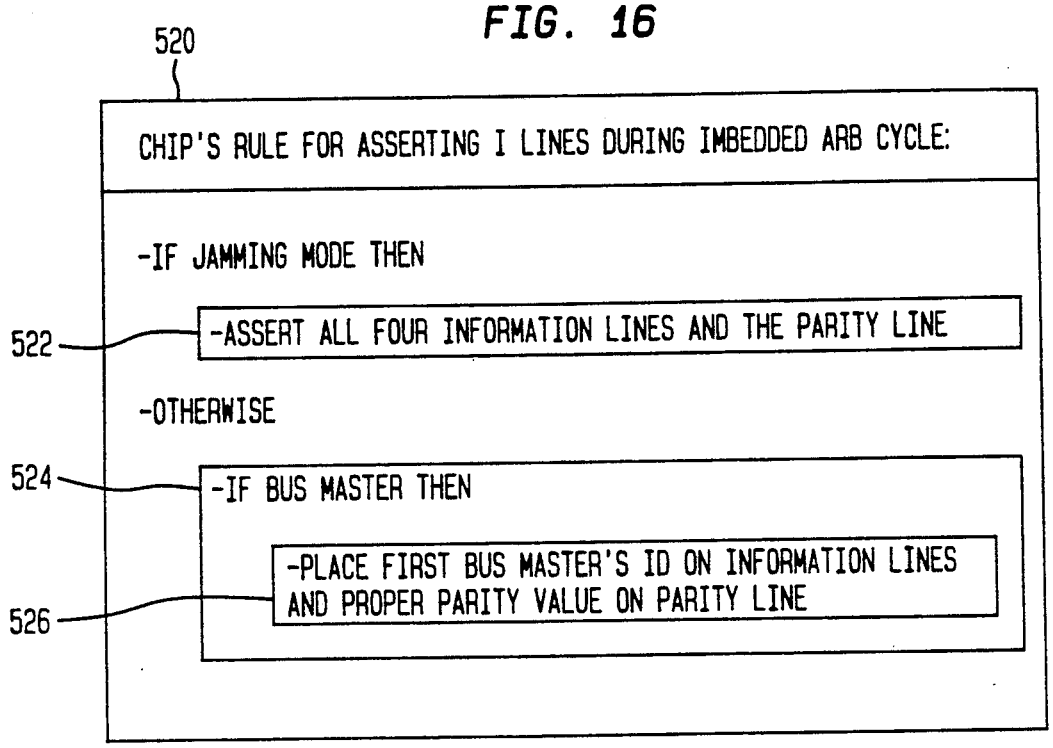
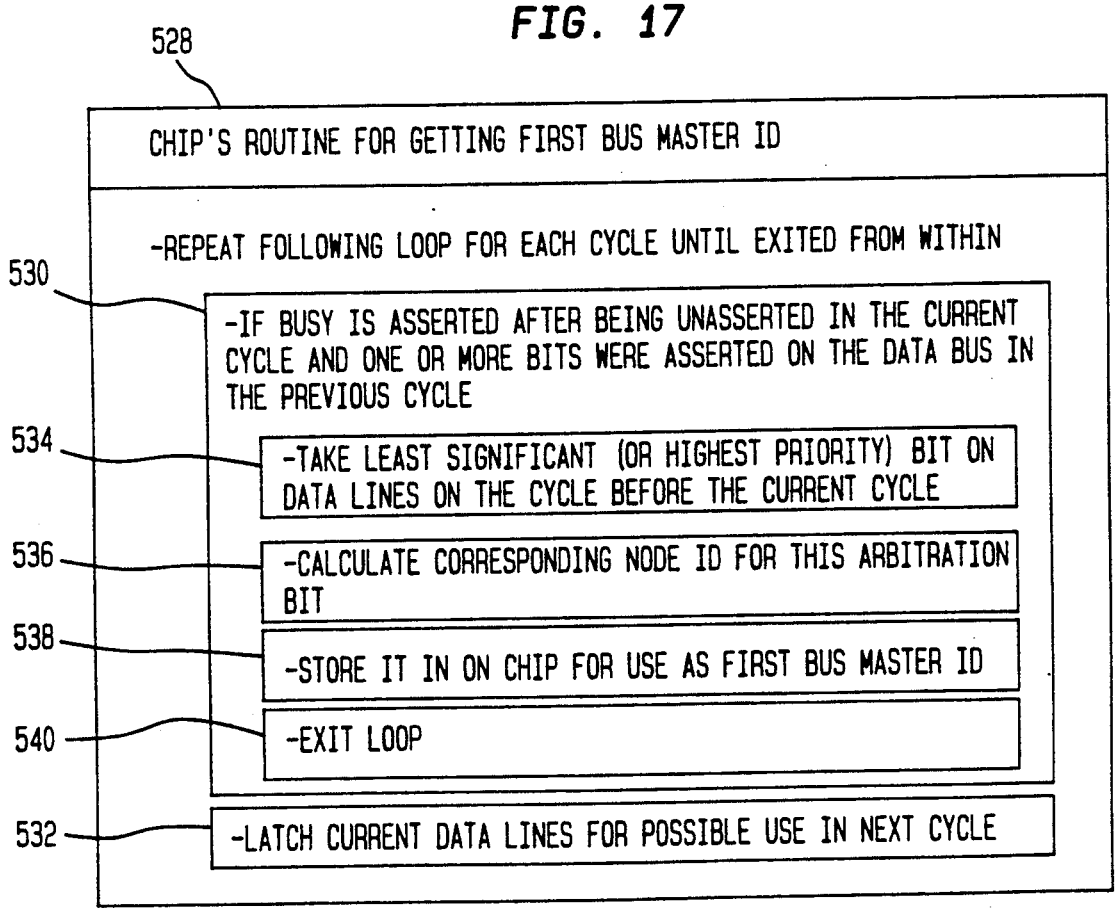

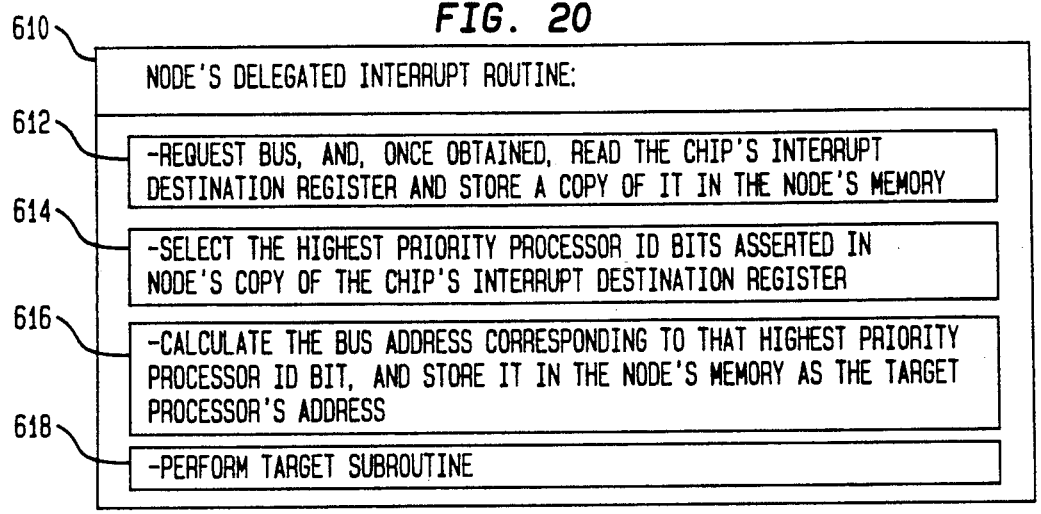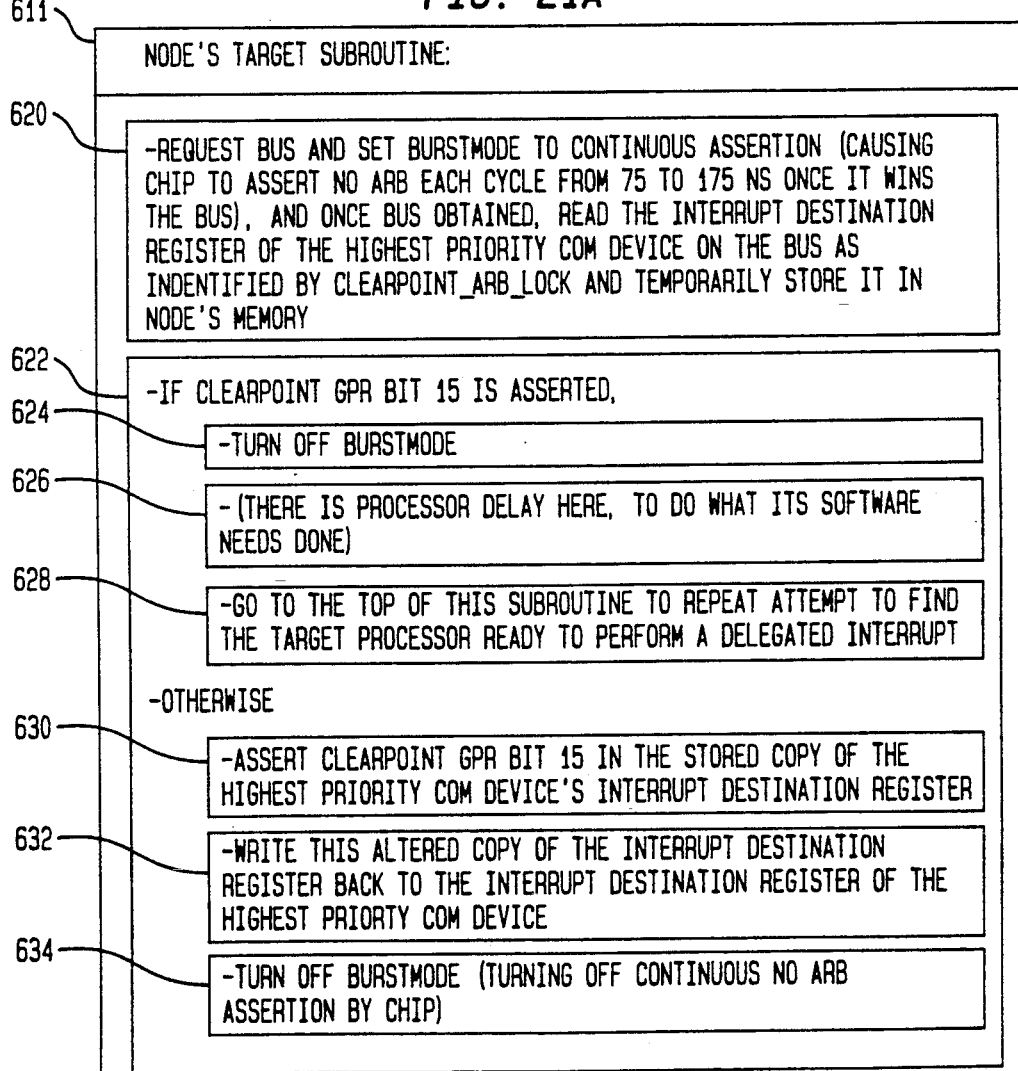

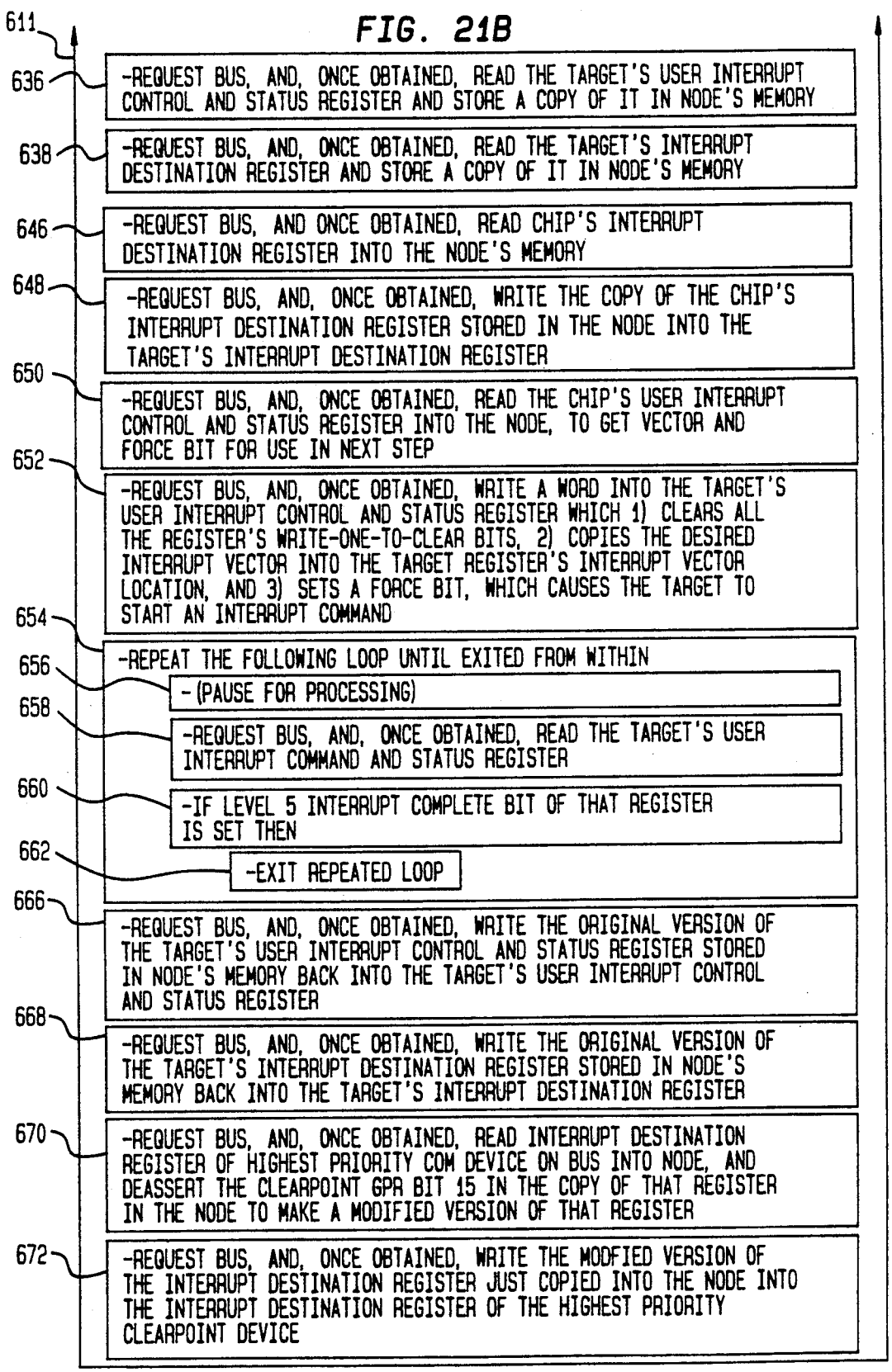

FIG. 25

SC Codes

BCI_SCN[2:0]      Meaning
Negative Logic

7       Not Active (Default)
    6       Read/write to CSR (first 8k in node space).
    5       R/W to space defined by the EADR/SADR.
    4       R/W to Multicast space.
    1       Inval/Write not to this node mem/IO space.
    0       Broadcast/Stop/Reserved to node.

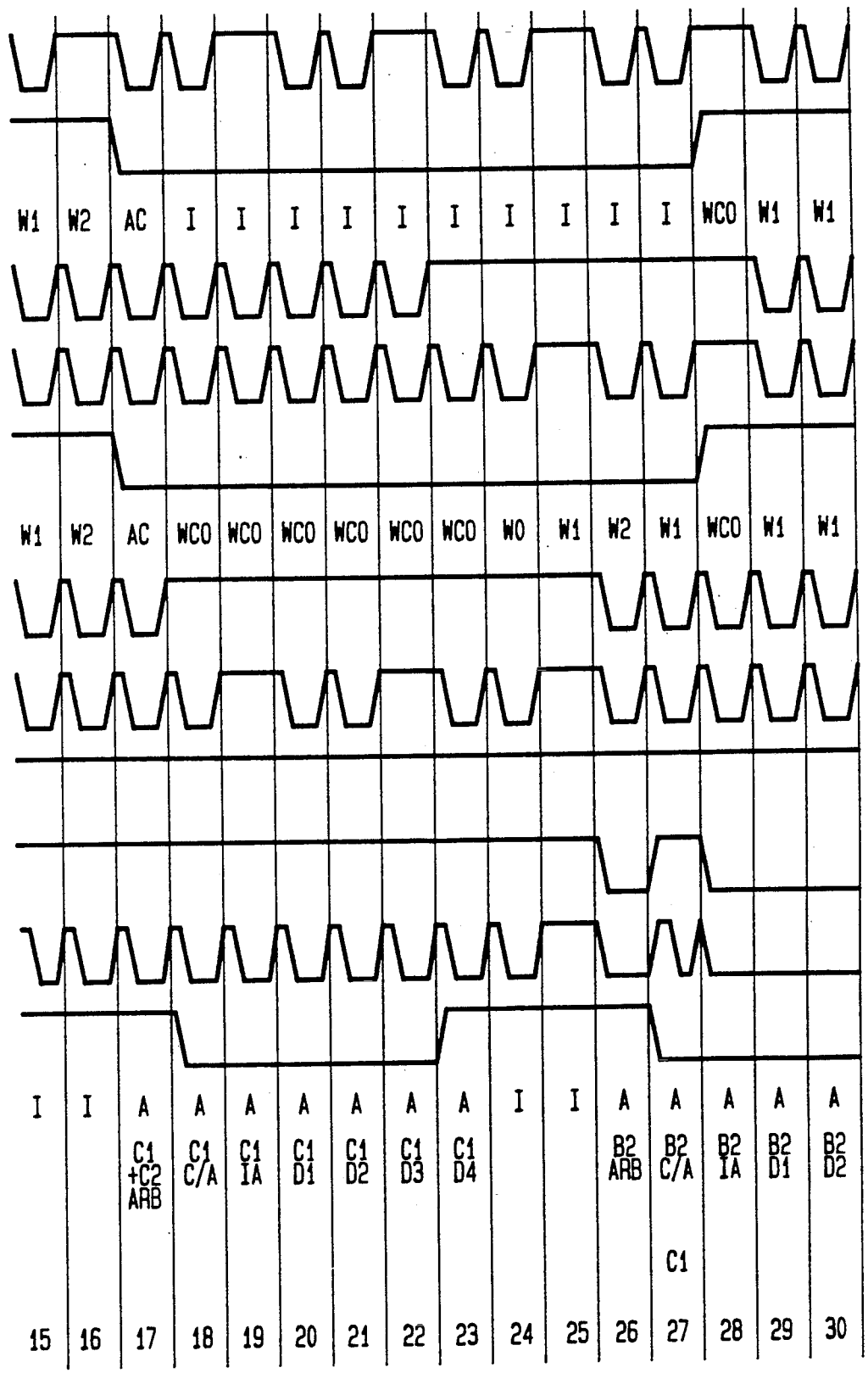
FIG. 29A (CONTINUE)

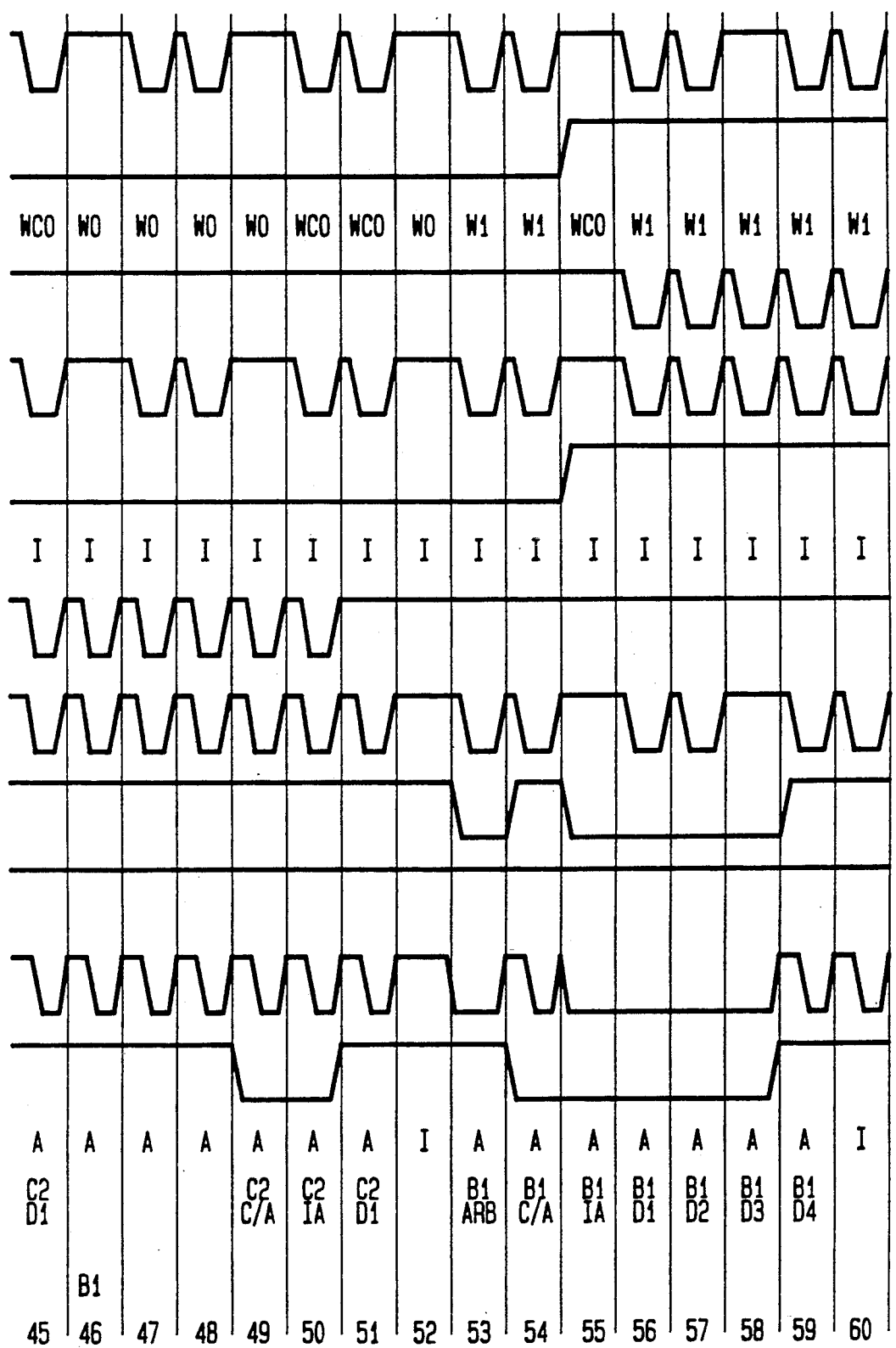
FIG. 29B (CONTINUE)

FIG. 29C (CONTINUE)
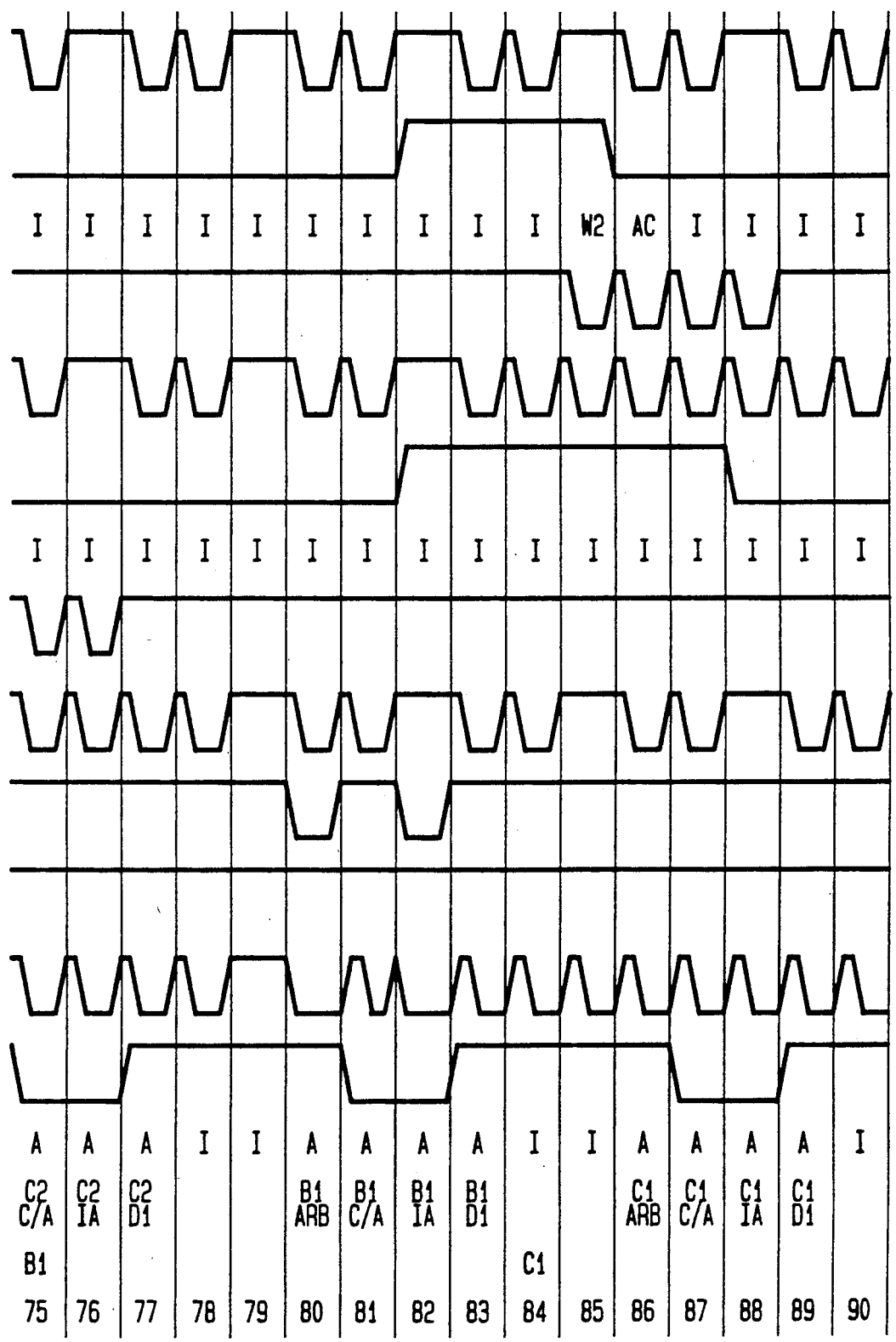

BUS DEVICE FOR GENERATING AND RESPONDING TO SLAVE RESPONSE CODES

I. FIELD OF THE INVENTION

The present invention relates to the art of digital computers, and more particularly to bus communication protocols which define the rules by which various devices connected to each other by means of a computer bus communicate with each other, and to the bus devices and their components which enable them to comply with such bus protocols. The particular invention claimed herein relates to means for generating and responding to signals used by a Slave device to inform the Bus Master of the Slave's status in a transaction.

II. BACKGROUND OF THE INVENTION

As is well known in the art of digital computers, a computer bus is the communications path used to connect the separate electronic devices of which a computer is comprised. It is, in effect, the highway on which data and commands travel between such devices. The separate devices connected by such a bus normally include one or more processors, which perform the basic computation of the system; memory boards, which provide relatively high speed storage of data and commands for use by the processors; and I/O devices, such as disk and tape drives for providing slower but much larger memory, and such as devices for communicating with other computers or with user terminals. Usually the bus is comprised of a plurality of parallel wires, and the separate electronic devices each include a printed circuit board on which electronic components are mounted. The bus normally contains a series of connector sockets attached to it. Each such connector is configured so that when an edge of a board designed for use with the bus is plugged into it, edge connectors on the board will be connected though contacts in the connector to their corresponding wires on the bus, electronically connecting wires on the board to the bus.

As used in its narrow sense, the phrase "computer bus" can refer just to a physical communications path of the type described above. Unless indicated otherwise, this is the meaning in which the word "bus" is used in the patent claims that follow. But in a broader sense, a "computer bus" is defined by much more than just the wires of which it is made. It is also defined by what is known as a bus protocol, or bus architecture. A bus protocol includes a complex set of pre-defined rules about how the wires of its bus are to be used. It specifies what information is supposed to be transmitted on which wires, by which devices, at which times. It specifies how the different devices on the bus are to respond to, and interpret, information on specific wires of the bus at given times. It specifies how the different devices on the bus are to determine which of them gets to use the bus next. And it specifies how various transactions between such devices are to be performed. A bus protocol's rules allow different devices to use the bus without interfering with each other, and make it possible for different devices to communicate with each other in a manner which is mutually understood.

Thus, it can be seen that when a given device is connected to a computer bus, it must either obey the bus protocol of the other devices on the bus or, at the least, behave in a manner that is functionally compatible with the protocol of other devices on the bus. This is necessary to enable the given device to properly communicate with such other devices, and to prevent unwanted interference between devices. Traditionally, all bus devices designed for use on a given bus seek to obey all the rules of a common protocol associated with that bus, so as to prevent communication problems. Unfortunately, however, no bus protocol can be optimal for all purposes. Therefore, the traditional requirement that all bus devices connected to a given bus must obey the protocol associated with that bus can be limiting.

As is explained below in greater detail, the preferred embodiment of the present invention relates to bus devices which use the COM, or Clearpoint Open Market, bus communications protocol. This protocol is unusual, in that it is designed for use on buses which contain one or more devices which obey another bus protocol. In the case of the COM protocol, the protocol with which it is designed to be used is the so-called BI, or Backplane Interconnect, bus protocol. "BI" is a trademark of Digital Equipment Corporation, 146 Main Street, Maynard, Mass., the company which manufactures several different models of computers which use the BI bus and bus protocol.

The BI protocol probably constitutes the most relevant prior art to the COM protocol. The BI protocol is explained in detail in the following five U.S. Pat. Nos.:

U.S. Pat. No. 4,661,905, entitled "Bus-Control Mechanism", issued to Frank C. Bomba et al. on Apr. 28, 1987;

U.S. Pat. No. 4,706,190, entitled "Retry Mechanism For Releasing Control Of A Communications Path A In Digital Computer System", issued to Frank C. Bomba on Nov. 10, 1987;

U.S. Pat. No. 4,763,249, entitled "Bus Device For Use In A Computer System Having A Synchronous Bus", issued to Frank C. Bomba et al. on Aug. 9, 1988;

U.S. Pat. No. 4,769,768, entitled "Method And Apparatus For Requesting Service Of Interrupts By Selected Number Of Processors", issued to Frank C. Bomba et al. on Sept. 6, 1988; and U.S. Pat. No. 4,787,033, entitled "Arbitration Mechanism For Assigning Control Of a Communications Path In A Digital Computer System", issued to Frank C. Bomba et al. on Nov. 22, 1988.

Collectively these five patents are referred to herein as the "BI patents", and the BI patents are hereby incorporated herein by reference. Because of the BI protocol's relevance to the present invention, a detailed description of that protocol, derived from the BI patents, is set forth below in the Detailed Description Of Preferred Embodiments.

The preferred embodiment of the present invention also relates to bus interface chips of the type designed to be part of a bus device and to connect the wires of the computer's bus with the wires of an internal bus, or collection of wires, contained on such a bus device. Commonly such interface chips contain much of the logic which enables the bus devices of which they are part to obey a given bus protocol. Bus interface chips of this general description are well known in the computing arts. For example, most bus devices which use the BI bus protocol use a bus interface chip called the BIIC, or BI Interface Chip, which is sold by Digital Equipment Corporation.

III. BRIEF DESCRIPTION OF THE INVENTION

A. Objects of the Invention

An object of the invention is to provide a bus device of a first type which is compatible with bus devices of a second type without being limited by the bus communications protocol used by devices of the second type.

Another object of the invention is to provide a bus device which requires a reduced number of types of responses to transaction status signals generated by Slave devices.

Yet another object of the invention is to simplify the logic required for generating such transaction status signals.

B. Cross-Reference to Related Applications

This application is directed to one of the several inventive aspects of the COM bus communication protocol. It is one of a group of eleven related applications, filed concurrently herewith. These eleven applications include the following:

"Bus Device Which Arbitrates Despite Assertion Of An Arbitration Prevention Signal", invented by Vincent P. Bono, Lauren D. Baker, Gary W. Stevens, and William C. Herbst.

"Bus Device Which Asserts A Signal And Determines If Other Devices Are Asserting That Signal During The Same Cycle", invented by Vincent P. Bono, Lauren D. Baker, Gary W. Stevens, and William C. Herbst.

"Bus Device Which Arbitrates In Response To Multiple Bus Signals", invented by Lauren D. Baker, Gary W. Stevens, and William C. Herbst.

"Bus Device Which Does Not Perform Imbedded Arbitration Or Assume Pending Master Status", invented by Lauren D. Baker, Gary W. Stevens, and William C. Herbst.

"Bus Device For Generating And Responding To Slave Response Codes", invented by Lauren D. Baker, Gary W. Stevens, and William C. Herbst.

"Bus Device Which Performs Atomic Read-Modify-Writes Using A Bus Monopolization Signal", invented by Gary W. Stevens, William C. Herbst, and Lauren D. Baker.

"System For Responding To Command/Address Cycles", invented by Lauren D. Baker, Gary W. Stevens, and William C. Herbst.

"Bus Device Which Performs Protocol Confidential Transactions", invented by William C. Herbst, Gary W. Stevens, and Lauren D. Baker.

"Bus Device Which Performs Delegated Interrupts", invented by William C. Herbst, Gary W. Stevens, and Lauren D. Baker.

"Bus Device Which Abstains From Round Robin Arbitration", invented by Lauren D. Baker, Gary W. Stevens, and William C. Herbst.

"Bus Device Which Jams The Protocol Of Other Bus Devices", invented by Lauren D. Baker, Gary W. Stevens, and William C. Herbst.

"Bus Interface Which Sequentially Addresses Successive Transactions", invented by Gary W. Stevens, Lauren D. Baker, William C. Herbst.

SUMMARY OF THE INVENTION

According to one aspect of the present invention, a bus device of a first type is provided which uses a first bus communications protocol, and which is designed for use in a computer system having a bus, including lines for carrying ACK, NO ACK, and RETRY signals, and one or more bus devices of a second type. These second type devices use a second bus communications protocol according to which, if a Slave device addressed in a transaction is absent from the bus or has an indication that it cannot perform the transaction, a NO ACK signal should be generated on the system bus, and the Master responds to such a NO ACK by terminating the transaction in one manner. According to the second protocol, however, if the Slave has an indication that it will be able to complete the transaction, but only after a certain delay, the Slave places a RETRY signal on the system bus, and the Master device responds to the RETRY by terminating the transaction in another manner and then attempting to repeat the transaction later. According to this aspect of the invention, the first type device includes means for responding, when it is a Bus Master, to the receipt of either a NO ACK or a RETRY from a Slave by generating a common signal indicating the receipt of one of those two signals, and means for responding to the common signal by terminating the transaction and attempting to repeat it later.

In a preferred embodiment of this aspect of the invention, the first type device further includes means for keeping a count of the number of the common signals, indicating the receipt of either a NO ACK or a RETRY, generated in response to repeated attempts to complete a given transaction. The first type device also includes means for aborting further attempts to repeat the given transaction if this count exceeds a given number.

Another aspect of the present invention relates to bus device of a first type which uses a first bus communications protocol and which is designed to work with second type bus devices which use a second bus communications protocol. This second protocol dictates that if a second type Slave device has an indication that it can complete its transaction, but not within the normal time period, it places a STALL signal on the system bus. The protocol dictates that if the second type Slave has an indication that it will be able to complete the transaction, but only after a delay which is so long that it would result in inefficient use of the system bus to extend the transaction by using the STALL signal until that delay is over, the Slave places a RETRY signal on the system bus. The second protocol also dictates that if the second type Slave device places a STALL on the system bus to extend a transaction, it monitors how many cycles it asserts STALL, and, if it has been asserting that signal for over a specified number of cycles, it replaces STALL with a RETRY signal. According to this aspect of the invention, the first type device is similar in its use of the STALL and RETRY signals, except that it does not including any means for replacing a STALL with a RETRY during a given transaction in which the first type device is a Slave device.

IV. DESCRIPTION OF THE DRAWINGS

The foregoing and other and further objects and features of the invention will more readily be understood from the following detailed description of the invention, when taken in conjunction with the accompanying drawings, in which FIGS. 1-8 have been largely copied from the BI patents and represent prior art, and in which.

FIG. 2 illustrates the lines contained in the BI and COM bus;

FIG. 3D illustrates the arbitration function sequence of a BI device.

FIG. 3E illustrates BUSY and NO ARB sequences of a BI device.

FIG. 4A, is a table setting forth the structure of a BI Read-type transaction;

FIG. 4C is a table setting forth the structure of a BI INVALIDATE transaction;

FIG. 4E is a table setting forth the structure of a BI IDENTIFY transaction;

FIG. 4H is a table setting forth the structure of a BI BROADCAST transaction;

FIG. 5A is a table summarizing the command codes of the BI and COM protocols;.

FIG. 5B is a table summarizing the read data status codes of the BI and COM protocols;

FIG. 5C is a summary of the data length codes of the BI and COM protocols;

FIG. 6 is a table of the Response Codes of the BI and COM protocols;

FIG. 7A is a diagram of the register set contained on BI bus interface chips;

FIG. 7B is a more detailed diagram of the Device Type Register, shown in FIG. 7A., indicating specific utilization of various bits within that register;

FIG. 7C is a more detailed diagram of the BI Control And Status Register, shown in FIG. 7A, indicating the specific utilization of various bits within that register;

FIG. 7F is a more detailed diagram of the Interrupt Destination Register, shown in FIG. 7A, indicating the specific utilization of various bits within that register;

FIG. 7G is a more detailed diagram of the Interprocessor Interrupt Mask Register, shown in FIG. 7A, indicating the specific utilization of various bits within that register;

FIG. 7H is a more detailed diagram of the Interprocessor Interrupt Destination Register, shown in FIG. 7A, indicating the specific utilization of various bits within that register;

FIG. 7I is a more detailed diagram of the Interprocessor Interrupt Source Register, shown in FIG. 7A, indicating the specific utilization of various bits within that register;

FIG. 7O is a more detailed diagram of the User Interrupt Control and Status Register, shown in FIG. 7A, indicating the specific utilization of various bits within that register;

FIG. 13 is a schematic representation of the logic used by the COM bus interface chip to control Bus Master Jamming, which prevents imbedded arbitration when the COM device is Bus Master;

FIG. 14 is a schematic representation of the logic used by the COM chip to control Tri-Cycle Jamming, which prevents imbedded arbitration when a BI device takes control of the bus on the cycle after it wins an arbitration;

FIG. 15 is a schematic representation of the logic used by the COM chip to control Loop-Back Jamming, which prevents imbedded arbitration when a BI device takes control of the bus after winning an arbitration during the first cycle of a BI loop-back transaction;

FIG. 16 is a schematic representation of the logic used by the COM chip to control its assertion of the information lines on the CM bus during an imbedded arbitration cycle so as to effect round robin arbitration performed by BI devices;

FIG. 17 is a schematic representation of the logic used by the COM chip to obtain the ID number of the first device to become Bus Master after initialization, which is used by the logic shown in FIG. 16;

FIGS. 20 and 21 are schematic representations of the steps used by the COM node to perform a delegated interrupt;

FIG. 25 is a table of Select Codes generated on the BCI bus by a COM chip to inform a COM node of the type of command/address information received from the COM bus in a Command/Address cycle;

Figure 29A:
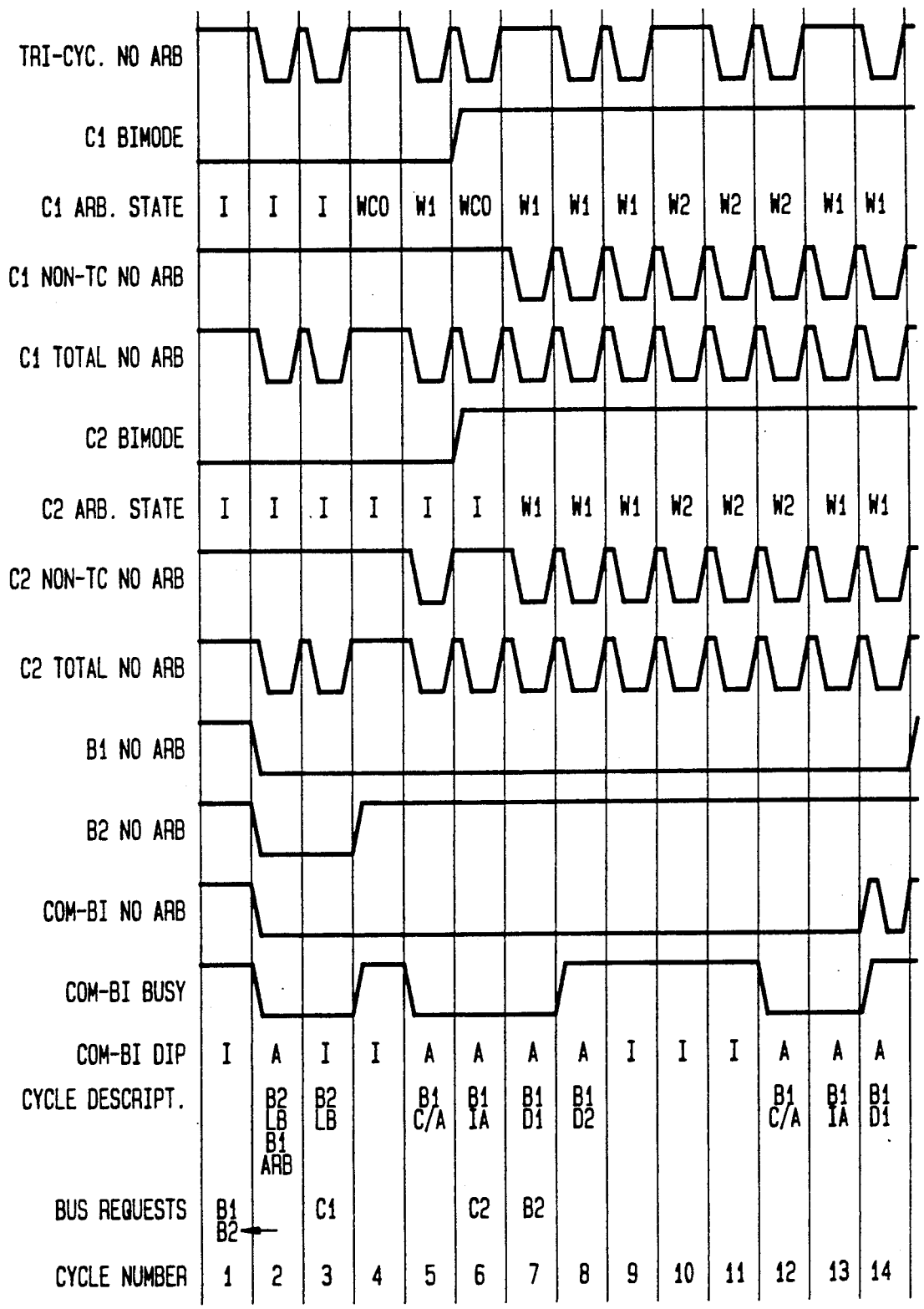
Figure 29B:
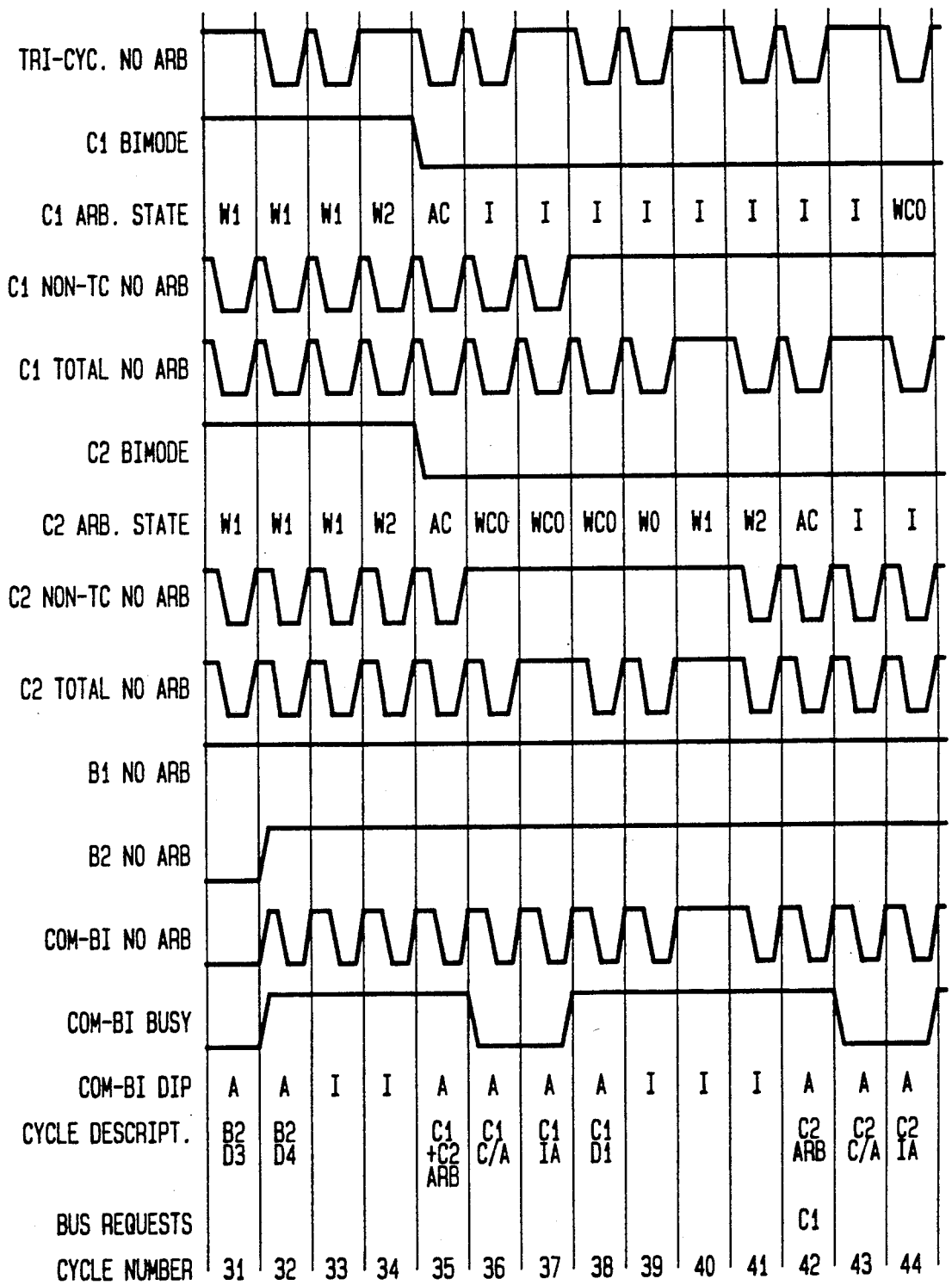

FIGS. 29A-29B form a schematic representation of the NO ARB and BUSY waveforms produced on a single COM bus over multiple transactions by two COM devices in jamming mode and two BI devices, with an indication for each bus cycle of each COM device's arbitration state, the assertion of the DIP lines, and the tri-cycle jamming and other components of each COM device's NO ARB output.

V. DETAILED DESCRIPTION OF THE PREFERRED EMBODIMENTS

The preferred embodiments of the present invention relate to bus devices, and their included bus interface chips, which use the Clearpoint Open Market, or COM, bus communications protocol. We call such bus devices "COM devices" and their integrated bus interface circuits "COM bus interface chips", or just "COM chips". The COM protocol is unusual in that it lets COM devices communicate, not only with other COM devices, but also with devices which use another protocol called the BI, or Backplane Interconnect, bus communication protocol, which is described in detail in the BI patents identified above. In order to understand what is new and significant about the COM protocol it is necessary to understand the BI protocol in detail. Thus, for the convenience of the reader, a detailed explanation of the BI protocol, derived from the BI patents, is set forth in the following section A.

A. PRIOR ART BI PROTOCOL

1. BI Computer Systems and System BUS

Figure 1A:
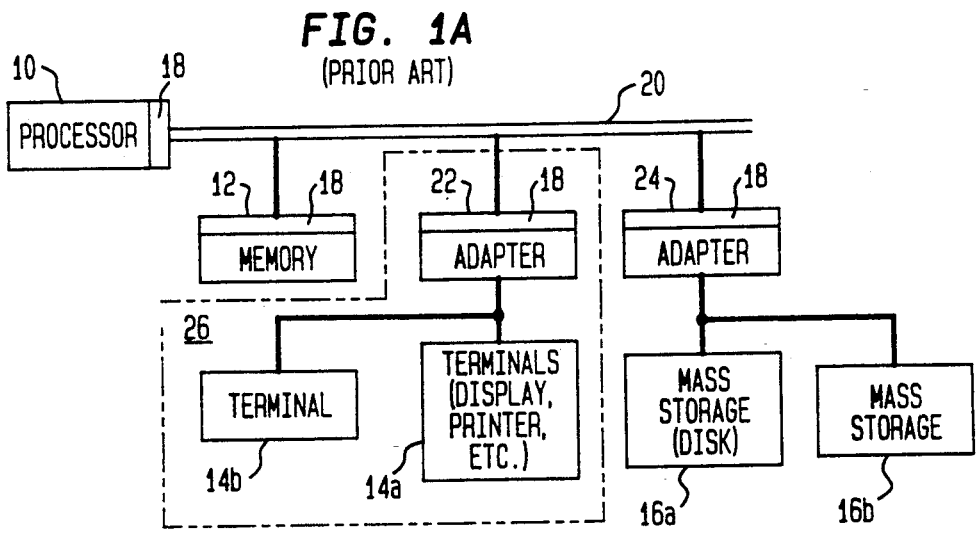
FIGS. 1A–1C are schematic block representations of various processor and device configurations of a computer system using a BI or COM bus.

FIG. 1A illustrates the utilization of the BI bus in a configuration typical of small and relatively inexpensive BI computer systems. As there illustrated, a processor 10, memory 12, terminals 14, and mass storage units (disks) 16 are interconnected to each other via BI interconnecting means 18 and a BI communications path, or bus, 20. In the case of processor 10 and memory 12, the interconnecting means 18 are preferably located integrally within the device and, thus, provide the communications interface to the device. In the case of the terminals 14 and storage units 16, a BI interconnecting means 18 is located in intermediate adapters 22, 24, respectively, which may be provided in order to allow the connection of a number of terminals or storage devices to a single such interconnecting means. The adapters serve to interface the communications bus 20 to the remainder of the device. In both cases, the majority of the logic associated with the interconnecting means 18 is located on an integrated circuit called the BIIC, or BI Interface Chip. This BIIC chip is in many ways similar to the COM chip which is described in detail below.

Figure 1B:
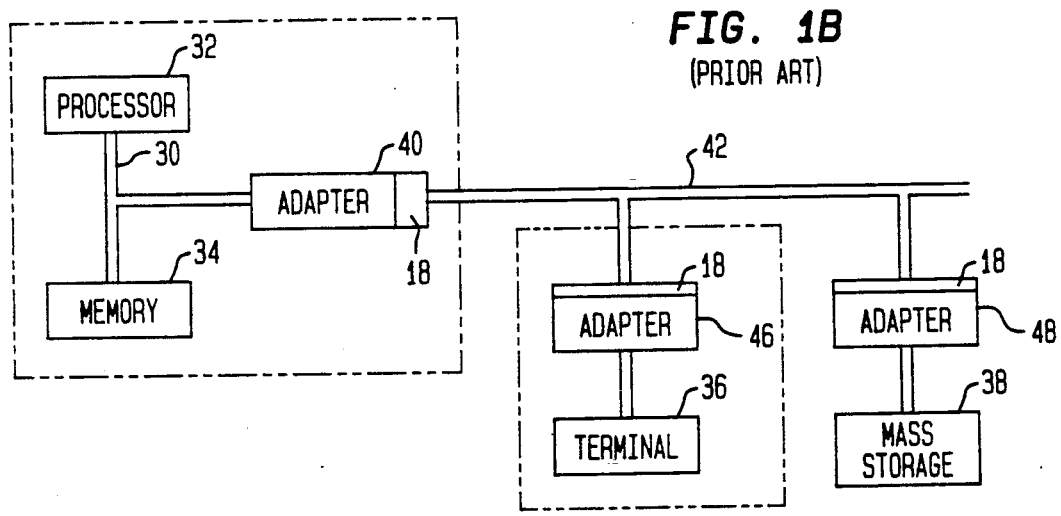

As utilized herein, the term "device" denotes one or more entities connected to the communications path by a common BI interconnecting means, including a BI bus interface chip. Thus, in FIG. 1A, the terminals 14 and adapter 22 comprise a single device 26; similarly, processor 10 and main memory 12 are each devices. In FIG. 1B, the processor 32 and memory 34, together with adapter 40, comprise a single device.

In FIG. 1A, it will be noted that the processor 10 shares the memory 12 with the other devices connected to communications path 20. This results in lower system cost, but limits system speed because of the need to share the BI bus 20. In FIG. 1B, this problem is resolved by providing a separate memory path 30 between a processor 32 and a memory 34. The processor and memory are then connected to terminal devices 36 and mass storage devices 38 via a adapter 40, a BI bus 42, and adapters 46 and 48. The adapter 40 has a BI interconnecting means 18 integral with it and connecting the adapter to the BI bus 42. Similarly adapters 46 and 48 each have an interconnecting means 18 integral therewith and connecting them to the path 42. A system of this type offers higher performance, but at a higher cost. However, it is still fully compatible with the BI interconnecting means described herein.

Figure 1C:
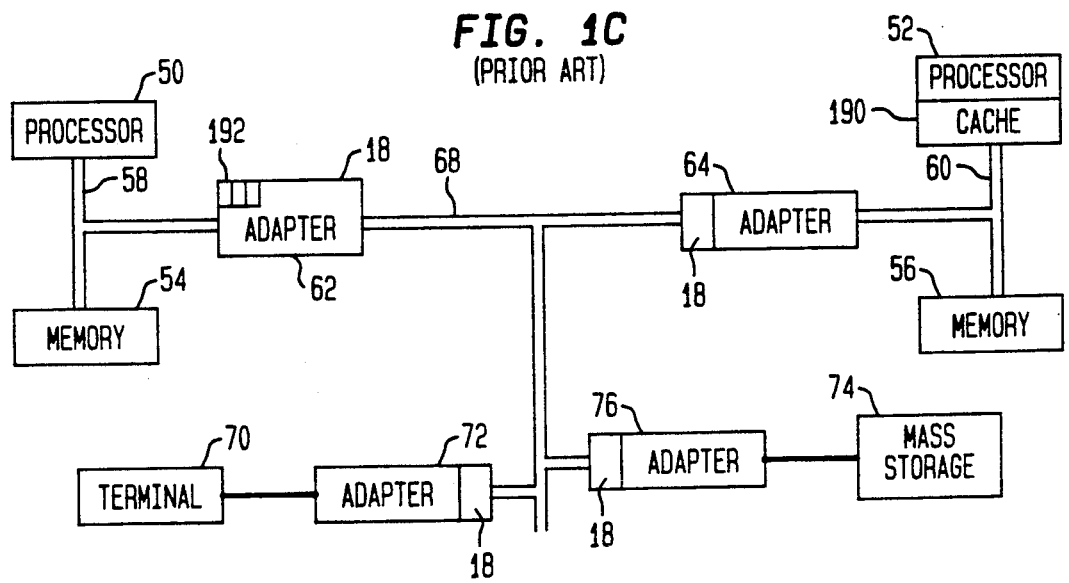

Finally, FIG. 1C illustrates the use of the BI interconnecting means in a multi-processor system. In this Figure, processors 50 and 52 are connected to primary memories 54, 56, respectively, by memory paths 58, 60, respectively. The processor-memory pairs, in turn, are connected to the remainder of the system via adapters 62, 64, respectively, having BI interconnecting means 18 incorporated integrally therewith and interconnected by a BI bus 68. A cache memory 190 is associated with one of the processors, e.g., processor 52. The remainder of the system is then essentially that shown in FIG. IB, namely, one or more terminals 70 connected to the bus 68 via an adapter 72 having a BI interconnecting means 18 therein, and a mass storage device 74 interconnected to the bus 68 via an adapter 76 having an interconnecting means 18. In this configuration, not only can each processor communicate with each device in the system, but the processors can communicate directly with each other. Further, cache memory 190 is effectively accommodated. Despite the differing nature and level of complexity imposed by this demanding mixture of devices in the same system, the BI interconnecting means described herein efficiently controls all the communications in essentially the same way.

FIGS. 1A-1C illustrate BI computer systems in which only BI bus devices are used. It should be understood, however, that COM devices using the COM bus interface chip, instead of a BIIC, in its interconnecting means, could be connected to the system buses 20, 42, and 68, shown in FIGS. 1A, 1B, and 1C. Such COM chips can be used as interconnecting means in memory devices and I/O devices, such as disk, tape, and terminal devices. The current COM chips, however, are not designed to operate as the interconnection means for processors devices. Thus, it is currently planned that COM devices will always work with at least one BI device, that is, a processor, connected to the same system bus.

Returning now to the description of the BI protocol, FIG. 2 lists the significant lines, or wires, contained in the BI bus, and groups them in accordance with their principal functional class. Within each class, the wires are grouped by their separate sub-functions. A line or wire is considered to be asserted if any device attached to the line asserts it. The line is deasserted only if no device is asserting it.

For purposes of illustration, two separate BI interconnecting means, designated A and B, respectively, each of which is part of corresponding physical bus devices whose communications they control, are illustrated schematically as being connected to each end of the bus. However, it should be understood that path 78 will typically physically link more than two BI devices at any one time, although only those devices selected by the Current Master will actually participate in a transaction. The remaining devices remain physically connected to the communications path but do not participate in the transaction.

As illustrated in FIG. 2, there are four broad classes of signals utilized by BI interconnecting means, namely, Information Transfer class signals; Response class signals; Control class signals; and Power class signals.

The "Information Transfer" class signals include an Information field, designated I[3:0], which is transmitted and received over four separate lines 80 of the path 78. The Information lines carry information such as the command code, a code identifying the device initiating the transaction (the "Current Master"), and information specifying the status of data transmitted during the cycle, among other information. A thirty-two bit data word transmitted over the data lines 82, labeled D[31:0] in FIG. 2, provides certain information needed in the transaction, such as the length of a data transfer that is to take place (used in Read-type and Write-type transactions); the identity of a device which is selected to participate in the transaction; the address of memory locations which are to be accessed for data transfer; and the data which is to be transferred. This word is transmitted and received over thirty-two separate lines 82. Two lines, 84 and 86, designated "PO," the "parity" line used for indicating the parity on the information and data lines, and BAD, signaling an error condition, are also provided.

The "Response" class of signals comprises a three-bit field, designated CNF[2:0] and transmitted over lines 88, which provides a response to various information transmitted to a device and which allows the devices to alter the progress of the transactions, as described in more detail subsequently.

The "Control" class signals are transmitted over a group of eight lines 90-104. The first of these signals, NO ARB, controls the arbitration process. The second of these, BUSY, or BSY as it is sometimes called, indicates current control of the communications path by a device. These two signals are used in conjunction with each other to provide an orderly transition of control among devices seeking control of the communications path.

Of the remaining signals in the control class, the Time+ and Time- signals comprise waveforms generated by a single source connected to the path 98 and transmitted over lines 94 and 96, respectively; they are used in conjunction with Phase+ and Phase- waveforms, also generated by a single source, and transmitted over lines 98 and 100, respectively, to establish the local timing reference for operation of the BI interconnecting means at each device. Specifically, the interconnecting means of each BI device connected to the path 78 generates local transmitting and receiving clock signals, TCLK and RCLK, respectively, from the Time and Phase signals. Finally, the STF signal, transmitted over line 102, is used to enable a "Fast Self Test" of the local devices, as described in more detail hereinafter. According to the BI patents the RESET signal, transmitted over line 104, provides a means of initializing (setting to a known status) the devices attached to the communications path.

In the "Power" signal class, the AC LO and DC LO signals are transmitted over lines 104, 106, respectively and are monitored by each device to determine the status of the AC and DC power within the system. A Spare line 110 provides for future expansion.

Figure 3A:
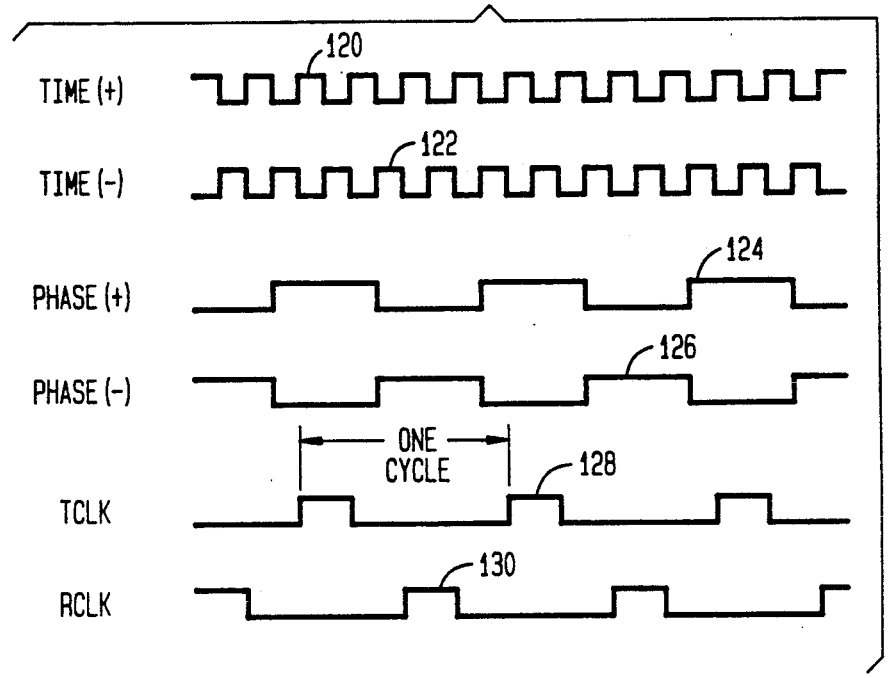
FIG. 3A is a timing diagram illustrating the bus timing signals that define-transaction cycles for BI and COM bus devices.

The BI interconnecting means described herein performs its function of establishing communication among selected devices by performing a sequence of operations that are specific to the type of communication to be undertaken. Each operation comprises a sequence of cycles during which various elements of information are placed on, or received from, the BI bus in order to effectuate the desired communication with another device or devices connected to that bus. These cycles are defined by the Time and Phase clocks as may be understood more clearly on reference to FIG. 3A, which shows Time+ and Time- clock signals 120 and 122, respectively, as well as Phase+ and Phase- signals 124 and 126, respectively. These signals are generated by a single Master clock connected to the communications path. They are received by the interconnecting means of each device and used to generate the local TCLK and RCLK signals 128 and 130, respectively, which control the transmission and reception of information by them.

Figure 3B:
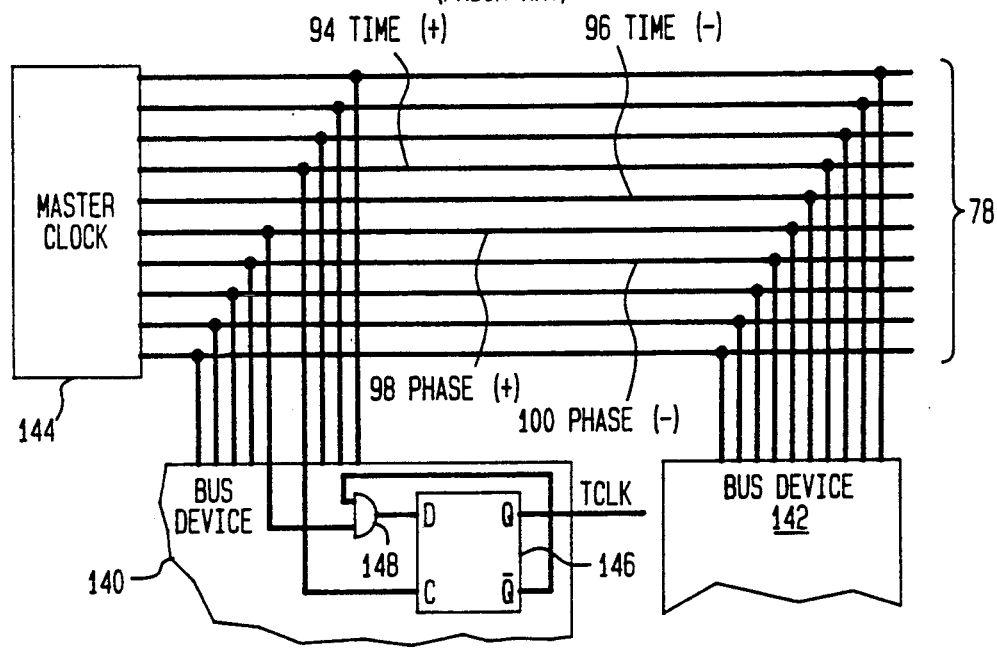
FIG. 3B is a block diagram depicting a master clock and certain elements of a BI bus device which are controlled by the bus timing signals.

Thus, as shown in FIG. 3B, a number of BI devices 140, 142, etc. are connected in parallel to the system bus, so as to transmit and receive information over its lines. These devices may be input/output (I/O) devices such as printers, display terminals, etc. or may be devices such as processors. The physical placement of the devices on the bus is immaterial. A Master Clock 144 also connected to the path generates the Time and Phase signals which are transmitted to each device over lines 94-100. Each interconnecting means includes timing circuitry for generating local transmitting and receiving clocks TCLK and RCLK, respectively. For example, device 140 may include a flip-flop 146 whose Q output produces TCLK. The flip-flop is set from a gate 148 and is clocked by the Time+ signal from line 94. Gate 148, in turn, is enabled by line 98 and the Q bar output. In similar fashion, the local Slave receive clock, RCLK, is generated from the received Time+ and Phase- signals. The timing signals on the BI bus are designed to make each bus cycle 200 nanoseconds long, to make TCLK be asserted from 0 to 50 nanoseconds in each cycle, and to make RCLK be asserted from 100 to 150 nanoseconds in each cycle.

Figure 3C:
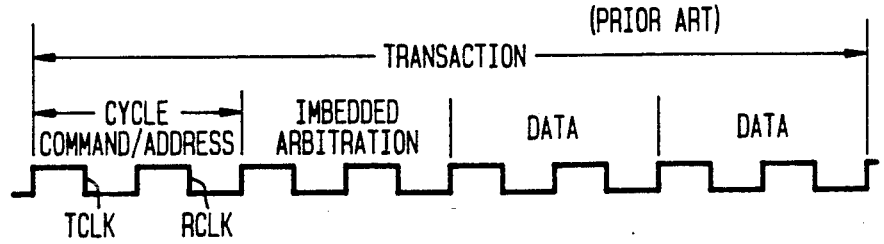
FIG. 3C is a timing diagram depicting the timing for a transaction performed by a BI or COM bus device.

As shown in FIG. 3C, the time between the start of successive TCLK signals defines a cycle. A sequence of successive cycles which is utilized to perform a desired interchange of information is herein called a "transaction." Although the detailed characteristics of each transaction vary in accordance with the operation performed by it, each transaction consists, generally, of a Command/Address cycle; an Imbedded Arbitration cycle; and one or more additional cycles, most commonly designated as "Data" cycles. For purposes of illustration only, two such data cycles are shown in FIG. 3C. In general, information is placed on the communications path 78 at the leading edge of TCLK, which is at the start of cycle, and is latched into the interconnecting means of a device during RCLK of the same cycle, which extends from 100 to 150 nanoseconds into the cycle.

A diagram of the Arbitration State Machine contained in each BI interface chip, or BIIC, is shown in FIG. 3D. The Arbitration State Machine remains in the Idle state 150 until some element in the BIIC's associated BI device causes it to seek to initiate a transaction as indicated by REQ in FIG. 3D. When this occurs, the BIIC determines whether it is free to assert its arbitration signals on the path 78 by examining the NO ARB line. As long as NO ARB is asserted, the arbitration function must remain in the Idle state. However, as soon as NO ARB is deasserted, the device may arbitrate during the following cycle, provided that REQ is still asserted. Under these conditions, it enters the arbitration state 152 in which the device arbitrates with other devices seeking access to the communications path. The manner of arbitration will be described in more detail hereinafter.

A device losing the arbitration returns to the idle state 150, from which it may again seek to arbitrate as long as REQ is asserted. Conversely, a BI device winning the arbitration enters either the Current Master state (if BUSY is deasserted) or the Pending Master state (if BUSY is asserted.) A BI device which is Pending Master remains Pending Master as long as BUSY is asserted, and becomes Current Master following the deassertion of BUSY.

Before describing the operation sequence of each of the transactions provided for by the interconnect, it will be helpful to obtain a more detailed understanding of some of the Control, Response, and Information Transfer class signals of the BI bus themselves, as these are common to essentially all the transaction types.

2. BI Control Signals: NO ARB, Busy

The NO ARB signal controls access to the data lines for purposes of arbitration. BI devices may arbitrate for use of the communications path only in those cycles for which NO ARB has been deasserted for the previous cycle. The device which has control of the interconnect (the "Current Master") asserts NO ARB throughout the transaction, except during the first cycle and the last expected data cycle. (The last expected data cycle of a transaction is usually the last data cycle, in fact; however, as described more fully hereafter, devices may delay completion of a transaction under certain conditions. When they do, the cycle that is expected to be the last data cycle no longer is, and subsequent cycles follow before all the data is transferred.) NO ARB is also asserted by a BI Pending Master until it becomes the Current Master. At any one time, there is at most only one Current Master and one Pending Master. It should be noted that if we refer to a device merely as the "Master" or "Bus Master", we mean that it is the Current Master. When we want to indicate that a device is a Pending Master we will always use the words "Pending Master".

NO ARB is also asserted during an arbitration cycle by all arbitrating BI devices. During an Imbedded Arbitration cycle, this assertion is in addition to the assertion of NO ARB by the Current Master. During an Idle Arbitration cycle, assertion of NO ARB by an arbitrating device will preclude subsequent arbitrations until one of the devices currently arbitrating becomes Current Master.

NO ARB is additionally asserted by Slave BI devices (devices selected by the Current Master) for all cycles in which the Slave asserts STALL, as well as for all data cycles except the last. It is also asserted by a BI device (coincidentally with assertion of BUSY) during special modes when the device communicates with is own interconnecting means. In these special mode transactions, which we call loop-back transactions, the BI device does not use any lines of the BI bus other than BUSY and NO ARB. Due to the potential of being selected as Slave, a BI device is prevented from entering a loop-back transaction during a Command/Address cycle. A device may operate in a loop-back, for example, in order to access registers in its BIIC without requiring use of the data, information, or parity lines of the BI bus. Further, it may also be desirable to allow a BI device which is a Current Master to continue assertion of NO ARB beyond its usual termination cycle to thereby perform a sequence of transactions, which we collectively call a block transaction, without relinquishing control of the communications path. This would be particularly useful for high speed devices to allow extended information transfer cycles, and thus, effectively increase the available bandwidth for that device.

BUSY indicates that a transaction is in progress. It is asserted by the Current Master during the entire transaction, except during the last expected cycle. It is also asserted by Slave devices which need to delay progress of the transaction (e.g., a memory device which needs additional time to access a particular memory location); the delay is accomplished by asserting BUSY and NO ARB together with a STALL response code (to be described later). In addition, BUSY is also asserted for all data cycles except the last. A device may also extend the assertion of BUSY in order to delay the start of the next transaction, or when operating in the loop-back transactions discussed above.

BUSY is examined by devices at the end of each cycle; when deasserted, a BI Pending Master may assert it and assume control as Current Master.

FIG. 3E is a state diagram of possible sequences of the BUSY and

NO ARB control lines in the BI protocol. It will be used to illustrate the manner in which the joint observation of these signals efficiently controls the exchange of information from device to device on the communications path.

Upon initialization, all BI devices assert NO ARB (State "A") effectively preventing access by any device until all devices deassert the line (State "B"), at which time the communications path enters the IDLE state. This allows time for all devices to complete any power up initialization sequence, if required. Once NO ARB is deasserted and State "B" is thereby entered, devices may freely seek to contend for control of the communications path. Once a device arbitrates, State "A" is again entered, whereupon the "winning" device enters Command/Address State "C". It is important to note that BI devices recognize such a Command/Address cycle not only by the transition of BUSY from the deasserted to the asserted state, which we called a "busy-edge", but also by the assertion of NO ARB in the previous cycle. Apparently the designers of the BI protocol felt the observation of NO ARB in the previous cycle is necessitated for BI devices, in order to prevent them from confusing the first cycle of a loop-back state with a Command/Address cycle.

The first entry of State "D" from the Command/Address state is indicative of the Imbedded Arbitration cycle of a transaction. It is in this Imbedded Arbitration cycle that BI devices which are in the "dual round robin" mode, described below, observe the encoded Master ID placed on the Information lines by the Bus Master, so as to determine whether they will arbitrate in the high or low priority band if they arbitrate in the next arbitration cycle.

Depending on the data length of the transaction, control may remain in this state for subsequent cycles. If no arbitration occurs, the Master and Slave will relinquish control of the communications path when they complete their transaction and then the flow will proceed again back to State "B", in which both control signals are deasserted. If, however, a Pending Master exists, state F will be subsequently entered, whereupon the device asserting NO ARB will notice the deassertion of BUSY in this cycle and proceed either to Command/Address "C" or "G" depending on whether the Bus Master, as part of a BI block transaction, is precluding further arbitration by other devices (referred to as "BURST MODE" in the diagram). Note that in State "G" the Command/Address control signals show that NO ARB and BUSY are both asserted which differentiates this from Command/Address State "C".

If the previous transaction was extended by the assertion of BUSY, and no Pending Master had existed, control would have sequenced from State "D" to "E", and remain in State "E" for one or more cycles as required. The witnessed assertion of BUSY would cause control to remain in this state for one or more cycles, whereupon the sequence may continue back to IDLE State "B" and relinquish the communications path for future transfers.

As described above, a loop-back transaction may have alternatively caused control to return to State "D" for one or more cycles if one particular device wished preclusion of selection as a Slave by any other device. The simultaneous deassertion of BUSY and NO ARB would then again return control to State "B", the IDLE condition.

Figure 8:
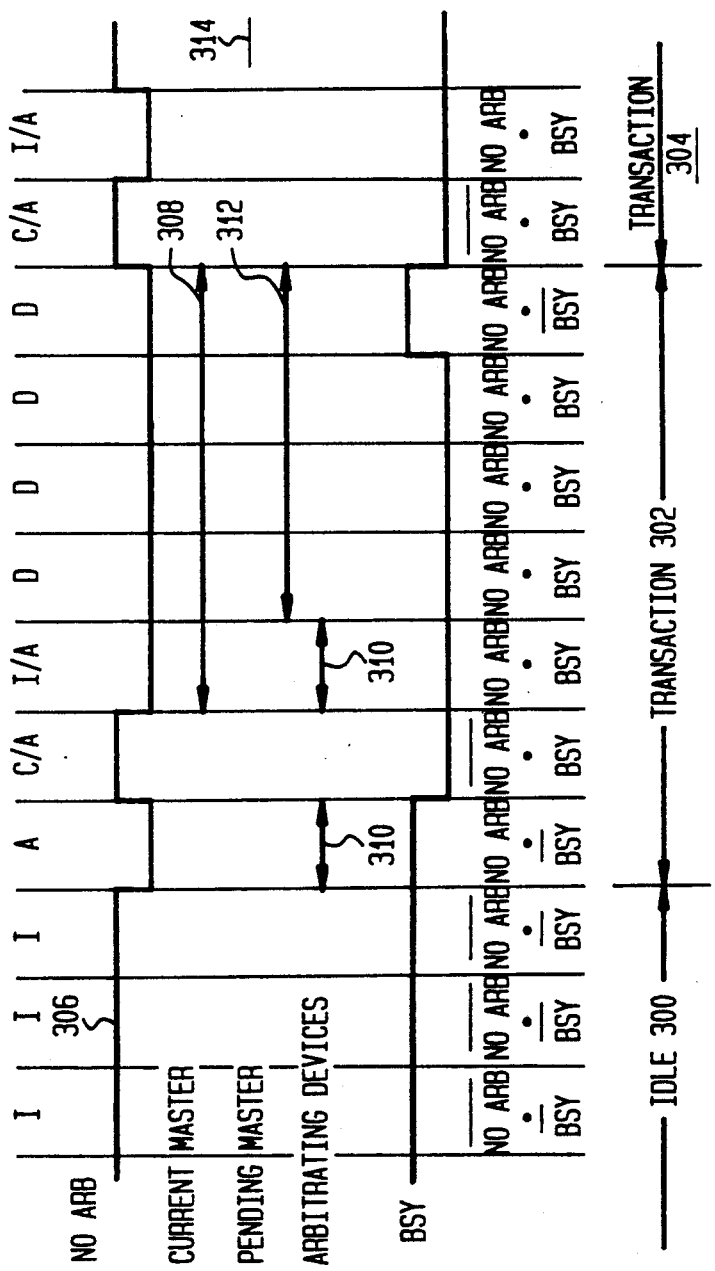
FIG. 8 is a timing diagram illustrating the use of the BUSY and NO ARB lines in regulating control of the BI bus.

FIG. 8, illustrates the relation according to the BI protocol between the BUSY and NO ARB signals during various states of the system bus. In particular, there is shown an idle state 300 followed by two transaction states 302, 304, respectively. The idle state is shown as including a number of idle bus cycles (designated by "I") during which neither NO ARB nor BUSY is asserted. During the idle cycles, no information is being communicated over the communications path. Thus, the data, information and parity lines of the BI bus, collectively called the DIP lines are all idle. The idle state is concluded when a device seeks control of the communications path. It does this by asserting NO ARB, and asserting its arbitration bit on the data lines, thereby converting an idle cycle into a arbitration cycle ("A"). Any BI device may assert NO ARB at this time, and arbitration will proceed in the manner described above. The winning device then becomes Current Master during the following cycle, which becomes the Command/Address ("C/A") cycle of a transaction.

During the Command/Address cycle, the BI device which is master deasserts NO ARB in order to allow any other BI devices wishing to arbitrate for control of the bus in a subsequent transaction to participate in an imbedded arbitration during the following, Imbedded Arbitration, cycle. At the same time, the device asserts BUSY to indicate to other devices that the communications path is occupied by a transaction. This assertion continues for the duration of the transaction, until the start of the last expected data cycle. Similarly, during the following Imbedded Arbitration ("I/A") cycle, the device reasserts NO ARB and continues this assertion until the last expected data cycle, as indicated by arrow 308. At the same time, those devices arbitrating for control of the communications path during the following transaction assert NO ARB, as indicated by arrow 310. The device winning the arbitration asserts its status as a Pending Bus Master by asserting NO ARB beginning with the cycle following the Imbedded Arbitration cycle and continuing through the last data cycle, as indicated by the arrow 312. It deasserts NO ARB for the first cycle of the following transaction (the Command/Address cycle), and then reasserts NO ARB as the Current Master of that transaction, as indicated by the arrow 314.

The figure therefore shows that in the BI protocol the joint operation of NO ARB and BUSY regulates the orderly flow of control exchange as well as information transfer on the communications path.

3. BI Response Signals: ACK, NO ACK, STALL, RETRY

System reliability is greatly increased in the BI protocol by requiring a response to transmissions over the Information and Data lines. The response code for these devices is shown in FIG. 6, where a "0" bit indicates assertion (low level) and a "1" bit indicates deassertion (high level).

In the BI protocol the ACK response indicates successful completion of a transmission by the intended recipient of the transmission. For all transaction types, the assertion of ACK during the first data cycle of the transaction confirms correct receipt (i.e., no parity error) of the Command/Address information transmitted two cycles earlier. Additionally, in the first data cycle as well as in subsequent data cycles in Read-type and Ident transactions, ACK also indicates that read or vector data is being asserted by the Slave, while in Write-type transactions ACK also indicates that the Slave is prepared to accept Write data.

In the BI protocol NO ACK indicates either a failure in the transmission/reception or that n Slave has been selected. Both ACK and NO ACK are permissible responses to command transmissions, as well as to data transmissions; in the latter case, the responses occur through the two cycles following the last data cycle, even though these cycles may coincide with a subsequent transaction. NO ACK is the default state of the response lines. It is defined in such a way that any other code may override it.

In the BI protocol STALL may be asserted by a Slave device during data cycles. For example, it is used by memories to extend the time allowed for a read access or to provide time for a refresh or error correction cycle during a transaction. It is also used by memories to delay further data transmission from the Master when the memory write buffer is full. It is used by devices to synchronize to another communications path. One or more STALLS may be used to delay an ACK or NO ACK command confirmation if the device recognizes that it is the Slave.

In the BI protocol, RETRY is asserted by a Slave device which cannot immediately respond to a transaction. For example, it is used by devices requiring a long internal initialization sequence; by devices waiting for access to another communications path; and by memories which have been locked by an Interlock Read command as described below. The Current Master responds to the Slave RETRY response by terminating the transaction. In the present implementation, RETRY is not used after the first data cycle of a transaction. This simplifies the interconnection logic.

According to the BI patents, each BI device includes a counter which counts the number of cycles in which it, as a Slave device, has asserted STALL on the CNF lines to extend the first data Cycle of a given transaction. Once the counter detects that its BI device has asserted STALL more than a specified number of cycles, the BI device will place a RETRY signal, instead of a STALL, on the CNF lines during the next cycle and will cease further participation in the transaction. This will cause the Bus Master to also terminate the transaction and to try it again later.

In order to prevent a device from monopolizing the communications path, the BI protocol places a limit on the extensions or successive assertions of STALL, RETRY, BUSY and NO ARB.

4. BI Transaction Sequences

FIGS. 4A-H set forth in detail the specific characteristics of the transactions provided for by the BI protocol. In particular, transactions for reading and writing data (READ, READ WITH CACHE INTENT, INTERLOCK READ WITH CACHE INTENT, WRITE, WRITE WITH CACHE INTENT, WRITE MASK WITH CACHE INTENT, and UNLOCK WRITE MASK WITH CACHE INTENT); for invalidating obsolete cached data (INVALIDATE); for handling interrupts (INTERRUPT, INTERPROCESSOR INTERRUPT, IDENTIFY); for halting transaction generation by devices (STOP); and for transmitting information to a number of devices simultaneously (BROADCAST) are illustrated in detail. In each of the Figures, the range of permissible CNF responses is set forth, and the particular response illustrated is marked by a dot (.). Further, for purposes of simplification, the transactions are shown as including only two cycles of data transfer, although a larger or smaller number of cycles may be used.

The commands described herein are of two general types, namely, single responder commands (Read-type, Write-type commands, and IDENTIFY) and multi-responder commands (STOP, INVALIDATE, INTERRUPT, INTERPROCESSOR INTERRUPT, and BROADCAST). In order to insure the unique recognition of responses when multiple responses are being asserted on the same lines, the permissible responses to multi-responder commands are limited to ACK and NO ACK.

a. BI Read-Type Transactions

Referring now to FIG. 4A, the characteristics of a Read-type transaction in the BI protocol are set forth in detail. This type of transaction includes not only the READ command, but also the READ WITH CACHE INTENT and the INTERLOCK READ WITH CACHE INTENT commands as well. The four-bit codes for these commands are shown in FIG. 5A, together with the codes for the other commands utilized by the device interconnecting means. Note that additional codes may subsequently be added, as indicated by the codes with hexadecimal values 0, A, and B which are marked "RESERVED" in this figure. The actual codes which appear on the information lines use negative logic. In this negative logic a one bit, which means a line is asserted, is represented by pulling the line to a low voltage, which is represented in the first column of FIG. 5A as a zero.

The Read-type transaction comprises a number of successive cycles, namely, a Command/Address cycle 180, an Imbedded Arbitration cycle 182, and a number of data cycles. For purposes of illustration only, the transaction is shown as including two data cycles 184, 186, respectively. The principal lines on which information is transmitted (cf. FIG. 2) are indicated by their functional names, namely, the Information lines I[3:0], the Data lines D[31:0], the Confirmation lines CNF[3:0], and the NO ARB, BUSY and P (parity) lines. For clarity of illustration, the remaining lines (i.e., Time, Phase, STF, RESET, AC LO, DC LO, BAD and SPARE) are omitted in FIG. 4 since they are not essential to understanding the operation of the transactions.

As indicated in FIG. 4A, during the Command/Address cycle of a Read-type transaction, the four-bit command code is placed on the information lines I[3:0]. Additional data required in connection with the command is placed on the data lines D[31:0]. Specifically, a two-bit data length code specifying the length of the transfer which is to take place is applied by the BI device to data lines D[31:30], while the "address" of the device with which the transfer is to take place is applied to data lines D[29:0]. The fact that these signals are asserted on the appropriate lines by the device which currently has control of the bus (the "Current Master") is indicated by the letter "M" in the appropriate block in FIG. 4A. The assertion of information on a given line or set of lines by a Slave device is indicated by the letter "S" in FIG. 4A. In similar fashion, the letters "AD", "AAD", "APS" and "PM" (i.e. "All Devices", "All Arbitrating Devices," "All Potential Slaves" and "Pending Master", respectively) indicate various other devices which may assert signals on selected lines of the communications path during particular cycles.

The address comprises a single thirty-bit word designating the specific storage location with which a Read-type or Write-type transaction is to take place. A separate block of addresses is assigned to each device. The location of the block is based on the identification number of the associated device.

During the Command/Address cycle, the Current Master deasserts NO ARB as shown at 158 in FIG. 4A. (For purposes of discussion herein, a signal is considered "asserted" when at a low level, and "deasserted" when at a high level). Deassertion of NO ARB allows other B devices desiring control of the communications path to arbitrate for such access during the following cycle. At the same time, the device asserts BUSY to prevent other devices from gaining control of the communications path while the current transaction is in process. No signals are applied to the CNF lines at this time by the Current Master, although it should be understood that, in the course of a sequence of transactions, one or more Response signals may be applied to the CNF lines by other devices during a transaction by a Current Master.

The second cycle of the transaction comprises an arbitration cycle. It is referred to as an "imbedded" arbitration cycle since it is contained within a transaction. Arbitration which occurs outside of a transaction is referred to as an "Idle" arbitration cycle. During the Imbedded Arbitration cycle of FIG. 4A, the Current Master places its identification number (ID) on the information lines I[3:0]. This code is used by all devices using round robin arbitration to update their arbitration priority.

At this time also, those BI devices seeking use of the communications path assert a single-bit signal corresponding to their identification number on either the low priority level lines, D[31:16], or the high priority level lines D[15:0], e.g., device 11 asserts line D[11] if arbitrating at high priority and asserts line D[27] if arbitrating at low priority.

The level at which the device arbitrates is determined by its arbitration mode, and, if it is in the dual round robin arbitration mode, it is also determined by the ID of the previous Master. In the present implementation, the arbitration mode is defined by bits 4 and 5 of the particular device's BI Control and Status Register, i.e., BICSR[5:4] (see FIG. 7C). As presently implemented, four modes are provided for, namely, fixed high priority, fixed low priority, "dual round robin", and arbitration disabled. The interconnecting means support mixing these modes at will by appropriately setting the arbitration mode bits BI CSR[5:4].

In the case of arbitration in a fixed-priority mode, whether fixed high or fixed low, the priority does not vary from transaction to transaction. In contrast, in the case of "dual round robin" arbitration the priority of a device may change from one transaction to another. In particular, in the "dual round robin arbitration" mode, during a given transaction, a device will arbitrate at a low priority level (i.e., on lines D[31:16]) if its ID number is equal to or less than the ID number of the Master asserted on the information lines during the Imbedded Arbitration cycle of the immediately preceding transaction, and will arbitrate at a high priority level (i.e., lines D[15:0]) otherwise.

Continuing on with the transaction of FIG. 4A, at the conclusion of the Imbedded Arbitration cycle, a BI device which has arbitrated during this cycle and won the arbitration becomes Pending Master, and asserts NO ARB until it becomes Current Master, as shown in dotted lines in FIG. 4A. This prevents other devices from subsequently arbitrating for, and possibly gaining control of, the communications path before the Pending Master can assume such control.

The arbitration cycle is followed by one or more data cycles. For purposes of illustration, FIG. 4A shows two such data cycles only. As noted previously, the actual amount of data to be transferred in each transaction, and thus the number of data cycles utilized by the transaction, is specified in the Command/Address cycle by bits D[31:30]. In the particular implementation described in FIG. 4A, from one to four cycles of data (here, 32 bits per cycle) may be transmitted in a transaction. Of course, by providing fewer or more bits for the data length specification, a lesser or greater number of data cycles, and thus transaction cycles, may be provided for.

In the case of a Read-type transaction as shown in FIG. 4A, the data called for by the transaction is supplied by the Slave to which the transaction is addressed. This device may be a memory device or it may be some other device such as an input/output terminal. In either event, the device so selected asserts its data on the data lines D[31:0] during the data cycle. At this time, also, it asserts a code on lines I[3:0] which indicates the status of the data. For example, for memory references, the code may indicate whether the data is data that has been retrieved without utilization of any correction algorithms (referred to simply as "read data"), data that has been corrected before being asserted on the data lines (referred to as "corrected read data"); or data that, for one reason or another, cannot be relied on ("read data substitute"). Further, the status code indicates whether or not, for each of these data categories, the data may be cached. The use of the "don't cache" facility will greatly enhance performance in some systems. These codes are illustrated in FIG. 5B.

During the first data cycle, the Slave returns to the Master a confirmation code on lines CNF[2:0] which confirms receipt of the Command/Address information from the Master and which may provide further information to the Master with respect to the Slave's response. Thus, the first assertion of the confirmation signals for the current transaction is made during the first data cycle, two cycles after the Command/Address cycle which began the transaction. For the Read transaction described in FIG. 4A, the permissible responses in the first data cycle are the ACK ("Acknowledge"), NO ACK ("Not Acknowledge"), STALL and RETRY. These are largely common to all transactions, with certain exceptions which will be described in connection with the particular transactions.

In general, the assertion of ACK during the first data cycle indicates correct receipt of Command/Address information, together with the ability of the Slave to take the requested action, i.e., return read data. Conversely, the assertion of NO ACK indicates either an error in transmission of the command or some other inability of a Slave to respond. The assertion of STALL allows the Slave to extend the transaction in order to prepare itself to provide the read data requested by the Master, while the assertion of RETRY indicates current inability to respond to the command, accompanied by a request that the Master try again at a subsequent time. RETRY is appropriately used when the expected response time of the Slave would be so long that it would be inefficient to extend the transaction an excessive number of cycles by asserting general STALL responses.

In FIG. 4A, the ACK response (designated by a dot (.) before the response) is illustrated. If the response were NO ACK, the action taken by the Master would differ from that taken in response to ACK, e.g., the Master may seek to repeat the transaction a limited number of times, may call for an interrupt, etc. A STALL response is similar to an ACK response but the transaction will be extended by one or more "blank" cycles (cycles in which no valid data is transferred on the data lines) before the requested data is returned.

The second, and last, data cycle in FIG. 4A is similar to the preceding data cycle, that is, the Slave asserts the requested data on lines D[31:0]together with a code indicating the status of the data on lines I[3:0]. At the same time, it asserts a confirmation signal on CNF[2:0]. Unlike the Slave's response to the first data cycle, however, the Slave may respond only with ACK, NO ACK, or STALL; it may not assert RETRY. Further, since the second data cycle is the last data cycle of the transaction in FIG. 4A, the Slave deasserts both NO ARB and BUSY. If the Slave were to extend the transaction by asserting STALL so that the return of read data would be deferred a subsequent cycle, the Slave would continue its assertion of NO ARB and BUSY until the last data cycle in fact occurred. It would then deassert NO ARB and BUSY during that last data cycle. As noted previously, deassertion of BUSY allows a Pending Master to assume control of the communications path on the following cycle, while the Slave's deassertion of NO ARB is preparatory to allowing subsequent arbitration to occur for access to the communications path. With the completion of the second and last data cycle, the principal information transfer functions of the transaction of FIG. 4A are completed. However, it is still necessary to confirm the correct receipt of the data. This is accomplished during the two cycles following the last data cycle during which the Master asserts the appropriate confirmation signal on CNF[2:0] with respect to receipt of the data. As shown, the appropriate confirmation is either ACK or NO ACK. Note that the confirmation extends beyond the last data cycle and may thus overlap with the Command/Address and Imbedded Arbitration cycles of a following transaction. However, no error will arise from this since the confirmation lines are not used by the following transaction during its first two cycles.

In the BI protocol, a set of lines is considered to have proper parity during the cycles of a transaction if the total number of bits asserted in that set of lines, including the parity bit, is an odd number. During the Command/Address cycle parity is generated by the Current Master for the D[31:0], I[3:0], and P lines, that is the parity bit is set so that the total number of DIP lines which are asserted is odd. During this cycle parity is checked by all devices. During the Imbedded Arbitration cycle, it is generated by the Master for the I[3:0] and P lines only, since no one device knows in advance which bits will be asserted on the data lines if an imbedded arbitration takes place. During the Imbedded Arbitration cycle parity is checked by all devices. During the data cycles of a Read-type transaction, parity is generated by the Slave on the D[31:0], I[3:0], and P lines and is checked by the Current Master. The specific consequences of a parity-error will depend on the nature of the information being transmitted during the given cycle when the error occurs. At a minimum, BI devices detecting a parity error during the Command/Address cycles should not respond to selection; additionally, they may indicate the parity error by setting an error flag, initiating an interrupt, or other such action.

As noted previously, the READ WITH CACHE INTENT command has the same format as the READ transaction. It is generated by devices with cache to indicate to the Slave that the requested read data may be placed in the Master's cache. When this command is used in conjunction with the INVALIDATE command described below, it can provide a significant performance enhancement in certain systems with cached devices.

The INTERLOCK READ transaction also has the same format as the READ transaction. It is used with shared data structures to provide exclusive access to data by processors and other intelligent devices. Slaves supporting the INTERLOCK READ command have one or more interlock bits corresponding to designated storage locations. When accessed by an INTERLOCK READ Command, a Slave sets the appropriate bit corresponding to the addressed location. This prevents subsequent INTERLOCK READ accesses to the location until the bit is reset to thereby unlock the given location. This bit is typically reset by the UNLOCK WRITE MASK WITH CACHE INTENT Command described below. The INTERLOCK READ command is especially useful in systems having processors which provide read-modify-write operations to insure that intervening devices using the INTERLOCK READ Command are precluded from access to data after the initiation, but before the completion, of such an operation. Slaves addressed by INTERLOCK READS while the interlock is set issue a RETRY. Note that the interlock bit is set only if the INTERLOCK READ transaction is successful, i.e., the Master confirms correct receipt of the Slave's read data.

b. [BI Write-Type Transactions

Figure 4B:
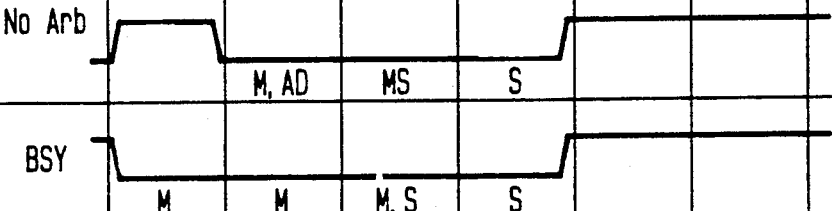
FIG. 4B is a table setting forth the structure of a BI Write-type transaction.

Turning now to FIG. 4B, the Write-type transactions (WRITE, WRITE WITH CACHE INTENT, WRITE MASK WITH CACHE INTENT, and UNLOCK WRITE MASK WITH CACHE INTENT) of the BI protocol are shown in detail. Starting with the Command/Address cycle, the Current Master places the appropriate four bit code for the command on information lines I[3:0]; a two-bit code identifying the length of the data transmission on data lines D[31:30]; and an address on data lines D[29:0]. At the same time, it asserts BUSY to indicate the occupied status of the communications path, and deasserts NO ARB to signal the availability of the data lines for arbitration during the immediately following cycle.

During the second cycle, the BI device which is the Current Master places its ID on information lines I[3:0]. BI devices seeking control of the communications path for a subsequent transaction assert a single bit corresponding to their ID on the data lines at this time. As was previously the case, the assertion is made on one of the low priority data lines D[31:16] for arbitration at the low priority level, and is made on the high priority data lines D[15:0] for arbitration at the high priority level. The Master continues to assert BUSY at this time, and the Master, as well as devices participating in the arbitration, assert NO ARB at this time also.

In the example shown in FIG. 4B, the third and fifth cycles are data cycles. Although two data cycles are shown, a lesser or greater number may be utilized, in accordance with the transfer length specified on lines D[31:30] in the Command/Address cycle. The data being written by the Master is applied to data lines D[31:0] during these cycles. The Information lines I[3:0] carry either a write mask (in the case of a Write Mask-type transaction) during the data cycles to indicate the selected byte or bytes which are to be written during the transaction, or are "undefined" (in the case of WRITE and WRITE WITH CACHE INTENT transactions). The "undefined" status of the I[3:0] lines indicates that any information on these lines is to be ignored by the devices for purposes of the transaction.

During the first data cycle, the Current Master continues to assert BUSY and NO ARB. During the fourth cycle, which the Current Master expects to be the Data 2, or last, data cycle, the Current Master deasserts both BUSY and NO ARB to prepare for an orderly transition of communications path control.

In order to illustrate the capability of a Slave to extend a transaction, the fourth cycle (Data 2) is shown as stalled by way of the Slave's assertion of STALL. For example, this may be done when the Slave is unable to accept the second data word at this time. The Slave asserts BUSY an NO ARB during this cycle. The last data cycle of this transaction is the fifth cycle. During this cycle the Master responds to the assertion of STALL in the previous cycle by re-transmitting Data 2. The Slave asserts ACK on the CNF lines; and the Slave deasserts both BUSY and NO ARB.

In the two cycles following the last data cycle, the Slave continues to assert ACK to confirm the correct receipt of Write data.

When a Write-type transaction occurs on the BI bus, devices connected to the bus and having resident cache memory invalidate any cached data within the address range of the write command. As was the case with the READ WITH CACHE INTENT command, the WRITE WITH CACHE INTENT command, when used with the Invalidate command offers significant performance advantages in certain systems.

The write mask is a four-bit code indicating, by the presence of asserted bits in one or more of the four-bit positions, the selection of the corresponding eight-bit bytes to be written. Thus, the code 1001 indicates that only the first and fourth bytes (corresponding to D[7:0] and D[31:24], respectively) of a four byte (32 bit) word are to be written.

The UNLOCK WRITE MASK WITH CACHE INTENT command is used in conjunction with the INTERLOCK READ command to implement indivisible, or atomic, operations such as a read-modify-write operation.

As may be seen from FIG. 4B, during a WRITE-type transaction, parity is generated by the Master during all cycles of the transaction. It is checked by all devices during the Command/Address and Imbedded Arbitration cycle; and by the Slave during the data cycles.

c. BI Interrupt and Identify Transactions

Figure 4D:
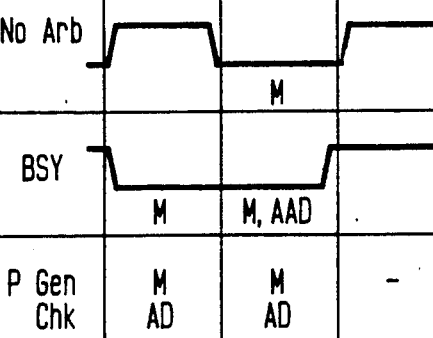
FIG. 4D is a table setting forth the structure of a BI INTERRUPT transaction;.
Figure 4F:
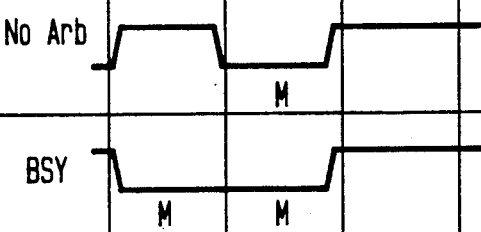
FIG. 4F is a table setting forth the structure of a BI INTERPROCESSOR-INTERRUPT transaction.
Figure 4G:
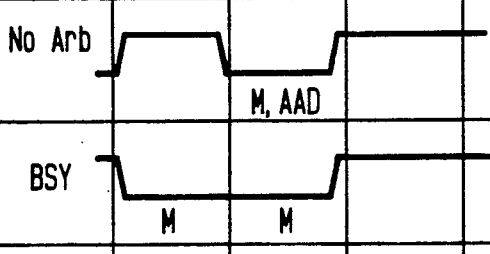
FIG. 4G is a table setting forth the structure of a BI STOP transaction.

An INTERRUPT transaction of the BI protocol is illustrated in FIG. 4D. The purpose of the transaction is to notify other devices (typically, processors) of the need to interrupt current activities in order to take other action. The interrupted device responds with an IDENT command to solicit the Interrupt Vector. This vector serves as a pointer to the address of an interrupt routine stored in memory which will establish the required action.

The INTERRUPT transaction comprises a Command/Address cycle, an Imbedded Arbitration cycle, and a data cycle in which no information is transmitted. During the Command/Address cycle, the Interrupt command code is asserted on the Information lines I[3:0] by the device seeking to interrupt. During this cycle, the interrupting device also asserts one or more interrupt priority levels on data lines D[19:16] to identify the immediacy of requested services. The interrupting device also places an interrupt destination mask on data lines D[15:0]. This mask specifies the devices to which the INTERRUPT is directed. All devices on the communications path receive this mask. If any asserted bit in the mask corresponds to a device's decoded ID, then the device is selected. This device will later respond with an IDENTIFY transaction.

Devices which have been selected by the INTERRUPT respond by transmitting an ACK signal two cycles after the Command/Address cycle. As with all other multiresponder commands, ACK and NO ACK are the only permissible responses.

Devices selected during an INTERRUPT may be expected to engage in a subsequent transaction with the interrupt-requesting device in order to complete the interrupt process. Accordingly, each responding device maintains a record for each interrupt level to indicate whether an interrupt was received at the corresponding level. Typically, the "record" comprises a flag bit in a flip flop (hereinafter referred to as an Interrupt Pending Flip-Flop). Each bit remains set until the corresponding INTERRUPT has been serviced.

The second and third cycles comprise the usual Imbedded Arbitration cycle, as previously described, as well as a data cycle in which no further information is transmitted. Confirmation is made by one of the confirmation codes permissible for multi-responder commands, ACK or NO ACK.

FIG. 4E illustrates an IDENTIFY, or IDENT, transaction according to the BI protocol. This transaction takes place in response to an INTERRUPT transaction. During the Command/Address cycle, the Current Master asserts the IDENTIFY command code on Information lines I[3:0] and asserts on data lines D[19:16] a code corresponding to one or more interrupt levels to be serviced. It also asserts BUSY and deasserts NO ARB. The following cycle is the usual Imbedded Arbitration cycle.

In the next cycle, the Current Master reasserts its ID number, this time in decoded form on data lines D[31:16]. Each device that requires service at an interrupt level specified in the Command/Address cycle compares the decoded Master ID with the interrupt destination mask that it had earlier transmitted in order to determine whether it is one of the devices to which the IDENTIFY command is directed. If it determines that it is, it manifests its status as a Potential Slave participating in the Interrupt Arbitration cycle. During both the Decoded Master and the Interrupt Arbitration cycles, the interrupting Slaves also assert BUSY and NO ARB. During the Interrupt Arbitration cycle, the devices arbitrating to transmit their interrupt vector assert their decoded ID number on the appropriate one of the data lines D[31:16]. Arbitration takes place in the manner previously described, that is, the device having the highest priority (lowest ID number) "wins" the arbitration, thereby becoming the Slave. The Slave then asserts its interrupt vector on the data lines. This vector points to a location in memory which contains a further vector identifying the start of the interrupt service routine. At the same time, the Slave transmits a vector status code on information lines I[3:0] indicating the status of the vector in much the same manner as the data status indicated the status of the read data on these lines during a Read transaction.

As was the case with previously described transactions, the BUSY signal is asserted by the Master during the transaction from the first cycle to the last expected cycle, while NO ARB is asserted from the Imbedded Arbitration cycle to the last expected cycle. ACK, NO ACK, STALL and RETRY may be asserted by the Slave in response to the IDENTIFY command. This response occurs in cycle five, which is two cycles later than for all other transaction types. During the two cycles following the vector cycle, the Master asserts the ACK confirmation code to indicate successful completion of the transaction. On receipt of the Slave's acknowledgement of the IDENTIFY command, the Master resets the Interrupt Pending flip-flop corresponding to the interrupt level for which the interrupt vector was transmitted. If the Slave does not receive the Master's acknowledgement to its transmission of the Interrupt Vector, it re-transmits the Interrupt transaction.

A device may not participate in the interrupt arbitration cycle if it has detected a parity error in either the Command/Address or the Decoded Master ID cycles.

Devices which have arbitrated during the Interrupt Arbitration cycle but which have lost the arbitration are required to reissue the Interrupt Command. This prevents loss of previously posted interrupts.

d. Other BI Transactions

The BI protocol also has an INTERPROCESSOR INTERRUPT transaction, a STOP transaction, a BROADCAST transaction, and an INVALIDATE transaction, shown schematically in FIGS. 4F, 4G, 4H, and 4C respectively. These transactions are all described in greater detail in the above mentioned BI patents. They are not mentioned in detail here because knowledge of them is not necessary for an understanding of the inventions which relate to the COM protocol described below.

5. Register Complement of the BI Interface Chip

FIG. 7A is a representation of our understanding of the bus-addressable register file contained in the BIIC, or BI interface chip. This register file is comprised of the following:

- a Device-Type Register 200,
- a BI Control and Status Register 202,
- a Bus Error Register 204,
- an Error Interrupt Control And Status Register 206,
- an Interrupt Destination Register 210,
- an Interprocessor Interrupt Mask Register 212,
- an Interprocessor Interrupt Destination Register 214,
- an Interprocessor Interrupt Source Register 216,
- a Start Address Register 218,
- an End Address Register 220,
- a BCI Control and Status Register 222,
- a Write Status Register 224,
- a Force Interprocessor Interrupt/Stop Command Register 226,
- a User Interrupt Control and Status Register 228 and
- four General Purpose Registers 230-236.

In the BI Device-Type Register 200, (FIG. 7B) the code for the device-type is stored in the lower half DTR[15:0], of the register. The device-type is loaded into this register on system power-up or on subsequent initialization of the system. This register may be interrogated by other elements in the system, usually a processor, to determine what devices are connected to the system for purposes of optimizing and dynamically rearranging, the system configuration. A Revision Code field, DTR[31:16] is provided for in the upper half of the Device-Type Register.

The BI Control and Status Register 202 contains a number of bits indicating the status of various conditions within the BIIC, as well as within the BI device to which it is attached. Additionally, it stores information utilized in arbitrating for control of the communications path.

Bits BICSR[3 0] store the encoded form of the device ID which is loaded into this register on power up or on subsequent initialization. Bits BICSR[5:4] specify the arbitration mode in which the device will arbitrate. As described earlier, these modes comprise "Dual Round Robin", Fixed High, Fixed Low, and Arbitration Disabled modes. On power up or on subsequent Initialization the arbitration mode is set to "dual round robin." However, this mode may be changed by writing to these bits during system operation.

BICSR[7] and BICSR[6] are Hard Error Interrupt Enable and Soft Error Interrupt Enable bits, respectively. When set, they enable the device to generate an Interrupt transaction (referred to hereafter as an Error Interrupt transaction) whenever the Hard Error Summary Bit BICSR[15] or Soft Error Summary bit BICSR[14], respectively, are set. These latter bits are set when a hard or a soft error, respectively, is detected. A "hard" error is one which affects the integrity of data on this system; for example, a parity error detected on the data lines during transmission of data is a hard error. Conversely, a "soft" error is one which does not affect the integrity of the data in the system; for example, a parity error detected on the Information I[3:0] lines during the Imbedded Arbitration cycle may lead to an incorrect arbitration priority calculation by a device but, will not affect the integrity of data on the communications path. Accordingly, it is a soft error.

The Unlock Write Pending bit BICSR[8] indicates that an INTERLOCK READ transaction has been successfully transmitted by the device but that a subsequent UNLOCK WRITE MASK WITH CACHE INTENT command has not yet been transmitted. Start Self Test bit BICSR[10], when set, initiates a self test which checks out the operation of the interconnect logic. The Self Test status BICSR[11] remains reset until the self test has been successfully completed, at which time the STS bit is set to indicate successful completion of the test. The Broke bit BICSR[12] is also set if the device has failed its self test.

The Initialization bit BICSR[13] is used in conjunction with system initialization. For example, it may be used as a status indicator while the device is undergoing Initialization. BICSR[23:16] specifies the particular design of the interconnecting means. Bits BICSR[31:24] are presently not used.

Figure 7D:
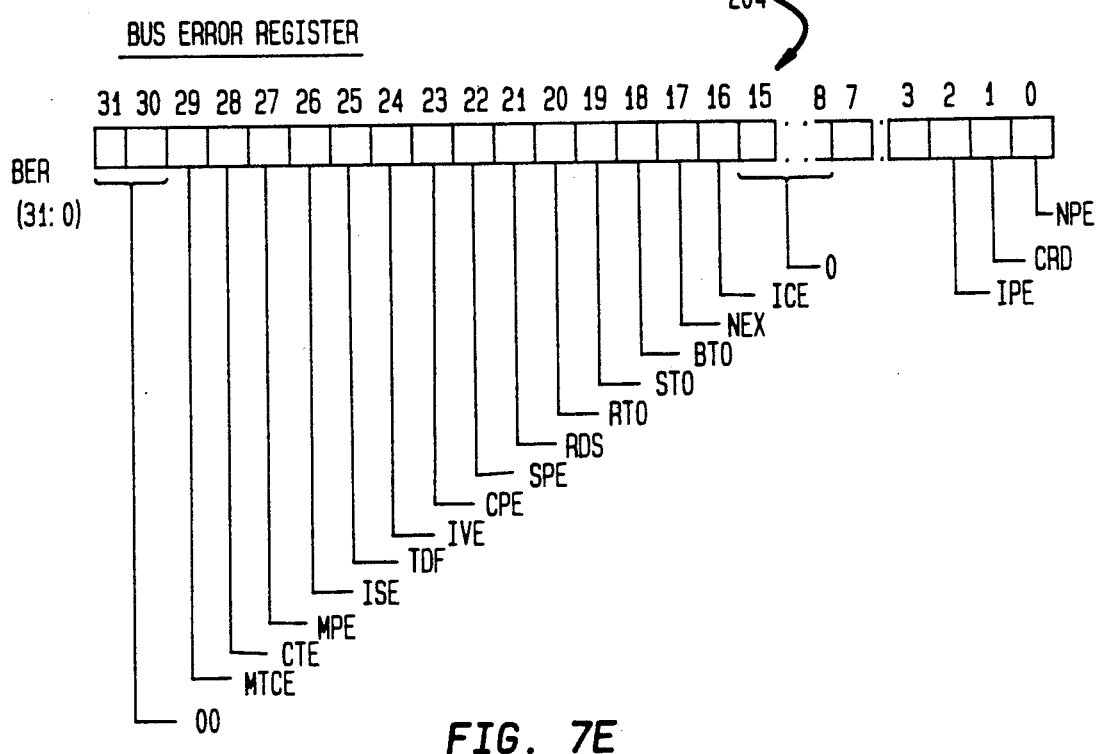
FIG. 7D is a more detailed diagram of the Bus Error Register shown in FIG. 7A, indicating the specific utilization of various bits within that register.

Referring now to FIG. 7D, the Bus Error Register 204 records various error conditions during system operation. The Null Parity Error Bit BER[0], the Corrected Read Data Bit BER[1] and the ID Parity Error Bit BER[2] records soft errors, while the remaining bits record hard errors. The Null Parity Error Bit is set if incorrect parity was detected during the second cycle of a two-cycle sequence during which NO ARB and BUSY were deasserted. The Corrected Read Data Bit is set if a Corrected Read Data Status Code is received in response to a Read-type transaction. The ID Parity Error Bit is set if a parity error is detected on the I[3:0] lines carrying the encoded Master ID during an Imbedded Arbitration cycle.

Illegal Confirmation Error Bit BER[16] indicates receipt of an illegal confirmation code during a transaction. Nonexistent Address Bit BER[17] is set on receipt of a NO ACK response to a read-type or write-type command. Bus Timeout Bit BER[18] is set if a Pending Master ever waits more than a predetermined number of cycles to assume control of the interconnect. In the specific implementation described herein, a timeout of 4096 cycles is implemented. Stall Timeout Bit BER[19] is set if the chip, as a Slave device, asserts STALL on the response lines CNF[2:0] for more than a predetermined number of cycles. In the present implementation, the stall timeout occurs after 128 cycles. The RETRY Timeout Bit BER[20] is set if a Current Master receives a predetermined number of consecutive RETRY responses from a Slave with which it is communicating. In the present implementation, this timeout is set for 4096 consecutive RETRY responses.

The Read Data Substitute Bit BER[21] is set if a data status comprising a Read Data Substitute or a Reserved Status Code is received during a Read-type or IDENTIFY transaction and there has been no parity error during this cycle. The Slave Parity Error Bit BER[22] is set when a Slave detects a parity error on the communication path during a data cycle of a Write-type or BROADCAST transaction. The Command Parity Error bit BER[23] is set when a parity error is detected during a Command/Address cycle.

The Identify Vector Error Bit BER[24] is set by a Slave on receipt of any confirmation code other than ACK from the Master during an Identify transaction. The Transmitter During Fault Bit BER[25] is set if a device was asserting information on the data and information lines (or, during Imbedded Arbitration, just on the information lines) during a cycle resulting in the setting of the SPE, MPE, CPE, or IPE bit. The Interlock Sequence Error Bit BER[26] is set if a Master successfully transmitted an UNLOCK WRITE MASK transaction without having previously transmitted the corresponding INTERLOCK READ transaction. The Master Parity Error Bit BER[27] is set if the Master detects a parity error during a data cycle having an ACK confirmation on the CNF[2:0] lines. The Control Transmit Error Bit BER[28] is set when a device detects a deasserted state on the NO ARB, BUSY, or CNF lines at a time when the device is attempting to assert these lines. Finally, the Master Transmit Check Error Bit BER[29] is set when the data that the Master is attempting to assert on the Data, Information or Parity lines fails to match the data actually present on these lines. However, the assertion of the Master ID during an Imbedded Arbitration is not checked. Although not shown in FIG. 7D, or described in the BI patents, the Bus Error Register of BIIC's which we have seen also have a NO ACK To Multiresponder bit, BER[30].

Figure 7E:
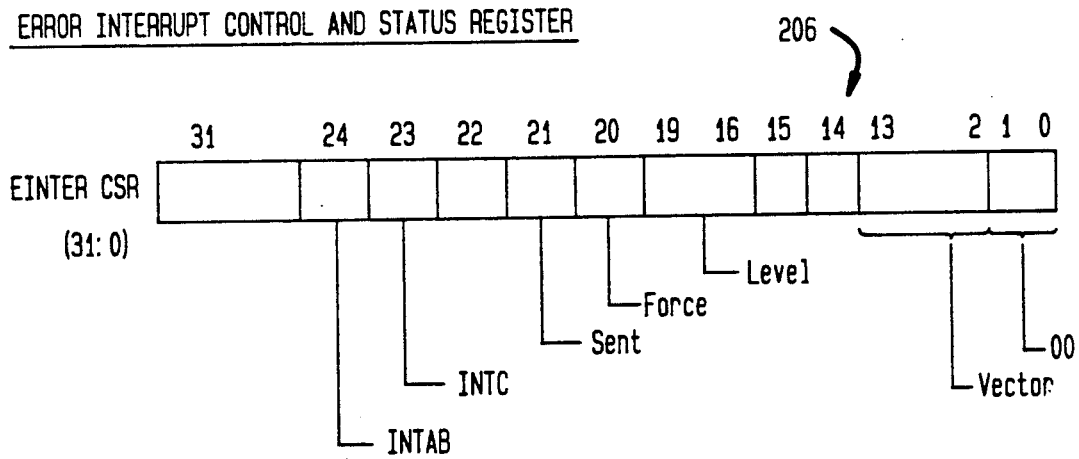
FIG. 7E is a more detailed diagram of the Error Interrupt Control and Status Register, shown in FIG. 7A, indicating the specific utilization of various bits within that register.

Turning now to FIG. 7E, the structure of the Error Interrupt Control And Status Register 206 is shown in detail. When a bit is set in the Bus Error Register, and the appropriate Error Interrupt Enable bit is set in the BI Control and Status Register, or when the force bit is set in the Error Interrupt Control Register, an Error Interrupt will occur. Bits EINTRCSR[13:2] contain the Error Interrupt Vector. If the Force Bit EINTRCSR[20] is set, the interconnecting means will generate an Error Interrupt transaction at the levels specified by bits EINTRCSR[19:16]. The Sent bit EINTRCSR[21] is set after an Error Interrupt has been transmitted. When set, it prevents the generation of further interrupts by this register. This bit is reset on losing an Interrupt Arbitration for the Error Interrupt. The Interrupt Complete Bit EINTRCSR[23] is set on successful transmission of the Error Interrupt Vector. The Interrupt Abort Bit EINTRCSR[24] is set if an Error Interrupt transaction is not successful.

Turning now to FIG. 7F, the Interrupt Destination Register 210 contains an interrupt destination field INTRDES[15:0] which identifies which devices are to be selected by interrupt commands originated by this device, as previously described.

The Interprocessor Interrupt Mask Register 212 is shown in FIG. 7G. This register contains a Mask Field IPINTRMSK[31:16] which identifies devices from which interprocessor interrupts will be accepted. Similarly, the Interprocessor Interrupt Destination Register 214, shown in FIG. 7H, contains a destination field IPINTRDES[15:0] which identifies devices to which interprocessor interrupt commands are to be directed. The Interprocessor Interrupt Source Register 216, of FIG. 7I, contains a source identification field IPINTRSRC[31:16], which stores the decoded ID of a device sending an interprocessor interrupt command to this device, provided the ID of the sending device matches a bit in the Interprocessor Interrupt Mask Register of this device.

Figure 7J:
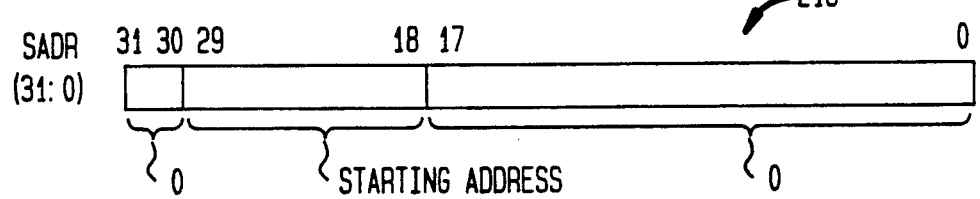
FIG. 7J is a more detailed diagram of the Start Address Register, shown in FIG. 7A, indicating the specific utilization of various bits within that register.
Figure 7K:
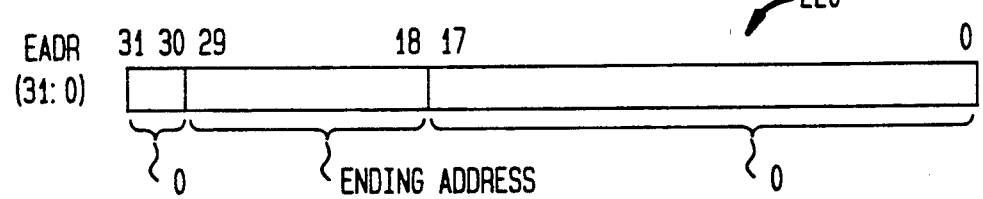
FIG. 7K is a more detailed diagram of the End Address Register, shown in FIG. 7A, indicating the specific utilization of various bits within that register.

FIGS. 7J and 7K show the Start Address Register 218 and the End Address Register 220, respectively. Each of these registers stores a partial address in bits 18 to 29 which defines the start and end of the memory or I/O space associated with the particular BI device on which those registers are located.

Figure 7L:
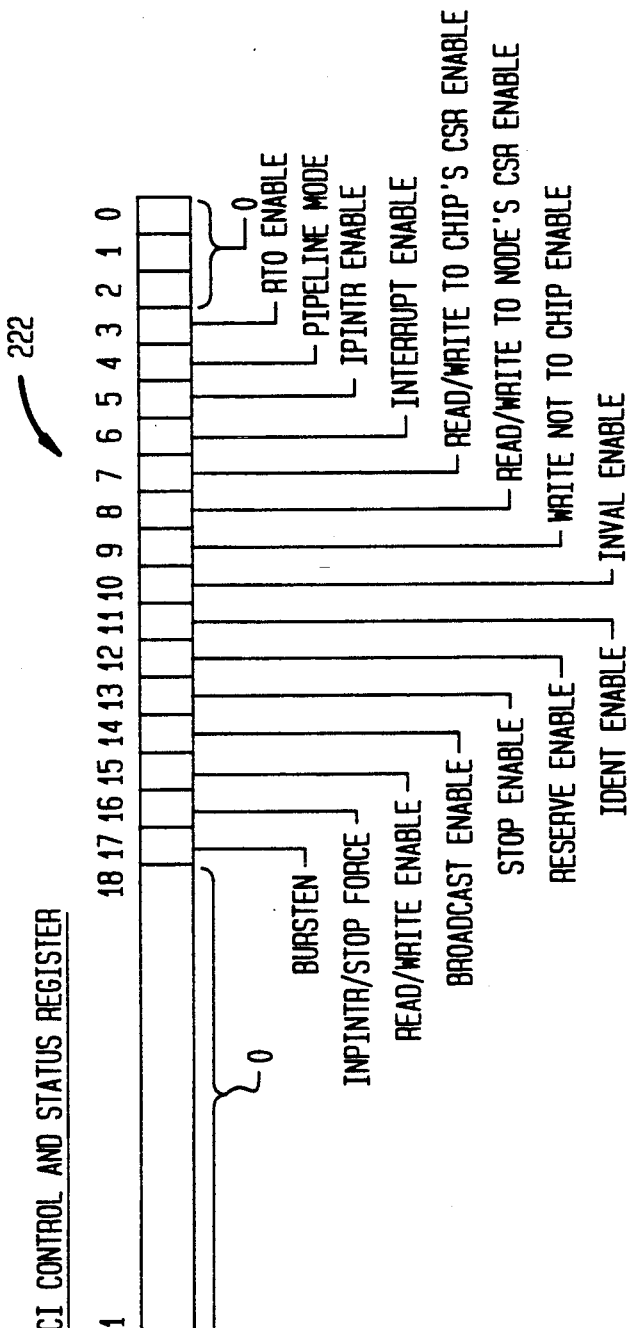
FIG. 7L is a more detailed diagram of the BCI Control and Status Register, shown in FIG. 7A, indicating the specific utilization of various bits within that register.

FIG. 7L shows the BCI Control and Status Register 222, the major purpose of which is to determine which type of instructions its BI device is to respond to. BCICSR[31:18] are always zero and have no function. BCICSR[17] is the BURSTEN Bit, which is used to enable the BI device to perform burst, or block, mode transactions. When this bit is set the BIIC will start to continuously assert NO ARB, starting with the next time it gets control of the bus, and usually continuing until the bit is reset. BCICSR[16] is the Ipintr/Stop Force Bit which causes the BI device to perform either an INTERPROCESSOR INTERRUPT or a FORCE transaction, depending on the command contained in FIPSCMD[15:12] bits of the Force Interprocessor Interrupt/Stop Command Register.

BCICSR[15:5] are all bits which control whether or not the BI Interconnect means will respond to a particular Command/Address cycle by generating a signal called the SEL signal, which generally indicates the BIIC's associated bus device has been selected by the command, and by generating SC codes, which provide an decoded interpretation of the command to the BIIC's associated bus device. BCICSR[15] determines whether or not the bus device will respond to the recognition of Read-type or Write-type commands other than Broadcast commands to multicast space. Multicast space is defined as 128 Kbytes of I/O space located between 20020000 and 2003FFFF. BCICSR[14] enables recognition of BROADCAST commands. BCICSR[13] enables recognition of STOP commands. BCICSR[12] enables recognition of reserved commands, which correspond to the assertion of the positive logic hexadecimal values 0, A and B on the Information lines during the Command/Address cycle. BCICSR[11] enables the interconnect means to cause its bus device to respond to IDENTIFY commands. In this case, the BIIC handles decoding and response to the command, regardless of this bit's status. If the BCICSR bit is not set, however, the chip will not generate the SEL and SC lines to its bus device. BCICSR[10] enables recognition of INVALIDATE commands. BCICSR[9] enables recognition of Write-type commands that are directed to neither the BIIC's corresponding node space nor to memory space defined by its EADR and SADR registers. BCICSR[8] enables recognition of Read/Write-type commands addressed to the User CSR space, that is, addressed to between 256 and 8 k in the device's address space. BCICSR[7] enables recognition of Read/Write-type commands address to the BIIC's CSR space, that is, addressed to between 0 and 255 in its device's address space. BCICSR[6] enables recognition of INTERRUPT commands. BCICSR[5] enables recognition of INTERPROCESSOR INTERRUPT commands.

BCICSR[4] is the Pipeline Mode Bit, which, when set, causes the BIIC chip to enter pipeline mode. In pipeline mode, the BIIC asserts an extra NEXT signal after the last data cycle of a write transaction on the bus which connects the BIIC with the other circuitry of its bus device. BCICSR[3], the RTO enable bit, when set, enables the BIIC to send a RETRY time-out event code to the other circuitry on its bus device when the BIIC detects a RETRY time-out by a slave device on the CNF lines of the BI bus. BCICSR[2:0] are always zero and have no function.

Figure 7M:
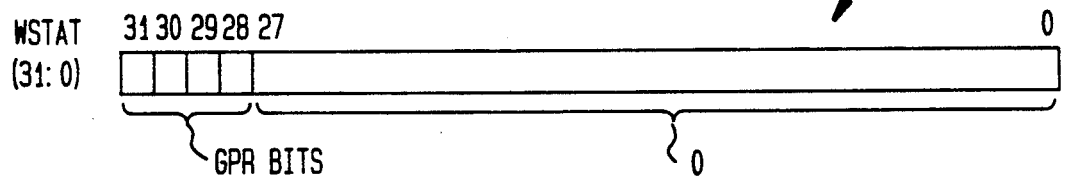
FIG. 7M is a more detailed diagram of the Write Status Register, shown in FIG. 7A, indicating the specific utilization of various bits within that register.
Figure 7N:
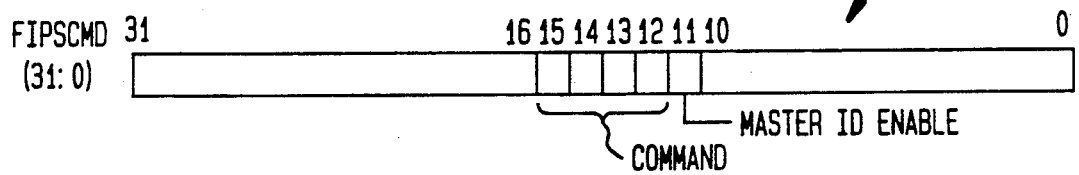
FIG. 7N is a more detailed diagram of the Force Interprocessor Interrupt/Stop Command Register, shown in FIG. 7A, indicating the specific utilization of various bits within that register.
Figure 7P:
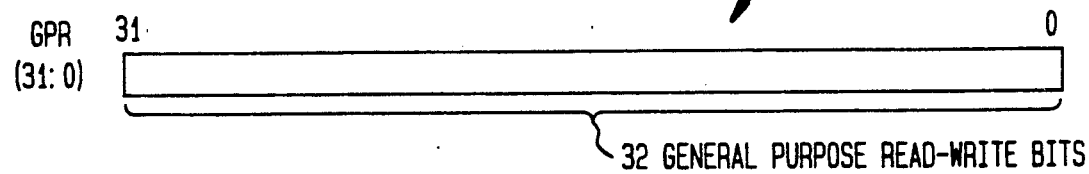
FIG. 7P is a more detailed diagram of one of the four General Purpose Registers shown in FIG. 7A.
Figure 70:
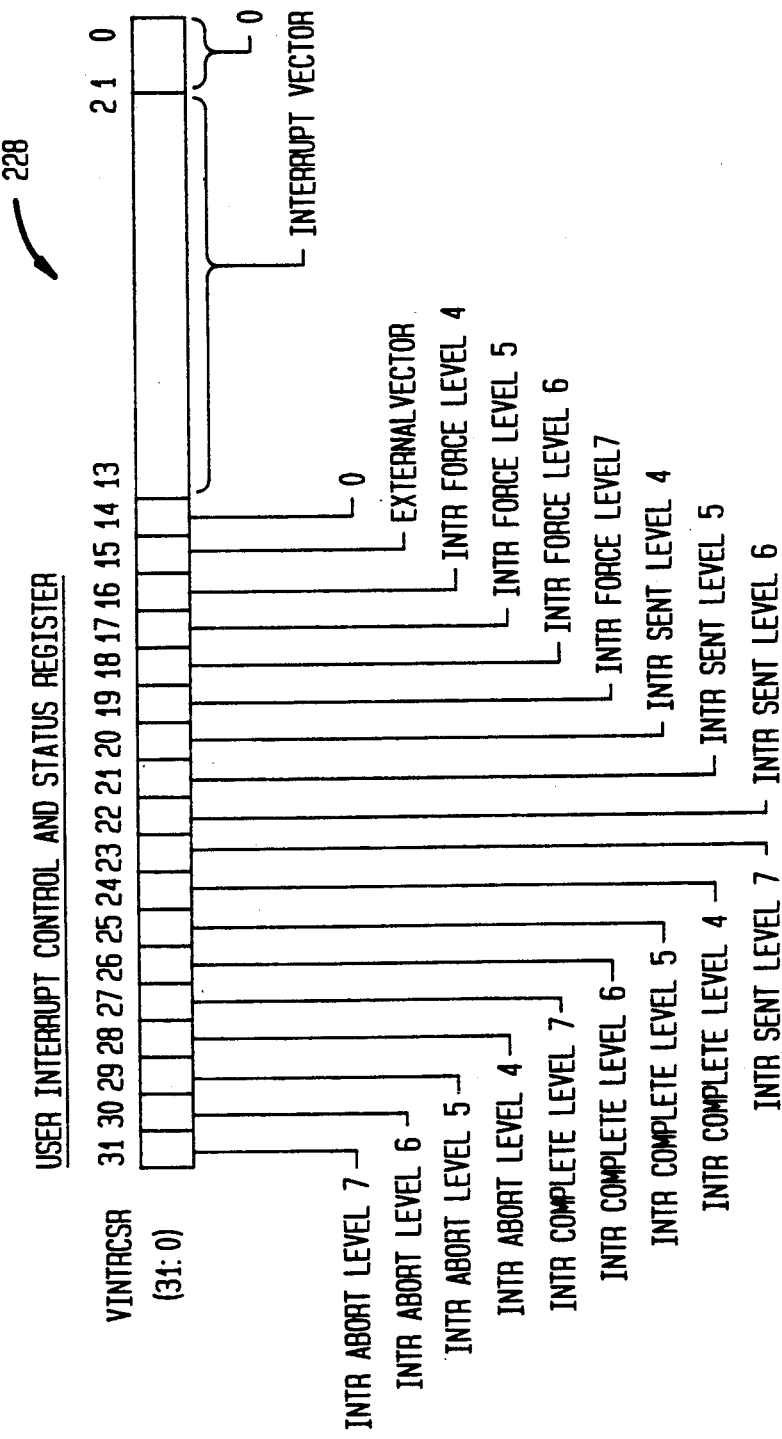

Referring to FIG. 7M, each of the top four bits of the Write Status Register shown in that figure is used to keep track of whether or not data has been written to a corresponding one of the four General Purpose Registers of the type shown in FIG. 7P. Its remaining bits are unused.

The Force Interprocessor Interrupt/Stop Command Register shown in FIG. 7N is designed to tell the BIIC whether it should perform an INTERPROCESSOR INTERRUPT ("IPINTR") transaction or a STOP transaction when the BCICSR[16] force bit, described above, is set. It has four bits, FIPSCMD[15:12] for holding the four bit command code of the type shown in FIG. 5A and a bit FIPSCMD[11]for holding a bit to indicate if the BIIC is to put out a its ID on the BI data lines during the Command/Address cycle when it performs a transaction in responds to the BCICSR[16] force bit. If an IPINTR is to be performed in response to the setting of this force bit, the FIPSCMD[15:12] should hold the IPINTR command and FIPSCMD[11] should indicate the master ID is to be placed on the BI data lines. If a STOP is to be performed, the FIPSCMD[15:12] should hold the STOP command and FIGSCMD[11]should indicate that the master ID should not be placed on the BI data lines. FIG. 7O shows the User Interrupt Control and Status Register 228. This register is used to store information used in performing interrupts other than error interrupts. Error interrupts use information stored in the Error Interrupt Control and Status Register 206, described with regard to FIG. 7E. UINTRCSR[31:28]contains an Interrupt Abort Bit for each of the four levels, 7-4, of possible user interrupts. One of these bits is set if the BIIC receives an improper CNF code, such as a NOACK, when the chip attempts to perform an interrupt transaction. It indicates that the interrupt was aborted rather than being properly completed. UINTRCSR[27:24] contains an interrupt complete bit for each of the four possible user interrupt levels. One of these bits is set once the chip has successfully transmitted an interrupt level and vector to a desired processor through the combination of an INTERRUPT command and a responding IDENTIFY command. UINTRCSR[23:20] contains an Interrupt Sent Bit for each of the four possible user interrupt levels. When the Interrupt Sent Bit for a given level is set, it indicates the BI chip has just performed an INTERRUPT transaction where it broadcasted the ID of processors to be interrupted and the level of the desired interrupt, but has not yet received the proper IDENTIFY transaction from one of the identified processors for that level interrupt. UINTRCSR[19:16] contains an Interrupt Force Bit for each of the four user interrupt levels. When one of these bits is set, it causes the BI chip to seek to obtain control of the bus, and then perform an INTERRUPT transaction which specifies the priority level associated with the Interrupt Force Bit which has been set. UINTRCSR[15] is the External Vector Bit, which, when set, indicates that the BIIC should use a vector supplied to it by other circuitry on its bus device, when it performs an interrupt, rather than taking the interrupt vector contained in either the BIIC's User Interrupt Control and Status Register or its Error Interrupt Control and Status Register. UINTRCSR[14] is always zero. UINTRCSR[13:2] is the interrupt vector, that is, it contains twelve bits which identify the interrupt routine which is to be performed by the processor which responds to the INTERRUPT instruction. UINTRCSR[1:0] are always zero.

FIG. 7P gives a graphical representation of a General Purpose Register, of which there are four on each BIIC. Each General Purpose Register is made up of 32 bits which can be written into or read from, making each such register a type of general purpose memory.

B. Overview of the COM Protocol

As is stated above, the COM bus communications protocol has been designed to work with devices which use the BI protocol, and, thus, is in many ways similar to the BI protocol. It uses the same physical bus as the BI protocol. It interprets most of the lines on the bus in the same manner as the BI protocol. COM devices do not currently perform all of the transactions described above with regard to FIGS. 4A-4H, but the transactions which they do perform, such as READ and WRITE transactions, are performed almost exactly as shown in those figures, except for the distinctions pointed out below. In fact, for the purpose of understanding the inventions claimed in this patent application, the reader can assume that the COM protocol is identical to the BI protocol described above, except for the differences specifically set forth below in this specification.

It should be understood, however, that there are differences between the COM protocol and the BI protocol, and that these differences are important. As will be explained below, in many respects they make COM devices operate quite differently than BI devices. The most important of these differences can be summarized briefly as follows:

First, COM devices arbitrate and control arbitration in a very different manner than BI devices. Unlike BI devices, COM devices are not necessarily prevented from arbitrating in a cycle by the assertion of NO ARB in the previous cycle. In fact, COM devices only arbitrate in cycles following ones in which NO ARB is asserted. COM devices use this distinction to insure that COM devices and BI devices always arbitrate separately COM devices also use the relatively continuous assertion of NO ARB to insure, that if the last device to control the bus was a BI device, the next device to arbitrate will be a COM device. When COM devices assert NO ARB, they only do so from approximately 75 to 175 nanoseconds in each 200 nanosecond bus cycle, rather than asserting it during substantially the whole bus cycle as do BI devices. This enables COM devices to determine if a BI device is asserting NO ARB during a cycle that a COM device is also asserting it. In addition, COM devices do not perform any imbedded arbitration, and they do not perform any round-robin arbitration, since they always arbitrate in both the high and low priority bands at once.

Second, COM devices have the capability to purposely jam the BI protocol, even when they are not Bus Masters, so as to prevent BI devices from performing imbedded arbitration and round robin arbitration. COM devices do this by asserting signals on the BI bus at times when they are not supposed to according to the BI protocol. When a COM device performs such jamming, even the BI devices on the bus to which it is attached operate in quite a different manner than BI devices normally do, and, thus, the bus ceases to be a standard BI bus and becomes instead a hybrid bus, which we call the "COM" bus.

Third, COM devices have means for detecting if the last device to win the bus was a COM device or a BI device, and to respond to certain instructions differently, based on whether those commands are addressed to them by a COM device or a BI device. This enables COM devices to determine which other devices on the bus are COM or BI devices, to have access to memory in COM devices that is not accessible to BI devices, and to use some of that memory as a lock-bit to indicate if a certain resource used by COM devices is currently in use.

Fourth, current COM devices never partake in INTERRUPT and IDENTIFY transactions, as do BI devices. Instead, they use a "delegated" interrupt scheme in which COM devices cause BI devices to perform such INTERRUPT and IDENTIFY transactions for it.

Fifth, COM devices perform atomic read-modify-write transactions by using the assertion of NO ARB to prevent BI devices from interrupting that transaction. Such a use of NO ARB is not specifically part of the BI protocol.

Sixth, the COM bus interface chip has circuitry that lets it perform DMA operations in which a plurality of Read-type or Write-type transactions take place, with the Command/Address cycle of each successive transaction following immediately after the last data cycle of the previous transaction. This is something that devices with the BI bus interface chip cannot do.

Seventh, COM devices never replace a STALL signal with a RETRY signal, as do BI devices.

Eighth, COM devices do not respond differently to a NO ACK and a RETRY signal, as do BI devices.

Ninth, COM devices detect the Command/Address cycle in a different manner than do BI devices. BI devices use NO ARB as well as other signals to detect Command/Address cycles, whereas COM devices do not use the NO ARB line for that purpose.

Figure 9:
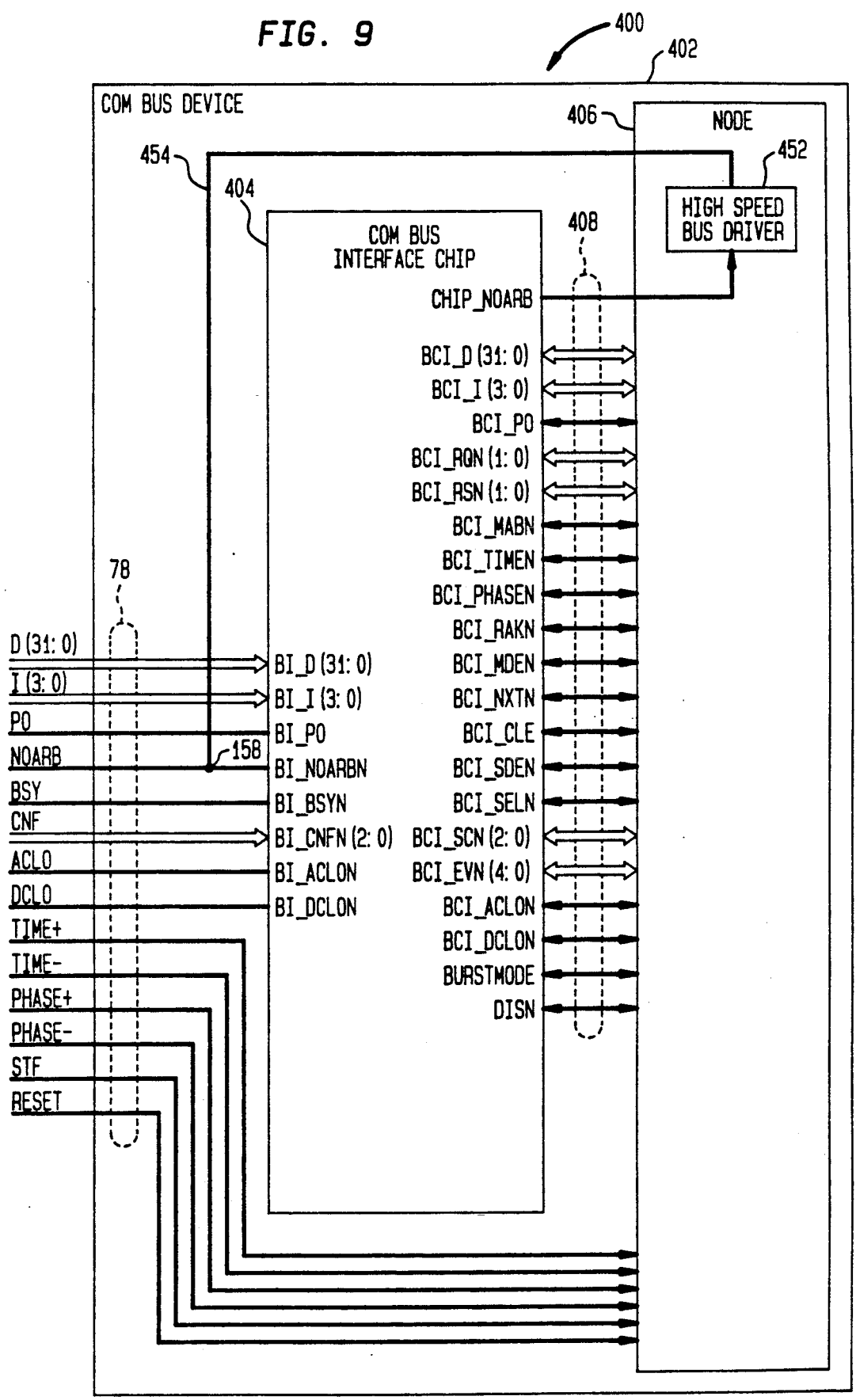
FIG. 9 is a schematic representation of a COM bus device showing its interconnection to the COM bus, the COM bus interface chip, its COM node, and the BCI bus connecting the COM bus interface chip and the COM node.

Referring now briefly to FIG. 9, a schematic representation of a preferred embodiment of the present invention is shown. The preferred embodiment is in the form of a COM bus device 400. This bus device is made of a printed circuit board 402 which contains a plurality of electronic components which allow the COM bus device to perform its desired functions, such as serving as a digital memory, or as an interface with a hard disk, tape drive, printer, terminal, or other device. For our purposes, the COM bus device 400 can be considered to be divided into two major components. The first is the COM bus interface chip 404, and the second is the grouping of all the other electronic components on the board, which for purposes of simplification are collectively called the "node". In FIG. 9 the node is represented as one functional block 406. It should be understood, however, that in actuality the COM chip 404 takes up only a small fraction of the surface of the printed circuit board 402, and the node 406, which contains many integrated circuit chips, takes up the vast majority of that circuit board's area.

The COM interface chip 404 is connected to most of the lines of the COM, or system, bus 78. The COM bus is exactly the same as the BI bus shown in FIG. 2, except that one or more COM devices are attached to it, which changes its protocol. The COM chip is connected to the node 406 through a node bus 408, which is called the BCI bus. It can also be seen that some of the lines of the COM bus 78, such as the TIME+, TIME−− PHASE+, PHASE−, STF, and RESET lines, are not supplied to the COM bus interface chip, but instead are supplied directly to the node.

The operation of the COM interface chip 404 and COM node 406 is explained in greater detail below, but for purposes of this overview it should be pointed out that in the preferred embodiment the node 406 includes a microprocessor, program and data memory, several state machines, combinatorial logic, and latches which provide an interface between the BCI bus and the microprocessor bus of the node. The COM interface chip is a gate array. As those skilled in the electronic arts know, a gate array is a standard collection of transistors which are wired at time of final manufacture to have a desired functional capability. As will be described in greater detail below, the logic gates of the COM chip have been wired to created a circuit which includes the following: a plurality of latches for temporarily storing data received from the COM and BCI buses; an Arbitration State Machine, a Master State Machine, and a Slave State Machine, which are designed to sequence arbitration, bus master, and bus slave behavior, respectively; and many groupings of combinatorial logic which perform the additional functions required to interface a COM bus device to the COM bus

C. COM Arbitration

As is pointed out in the overview of the COM protocol, one of the major distinctions between the COM protocol and the BI protocol lies in the area of arbitration. The arbitration of COM devices which have received a bus request is not controlled solely by the deassertion of the NO ARB line, as FIG. 3D shows is the case with BI devices. In fact, COM devices always arbitrate on a cycle immediately after NO ARB is asserted. This prevents COM and BI devices from arbitrating during the same cycle. Furthermore, the fact that COM devices can arbitrate the cycle after NO ARB is asserted means that COM devices which want to arbitrate can use the NO ARB line for each of a succession of cycles as a means to prevent BI devices from arbitrating until after they do. COM devices are also different than BI devices in that they never perform any imbedded arbitrations or any round-robin arbitrations. COM devices always arbitrate in both the high and low priority bands, rather than in either the high or low priority band as do BI devices. And COM devices include means for jamming the performance of imbedded arbitration and round-robin arbitration by BI devices, so that once a COM device is added to a BI bus, the arbitration of all devices on the bus, not only that of COM devices, is altered.

FIGS. 10-15 are used to describe the arbitration behavior of COM bus devices.

Figure 10:
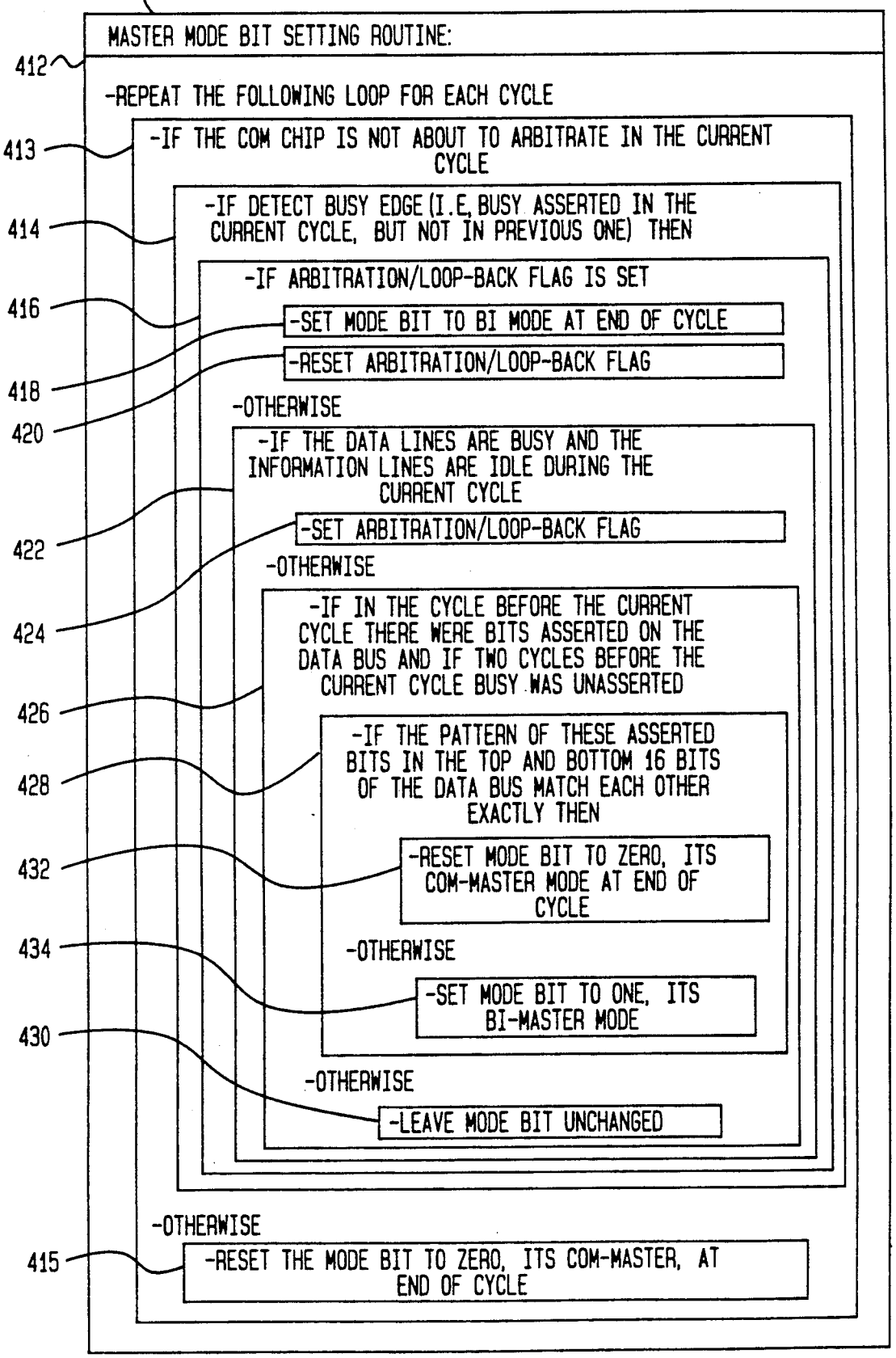
FIG. 10 is a schematic representation of the logic used to set the master mode bit on COM bus interface chips.

FIG. 10 represents the logical rules used to control the setting of a bit of memory in the COM chip 404, called the Master Mode Bit. This bit is used to indicate whether the last Bus Master to win control of the bus was a COM device or a BI device. This information plays an important role not only in COM arbitration, but also in the protocol confidential communications scheme used by COM devices, which will be explained latter.

In FIG. 10 the logical rules for setting the master mode bit are shown in the form of a simplified flow chart. This flow chart represents these rules as a sequence of logical steps 410, as if those logical rules were performed by a programmable computer. It should be understood, however, that the current COM chip is a gate array, and thus the actual setting of the Master Mode Bit is performed by a combination of logic gates, not by a programmable computer. Thus, some of the steps represented as occurring sequentially in FIG. 10 are actually performed in parallel. This use of a simplified flow chart to represent the behavior of combinatorial logic is used in FIG. 10, as well as in FIGS. 13-18 and 23. These simplified flow charts are used because they are much easier to understand than the actual logic gates of the COM chip.

Before explaining the Master Mode Bit setting rules 410, it is necessary to explain the context in which those rules work. First of all, in both the BI and COM protocols, a busy-edge usually indicates the Command/Address cycle of a transaction. A busy-edge is a bus cycle in which the BUSY line of the COM bus is asserted, this is, has a low voltage, immediately after a cycle in which the line was deasserted, or had a high voltage. The only time a busy-edge occurs which is not associated with the Command/Address cycle of a transaction is during the first cycle of a loop-back transaction, of the type described above, performed by a BI device. COM devices do not perform loop-back transactions. Busy-edges occur on the first cycle of a loop-back, since BI devices undergoing a loop-back transaction assert both BUSY and NO ARB, even though they do not assert any other lines of the COM bus. Since normal transactions which start with Command/Address cycles are much more common than loop-back transactions, most busy-edges are associated with Command/Address cycles, not loop-back transactions.

It should also be understood that COM devices can be operated in either of two modes, a jamming mode or a non-jamming mode. The jamming mode is the preferred mode of operation, and the one for which the logic of the Master Mode Bit setting routine was designed. In the jamming mode, COM devices prevent all BI devices from performing imbedded arbitrations of the type described above. Clearpoint devices never perform imbedded arbitrations themselves, whether in the jamming or non-jamming mode. Thus when a COM device is in the preferred, jamming, mode of operation, there will be no imbedded arbitration on the COM bus to which it is connected. That means that both BI devices and COM devices only arbitrate for control of such a bus when there is currently no transaction taking place on the bus, and, thus, that, once such a device wins an arbitration, it will always take control of the bus immediately on the next cycle, with one exception which is discussed below. As a result, the cycle immediately before a Command/Address cycle will always, with the one exception to be described, be an arbitration cycle.

The one exception occurs if a loop-back transaction starts on the very same cycle as a BI device wins an arbitration. A BI loop-back transaction can occur on any cycle in which a BI idle arbitration can take place, that is, on any cycle not immediately preceded by the assertion of the NO ARB line. Thus one or more BI devices can attempt to arbitrate on the same cycle that another BI device starts a loop-back. Since a BI device performing a loop-back asserts only BUSY and NO ARB, it does not interfere with the arbitration. But if a BI device wins an arbitration which coincides with the first cycle of a loop-back transaction, it must wait in its Pending Master state until after the loop-back transaction has de-asserted the BUSY line before it can take control of the bus and start the Command/Address cycle of its transaction. Thus if a cycle is both the start of a loop-back and a BI arbitration cycle it means that a BI device will become a Pending Master and will take control of the bus by issuing a Command/Address cycle on the cycle after the BUSY line is first deasserted after the end of the loop-back.

Of course, COM devices can never arbitrate on the first cycle of a loop-back because COM devices only arbitrate on a cycle after NO ARB has been asserted, and loop-backs cannot start on such a cycle.

A BI device always arbitrates by asserting the bit corresponding to its ID in either the high priority, half, or the low priority half, of the thirty-two bit COM data lines, as described above. Each COM device, like each BI device, has an ID number between zero and fifteen associated with it. But when a COM device arbitrates it always asserts the bit associated with its ID number in both the high and low priority halves of the COM data lines at the same time. This is done to provide a signal which distinguishes COM arbitration from BI arbitration. As is stated above, since BI devices can never arbitrate on a cycle immediately after a cycle in which the NO ARB line is asserted, and since COM devices only arbitrate in a cycle immediately after the NO ARB line is asserted, COM and BI devices never arbitrate on the same cycle.

Referring again to FIG. 10, now that we have given the background for understanding the operation of the Master Mode Bit Setting Routine 410, let us explain the routine itself. The routine 410 is comprised of a loop 412 which repeats the mode setting procedure contained within step 413 once every COM system bus cycle. The step 413 tests to see if, in the current cycle, the COM chip has an indication that it is to arbitrate in the next cycle. As is described below with regard to FIG. 11, the COM chip's Arbitration State Machine generates a signal, ARBNEXT, which informs the chip if it is going to arbitrate on the next cycle. If the ARBNEXT signal is not asserted, step 413 causes step 414 to be performed in the current cycle. If ARBNEXT is asserted, step 413 causes step 415 to be performed, which resets the mode bit to its COM master mode, or !BIMODE, at the very end of the current cycle. This is done because, if the COM chip is going to arbitrate in the next cycle, either it or some other COM device will win control of the bus, since only other COM devices can arbitrate when a given COM device is arbitrating. Since a COM device will win control of the bus, the Master Mode Bit should be set to the COM master mode, or !BIMODE, to indicate, in future cycles, that the last device to win the bus was a COM device.

If, however, the value of ARBNEXT indicates that the COM device is not going to arbitrate in the next cycle, step 413 causes step 14 to be performed. Step 414 checks to see if a busy-edge has been detected, indicating either a Command/Address cycle or the start of a loop-back. If this test is not met for a given cycle, the mode setting routine does nothing further in the current cycle, except calculating and storing certain information for use by the tests of routine 410 in subsequent cycles.

The calculation and storage of information for use in subsequent cycles is not shown directly in FIG. 10, but is implied by its description of information from previous cycles which is required in the tests used by the figure's various steps. The circuitry which is used to perform the logic shown in FIG. 10 includes a latch for storing a bit that indicates whether or not any data lines were asserted during the current cycle, and another latch for storing a bit indicating whether or not in the top sixteen bits of the COM data lines match those in the line's bottom sixteen bits. These bits are calculated each cycle and are saved for possible use by the routine 410 in the next cycle. Circuitry is also provided to calculate a bit indicating if any of the information lines are asserted during the current cycle and to calculate a bit indicating if the BUSY line is asserted for the current cycle. This last bit is saved each cycle for use in the next cycle to determine by comparison with the then current value of the BUSY signal if there is a busy-edge in that next cycle, and is saved for use in the cycle after that next cycle as the indication of the status of the BUSY line two cycles before the then current cycle.

If a busy-edge is detected during the current cycle, the test of step 414 will be met, and it will cause another conditional step, step 416, to be performed. Step 416 tests to see whether the Arbitration/Loop-Back Flag is currently set. If so, it causes steps 418 and 420 to be performed. If not, it causes another conditional step 422 to be performed. The Arbitration/Loop-Back Flag is a memory bit which is set to indicate that the last busy-edge detected by the routine was both the first cycle of a loop-back transaction and a cycle in which one or more BI devices arbitrated. This means that the BI device which won the arbitration during that arbitration/loop-back cycle will become a Pending Master, and thus will take control of the bus as soon as the loop-back terminates. It will do so because, once a BI device is a Pending Master, it continuously asserts NO ARB in a manner which prevents any loop-backs or other transactions from starting until the BUSY line is deasserted and the Pending Master gets control of the bus and performs its transaction.

If the Arbitration/Loop-Back Flag is set when the conditional step 416 is performed, it indicates that the BI device which won the arbitration during the last busy-edge has just taken control of the bus by issuing a Command/Address cycle which caused the current busy-edge. Thus, if the Arbitration/Loop-Back Flag is set, conditional step 416 causes steps 418 and 420 to be performed. Step 418 sets the Master Mode Bit to the BI master mode, or BIMODE, since the current busy-edge is associated with the Command/Address cycle in which a BI Pending Master has taken control of the bus. Step 420 resets the Arbitration/Loop-Back Flag to indicate that there is no longer a BI Pending Master waiting to take control of the bus, since the Pending Master that was previous waiting has just gotten control of the bus. Once step 420 is performed no further action is performed by the Master Mode Bit setting routing until the next cycle.

If the test 416 finds that the Arbitration/Loop-Back Flag is not currently set when a busy-edge is detected, it causes the conditional step 422 to be performed. Step 422 tests to see if both of two conditions are met: first, if the data lines of the COM bus are busy, that is, if they have any lines asserted; and, second, if the information lines of the COM bus are idle, that is, have no lines asserted. If these two conditions are met in a cycle which is a busy-edge, it means that a BI arbitration is taking place in the first cycle of a loop-back transaction. The fact that the information lines are idle means that the cycle cannot be a Command/Address cycle, since Command/Address cycles always place command information on the information lines. This is because the zero command, in which all the information lines are deasserted, is defined as a reserved command, that is, a command which currently has no meaning in the BI protocol. Since the cycle has a busy-edge, but is not a Command/Address cycle, it means that it must be the start of a loop-back instruction. But since loop-back instructions do not assert the data lines, the fact that the data lines are asserted means that one or more other BI devices are arbitrating during the cycle. Thus if step 422 finds the data lines are busy and the information lines are idle, it performs a sub-step 424 in which it sets the Arbitration/Loop-Back Flag for use during then next busy-edge, and then it waits for the next cycle.

If step 422 does not find that both the data lines are asserted and the information lines are deasserted, it causes a conditional step 426 to be performed. Step 426 tests to see if the following two conditions have been met: first, that in the cycle immediately preceding that in which the current busy-edge is detected there were at least some bits asserted in the data lines of the COM bus, and, second, that in the cycle before that, that is, the cycle two cycles before that in which the current busy-edge is detected, the BUSY line was not asserted. If this test is satisfied, step 426 causes another conditional step 428 to be performed. Otherwise, it causes a step 430 to be performed, which causes the routine to do nothing until the next bus cycle.

The step 428 checks whether or not the top and bottom sixteen lines of the data path had an identical pattern in the cycle before the current busy-edge. If the top and bottom halves matched in the previous cycle, this indicates that one or more COM devices arbitrated in the cycle before the current busy-edge, since only COM devices arbitrate by asserted corresponding bits in both the high and low halves of the data lines. Thus, if this condition is met, step 428 causes step 432 to reset the Master Mode Bit to its COM Master Mode, or !BIMODE, to indicate the fact that a COM devices is the current Bus Master. If this condition is not met, it indicates that the devices which arbitrated in the last cycle were BI devices, since they did not each assert their arbitration bit in both the high and low halves of the data lines, and thus step 428 causes step 434 to set the Master Mode Bit to its BI Master Mode, or BIMODE, indicating that a BI device is current Bus Master.

If the step 426 finds that no data bits were asserted on the cycle immediately before the current busy-edge, the current cycle is not a Command/Address cycle preceded by an arbitration, and thus the Mode Setting Routine does nothing, as is indicated by the step 430 in FIG. 10. Such a situation could occur if a BI device performs a loop-back in which no BI arbitration takes place, or during the Command/Address cycle of the second or later transaction in a BI block mode, or a COM burst mode, transaction. As is described above, it is possible for a BI Bus Master to assert NO ARB each cycle for a plurality of successive cycles to keep other devices from seizing the bus while it performs a plurality of transactions. COM devices can do the same thing. When this is done there are often idle cycles between the successive transactions of such a block or burst mode transaction. On the Command/Address cycle of each such successive transaction, the Master Mode Bit setting routine 410 would end up performing step 430. This would be appropriate, because, in such a situation, nothing has happened to change whether the last device to take control of the bus was a BI or COM device.

Similarly, if the test at the top of step 426 finds that the BUSY line was asserted on the second cycle before the current busy-edge, the mode setting routine will leave the Mode Bit unchanged, as is indicated in step 430. This is done because, when BI devices are prevented from performing imbedded arbitration by the COM jamming mode, there are only two situations in which BUSY will be deasserted for just one cycle. The first results when a BI device wins an arbitration during the first cycle of a loop-back. This situation is properly dealt with by steps 418 and 424, described above. The second occurs before the Command/Address cycles of the successive individual transactions of a COM DMA transaction. In a COM DMA the last data cycle of one transaction immediately precedes the Command/Address cycle of the next, causing the BUSY line to be deasserted for just one cycle before successive Command/Address cycles of the DMA. This makes it very likely that bits on the Data lines on the cycle before the busy-edge of the DMA'S successive Command/Address cycles would look to the test of step 428 like the product of a BI arbitration. To avoid such a mistake, the test at the top of step 426 requires BUSY to be deasserted two cycles before a busy-edge as a prerequisite to letting steps 432 and 434 change the Master Mode Bit. This prevents the changing of the Master Mode Bit in response to any but the first Command/Address cycle of a COM DMA transaction, and thus, prevents the successive Command/Address cycles of such a DMA from being confused with cycles in which a BI device takes control of the bus.

Thus, it can be seen that the Mode Setting Routine 410 provides a reliable manner for keeping track of whether the last device to take control of the system bus was a BI or COM device, provided that at least one COM device on the bus is in the jamming mode, as is normally expected to be the case.

Figure 11:
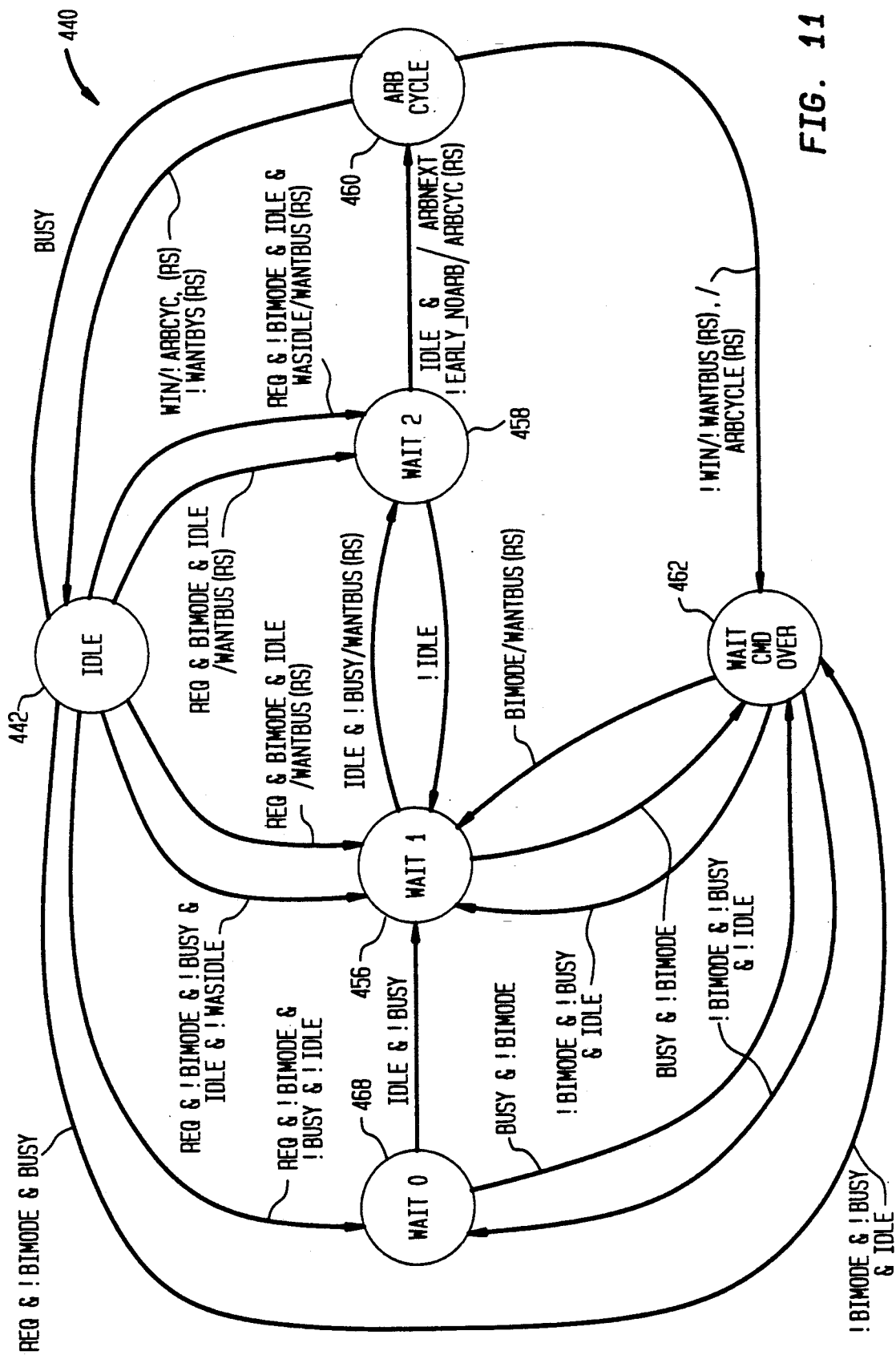
FIG. 11 is a schematic representation of the Arbitration State Machine used to control the arbitration activity of a COM chip.

Referring now to FIG. 11, a schematic representation of the Arbitration State Machine 440 located on the COM bus interface chip 404 is shown. According to the notation used in FIG. 11, a state is represented by a circle and the name of the state is written inside the circle. The arcs between states represent the possible transitions which can be made between such states. Each such arc is labeled. The arc label indicates the logical combinations of one or more signals which must be met before the transition will be made. The notation after the "/", if any, indicates the signals that will be produced when these conditions are met. In the state machine 440, if a transition is made, it will always be made at the end of the COM bus cycle in which the conditions required for it have been met. All the outputs, except ARBNEXT, are labeled with a "RS" after their names, which stands for "reset-set". This means that when the conditions required for a transition are met, a set signal (or a reset signal where the signal name is preceded by "!") is supplied to a flip-flop which will be clocked at the start of the next cycle. This setting or resetting causes the signal generated by that flip-flop to be either turned on, if it is not already on, or turned off, if it is not already off, respectively. Thus "RS" outputs are not changed until the start of the bus cycle in which an associated transition to a new state has been made. The ARBNEXT output is the only output which is not an "RS" signal in FIG. 11. It is generated as soon as all the conditions for any transition for which it is listed as an output are met, that is, it is generated before its corresponding transition is made.

Before explaining the state machine of FIG. 11 in detail, we will give an overview of its BIMODE function and the background necessary to understand how this function works.

If the Master Mode Bit is in the BI Master Mode, or BIMODE, when the COM chip receives a request for the bus ("REQ"), the state machine of FIG. 11 normally performs the following steps: 1) it starts on the next cycle to assert NO ARB each cycle so as to prevent any BI devices from arbitrating until its device does; 2) it waits until it detects that the bus is free; and then 3) it arbitrates with any other COM devices that also wish to arbitrate. The fact that the chip is in BIMODE indicates that the last device to control the bus was a BI device. Thus the preclusion of BI devices from arbitration until after one or more COM devices has arbitrated will not cause exclusion of BI devices from the bus for an unacceptably long period of time. With some simplification, it can be said that during BIMODE the state machine considers the bus to be free as soon as it detects two successive bus cycles in which the data, information, and parity lines (collectively the "DIP" lines) of the COM bus are all deasserted, provided that on the second of these two cycles the NO ARB line is not asserted 50 nanoseconds into that cycle.

The fact that NO ARB is not asserted 50 nanoseconds into the second of the two consecutive idle cycles means that the bus is not in an idle cycle between the individual transactions of a BI block transaction. As is stated above, BI devices can perform block transactions in which a given BI device continuously asserts NO ARB to keep other devices from arbitrating for control of the bus while it performs a sequence of individual transactions. When a BI device performs such a block transaction, there is always a space of one or more idle cycles between the individual transactions of the block. During such idle cycles, the only indication that the bus is not free for use by other devices is the assertion of the NO ARB line.

The COM chip checks to see if the NO ARB lines is asserted at 50 nanoseconds into the cycle because the COM chip itself asserts the NO ARB line from approximately 75 to 175 nanoseconds into each 200 nanosecond bus cycle while it is waiting for the bus to be free so that it can arbitrate. The COM chip would not be able to determine if a BI device were asserting the NO ARB line during this 75 to 175 nanosecond period when it itself is asserting that line.

Figure 12:
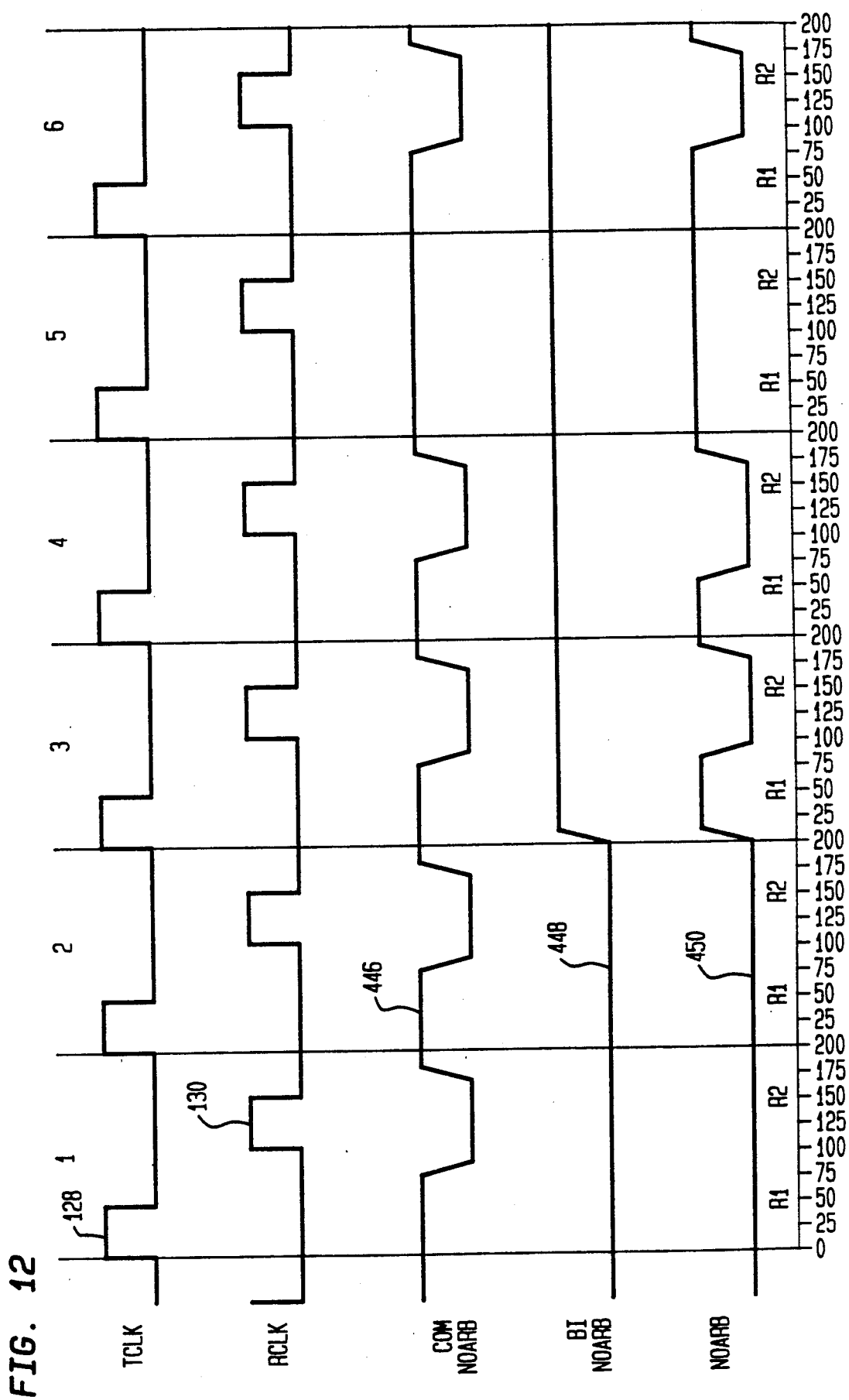
FIG. 12 is a schematic representation of NO ARB waveforms generated by a COM and a BI device shown relative to the transmit clock and read clock timing signals controlled by the COM bus.

FIG. 12 is a schematic representation of the relative timing on the COM bus of the Transmit Clock, or TCLK, signal 128, the Read Clock, or RCLK, clock signal 130, the NO ARB signal 446 asserted by a COM device, the NO ARB signal 448 asserted by a BI device, and the actual NO ARB signal 450 seen on the COM bus, which is a combination of the assertions of the NO ARB signals 446 and 448. FIG. 12 shows these signals during six bus cycles labeled 1-6. It does not shown the bus delays which make the relatively crisp signals shown in that figure be much more rounded, and delayed on the actual system bus.

As is indicated above, according to the BI protocol, signals which are to be asserted during a cycle on the BI bus are supposed to be asserted from the TCLK pulse which starts that cycle until the TCLK pulse which starts the next cycle. TCLK extends from 0 to 50 nanoseconds into each cycle. According to the BI protocol signals are to be read from the bus during the RCLK pulse which extends from 100 to 150 nanoseconds in the cycle.

Thus, when a BI device asserts NO ARB in a given cycle it asserts it from the TCLK of that cycle until the start of the TCLK of the next cycle. That it, it asserts NO ARB for substantially the entire cycle. Because of bus delays, however, the signal may well not be seen as asserted by other bus devices for 50 or more nanoseconds after the BI device asserting it starts to do so, and, thus, it is not clear that a COM device would read NO ARB as being asserted at 50 nanoseconds in a cycle in which a BI device first starts asserting that signal. But if a BI device asserts the NO ARB line for two or more successive cycles it leaves the signal asserted continuously across the boundaries between those successive cycles, so the bus sees the signal as continuously asserted, or low in the case of NO ARB, as is shown in cycles 1 and 2 of FIG. 12. It is this continuous assertion of NO ARB which occurs when a BI device performs a block transaction, and it is this continuous assertion of NO ARB which can be reliably read by a COM device when it monitors the state of the NO ARB line 50 nanoseconds into a bus cycle.

As is shown in FIG. 12, COM devices assert NO ARB from approximately 75 to 175 nanoseconds during each cycle in which they assert that signal. FIG. 12 shows a case in which a COM device asserts NO ARB "continuously", for cycles 1-4, then deasserts it in cycle 5, and reasserts it in cycle 6. In this specification, when we refer to the "continuous" assertion of the NO ARB line by a COM device, we means the assertion of that line once each cycle, from 75 to 175 nanoseconds. It can be seen that when a COM device asserts NO ARB in a given cycle it asserts it during all of the 100 to 150 nanosecond RCLK period in when BI devices read the NO ARB line. Thus, if a COM device asserts NO ARB during a cycle, a BI device will be prevented from arbitrating in the next cycle. But a COM device does not assert NO ARB during the entire period of 0 to 200 nanoseconds in which BI devices assert that line. This enables the COM device to read the NO ARB line at 50 nanoseconds into a given cycle to determine if a BI device is asserting that line during the same cycle.

As is indicated schematically in FIG. 9, the COM chip has a special output CHIP_NOARB. This is the NO ARB output of the COM chip. This output is supplied to the input of a relatively high speed driver 452 located on the COM node 406. The output of this driver 452 is supplied over wire 454 to the NO ARB line 90 of a the COM bus. This high speed driver is required because the drivers on the COM chip do not have enough current sinking capacity to pull the NO ARB line from high to low, between 75 nanoseconds, when COM devices start to assert NO ARB on the COM bus, and 100 nanoseconds, when BI devices start to read data from the bus. If the COM chip desires to assert NO ARB during a given cycle, the signal on CHIP_NOARB goes high at the beginning of the bus cycle to enable the driver 452 to drive the NO ARB line of COM bus low starting at 75 nanoseconds into the bus cycle. For purposes of simplification, however, we will normally describe the COM chip as if it directly asserts NO ARB from 75 to 175 nanoseconds in each cycle in which it is asserts that signal.

Referring again to FIG. 11., the state machine 440 waits in the IDLE state 442 until it first receives a bus request ("REQ"). As is described below, a COM chip can receive two types of bus requests. The first is the assertion of the TRANSACTION_REQUEST signal, indicating that other than a DMA transaction is requested. The second is the assertion of DMA_REQUEST, indicating that a DMA transaction is desired.

If the COM chip is in the BIMODE during the cycle a bus request is received, the Arbitration State Machine will make a transition at the end of the cycle to a WAIT 1 state 456 if logic on the COM chip detects that the DIP lines are not all idle, generating a signal !IDLE. If, however, the DIP lines are all idle, giving rise to an IDLE signal, when a COM device in the BIMODE receives a bus request, the state machine 440 makes a transition at the start of the next cycle to a WAIT 2 state. In either case, as soon as the transition is made, the WANTBUS signal is turned on. Since the WANTBUS signal is an "RS" signal, it will stay on until is it is specifically turned off after the COM device has had a chance to arbitrate. When the WANTBUS signal is on, the COM chip will continuously assert the NO ARB line, that is, it will assert it from 75 to 175 nanoseconds in each bus cycle. This continuous assertion of NO ARB prevents any BI devices from arbitrating for control of the COM bus from the cycle after WANTBUS is turned on until the second cycle after the COM device asserting WANTBUS arbitrates and turns WANTBUS off.

If the state machine has entered WAIT 1 state 456, it means that a TRANSACTION_REQUEST has been made, but that neither of the two consecutive cycles with an idle DIP, which are required before arbitration can occur, has been detected. The state machine will stay in WAIT 1 state until the COM chip detects a cycle in which the DIP lines are all idle and the BUSY line is deasserted, and then at the end of that cycle the state machine will enter the WAIT 2 state. The only exception is if the COM chip is in the !BIMODE, in which case the state machine will transfer from WAIT 1 to the WAIT CMD OVER state 462 at the beginning of the next cycle if BUSY is asserted. This is because, as is described below, when in the !BIMODE the state machine has to wait for more than just an indication that the bus is free before it asserts WANTBUS and prevents BI devices from arbitrating.

If the state machine has entered the WAIT 2 state 458, it means that the first of possibly two consecutive cycles with idle DIP lines has already been detected. Once in the WAIT 2 state, if a cycle is detected in which the DIP lines are not idle, at the end of that cycle the state machine will enter the WAIT 1 state 456, since, in that case, the state machine must start again to wait for the first of two consecutive cycle with idle DIP lines.

If, when in WAIT 2, a cycle is detected in which the DIP lines are idle and logic on the COM chip determines that NO ARB is not asserted 50 nanoseconds into the cycle, causing a !EARLY_NOARB signal to be generated, then at the end of that cycle the state machine will make a transition into the ARB CYCLE state 460. As soon as the two conditions for this transition are met, that is, the detection of IDLE and !EARLY_NOARB, the state machine generates the signal ARBNEXT, which is used to inform various components on the COM chip to prepare for arbitration on the next cycle. It also generates an "RS" or set reset signal which sets the ARBCYC flip-flop, so that at the start of the next bus cycle when the state machine enters the ARB CYCLE state the ARBCYC signal will be turned on, indicating to the components of the COM chip that it is to arbitrate in that cycle.

If the DIP lines are idle but NO ARB is asserted at 50 nanoseconds when the state machine is in WAIT 2, the state machine merely stays in WAIT 2 for the next cycle.

During a bus cycle in which the state machine is in the ARB CYCLE state 460, the COM chip arbitrates by asserting the data line in both the top and bottom sixteen bits of the data lines associated with the ID number of the bus device of which the chips is part. Since WANTBUS has been on, causing NO ARB to be asserted from 75 to 175 nanosecond during the cycle before the cycle in which the state machine is in the ARB CYCLE state, only COM devices can arbitrate during that cycle. Since all COM devices have the same state machine 440 located within them, if there are a plurality of COM devices which want the bus starting at some time before the bus is free, they will all enter their ARB CYCLE state 460 on the same cycle, and thus will all arbitrate at the same time. If a given COM chip has the highest priority bit asserted in either of the two halves of the data bus during a COM arbitration cycle, logic on the chip generates a "WIN" signal. This causes the Arbitration State Machine to make a transition back to the IDLE state 442 at the end of the arbitration cycle, and it causes the ARBCYC and WANTBUS flip-flops to be reset, so that at the beginning of the next cycle those two signal will be turned off. Turning off ARBCYC merely informs the rest of the COM chip that the arbitration cycle is over. Turning off WANTBUS causes the COM chip to terminate WANTBUS's continuous assertion of NO ARB from 75 to 175 nanoseconds during each bus cycle. The WIN signal, which indicates that the COM chip has won arbitration, informs a Master State Machine that the COM chip should take control of the bus on the next cycle by asserting Command-/Address information on the COM bus. The Master State Machine, which is not shown in the figures, is much more complex than the Arbitration State Machine 440. It is used to control the sequence of steps performed by a COM chip when it seeks to become, and does become a Bus Master. If a COM chip does not have the highest priority bit asserted during a COM arbitration cycle, the deassertion of the WIN signal ("!WIN") causes the state machine to make a transition to the WAIT CMD OVER state 462. This sends reset signals to the WANTBUS and ARBCYC flip-flops, which will cause the WANTBUS and ARBCYC signals to be deasserted on the next cycle. As is described below, the WAIT CMD OVER state, is the state in which the state machine 440 waits until another COM bus device deasserts the BUSY line to indicate that it is finishing its transaction.

If the Master Mode Bit is in the COM Master Mode, or !BIMODE, when the COM chip receives a request for the bus, the Arbitration State Machine of FIG. 11 is designed to make it respond generally in the same manner as if it were in the BIMODE, but there is one important difference. If the !BIMODE signal is asserted when the state machine receives a bus request, it indicates that the last device to control the bus was a COM device. In this case, the COM device attempts to insure that any BI device which has been wanting to arbitrate gets a chance to do so before the COM device starts the continuous assertion of NO ARB associated with the WANTBUS signal. This is done to insure that COM devices do not continuously deny BI devices access to the bus.

The basic manner in which !BIMODE COM devices seek to insure that BI devices have a chance to arbitrate is by requiring that at least three consecutive cycles pass in which there is no assertion of NO ARB other than the "TRI-CYCLE" assertion of NO ARB. As is explained below in greater detail, COM devices in the jamming mode generate a so-called "TRI-CYCLE NO ARB" signal which is repeatedly deasserted for one cycle and then asserted for the next two. The assertions of this TRI-CYCLE NO ARB signal are logically ORed with the assertions of the NON-TRI-CYCLE NO ARB signal produced by all the other NO ARB assertion logic contained on the COM chip, to produce the total NO ARB output produced by that chip. Requiring that there be at least three consecutive cycles in which there is no non-tri-cycle assertion of the NO ARB signal insures that, even if there is tri-cycle jamming, the NO ARB signal will not be asserted during one of those three consecutive cycles, and, thus, insures that BI devices will have at least one cycle in which to arbitrate before the assertion of WANTBUS denies them access to the bus.

During !BIMODE the Arbitration State Machine 440 seeks to insure that three consecutive cycles pass in which NON-TRI-CYCLE NO ARB is not asserted by requiring that at least two consecutive idle bus cycles pass in which neither BUSY nor any of the DIP lines are asserted before the COM chip starts its WANTBUS assertion of NO ARB. Since, in the !BIMODE, the last device on the bus before any such consecutive idle cycles will be a COM device, and since COM devices currently end their transactions with at least one cycle in which there is no non-tri-cycle assertion of NO ARB, the two consecutive idle cycles will always be preceded by a third cycle in which there is no non-tri-cycle assertion of NO ARB, and, thus, will insure that BI devices have a chance to arbitrate.

Referring again to FIG. 11, if the Master Mode Bit is in !BIMODE when the COM chip receive a TRANSACTION REQUEST, the Arbitration State Machine will make a transition from the IDLE state 442 to the WAIT CMD OVER state 462 if the BUSY line is asserted, indicating that a COM device is currently using the bus. If, when the request is received, the BUSY line is deasserted, but the DIP lines are not idle, indicating that it is probably the last cycle of the COM Bus Master's transaction, the state machine makes a transition from IDLE state 442 to WAIT 0 state 468. If, when the request is received, the BUSY and DIP lines are deasserted in the current cycle, but a signal !WASIDLE indicates that the DIP lines were not all asserted on the last cycle, indicating that the current cycle is the cycle immediately after the end of a previous transaction, the state machine makes a transition from IDLE to the WAIT 1 state, described above. Finally, if, when the request is received, IDLE and WASIDLE are both asserted, indicating that the DIP lines are idle during the current cycle and were idle in the immediately previous cycle, the state machine transits from the IDLE to the WAIT 2 state, described above, and turns on WANTBUS at the start of the next bus cycle.

When the Arbitration State Machine is in the WAIT CMD OVER state 462, it is waiting for either another COM bus device to complete its transaction, or the Master Mode Bit to switch to BIMODE, before the state machine's own COM device can arbitrate for control of the bus. If, at any time when the state machine is in WAIT CMD OVER, the Master Mode Bit is switched to the BIMODE, indicating a BI device is now the Bus Master, the state machine will make a transition to WAIT 1 and start WANTBUS assertion of NO ARB on the next cycle. As long as the Master Mode Bit is in !BIMODE the state machine waits in WAIT CMD OVER until BUSY is deasserted, indicating that the other COM device's transaction is ending. If, on the first cycle BUSY is deasserted, the DIP lines are not all idle, the state machine makes a transition to WAIT 0. This transition is made on the last bus cycle of a transaction in which another COM device is Master, since COM devices deassert BUSY, but assert data, during the last cycle of their transactions. If, however, for some reason the DIP lines are all idle during the first cycle in WAIT CMD OVER that BUSY is deasserted, a transition will be made to the WAIT 1 state.

When the state machine first enters the WAIT 0 state 468, normally another COM device is the Bus Master, and the previous cycle was the last cycle of that COM Bus Master's transaction, a cycle in which the Bus Master deasserted BUSY, but not all of the DIP lines. Once the state machine is in WAIT 0, if the BUSY line is asserted, indicating that another bus transaction has been started, the state machine makes a transition back to WAIT CMD OVER to wait until either the deassertion of BUSY indicates that the new transaction is ending or the Master Mode Bit is switched to BIMODE. If, on the other hand, when the state machine is in WAIT 0, a cycle is detected in which both the BUSY and the DIP lines are deasserted, the state machine makes a transition to WAIT 1. The behavior of the state machine once it enters the WAIT 1 state is described above.

It can be seen that if the Master Mode Bit is set to !BIMODE when a bus request causes a transition from the IDLE state 442 to either the WAIT CMD OVER state 462, WAIT 0 state 468, WAIT 1 state 456, or WAIT 2 state 458, at least two consecutive idle bus cycles are required before the transition to WAIT 2 is made in which WANTBUS is asserted, causing the assertion of NO ARB in each subsequent cycle. The same is true if the device enters WAIT CMD OVER as a result of losing a COM arbitration. As is explained above, this requirement of at least two consecutive idle bus cycles tends to insure that BI devices will be given at least one cycle in which to arbitrate before the assertion of WANTBUS keeps them off the bus, even if there is tri-cycle jamming.

If a BI device does arbitrate during one of the three idle bus cycles required before a COM device in !BIMODE can arbitrate, the Arbitration State Machine 440 will ultimately end up in WAIT 1, waiting until the BI transaction is over. If the BI arbitration occurs when the state machine is in WAIT 2, the assertion of bits on the DIP lines will generate a !IDLE signal causing a transition back to WAIT 1. IF the state machine is in WAIT 0 or WAIT 1 when the arbitration takes place, the assertion of bits on the DIP lines will prevent any progression toward WAIT 2, and the assertion of BUSY which will occur once the BI device which wins the arbitration takes control of the bus will cause a transition to WAIT CMD OVER. Once in WAIT CMD OVER, however, the switching of the Master Mode Bit to BIMODE, which results from the BI device's arbitration, will transfer the state machine to WAIT 1.

D. COM Jamming of Imbedded Arbitration

As is shown in FIG. 9, the COM chip has an input DISN which controls whether or not the chip is in its jamming mode, in which it seeks to prevent all devices on the bus from performing both imbedded arbitration and round robin arbitration. The letters "DIS" stand for "disable". The addition of an "N" at the end of the line's name indicate here, as with other lines, that the signal is a negative signal, that is, one which is asserted when the line goes low. It is currently intended that this line will normally be left high, so that the jamming will not be disabled.

Although the current implementation of the COM chip, described here, controls both the jamming of imbedded and round robin arbitration together, future implementations may enable these two forms of jamming to be operated separately, or may provide for only one of these two types of jamming without the other. Such a change might be desirable, for example, because, when the COM chip is used with certain combinations of devices, round robin arbitration jamming may prove undesirable, even though imbedded arbitration jamming may still be desirable.

Referring now to FIGS. 13–15, when the DISN line is left high, the COM chip uses a combination of three separate jamming rules to determine when to assert NO ARB so as to prevent BI devices from performing imbedded arbitration. There is no need for these rules to prevent COM devices from performing imbedded arbitration, since the Arbitration State Machine 440 shown in FIG. 11 always prevents COM devices from arbitrating after a cycle, such as a Command/Address cycle, in which the DIP lines are asserted. In order to make the three jamming rules of FIGS. 13–15 easier to understand, they are represented by simplified flow charts. It should be understood, however, that on the actual COM chip these rules are carried out by combinatorial logic rather than a programmable device.

Before explaining these imbedded arbitration jamming rules it should be remembered that, except as stated otherwise in this specification, when a COM device performs a transaction, it generally performs it according to the specification for the corresponding BI transaction set forth above with regard to FIGS. 4A–4H. COM transactions generally have the same bus cycles and the same signals asserted in each bus cycle as do corresponding BI transactions. In particular, COM Bus Masters, like BI Bus Masters, assert NO ARB during all the normal cycles of a transaction that a BI device would, plus during those extra cycles dictated by the operation of the Arbitration State Machine 440 of FIG. 11 and the jamming rules of FIG. 13-15. Of course, COM devices only assert NO ARB from 75 to 175 nanoseconds during a cycle in which they assert that signal.

The first jamming rule 480 is shown in FIG. 13. It results in so called "Bus Master jamming". The rule 480 simply insures that if the COM chip is in the jamming mode, if the device of which it is part is the current Bus Master, and if the current cycle is the Command/Address cycle, then the COM chip should assert NO ARB from 75 to 175 nanoseconds during that cycle. As is described above, when a BI device is the Bus Master it always deasserts NO ARB during the Command/Address cycle to allow other BI devices to arbitrate in the next, Imbedded Arbitration, bus cycle. The Bus Master Jamming Rule of FIG. 13 prevents BI devices from arbitrating in the Imbedded Arbitration cycle when a COM device which is in the jamming mode is Bus Master. If a COM Bus Master is not in the jamming mode, however, this rule will not assert NO ARB during the Command/Address cycle, and, thus, will allow BI devices to perform imbedded arbitrations during the Imbedded Arbitration cycle, just as it would if a BI device were the Bus Master.

FIG. 14 describes the rule 490 for generating tri-cycle jamming. The purpose of tri-cycle jamming is to prevent imbedded arbitration from taking place when a BI device is the Bus Master. Its basic premise is that when imbedded arbitration is being jammed, all arbitrations should be so called "idle" arbitrations, which take place when the bus is not in the middle of another transaction. Devices which win idle arbitrations will always, unless they win their arbitration in the first cycle of a loop-back transaction, take control of the bus, and have their Command/Address cycle, during the cycle immediately after they arbitrate. Thus, the Command/Address cycle in which a BI Bus Master deasserts NO ARB to allow for imbedded arbitration will normally occur exactly one cycle after the arbitration in which the Master won the bus, and exactly two cycles after the deassertion NO ARB which made that arbitration possible.

As is stated above, in tri-cycle jamming the COM chip repeatedly deasserts NO ARB for one cycle, followed by two cycles in which it is asserted. Deasserting NO ARB on the first out of each three cycles gives BI devices a chance to arbitrate on, and only on, the second cycle of each three cycles. Since tri-cycle jamming normally limits arbitration to the second of every three cycles, it means that the Command/Address cycle will normally be limited to occurring on the third of those three cycles. Since NO ARB is always asserted on the third of each three cycles of tri-cycle jamming, NO ARB will normally be asserted during the Command/Address cycles of a BI device's Bus Mastership, preventing imbedded arbitration from taking place.

FIG. 14 describes the rule 490 by which tri-cycle jamming is generated. This rule causes the COM chip to wait in step 492 until it receives the reset signal on the DCLO line ("BI_DCLON" in FIG. 9) indicating that the chip should initialize after power up. The chip uses this reset in step 494 to reset a tri-cycle counter to zero. This resetting of the tri-cycle counters by a common signal on the BI-COM bus is done to insure that all COM device on the bus have their tri-cycle counts synchronized. This is necessary because if different COM devices connected to a single bus asserted TRI-CYCLE NO ARB signals that were out of sync, their combined signals would assert NO ARB every cycle, and, thus, would never allow a BI device to arbitrate.

Once a COM device's tri-cycle count has been synchronized in step 494, the COM device in step 496 repeats the loop 498 each system bus cycle. First step 498 tests to see if the count in the tri-cycle counter during the current bus cycle is less than two. If this test is met, steps 500 and 504 are performed. Step 500 tests if the COM chip is in the jamming mode. If so, and only if so, step 502 asserts NO ARB from 75 to 175 nanoseconds during the current cycle. Step 504 increments the tri-cycle counter. If the test of step 498 finds that the tri-cycle count is greater than 2, step 506 resets the tri-cycle counter to zero.

Thus, the rule 490 continuously causes the tri-cycle counter in each COM chip to count from zero to two in a manner which is synchronized with any other COM chips on the bus. The chip makes this count whether or not the COM chip is in jamming mode, so that if the chip is switched from the non-jamming to the jamming mode, it will be properly synchronized. When the chip is in jamming mode, NO ARB is asserted for the first two counts of each cycle but not the third, giving rise to the tri-cycle NO ARB assertion pattern.

FIG. 15 describes the Loop-Back Jamming Rule 508. This rule is used to insure that imbedded arbitration is prevented if a BI devices wins an arbitration during the same cycle that another BI device starts a loop-back transaction. If a BI device arbitrates on the first cycle of a loop-back instruction, it cannot take control of the bus and perform its Command/Address cycle in the cycle after it wins the arbitration. Instead, it must wait until the cycle after the first cycle in which the loop-back transaction deasserts BUSY. In such a case, the Command/Address cycle which results when the BI device takes control of the bus is not synchronized to the tri-cycle jamming, and, thus, the Command/Address cycle could occur during a cycle in which the tri-cycle jamming allows NO ARB to be deasserted, allowing imbedded arbitration to take place. The Loop-Back Jamming Rule 508 prevents imbedded arbitration from taking place in such situations.

FIG. 14 explains of the Loop-Back Jamming Rule. The rule contains a conditional statement 510 which causes it only to be in effect if the COM chip is in the jamming mode. If the chip is in the jamming mode step 512 causes the conditional step 514 to be repeated for each cycle. Step 514 tests if three conditions are met for the current cycle: 1) that it is a busy-edge; 2) that at least one data line is asserted; and 3) that no instruction lines are asserted. If these three conditions are met the current cycle is the first cycle of a loop-back transaction in which an arbitration is taking place. If such an arbitration-loop-back cycle is detected, step 514 causes steps 516 and 518 to be performed. Step 516 w its until the next cycle in which BUSY is deasserted, and then step 518 asserts NO ARB from 75 to 175 nanoseconds during the next cycle. This next cycle will correspond to the Command/Address cycle of the device which won the arbitration during the first cycle of the loop-back instruction, and assertion of NO ARB during that Command/Address cycle will block imbedded arbitration during the following Imbedded/Arbitration cycle.

It can be seen that the Master Mode Bit Setting Routine of FIG. 10, and the Loop-Back Jamming Rule of FIG. 15 both detect a BI arbitration which occurs on the first cycle of a loop-back and both detect subsequent busy-edges. In the actual COM chip, the same logic elements perform these detections for both the Master Mod Bit Setting Routing and the Loop-Back Jamming Rule.

E. COM Jamming of, and Non-Participation in, Round Robin Arbitration

As is stated above, BI devices are capable of being set to a mode in which they perform "dual round robin arbitration". When a given BI device performs such dual round robin arbitration it compares its device ID with the ID of the last Bus Master placed on the COM information lines during an Imbedded Arbitration cycle. If the given BI device's ID number is equal to or lower than the ID of the Master (meaning its arbitration priority is equal to or higher than that of the Master), the given BI device will assert its arbitration bit in the low priority half of the data bus (i.e, line D[31:16]. Otherwise the given BI device will assert its arbitration bit in the high priority half of the data bus (i.e., lines D[15:0]).

COM devices do not perform any round robin arbitration, regardless of whether or not they are in the jamming mode. This is because COM devices always assert their corresponding ID bit in both the high and low priority halves of the data bus when they arbitrate. Thus, in effect, a given COM device always arbitrates at the same priority level. Since COM devices do not perform round robin arbitration, they have no need to, and do not, read the information lines during Imbedded Arbitration cycles. In fact, the COM chip does not even read the information lines during the Imbedded Arbitration cycle when it is a Slave for the purpose of computing parity, and, as a result they do not check parity under such circumstances.

As FIG. 16 indicates, even though COM devices do not perform any round robin arbitration themselves, they do have an effect upon the dual round robin arbitration of BI devices. They do, because they place signals on the I, or information, lines of the COM bus during the Imbedded Arbitration cycle. FIG. 16 is a simplified statement of the logical rule 520 which control the COM chip's assertion of the I lines during Imbedded Arbitration cycles. The Slave State Machine, described below with regard to FIG. 26, monitors the COM bus and informs the COM chip of which cycle is the Imbedded Arbitration cycle. The Master State Machine, which is not shown in the drawings, also provides this information when the chip is the Master.

The operation of the rule depends upon whether or not the chip is in the jamming mode. If it is, the rule causes step 522 to asserts all four information lines plus the parity line (to make proper odd parity) during each Imbedded Arbitration cycle, regardless of whether or not the COM chip's device is the Bus Master. This jamming of the I lines during Imbedded Arbitration cycle, is in contradiction to the BI protocol. It causes the ID on the I lines during all Imbedded Arbitration cycle to be read by BI devices practicing dual round robin arbitration as a hexadecimal "F", or a decimal "15". This corresponds to the highest possible ID number, and, thus, the lowest possible arbitration priority. Since BI devices practicing round robin arbitration, will arbitrate low if their ID is equal to or less than the ID on the I lines during the Imbedded Arbitration cycle, this causes all BI devices to arbitrate in the low priority band, effectively preventing any round robin arbitration.

If, on the other hand, the COM chip is not in the jamming mode during a given Imbedded Arbitration cycle, the rule 520 performs step 524, which tests if the COM chip's device is the current Bus Master. If it is, step 526 asserts, on the I lines during the Imbedded Arbitration cycle, the ID number of the first bus device to win control of the bus after the computer system was last initialized. Step 526 also causes the parity line to have a value which causes the information and parity lines to have proper parity. This use of the ID number of the first device to win control of the bus after initialization, insures that the ID number placed on the information lines will be that of a non-COM device, since COM devices are designed to never be the first devices to arbitrate for control of the bus after initialization.

FIG. 17 is a simplified explanation of the routine 528 performed by each COM chip to get and save the ID number of the first devices to win control of the bus after initialization. This is used in the ID number step 526 of FIG. 16, just explained. The routine 528 is comprised of a loop which is repeated each cycle after initialization until the loop is exited from within. The loop consists of two major steps that are repeated in each pass through the loop, step 530 and step 532. In step 530 the COM chip tests to see if the current cycle is a busy-edge which was preceded by a cycle in which bits were asserted on the I lines. If it is, the step 530 causes sub-steps 534, 536, 538, and 540 to be performed. Step 534 finds the highest priority bits which was asserted on the data lines during the cycle before the busy-edge cycle. This bit will correspond to the arbitration bit of the device which won the arbitration and whose Command/Address cycle has caused the busy-edge. Step 536 calculates the four bit ID number which corresponds to the highest priority arbitration bit. Step 538 stores this four bit ID number in the COM chip for future use of the type described in step 526 of FIG. 16. Once step 538 is complete, the purpose of the routine 528 has been accomplished, and step 540 causes the COM chip to exit that routine.

If the test at the top of step 530 does not find that the current cycle is a busy-edge preceded by a cycle in which one or more bits are asserted on the data lines, step 532 is performed for that cycle. This step latches the values of the data lines during the current cycle for us by steps 530 and 534 in the next cycle, if that next cycle is a busy-edge. After step 532 is complete the routine 528 returns to the top of its loop and waits for the next bus cycle.

F. COM Chip's Register Complement

The COM chip has generally the same registers as do BI chips. Some of the important differences between the registers of the COM chip and those shown in FIGS. 7A-7P are as follows:

In the BI Control and Status Register on COM chips BICSR[5:4], the arbitration mode bits, have a different function than on BI chips. They either enable or disable arbitration, but they only provide for one mode of arbitration, that in which COM chips assert an arbitration ID bit on both the high and low priority halves of the data bus.

In the Bus Error Register of COM chips BER[17], the NEX bit, and BER[2] the IPE bit are not used. Although not shown in FIG. 7D, the Bus Error Register in commercially available BIIC's have a NO ACK To Multiresponder bit, BER[30]. The COM chip, however, does not use BER[30].

The bottom half of a COM chip's Interrupt Destination Register is identical to that contained on a BI chip. But the upper half of the INTRDES Register on a COM chip, instead of being all zero's as in a BI chip, consists of 16 read/write bits, INTRDES[31:16]. A COM chip will only let these sixteen read/write bits on its INTRDES be written to, or read from, as having a value other than zero when the Master Mode Bit is in the COM Master Mode, indicating, if one or more COM devices on the bus is in jamming mode, that the device performing the write or read type transaction is a COM device. As is explained below, these bits form a protocol confidential memory, called the Clearpoint General Purpose Register, which can only be used by COM devices when the jamming mode is used.

The Interprocessor Interrupt Mask Register and the Interprocessor Interrupt Destination Register both have read/write bits in the same location as do BI chip, but neither of these registers have any function on the COM chip, since COM chips are not currently designed for use in devices which are processors.

The Interprocessor Interrupt Source Register does not exist on the COM chip. All of its bits will always be read as zeros.

In the BCI Control and Status Register of the COM chip the BCICSR[17] BURSTEN bit, the BCICSR[16] Ipintr/Stop Force bit, the BCICSR[4] pipeline mode bit, and the BCICSR[3] RTO enable bit have no function. In addition, in the COM chip the BCICSR[0] bit functions as the Clearpoint ID bit. This bit is always read as a '0' if addressed when the Master Mode Bit is in the BI Master Mode and as a '1' if addressed when the Master Mode Bit is in the COM Master Mode. As is described below in the section on Protocol Confidential Behavior, when the chip is in jamming mode, as it is normally intended to be, it will cause BI devices to read the Clearpoint ID bit as having a value of zero, as it would on BI chips, but will cause COM devices to read the bit as having a value of one.

The read/write bits of the COM chip's Force Interprocessor Interrupt/Stop Command Register have no function.

G. COM Protocol Confidential Behavior

COM devices are distinguished from BI devices in that they have protocol confidential behavior. This means that they have the ability to respond to the same transaction differently when that transaction is addressed to them by a COM device than when it is addressed to them by a BI device. The particular implementation of protocol confidential behavior used on the COM chip involves the bits in the top half of the Interrupt Destination Register, INTRDES[31:16], which are collectively called the Clearpoint General Purpose Register, and it involves the least significant bit of the BCI Control and Status Register, which is called the Clearpoint ID Bit.

Figure 18:
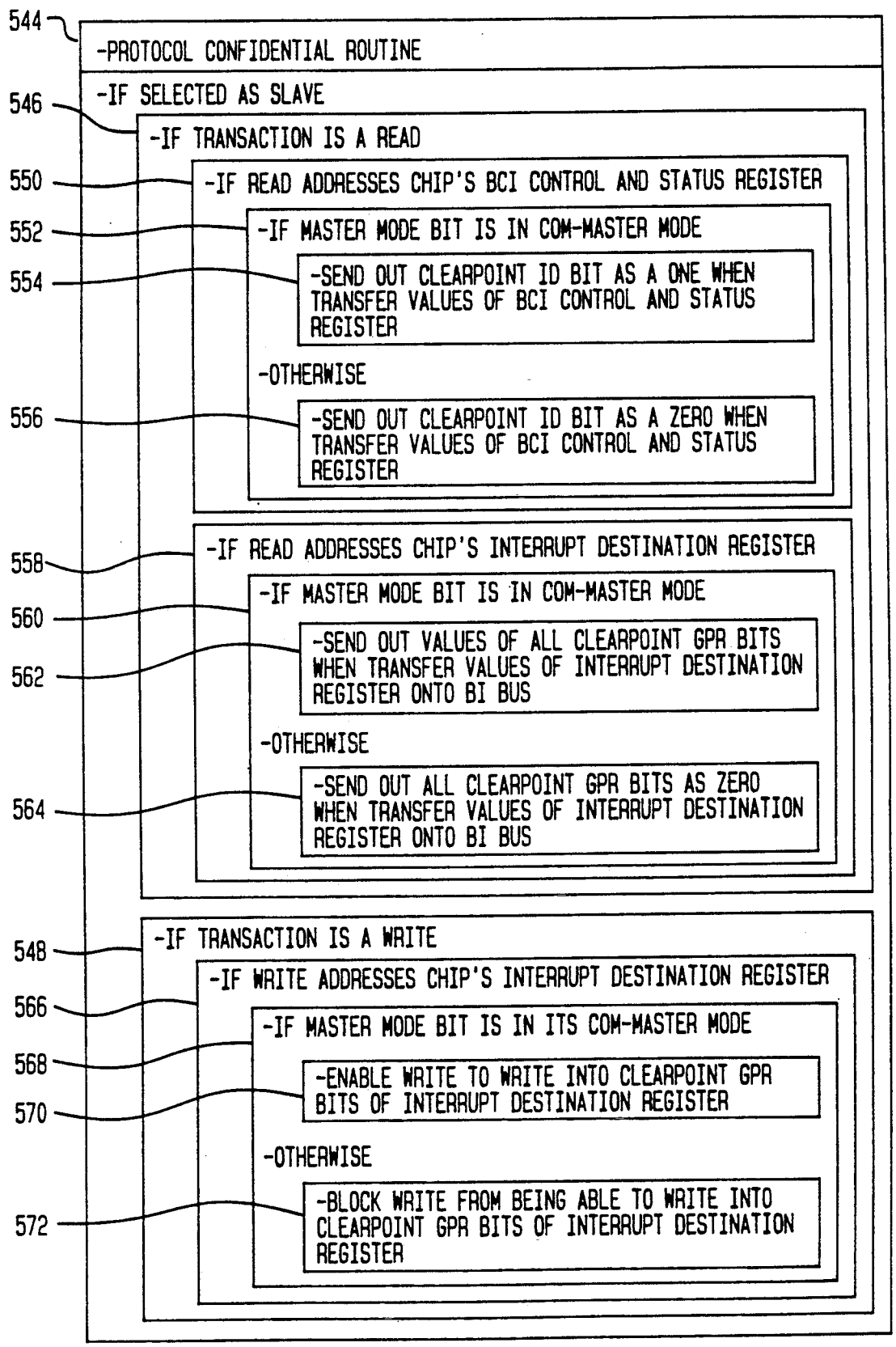
FIG. 18 is a schematic representation of the logic used by the COM chip to control access to the protocol confidential memory located on its Interrupt Destination Register and its protocol confidential ID bit located on its BCI Control and Status Register.

FIG. 18, is a simplified representation of the logic 544 used to control the protocol confidential behavior. Although the figure presents this logic as a sequential routine to make it easy to understand, it should be appreciated that in the actual COM chip combinatorial logic is used.

The routine 544 tests at its top to see if the COM chip has been selected as a Slave by the command and address placed on the bus in a Command/Address cycle. If not, the routing 544 takes no further steps until the next Command/Address cycle. If so, it proceeds with conditional steps 546 and 548. Step 546 tests if the transaction in which the COM chip has been selected as a Slave is a Read-type transaction. If so, it performs step 550, which tests if the Read-type transaction is addressed to the COM chip's BCI Control and Status Register. If it is, step 552 tests if the Master Mode Bit is in its COM Master Mode, or !BIMODE, indicating that the master of the Read-type transaction is a COM device. If the Master Mode Bit is in !BIMODE, step 554 sends out the Clearpoint ID bit, the least significant bit of the BCI Control and Status Register, as a one when the value of that register is placed on the COM bus during the data cycle of the read transaction. If the Master Mode Bit is in the BI Master Mode, or BIMODE, indicating that the master of the Read-type transaction is a BI device, step 556 sends out the Clearpoint ID bit as a zero when the value of the BCI Control and Status Register is placed out on the COM bus.

If one or more COM chips connected to the system bus are in jamming mode, the Master Mode Bit should almost always correctly indicate if the master in a Read-type transaction is a COM or a BI device. Thus, if jamming is used, the sending out of the least significant bit of the BCI Control and Status Register as a one when the Master Mode Bit is in !BIMODE and as a zero when it is in BIMODE will provide an indication of whether the device whose BCICSR is being read is a COM or BI device, and this indication will only be available to CO devices.

If, on the other hand, the Read-type transaction detected by the test at the top of step 546 is addressed to the COM chip's Interrupt Destination Register, the test at the top of step 558 is met, and its sub-step 560 is performed. Like step 552, step 560 tests whether or not the Master Mode Bit is in !BIMODE. If so, indicating that the Master of the Read-type transaction is a COM device, step 562 causes the actual values of the read/write memory bits of the Clearpoint General Purpose Register, INTRDES[31:16], to be placed on the COM bus when the value of the Interrupt Destination Register is placed on that bus during the data cycle of the Read-type transaction. If the Master Mode Bit is in BIMODE, indicating that a BI devices is the Master of the Read-type transaction, step 564 causes the most significant sixteen bits placed on the COM bus during the data cycle to be zero, as they would if a BI device's Interrupt Destination Register were being read. This is done regardless of the actual value of the COM chip's INTRDES[31:16].

If the transaction in which the COM chip is selected as a Slave is a Write-type transaction instead of a Read-type transaction, the test at the top of step 548 is satisfied, and step 566 is executed. Step 566 tests if the write is addressed to the chip's Interrupt Destination Register. If so, step 568 tests if the Master Mode Bit is in !BIMODE. If so, step 570 enables the write to write into the Clearpoint General Purpose Register bits, INTRDES[31:16], as well as the bottom half of the INTRDES Register. If not, step 572 prevents the write from having any effect on those top sixteen bits, although the write is still allowed to write into, and change, the bottom half of the INTRDES Register.

Thus, it can be seen that when a COM chip is in the jamming mode, steps 558 and 548 of the routine 544 enable a Bus Master to read and write into the upper sixteen bits of the Interrupt Destination Register only if that device is a COM device. If the Bus Master is a BI device, the upper sixteen bits of the register act as if they were made of read-only zeros.

Figure 19:
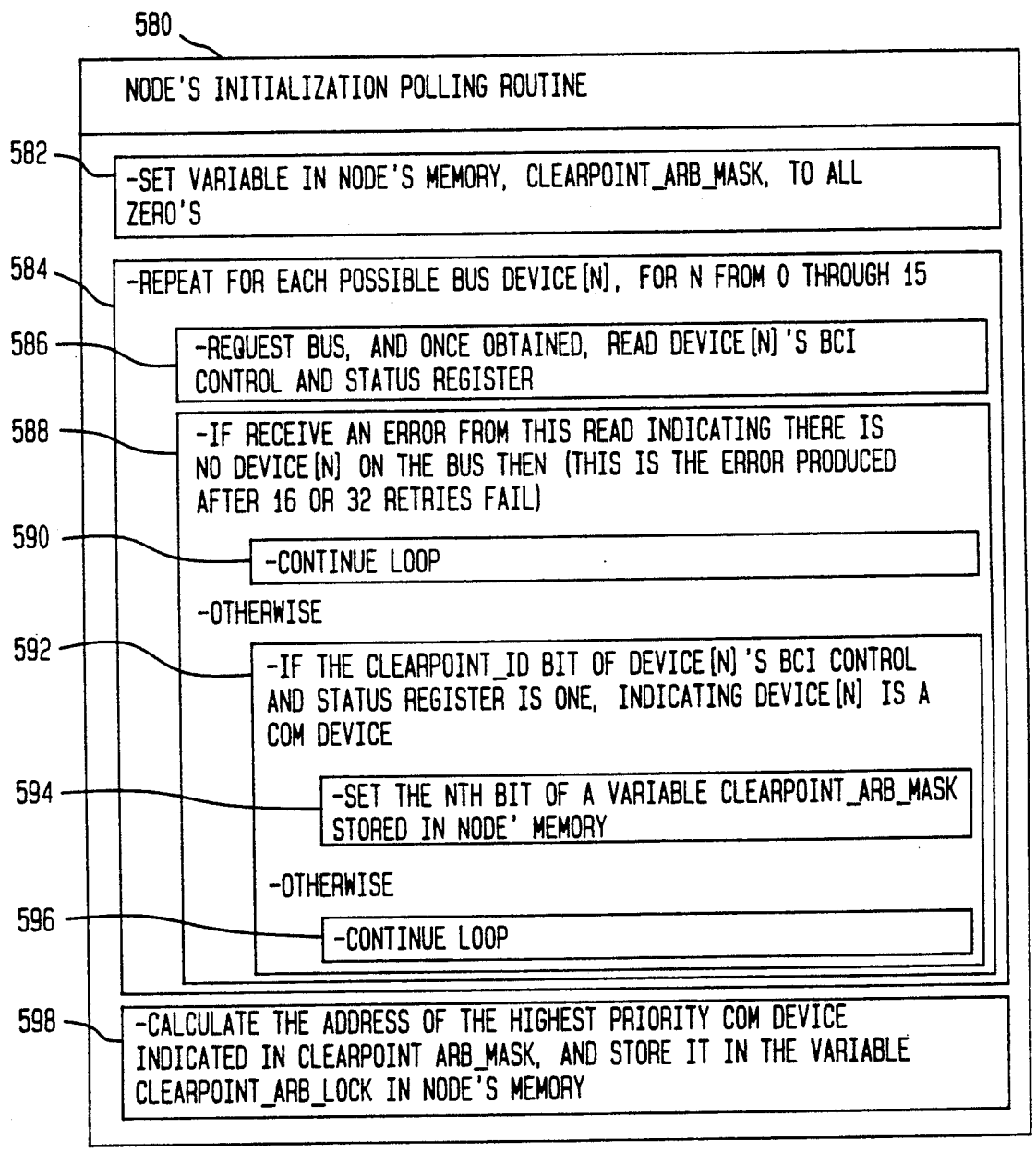
FIG. 19 is a schematic representation of the steps used by the COM node to poll all possible devices on the COM bus to identify the highest priority COM device connected to that bus.

FIG. 19 shows a simplified representation of the polling routine 580 which is performed by the node of a COM device during its initialization routine. This routine is used to determine which devices on the COM system bus are COM devices, and to select the highest priority of these COM devices for use in a delegated interrupt scheme which is explained below. The steps of the polling routine 580 are performed by a programmable microprocessor on the node of current COM devices.

The polling routine 580 is part of the initialization routine of a COM device. This initialization occurs shortly after the voltage on the DCLO line of the COM bus indicates that the computer system in which the COM device is installed has been turned on. The first step in the polling routine 580 is step 582, which sets the value of a variable CLEARPOINT_ARB_MASK, to zero. This variable contains sixteen bits, each of which corresponds to one of the sixteen possible ID numbers, zero though fifteen, of bus devices on the COM bus. CLEARPOINT_ARB_MASK is stored in the data memory used by the COM node's programmable microprocessor. After this variable is cleared, step 584 repeats a loop comprised of steps 586 and 588 for each of the sixteen possible device ID's, zero through fifteen. The variable N, represents the current value of the device ID used in each pass through that loop. In each such pass, the node, in step 586, sends a TRANSACTION_REQUEST to its associated COM chip, which causes that chip to arbitrate until it obtains control of the bus. Once the chip obtains control of the bus, the node and the chip together attempt to read into the node's memory the BCI Control and Status Register from the bus device with the Nth ID.

Once this read has been attempted, the loop advances to step 588. Step 588 tests to see if the attempt to read from the BCICSR of the Nth device produced an error indication. As is explained below, if, when a COM device is a Bus Master, it receives a NO ACK or RETRY signal in response to an attempted transaction, it will repeat that transaction a specified number of times, usually 16 or 32 times. If it does not complete the desired transaction within this number of times, it will make a record of that fact. It is this record of a failed transaction which is tested at the top of step 588. If the test of step 588 indicates that the attempts to read the Nth device's BCICSR all failed, it assumes that no bus device with an ID of N is connected to the bus. In this case, it executes step 590, which jumps to the top of the loop 584 to repeat the loop for the bus device with the next higher ID number.

If the test at the top of step 588 indicates that a read of the Nth device's BCICSR was successfully completed, step 592 tests to see if the Clearpoint ID bit (i.e., the least significant bit) read from the Nth device's BCICSR is one. If so, it indicates that the Nth device is a COM device, and thus step 594 sets the Nth bit of the CLEARPOINT_ARB_MASK variable. If, on the other hand, this least significant bit is zero, indicating that the Nth device is a BI device, step 596 causes the routine to go to the top of the loop 584 and start the loop for the device with the next highest ID number. This leaves the Nth bit of the CLEARPOINT_ARB_MASK with the value of zero.

Once the loop 584 has been performed for each of the 16 possible bus device ID's, the CLEARPOINT_ARB_MASK should have a one located in each of its sixteen bits which corresponds to the ID number of a COM device located on the COM bus. All the other bits will be zero. At this point, the CLEARPOINT_ARB_MASK provides a map of all the COM devices currently connected to the system bus.

After the loop 584 has been completed, the routine 580 advances to its final step 598. In this step it finds which of the sixteen bits in CLEARPOINT_ARB_MASK is associated with the highest priority ID number, that is, it finds the variable's least significant asserted bit. It then calculates the address associated with the Interrupt Destination Register on the bus device having that ID number. This is a straight forward calculation, since each ID number has a known address associated with it. This address is then stored in a variable, CLEARPOINT_ARB_LOCK, located in the node's memory.

The most significant bit in the upper sixteen bits of the Interrupt Destination Register of the device identified by the address in CLEARPOINT_ARB_LOCK is used as a protocol confidential memory location. This location stores a lock bit which indicates whether or not any COM device is currently involved in a delegated interrupt scheme. Since all COM chips use the same polling routine 580, each will select the Interrupt Destination Register of the same COM chip to store this lock bit. When jamming mode is used, this lock bit can only be read by COM devices, and thus its use will have no undesirable effects upon BI devices.

Thus, it can be seen that the protocol confidential behavior of COM chips let them set themselves apart from BI chips in a manner that only COM chips can detect, and it lets them communicate with each other through a confidential memory in with which only COM devices can communicate.

H. COM Delegated Interrupt

COM devices are designed to be able to perform interrupts in a very different manner than do BI devices. This is by use of what we call the "delegated interrupt" scheme. The word "delegated" is used because in the scheme a COM device does not perform an INTERRUPT command or respond to an IDENTIFY command itself, but rather it delegates those tasks to a BI device and has the BI device perform them for it. In this scheme, a COM device which wishes an interrupt to be performed writes information to a BI device, called the target. This information includes: a copy of the COM device's Interrupt Destination Register, which identifies the one or more processor(s) from which a response is desired; a copy of the interrupt vector which identifies the interrupt routine the COM device wants to be performed; and a force bit which identifies the level of the desired interrupt and which causes the target BI device to perform an INTERRUPT transaction of the type described above with regard to FIG. 4D. In the resulting INTERRUPT and IDENTIFY transactions the BI device conveys the COM device's desired interrupt vector and desired priority level to one of the BI devices indicated in the COM device's Interrupt Destination Register, causing the indicated BI device to perform the COM device's desired interrupt.

FIGS. 20, 21A and 21B provide a simplified representation of the routine performed by the node a COM device during a delegated interrupt. These steps are controlled by a programmable microprocessor on the COM node. FIG. 20 represent the node's delegated interrupt routine 610. FIGS. 21A and 21B show a sub-routine which is a part of the routine 610.

The delegated interrupt routine 610 is started when the program running in the microprocessor on the node of a COM device determines that the COM device wants an interrupt to be performed. Before the actual routine 610 is started it is assumed that the device's COM chip has one or more bits asserted in the lower sixteen bits of its Interrupt Destination Register to indicate the one or more BI device(s) which it would like to perform the interrupt. Normally this will be the ID bit of one or more BI processor device(s). It is also assumed that before the COM node starts the routine 610 it has the interrupt vector that identifies the interrupt routine which it wants performed in its User Interrupt Control and Status Register.

When these conditions are met, the COM node starts performing routine 610. In the first step of this routine, step 612, the node causes its associated COM chip to obtain control of the bus. Once control is obtained, the node uses the COM chip to read the chip's own Interrupt Destination Register. Like all reads from, or writes to, a register on a node's own COM chip, this read is performed over the COM bus. The data's path is from the register on the COM chip to the COM bus, and then back through the COM chip to the node, or BCI, bus 408 (FIG. 9), and from the BCI bus to the node itself. The COM chip is capable of both writing data onto, and reading data from, the COM data bus at the same time, since it is capable of functioning both as a Master and a Slave in the same transaction, and since its circuitry for writing to the COM bus is independent from its circuitry for reading from that bus. Once the copy of the COM chip's Interrupt Destination Register is read into the node, it is stored in the node's memory.

Once step 612 is done, step 614 selects the highest priority ID bit contained in the Interrupt Destination Register just read from the node's associated COM chip. This bit corresponds to the highest priority BI device which the node desires to interrupt. Then step 616 calculates the bus address corresponding to that highest priority BI device, and stores it in the node's memory as the address of the so-called "target" device. The selected BI device is called the "target" because most of the subsequent activity of routine 610 is directed toward this device. Once the target device's address has been calculated, step 618 performs the node's target subroutine 611, which is shown in FIGS. 21A and 21B.

The first step of the target subroutine is step 620. In it, the node requests the chip to obtain control of the bus, and once such control is obtained, it performs the READ of an atomic read-modify-write transaction. This READ is addressed to the Interrupt Destination Register of the COM device identified by CLEAR-POINT_ARB_LOCK. This is the register which holds the lock bit which indicates if there is currently a delegated interrupt taking place.

A read-modify-write is attempted because if the READ of the lock bit shows it is un-set, indicating that no delegated interrupt is currently underway and that it is proper to start a given new delegated interrupt, a write sets the lock bit so that no other delegated interrupt will be started until that given delegated interrupt is completed. The read-modify-write is atomic, that is, is un-interruptable, to prevent a second COM device from reading that the lock bit is un-set, and thus starting a second delegated interrupt, between the time that a first COM device reads that it is un-set and sets it.

The node performs the READ of the read-modify-write by requesting a READ transaction from its associated COM chip and by continuously asserting the BURSTMODE line on the BCI bus 408 which extends between the node 406 and its associated COM chip 404 (See FIG. 9). The continuous assertion of the BURSTMODE signal causes the COM chip to assert NO ARB on the COM bus from 75 to 175 nanoseconds during each cycle, from when the COM device obtains control of the bus, until BURSTMODE is deasserted. This prevents any BI device from arbitrating for control of the bus until BURSTMODE is deasserted. The COM chip also asserts the parity bit in cycles, after the COM device obtains control of the bus, in which BURSTMODE is asserted and the COM data and information lines are not being used in a transaction performed by the chip. This prevents all other COM devices from arbitrating until after BURSTMODE is deasserted.

Once step 620 is complete, step 622 tests to see if the lock bit, which is the most significant bit, INTRDES[31], of the INTRDES Register just read, is asserted or not. If the lock-bit is asserted, the node cannot progress any further with its delegated interrupt until the delegated interrupt currently in progress is completed. This being the case, step 624 deasserts the BURSTMODE signal supplied to the node's associated COM chip. This terminates the atomic read-modify-write, which at this point has gotten no further than the initial READ, and it allows other devices a chance to arbitrate for the bus. Then after a delay 626 in which the node's microprocessor performs some intermediary processing, step 628 returns the routine to step 620 at the top of the sub-routine 611, where it re-attempts the atomic read-modify-write.

This process of performing the initial READ of the Interrupt Destination Register of the highest priority COM device is repeated until the test at the top of step 622 finds that the lock bit is un-set, indicating that no other COM device is currently performing a delegated interrupt. Once this condition is met the routine advances to steps 630, 632 and 634 which complete the atomic read-modify-write.

Step 630 asserts the lock bit contained in the copy of the Interrupt Destination Register of the highest priority COM device read into the Node's memory by step 620. Then, in step 632, the node writes this altered copy back into the Interrupt Destination Register of the highest priority COM device. This sets the lock bit so that any other COM devices subsequently attempting a delegated interrupt will know that such an interrupt is already underway. Once this is done, the atomic read-modify-write is complete. At this point step 634 deasserts BURSTMODE, since there is no longer any need to prevent other devices from arbitrating for control of the bus.

After the lock bit has been found to be un-set and has been set, the routine advances to steps 636 and 638. In each of these two steps the node requests its COM chip to obtain control of the bus, and once the chip does so, the node reads into its memory a copy of one of the registers on the BIIC of target BI device. It reads the target'S User Interrupt Control and Status Register in step 636, and its Interrupt Destination Register, in step 638. As is indicated below, these registers are copied from the target BI device into the node's memory so that once the delegated interrupt is complete these registers of the target's BIIC can be restored to their former value.

Once these registers of the target have been copied into the node, the node, in step 646, requests its COM chip to obtain control of the bus, and once it has done so, the node reads into its memory a copy of the Interrupt Destination Register on its own COM chip. Once this is done, the node, in step 648, requests control of the bus, and once it obtains it, it writes this copy of its COM chip's Interrupt Destination Register into the Interrupt Destination Register of the target's BIIC. Then in step 650 the node requests control of the bus, and once it is obtained, it reads into its memory a copy of the User Interrupt Control and Status Register on its own COM chip.

Once this is done, the node, in step 652, requests the bus, and once it obtains it, it writes a thirty-two bit word into the target BI device's User Interrupt Control and Status Register. This word contains all ones in bits 31-20. This clears all the Interrupt Abort Bits, UINTRCSR[31:28], all the Interrupt Complete Bits, UINTRCSR[27:24], and all the Interrupt Sent Bits, UINTRCSR[23:20] in the target's User Interrupt Control and Status Register. All these bits are so-called "write-ion-to-clear" bits, since writing a binary one into each of them resets it to zero. These write-one-to-clear bits cannot be sent over the bus. They can only be set by logic on the target's BIIC if an interrupt has been aborted, completed, or sent. Bits 13-2 of the word written to the target's UINTRCSR contain a copy of the interrupt vector from the COM device's UINTRCSR read into the node in step 650. This places the COM device's interrupt vector into the Interrupt Vectors Bits, UINTRCSR[13:2], contained in the target's UINTRCSR. The word written to the target's UINTRCSR also includes a one in one of its bits 19-16 and zeros in the other three of these four bits. This sets one of the Interrupt Force Level Bits, UINTRCSR[19:16], in the target's User Interrupt Control and Status Register, but leaves all the other Interrupt Force Level Bits un-set. The setting of one of these Interrupt Force Level Bits causes the target BI device to arbitrate for control of the bus and perform an INTERRUPT transaction, of the type described above with regard to FIG. 4D, using the priority level associated with the selected Interrupt Force Level Bit which has been set.

In this INTERRUPT transaction, the target device broadcasts the interrupt level associated with the selected Interrupt Force Level Bit on bits [19:16] of the COM data lines and the bottom sixteen bit of the target's Interrupt Destination Register on bits [15:0] of the COM data lines. These sixteen bits contain the ID number of the one or more BI devices which the COM device wants to perform the actual interrupt subroutine. In response to this INTERRUPT transaction, one of the BI devices whose ID was placed on bits [15:0] of the data bus should respond with an IDENTIFY transaction of the type discussed above with regard to FIG. 4E. In this IDENTIFY transaction, the responding BI device places the priority level of the INTERRUPT transaction to which it is responding on the data bus during the Command/Address cycle. Then, during the first data cycle, the responding BI device places its ID on the data bus so that the target will know that it is one of the devices to which the target's INTERRUPT transaction was addressed. Then, in the data 2 cycle of the IDENTIFY transaction, all of the BI devices which initiated an INTERRUPT transaction requesting a interrupt with the priority level indicated in the IDENTIFY's Command/Address cycle from the responding Master device with the ID identified in the IDENTIFY's Data 1 cycle arbitrate to see which of them gets to have that responding Master device receive their interrupt vector in the IDENTIFY transaction. In the Data 3 cycle, the device which wins the arbitration sends the Master of the IDENTIFY transaction the interrupt vector stored in bits [13:2]of its User Interrupt Control and Status Register. The Master of the IDENTIFY transaction responds by actually performing the interrupt routine identified by this vector.

If the target device loses the arbitration in data cycle 2 of the IDENTIFY transaction, it will repeatedly perform its INTERRUPT command again, until finally it does win such an arbitration and send its interrupt vector to one of the BI devices identified in its Interrupt Destination Register.

After step 652 of FIG. 21B causes the target to start an INTERRUPT transaction, the node repeatedly performs steps 656, 658, and 660 of loop 654 until that loop is exited from within. Step 656 reflects the delay which occurs before the node's microprocessor can advance to step 658. In step 658 the node requests control of the bus, and once it is obtained, it reads into its memory a copy of the target's User Interrupt Command and Status Register. Then, in step 660, it checks this copy of the target's UINTRCSR to see if that one of its four Interrupt Complete Level Bits, UINTRCSR[27:24], which corresponds to the level of the INTERRUPT transaction started in step 652 is set. If this bit is set, it indicates that the target has sent its interrupt vector to one of the BI devices identified in its Interrupt Destination Register and has received an acknowledge signal from that device indicating that the vector was properly received. If this is the case, the target BI device has successfully requested the interrupt desired by the COM device, and thus step 662 causes the routine to exit the loop 654 and to advance to steps 666 and 668, which attempt to return the target to the state it was in before the COM device picked it to perform a delegated interrupt. If the interrupt complete bit has not been set, the loop 654 is continuously repeated until it is.

Once the node determines that the target's interrupt complete bit has been set, the program advances to steps 666 and 668. In each of these steps the node requests control of the bus, and once it obtains it, it writes back into one of the target's registers the copy of that register which the node read from it before the node wrote into it as part of its delegated interrupt scheme: in step 666 it writes back the User Interrupt Control and Status Register, and in step 668 it writes back the Interrupt Destination Register.

Once the registers of the target's BIIC have been returned substantially to the value they had before the delegated interrupt began, the node, in step 670 requests the bus and, once it is obtained, reads into its memory a copy the Interrupt Destination Register of the highest priority COM device. It then modifies this copy by deasserting the lock bit contained in the most significant bit of that register. Once his has been done, the node, in step 672, requests the bus, and once it is obtained, writes the modified copy of this register back into the Interrupt Destination Register of the highest priority COM device. These steps 670 and 672 deassert the delegated interrupt lock bit so that other COM devices will be free to perform delegated interrupts. Once this is done, the delegated interrupt routine 610 shown in FIGS. 20, 21A and 21B is complete.

It should be noted that since the target device is selected by step 614 to be one of the BI devices identified in the Interrupt Destination Register of the COM device desiring a delegated interrupt, the target BI device will often act as the Bus Master in both the INTERRUPT and the IDENTIFY transactions associated with the resulting interrupt. In fact, if only one BI device is identified in the COM chip's Interrupt Destination Register, the target device will always be sending the interrupt level and vector to itself. This is not a problem for BI devices, since they, like COM devices, are capable of acting as both Masters and Slaves in the same transaction.

The delegated interrupt routine 610 is the routine for handling user interrupts, that is, interrupts originated by the node. COM devices are also capable of performing error interrupts by using a delegated interrupt routine which is very similar to the routine 610. Software in the microprocessor of COM nodes repeatedly reads the Bus Error Register located on the COM chip to see if there are any errors indicated by the bits of that register which require an error interrupt. If so, the node causes a delegated interrupt routine to be performed which is the same as the routine 610 just described except that 1) in step 650 the node reads the Error Interrupt Control and Status Register rather than the User Interrupt Control and Status Register from its associated COM chip, and 2) in step 652 when it writes an interrupt vector and four interrupt force level bits to the target device's User Interrupt Control and Status Register, it uses the values of the vector and the force bits just read from the Erro Interrupt Control and Status Register.

I. COM Device's BCI Bus

As is shown in FIG. 9, the COM chip 404 is connected to its associated node 406 by a node bus 408. This node bus is in many ways similar to the corresponding node bus which connects BIIC chips to their associated nodes in BI bus devices. For this reasons it has been given the same name, the "BCI" bus, as the node bus used in BI devices. In COM devices the BCI bus includes the following lines:

CHIP_NOARB—This output is arguably not really part of the BCI bus since the only reason it is sent to the node is so that its output can be re-driven by the node's high speed bus driver circuit 452 onto the COM bus as the BI_NOARBN, or NO ARB, signal. This signal has to be re-driven by the circuit 452 because the output drivers on the COM integrated circuit chip do not have enough current sinking capability to assert the NO ARB line between 75 and 175 nanoseconds during a 200 nanosecond bus cycle and be assured that it will be read as asserted by other devices during the RCLK period from 100 to 150 nanoseconds in the cycle.

BCI_D, BCI_I and BCI_PO—These lines correspond to an inverted version of their COM counterparts, the COM data, information and parity lines.

BCI_TIMEN and BCI_PHASEN—These lines are buffered versions, respectively, of the BI_TIME and BI_PHASE signals from the COM bus. These timing signals are supplied to the COM chip from its node, since BI_TIME and BI_PHASE are not supplied directly to the COM chip. All clocking on the COM chip is derived from these two inputs. There are four primary internal clocks on the COM chip, designated T1 thru T4, each high for 50 ns during each 200 nanosecond system bus cycle.

BCI_RQN[1:0]—or the request lines, are used to request a chip to seek to arbitrate for control of the bus and to start a transaction as Bus Master. There are two types of requests possible: the regular request ("10") which we call the TRANSACTION_REQUEST signal, and the DMA request ('01') which we call the DMA_REQUEST signal.

BCI_RSN[1:0]—or the RS lines. These lines are used by the node to indicate to the COM chip the response of the node during a Slave transaction. The lines can represent four values: NO ACK, ACK, STALL, or RETRY. The chip uses these signals to determine the CNF signals it generates on the COM bus when it is in a Slave transaction.

BCI_RAKN—or the RAK line. "RAK" stands for "Request AcKnowledge". This line, when asserted by the COM chip, indicates that the COM chip has arbitrated for, and won control of, the COM bus in response to a TRANSACTION_REQUEST or DMA_REQUEST. It is asserted on the BCI during the system bus Command/Address cycle and deasserted after the last cycle of the transaction that the chip is concerned with.

BCI_MDEN—or the MDE line. "MDE" stands for "Master Date Enable." This output of the COM chip indicates that the node should place either Command/Address information or write data onto the BCI D and I bus during a Master transaction.

BCI_NXTN—or the NEXT line. This line is used by the COM chip when it is Bus Master to signal that the node should place the next piece of data onto the BCI bus during a Write-type transaction, or read the next piece of data from the BCI bus during a Read-type transaction.

BCI_CLE—or the CLE line. "CLE" stands for "Command Latch Enable". This signal is used by the COM chip to indicate that a transaction has probably started on the COM bus. Its falling edge indicates to the node that the BCI D and I lines probably contain Command/Address information passed through to those lines from the COM data and information lines. The node normally responds to this falling edge by latching the data contained on the BCI D and I lines.

BCI_SDEN—or the SDE line. "SDE" stands for "Slave Data Enable". This line is asserted by the COM chip during a read transaction in which the COM device is a Slave to indicate that the node should drive onto the BCI D and I lines the data to be read.

BCI_SCN[2:0]—or the SC lines. "SC" stands for "Select Code". These three lines carry a code from the COM chip indicating to the node the type of command which the COM chip received during a Command/Address cycle on the COM bus. It is generally used when the chip has been selected as a Slave.

BCI_SELN—or the SEL line. "SEL" stands for "Select". This output of the COM chip is asserted low along with the SC[2:0] lines. It normally is used to indicate to the node that it has been selected as a Slave by a Command/Address cycle on the COM bus.

BCI_MAB—or the MAB line. "MAB" stands for "Master Abort". This line is used by the node to make the COM chip cancels its retry state, which the chip enters if it receives a RETRY or a NO ACK signal from a Slave device in a transaction in which the COM device is Bus Master. The node normally sends this signal after a specified number of attempts to repeat the transaction have failed.

BCI_EVN[4:0]—or the EV lines. These are the "Event" lines. They carry ongoing status codes from the COM chip to the node.

BCI_DCLON—or the DCLO line. This output from the COM chip is generated from BI_DCLON. BCI_DCLON will deassert approximately 233 cycles after BI_DCLON is deasserted. The rising edge of BCI_DCLON is used to latch in the initialization conditions of the chip.

BCI_ACLON—or the ACLO line. This output from the COM chip is a re-driven synchronized version of BI_ACLON, delayed by three cycles.

BURSTMODE—This line is asserted by the node to make the COM chip assert NO ARB on each cycle, and assert the parity bit on each idle cycle, that BURSTMODE is asserted, once the COM device has obtained control of the bus. This assertion of NO ARB and the parity bit keeps all other devices from arbitrating for the bus until BURSTMODE is deasserted.

DISN—or the Disable line. When this input to the COM chip is asserted, the COM chip's jamming mode is disabled. This disables the blocking of imbedded arbitration and the overriding of node ID's during the imbedded arbitration cycle.

J. COM Chip-Node Interaction

TABLE ONE, shown in the appendix to this application, provides an overview of the interaction between the bus interface chip 404 and Node 406 of a COM device during a transaction on the COM bus. The table indicates each of the possible cycles which are involved in a READ or a WRITE transaction having one data cycle. It indicates many of the signals which are placed on both the COM bus and the BCI bus during each such cycle. Except for the differences pointed out in this specification, when COM devices perform bus transactions they assert the same signals on the system bus as do BI devices during the corresponding BI transactions. Since FIGS. 4A and 4B, discussed above, specify the signals which READ and WRITE transactions place upon the system bus in considerable detail, TABLE ONE only lists the assertion of those lines on the COM bus which are most directly related to the transactions which take place on the BCI bus.

When a COM device is the Master in a transaction, the first system bus cycle in which there is any activity on either the COM bus or the BCI bus is the so-called "Request" Cycle. In this cycle the node of the COM device which wishes to become Master in a transaction asserts the TRANSACTION_REQUEST line. This causes the Arbitration State Machine, shown in FIG. 11, to make a transition from the IDLE state 442 into either the WAIT CMD OVER, WAIT 0, WAIT 1, or WAIT 2 states, as indicated in FIG. 11. Since this transition does not take place until the beginning of the next system bus cycle, no other signals are asserted on either the BCI or COM lines by the COM device during this system bus cycle.

After the Request Cycle, one or more pre-arbitration cycle(s) take place while the Arbitration State Machine of the COM chip performs the pre-arbitration steps described above with regard to FIG. 11. During these steps, the COM chip monitors the COM bus to determine whether or not it is free, and it asserts NO ARB during at least the last of these pre-arbitration cycles, to prevent BI devices from arbitrating during the Arbitration Cycle which follows them. During all of these pre-arbitration cycles the node continues to assert the Transaction Request line on the BCI bus.

On the bus cycle in which the state machine of FIG. 11 enters the ARB CYCLE state 460, the Arbitration Cycle shown in TABLE ONE takes place. During this cycle, the COM device asserts its associated arbitration bit on both the high and low 16 bits of the COM data lines. During the same cycle, the COM chip asserts the Master DATA ENABLE line, (MDE). Since the RAK line has not yet been asserted by the chip, indicating that the device has not yet won control of the bus, the node will respond to the assertion of the Master DATA ENABLE line by placing the command/address information associated with its desired transaction on the BCI information and data lines. The chip then latches the command placed on the BCI information lines into a Master Command Register, and latches the address contained on the BCI data lines into a Master Address Register. This latching is all performed on the T3 clock, which extends from 100–150 nanoseconds into the system bus cycle. The node continues to assert the TRANSACTION_REQUEST signal all throughout this cycle, since it has not yet received the RAK, or Request Acknowledge Signal, from the chip, informing it that the chip has control of the bus.

If, during the Arbitration cycle, circuitry on the chip detects the assertion of an arbitration bit having a higher priority than that asserted by the chip itself, the state machine shown in FIG. 11 goes into the WAIT CMD OVER state 462, which causes the chip to go back to the one or more pre-arbitration cycles described above. It should be noted, however, that when the state machine causes the chip to go back to the pre-arbitration cycles it does not cause the chip to re-request the command/address information from the node the next time it arbitrates. The chip does not re-request this information because, at this point, it already has the desired command/address information stored in its Master Command and Master Address Registers.

If, however, the chip detects that its arbitration bit was the highest priority bit asserted during the Arbitration cycle, the Arbitration State Machine 11 causes the chip's Master State Machine to advance to the Command/Address cycle.

During the Command/Address Cycle, if a COM device has just won control of the bus, the chip will assert, on the COM bus, the command/address information loaded into its Master Command and Master Address Registers from the node in a previous Arbitration cycle. In addition, during the Command/Address cycle the chip of the Master device starts the continuous assertion of the RAK, or Request Acknowledge, line on the BCI bus to indicate that the chip has won control of the bus and that the node should proceed with the desired transaction. This assertion of the RAK signal continues throughout the remainder of the transaction.

Once the node receives the RAK signal, it deasserts the TRANSACTION_REQUEST signal.

The Command/Address cycle is the first cycle in which COM devices participate as Slaves in transactions on the COM and BCI buses. As will be explained in greater detail below, a COM chip responds to the busy-edge associated with the Command/Address cycle as an indication that the current cycle is a Command/Address cycle. In response, it normally causes the CLE, or COMMAND LATCH ENABLE line, on the BCI bus to have a falling edge, which indicates to the node that the current cycle is probably a Command/Address cycle and that it should latch the command/address information which the COM chip passes through from the COM bus to the BCI bus. The node normally responds to the falling edge on the CLE line b latching these command/address values from the BCI bus.

The next cycle of each transaction after the Command/Address cycle is the Imbedded Arbitration cycle. COM devices never arbitrate during an Imbedded Arbitration cycle. If the COM chip is in its jamming mode, as it is normally intended to be, it asserts all four information lines plus the parity bit on the COM bus, regardless of whether or not it is the current Bus Master. If the COM device is not the current Bus Master, the assertion of these bits will jam whatever ID is being asserted by the Current Master at this time. If the chip is the current Bus Master, the assertion of these bits represents an ID number which is independent of the COM device's ID number.

If, during the Imbedded Arbitration cycle, the COM device is not in jamming mode, but if it is the Bus Master, it asserts, on the COM information lines, the ID of the first Bus Master to take control of the COM bus after the system was last initialized, as determined by the routine described above with regards to FIG. 17. If, under these circumstances, the COM device is not Bus Master, it asserts no lines on the COM bus.

If the COM chip is the Master in a WRITE transaction during the Imbedded Arbitration cycle, its COM chip asserts the MDE, or MASTER DATA ENABLE, line on the BCI bus to indicate to the node that it is to transfer information to the chip. It also asserts the NEXT signal indicating that the node is to process the next, in this case the first, data transfer in the current bus cycle. The node responds to this combination of signals by putting the Data Cycle 1 data on the BCI data lines. The chip responds by latching this data into one of its two BCI data latches, so that it will be available for placement on the COM bus during the next cycle.

If the COM device is a Master in a READ, there is no transaction on the BCI lines during the Imbedded Arbitration cycle.

If the COM device is a Slave in the Imbedded Arbitration cycle, it will assert both the SEL, or Select, line and the SC, or Select Code, lines on the BCI bus, to inform the node that it has been selected as a Slave in the current transaction and to give it a coded description of the type of operation to be performed. The SEL and SC lines are available on the BCI bus at the beginning of the Imbedded Arbitration cycle because the decoding necessary for their generation is performed by the chip during the Command/Address cycle, as will be explained in greater detail below.

When the COM chip is a Slave in a READ transaction during an Imbedded Arbitration cycle, the COM chip asserts the SLAVE DATA ENABLE, or (SDE), line to indicate that its node should transmit the Data Cycle 1 data and accompanying data status information on the BCI D and I lines. Normally, the node responds to this signal by putting the data on the BCI D and I lines and by supplying an ACK on the BCI RS lines. The chip responds to this by latching this data into a set of its data latches, for use in the next cycle.

When the device is a Slave in a WRITE transaction during an Imbedded Arbitration cycle, an ACK would normally be asserted on the RS lines to indicate that the node is ready to accept data on the next cycle.

Once the Imbedded Arbitration cycle is over, the transaction advances to the Data 1 cycle.

If the COM device is a Master in a READ transaction during the Data 1 cycle, its bus interface chip latches in information from the data and information lines of the COM bus. If the COM device is a Master in a WRITE transaction in this cycle it asserts onto the data and information lines of the COM bus the data which it latched in from the BCI Data and Information lines on the previous cycle. If the device is a Slave in a READ during the Data 1 cycle, it places the information that it latched in from the BCI Information and Data lines during the previous cycle onto the COM Information and Data lines, and, if the transaction is going properly, it generates an ACK signal on the CNF lines of the COM bus.

If the device is a Slave in a WRITE during the Data 1 cycle, its bus interface chip latches in the values on the Information and Data lines of the COM bus, and if the transaction is proceeding properly, it generates an ACK on the COM CNF lines. The chip responds to the data which it has latched in from the Information and Data lines of the COM bus by passing those values through to the BCI Information and Data lines near the end of the Data 1 cycle. The node knows that it has the responsibility to latch this data at the end of the Data 1 cycle. There is no strobe signal which informs it that it should do so.

The transactions described in TABLE ONE are all transactions which have only one data cycle. It should be understood, however, that transactions that have more than one data cycle are basically similar to those which have just one, except for the fact that the process of supplying data from the node over the BCI bus to the COM chip, and then from the COM chip over the COM bus, or vice-versa, has to be repeated for each separate data cycle.

The only activity on the COM bus on the cycle after the last data cycle of a transaction associated with that transaction is the transmittal of the first of two post-data ACK signals to indicate that the data which has been transmitted during the Data 1 cycle has been correctly received. The only activity worth mentioning on the BCI bus during the first cycle after the last data cycle is performed if the device is either a Master in a READ or a Slave in a WRITE. If the device is a Master in a READ, its bus interface chip puts the data which it received from the COM bus in the last data cycle onto the Data and Information lines of the BCI bus, and then strobes the NEXT line. The node responds to the NEXT signal by latching in the data from the BCI D and I lines at the start of the assertion of this NEXT signal. If the device is Slave in a WRITE, it places the date it read from the COM bus in the previous cycle onto the BCI D and I lines. The node knows that it its to latch this data, and does so before the end of the cycle.

In the second cycle after the last data cycle of a transaction, the only activity on the COM bus associated with that transaction is the transmission of the second post-data ACK signal from the device which received data in the last data cycle. If the device received the data as a Master in a READ transaction, in addition to sending the second post-data ACK, the chip deasserts the RAK signal at the beginning of the cycle to indicate that it is through with the transaction, and sends a transaction complete event cod to the node as its final step in the transaction.

In the third cycle after the last data cycle of a transaction, if the transaction was a WRITE, the Master of that WRITE deasserts the RAK line at the beginning of the cycle, and sends a transaction complete code on the event line to its node to inform it that the transaction has been successfully completed. If the device is a Slave in a READ during this cycle, it sends an event code to the node indicating that it received the second ACK.

K. COM Burstmore and COM Atomic Read-Modify-Write

TABLE TWO, shown in the appendix to this application, describes, in greater detail, the atomic read-modify-write transaction that is used in Steps 620 and 622 of the Delegated Interrupt Routine shown in FIG. 21A. Like TABLE ONE, TABLE TWO shows most of the lines which are asserted on the BCI bus during the transaction it describes, and it shows the assertion of those lines on the COM bus which are most directly related to the activity on the BCI bus.

The atomic read-modify-write described in TABLE TWO corresponds very closely to a single data cycle READ of the type described in TABLE ONE followed by a single data cycle WRITE of the type described in the same TABLE. Because of this similarity, our description of TALE TWO will be limited to a description of the distinctions between its read-modify-write and the combination of a READ and a WRITE of the type described in TABLE ONE.

The first, and perhaps most important, such distinction is the fact that during the first Request cycle of the atomic read-modify-write, the node turns on a circuit which causes the BURSTMODE signal on the BCI bus to be continuously asserted until one or more cycles after the summary code on the BCI Event lines at the end of the WRITE informs node that the transaction is complete. As long as this BUSRTMODE signal is asserted, the COM chip asserts NO ARB from 75 to 175 nanoseconds each cycle, and asserts the parity bit during all cycles in which the chip is not mastering a transaction on the COM bus, starting as soon as the chip obtains control of the bus. This assertion of NO ARB and the parity bit is not shown in TABLE TWO, but it prevents BI and COM devices from interrupting the BURSTMODE transaction.

Another distinction between TABLE TWO and TABLE ONE is that TABLE TWO only describes the operation of a device which is in jamming mode, whereas TABLE ONE describes both the operation of devices in jamming and non-jamming mode. As a result, in each Imbedded Arbitration cycle the COM chip of TABLE TWO asserts all four information lines and the parity bit.

The next major distinction is that after the READ of the read-modify-write there are a plurality of cycles in which the node decides what it is to do. It is during these cycles that the node performs the test shown at the top of Step 622 in FIG. 21A. If this test is met, the node deasserts the BURSTMODE signal and exits the BURSTMODE Routine, causing it to fail to perform any of the steps which occur further down in TABLE TWO. If, on the other hand, the test at the top of 622 is not met, the node advances to the following Request cycle shown in TABLE TWO. During the cycles in which the node is deciding what to do, it keeps BURSTMODE continuously asserted until, and unless, it decides to abort the read-modify-write.

Another major distinction between a read-modify-write and a combination of a standard READ and a standard WRITE occurs after the second Request cycle of the read-modify-write. Because BURSTMODE has been continuously asserted since the start of the previous READ transaction, the logic in the COM chip knows that it already has control of the bus. For that reason, the COM device does not, after receiving this second bus request, perform any of the Pre-Arbitration or Arbitration cycles shown occurring after the Request cycle in TABLE ONE. Instead of such Pre-Arbitration and Arbitration cycles, a so-called "BCI Command/Address" cycle is required. This BCI Command/Address cycle is required because the COM chip needs to receive the command/address information from its node on the BCI I and D lines before it performs a Command/Address cycle on the COM bus. As is indicated in TABLE ONE, normally the COM chip receives this information in the Arbitration Cycle which precedes the Command/Address cycle. But since there is no Arbitration cycle in the second and subsequent individual transactions during BURSTMODE, this so-called BCI Command/Address cycle is required.

L. COM DMA Transactions

The COM bus interface chip has hardware which enables COM devices to perform DMA READ and DMA WRITE transactions. These DMA transactions enables COM devices to transfer data over the COM bus at a substantially higher rate than can BI devices. In particular, the COM bus interface chip has circuitry for storing command/address information received from the node at the beginning of a DMA transaction, for repeatedly incrementing the address component of that command/address information after each separate READ or WRITE contained in a DMA transaction, and for placing this incremented command/address information on the COM bus during the subsequent Command/Address cycle of each READ or WRITE transaction contained within the DMA transaction.

Because the COM chip has the ability to automatically increment, and repeatedly use, the command/address information received at the start of such a DMA transaction, it is not necessary for it to have a cycle, similar to the BCI Command/Address cycle described above with regard to TABLE TWO, during which the command and address information required for successive READS or WRITES is supplied to that chip from its node. As a result, COM DMA transactions do not require any cycles between the last data cycle of one of their individual transactions and the Command/Address cycle of the next. Since the BI bus interface chips, the BIIC's, do not have such an ability to increment and repeatedly re-use command/address information, they will always require at least one cycle similar to the BCI Command/Address cycle shown in TABLE TWO between the successive READS or WRITES of their block transactions.

TABLE THREE, shown in the appendix to this application, describes a COM DMA WRITE transaction. It uses the same format as TABLES ONE and TWO. As can be seen from TABLE THREE, the DMA transaction is in many ways similar to a sequence of WRITE transactions of the type shown in TABLE ONE, occurring one right after the other.

For purpose of brevity, the DMA transaction described in TABLE THREE includes only two individual WRITE transactions, and each of those WRITES only includes two data cycles. It should be understood, however, that in actual practice there may well be more individual transactions in each complete DMA, and each individual transaction may have more than two data cycles.

The DMA WRITE transaction of TABLE THREE starts when the microprocessor on the COM node sets up a state machine and a counter located on the node by supplying them with the starting address of the DMA transaction and the number of individual READS or WRITES it is to contain. Once this setup has taken place, the node initiates a Request cycle, in which it starts the continuous assertion of the DMA_REQUEST line. The Arbitration State Machine shown in FIG. 11, located on the COM chip, responds to the DMA_REQUEST in the same manner that it responds to a TRANSACTION_REQUEST. This causes the COM chip to spend one or more Pre-Arbitration cycles in which it verifies that the bus is free, and in which it asserts NO ARB for at least the one cycle preceding the following Arbitration cycle.

In the Arbitration cycle, the COM chip asserts the node's arbitration bit on both the high and low sixteen bits of the data lines of the COM bus. During this cycle the chip asserts the MDE signal on the BCI bus, requesting that the node place command/address information on the BCI I and D lines. When the node does so, the chip latches the command on the BCI I lines into its Master Command Register, and latches the address and length information contained on the BCIDD lines into its Master Address Register. If the device loses the arbitration, its Arbitration State Machine will make a transition to the WAIT CMD OVER state 462 shown in FIG. 11, which will cause the transaction to go back, in the sequence of steps shown in TABLE THREE, to the steps labeled "One Or More Pre-Arbitration Cycles". If the transaction does return to the Pre-Arbitration cycles, however, in its next pass through the Arbitration cycle, it will not re-request command/address information from the node, since it already has that information stored in its Master Command and Master Address Registers.

If the device wins the arbitration which occurs in the Arbitration cycle, it advances to the Command/Address cycle shown in TABLE THREE. In the Command/Address cycle, the COM chip asserts the command/address information stored in its Master Command and Master Address Registers onto the COM bus. The chip also starts a continuous assertion of the RAK signal on the BCI bus, indicating that it has won control of the bus.

In the first Imbedded Arbitration cycle of the DMA, the chip asserts all the information and parity lines of the COM bus, since in the example of TABLE THREE the chip is operating in the jamming mode. On the BCI bus the chip asserts the MDE line, which, since RAK is asserted, means that the node is to transfer data. The chip also asserts the NEXT signal indicating that the node is to perform the next data transfer in the current cycle. Combined, the MDE and NEXT cycle cause the node to respond by placing the Data Cycle 1 data on the BCI data and information lines. The chip then latches the information on the BCI I and D lines into its data and information latches.

In the first Data 1 cycle of the DMA, the chip asserts the Data Cycle 1 data onto the COM bus, which it latched in from the I and D lines of the BCI bus in the previous cycle. During the Data 1 cycle the chip also asserts the MDE and NEXT signals on the BCI bus. This causes the node to respond by putting Data Cycle 2 data onto the BCI data and information lines. The chip then latches this Data Cycle 2 data into a second set of Data and Information Registers. The chip contains two sets of Data and Information Registers for latching information off the BCI bus. This enables the chip to latch one data cycle's data from the BCI bus into one set of such latches at the same time that it drives another data cycle's data onto the COM bus from another set of such latches.

In the first Data 2 cycle, the bus interface chip asserts onto the COM bus the Data Cycle 2 data which it latched in from the BCI bus during the previous cycle.

In TABLE THREE the Command/Address cycle of the DMA's second WRITE transaction occurs immediately after the Data 2 Cycle of its first WRITE. This illustrates the fact that in COM DM transactions the Command/Address of the second and subsequent individual transactions of the DMA follow immediately after the last data cycle of the preceding individual transaction. The Command/Address cycle of this second WRITE is identical to that of the first WRITE, except that the address contained within the Master Address Register on the COM chip has been incremented by the number of bytes which have been transferred in the data cycles of the previous individual WRITE transaction. Thus, when the Command/Address information is placed on the I and D lines of the COM bus during this second Command/Address cycle, the address placed on the D lines will cause the WRITE to start at the next sequential address after the last byte just written in the first WRITE. The second Command/Address cycle is also distinguished from the first by the fact that, during the second, the COM chip responds to a first post-data ACK signal generated by the Slave as part of the first individual WRITE transaction.

The Imbedded Arbitration cycle of the DMA's second WRITE is identical to that contained in its first WRITE, except that the COM chip responds to the second post-data ACK signal received from the Slave in response to the first WRITE, and except that the node deasserts the DMA_REQUEST signal during this cycle. This deassertion of the DMA_REQUEST signal indicates that the DMA transaction is to end with the current, in this case, second, individual WRITE transaction. It should be noted, however, that the node could be programmed to delay this deassertion of the DMA_REQUEST signal, up until approximately 150 nanoseconds into the last data cycle in the last desired individual WRITE transaction. The chip monitors the DMA_REQUEST line, and it will not start another individual transaction if that line is deasserted before approximately 150 nanoseconds into the last data cycle. If DMA_REQUEST is not deasserted by this time, the chip will not have time to prevent another transaction from starting on the next cycle, and thus, it will perform at least one more complete individual transaction. Thus it can be seen that the DMA_REQUEST line performs a dual function. It informs the chip when to seek to start, and when to end, DMA transactions.

The Data 1 and Data 2 Cycles of the DMA's second WRITE are identical to those in its first WRITE, except that the DMA_REQUEST signal is no longer asserted.

On the first and second cycles after the last data cycle of the second WRITE, the COM chip responds to the CNF signals sent by the Slave. Presuming both of these CNF signals are ACK's, as is normally the case, the COM chip deasserts RAK in the third cycle after the last data cycle of the DMA's last individual WRITE, indicating the end of the last individual WRITE. If the transaction has been completed without receiving any error codes, it then asserts the transaction complete code on the event lines, indicating to the node that the DMA transaction appears to have been successfully completed.

It should be noted that the assertion of the DMA_REQUEST line causes the COM chip to assert the NO ARB line on the COM bus during each cycle that the COM device has control of the bus and that the DMA_REQUEST signal is asserted. This means that when a COM device is performing a DMA transaction it asserts the NO ARB line during every cycle of the transaction, except the last data cycle of the last individual transaction. This prevents BI devices from interfering with the DMA transaction. Other COM devices are prevented from interfering with the DMA transaction because they require at least two idle cycles before they can arbitrate, and there are no idle cycles during a COM DMA.

TABLE FOUR, shown in the appendix to this application, describes a DMA READ transaction in a similar manner to that in which TABLE THREE describes a DMA WRITE transaction. The only distinctions between these two transactions correspond to the differences between READ and WRITE transactions which are pointed out in TABLE ONE.

As is indicated in TABLES THREE and FOUR, if a DMA transaction is properly completed, the bus interface chip generates a transaction complete signal on the event lines at the end of the entire DMA, rather than after each of its individual transactions. The COM chip has an error memory used to store an indication of whether or not an error has been detected during a transaction. In other than DMA transactions, if an error is detected during an individual transaction, this error memory is set to indicate the detection of an error, and an error message is sent to the node at the end of the individual transaction, instead of a transaction complete code. In a DMA, however, such error messages are normally not sent after each individual transactions in which they occur. Instead, if the COM chip detects one or more errors during the individual transactions of the DMA, an error indication will be stored in the error memory, and an event code indicating the detection of an error, instead of a transaction complete code, will be placed on the event lines at the end of the entire DMA transaction. Because such error messages are not sent until after the entire DMA has taken place, it is impossible for the node to know during which individual transactions the error or errors giving rise to the error message took place. In addition, since the memory only has enough space to store a single error indication, the error code sent gives no information as to the number of errors detected. As a result, the microprocessor of a COM node will normally be programmed to retry an entire DMA transaction if such an error message is received.

If, however, a COM chip receives a RETRY or NO ACK during the first data cycle of one of the individual READS or WRITES of a DMA, a very different response takes place. As is explained below in detail, COM chips respond to both NO ACK's and RETRY's by retrying the particular transaction in which one of those signals occurs until either the transaction is completed or until more than a specified number of attempts to repeat it have failed. If a COM chip receives a NO ACK or a RETRY during an individual transaction of a DMA, it will attempt in a very similar to retry that particular individual READ or WRITE. When such a RETRY or NO ACK is received, the COM chip posts a RETRY event code at the end of the individual transaction in which it is received, just as it would if the transaction were not taking place as part of a larger DMA transaction. The chip turns off its assertion of RAK on the BCI bus. It also turns off the continuous assertion of NO ARB, despite the fact that DMA_REQUEST is still asserted, and it sets itself to a special DMA RETRY STATE.

The DMA RETRY STATE is a name given to the condition in which the COM chip is both in a DMA transaction and in the RETRY STATE, which is described below in detail under the heading "COM Response to RETRY AND NO ACK". The DMA RETRY STATE is different from a non-DMA RETRY STATE, because when the COM chip is in the DMA RETRY STATE, it attempts to repeat the transaction aborted by the receipt of a NO ACK or RETRY without needing to receive a TRANSACTION_REQUEST from the node, as it would if it were in the RETRY STATE alone. This reduces the amount of activity required by the node during a retry performed as part of a DMA transaction. The DMA RETRY STATE is also different because during it, the COM chip keeps the CLE line low. As a result, the CLE line will not make a transition from high to low on the busy-edge of the Command/Address cycles of each attempt to retry the aborted transaction.

The CLE line is kept low during the DMA RETRY STATE for the following reason. The COM node contains circuitry which counts falling edges of the CLE line. Although it is not shown in TABLE THREE and FOUR, these falling edges of the CLE signal occur on the BCI bus during the Command/Address cycle of each successive individual transaction of a DMA. The node counts these falling edges to keep track of how many of the DMA's desired individual transactions to successive addresses have taken place. By holding the CLE line low during attempts to retry a transaction, and, thus, preventing such falling edges, the node is prevented from counting the Command/Address cycles of successive attempts to retry an aborted transaction as Command/Address cycles associated with READS or WRITES to successive addresses. Thus, the attempts to retry an aborted transaction will not upset the DMA's count of sequentially addressed individual transactions.

As is explained below, COM nodes include means for counting the number of RETRY event codes generated in response to repeated attempts to complete a given transaction initially aborted in response to a RETRY or a NO ACK. If the node receives more than a specified number of such RETRY event codes for an attempt to repeat a given transaction during a DMA, it will assert the Master Abort Signal, and will deassert the DMA_REQUEST, to the chip. As a result, both the attempt to repeat the particular individual transaction and the attempt to complete DMA, of which that individual transaction is part, will be aborted. If, however, the chip succeeds in its attempt to complete the aborted transaction within the specific number of attempts allowed by the node, it will then exit the DMA RETRY STATE, return to its normal DMA procedure, and will attempt to complete the DMA transaction, as originally intended.

It is possible, during a DMA, that the error memory of the COM chip may already hold an error indication when a NO ACK or RETRY is received during the first data cycle of an individual transaction. If so the event code sent to the node at the end of the individual transaction to indicate that a NO ACK or RETRY has been received is not the standard RETRY event code. Instead, it is a RETRY/ERROR event code, which indicates both that a NO ACK or RETRY has been received and that the chip's error memory had an indication of some error occurring previously in the DMA. By using the RETRY/ERROR code the node is informed of the earlier error, as well as of the NO ACK or RETRY. When the COM chip sends the RETRY/ERROR code to the node, it clears the error memory. This is done because, once the RETRY/ERROR code is sent, the node will have been informed of the error, and thus there is no need for the error memory to keep further record of it. Thus, if the transaction in which the NO ACK or RETRY is received is successfully completed, and if the DMA of which it is part is completed without any further errors being detected by the COM chip, a transaction complete code will be generated at the end of the DMA. The software on the node, however, will know that an error was detected, since it received the RETRY/ERROR signal earlier in the DMA transaction.

M. COM Response to Retry and no Ack

Another feature which distinguishes COM devices from BI devices is that COM devices respond to both RETRY and NO ACK signals in the same manner. Basically, if the COM device receives either a NO ACK or a RETRY, its bus interface chip will send a RETRY signal over the event lines to its node indicating that either a RETRY or NO ACK signal has been received. Then together, the bus interface chip and the node, will continue to retry that transaction until, either it is properly completed, or the node detects the failure to complete the transaction after more than an allowed number of retry attempts.

Figure 22A:
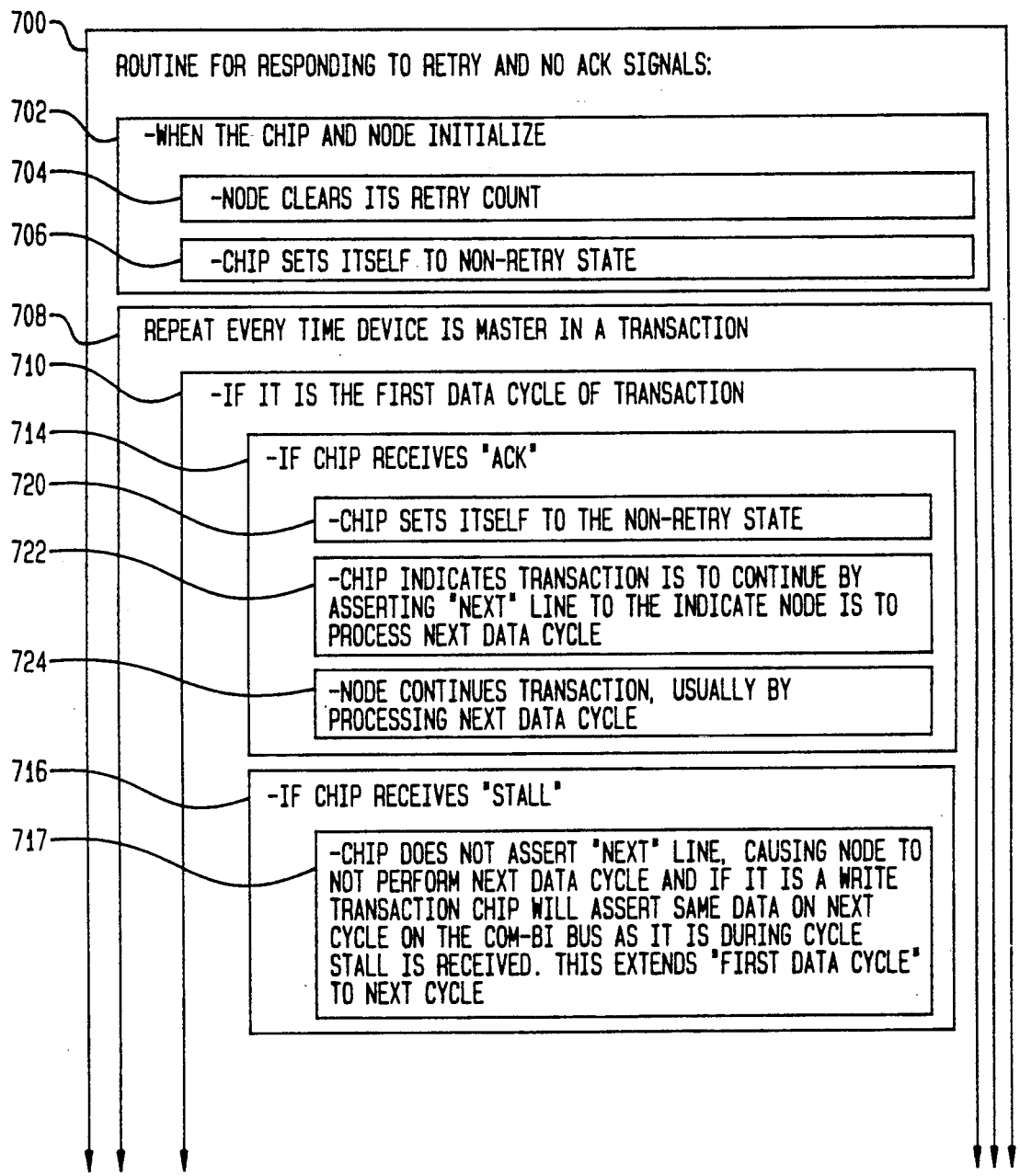
FIGS. 22A and 22B are schematic representations of steps taken by both the COM chip and COM node in responding to CNF signals, particularly RETRY's and STALL's, generated during the first data cycle of a transaction in which the COM device is Bus Master.
Figure 22B:
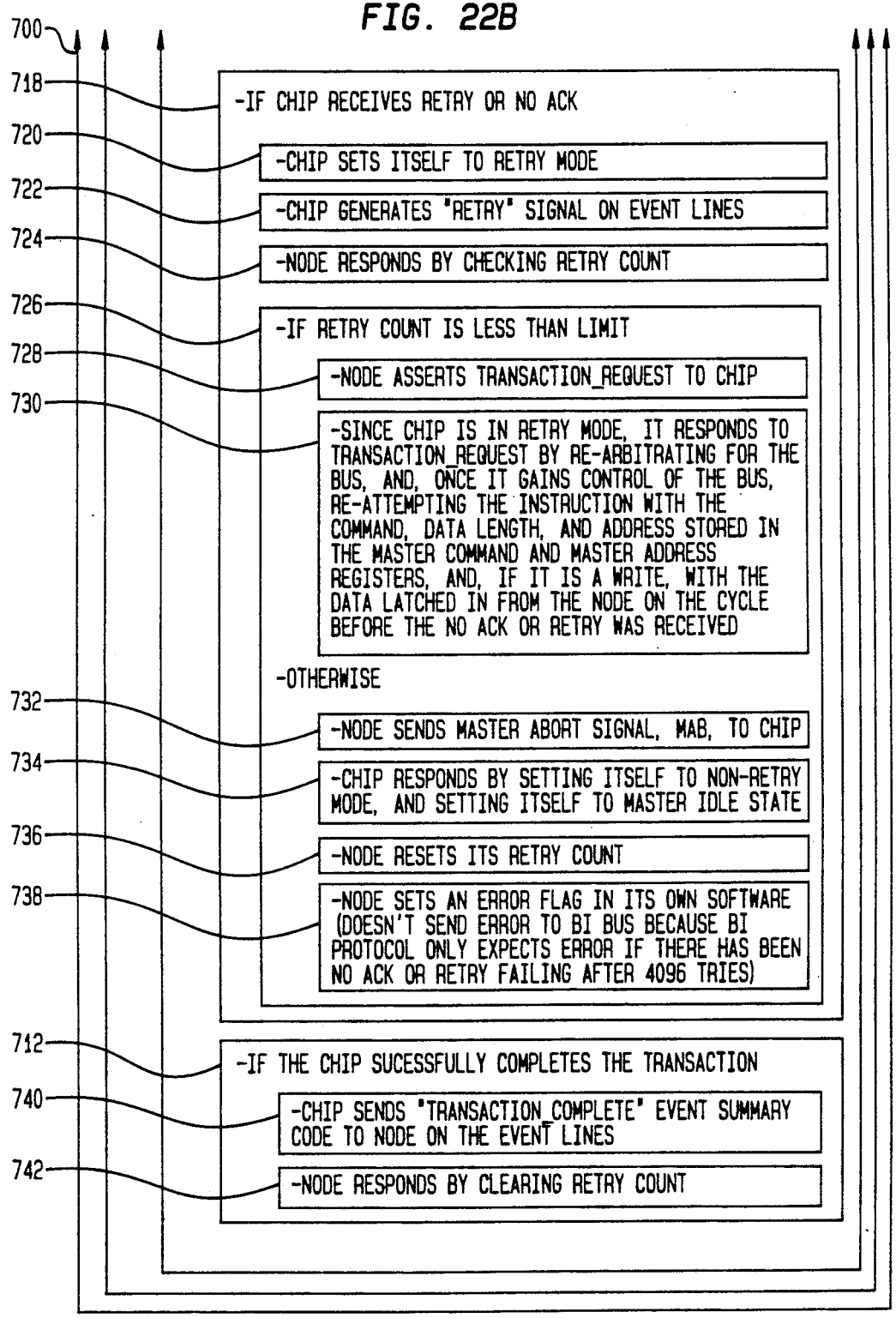

FIGS. 22A and 22B provide a simplified representation of the logic which the COM chip and COM node use in responding to such RETRY and NO ACK signals. It also describes how the device responds to the other two CNF signals, the ACK and STALL signals, when those signals are received during the first data cycle of a transaction. FIGS. 22A and 22B illustrate this logic in the form of a simplified flow chart. It should be understood, however, that this logic is not performed by any one sequential device, but instead is performed by a combination of logic existing both on the COM chip and the COM node, including a combination of combinatorial logic, state machines, and in the case of the COM node, a programmable microprocessor.

The first step in the Routine 700, shown in FIGS. 22A and 22B is the Step 702, which is performed when the COM device initializes, after the computer system, of which it is part, is turned on. The aspects of the COM device's initialization which are relevant to Routine 700 include Step 704 and 706. In Step 704 the node clears its RETRY count. This is a count which is kept by circuitry on the node and which is used to keep track of the number of times the BI device has attempted to retry a given transaction.

In Step 706 the COM chip sets itself into its NON-RETRY state. The logic on the COM chip enables it to be alternatively in one of two states, a NON-RETRY state, and a RETRY state. When the chip is in the NON-RETRY state it responds to TRANSACTION_REQUEST and DMA_REQUEST in the manner described above with regard to TABLES ONE–FOUR, that is: It performs one or more cycles of Pre-Arbitration behavior. It then arbitrates for the bus. During the Arbitration cycle, it asserts the Master DATA ENABLE signal, indicating to the node that it should send the desired Command/Address signal on the BCI bus. The COM chip then latches the command into its Master Command Register, and the address into its Master Address Register. When the chip finally wins the arbitration, it then performs a Command/Address cycle, in which it places the command and address information stored in the Master Command and Master Address Registers onto the system bus.

If, however, the COM chip is in the RETRY STATE, it responds to a Transaction Request in a manner similar to that described in TABLE ONE, except that it does not prompt the node to send it command/address information. Instead, it keeps the command/address information which was last loaded into its Master Command and Master Address Registers when it was last in the NON-RETRY STATE, and when it wins the bus, it is this command/address information which it places on the COM bus during the Command/Address cycle.

After the COM device has been initialized, the next step of Routine 700 is the Step 708. This step causes the COM device to perform Substeps 710 and 712, the latter of which is shown on FIG. 22B, when the COM device is a Master in a system bus transaction.

Step 710 causes its Substeps 714, 716, and 718 to be performed during the first data cycle of such a transaction. By "first data cycle" of a transaction we mean any cycle of a COM transaction in which, in the corresponding BI transaction described above, the CNF response is allowed to be ACK, NO ACK, STALL, or RETRY. Normally this will be the first cycle after an Imbedded Arbitration cycle. If, however, a STALL is received from the Slave in such a first cycle after the Imbedded Arbitration cycle, the first data cycle will also include all successive cycles up to, and including, the first cycle in which the Slave generates a CNF signal other than a STALL.

If, during such a first data cycle, the COM chip receives an ACK signal from the Slave, the test at the top of Step 714 is satisfied, and Steps 720, 722, and 724 are performed. In Step 720, the chip sets itself to the NON-RETRY state, if it is not already in that state. This is appropriate, because if the chip receives an ACK on the first data cycle of a transaction it knows the test at the top of Step 718 will not be met and that it will not be attempting to retry the current transaction. Then, Step 722 causes the chip to indicate to the node that the current transaction is to be continued. Normally this is done by the chip's assertion of the NEXT line on the BCI bus, indicating to the node that it is to process the next data cycle. If the node has already processed all the data involved in the transaction by the first data cycle, as would be the case if the transaction were a single data cycle WRITE transaction, the chip indicates its receipt of an ACK by deasserting RAK and sending a transaction complete event code once it has received other indications that the transaction has been properly completed. If, during the first data cycle of a transaction in which the COM device is a Master, the COM chip receives a STALL from the Slave device, the test at the top of Step 716 will be satisfied. In this case, Step 717 causes the chip to extend the first data cycle to include the next cycle after that in which the STALL is received. The chip does this by not asserting the NEXT line on the BCI bus. This prevents the node from advancing to the next data cycle, and causes it to remain in the current, first data cycle. If the chip is in a WRITE transaction it will continue to assert the same data on the COM bus in the next cycle, as it was asserting in the cycle in which it receives the STALL signal. Since Step 717 causes the next bus cycle to be a first data cycle, it cause the test at the top of Step 710 to be met, and all the substeps of Step 710 to be performed, on that next cycle.

If, during a first data cycle in which it is Master, the COM bus interface chip receives either a RETRY or NO ACK signal on the COM bus, it performs the Steps 720, 722, 724, and 726, shown in FIG. 22A. The test at the top of Step 718 uses decoding logic on the COM chip which separately decodes each of the four CNF signals, ACK, STALL, NO ACK and RETRY, defined according to the BI bus protocol, as shown in FIG. 6. All other combinations of the three bit CNF signal are undefined. If the CNF signal decoder on the COM chip receives an ACK it generates an ON_CHIP_ACK signal. If it receives a STALL it generates a ON_CHIP_STALL. But if it receives either a RETRY or a NO ACK on the CNF lines, it generates the same signal, the ON_CHIP_RETRY signal. It is when this ON_CHIP_RETRY signal is generated that Steps 720, 722, 724, and 726 are performed.

In Step 720, the chip sets itself to its RETRY STATE. It does this because it knows that since either a NO ACK or RETRY signal has been received, it is likely that the chip will be requested to retry the current transaction during which those signals were generated. Then, in Step 722, the chip generates a RETRY code on the event line of the BCI bus. This informs the node that the chip has received either a RETRY or a NO ACK from the Slave in the current transaction. In Step 724, the node responds by checking the current value of the RETRY COUNT, which is kept by logic on the node. Then Step 726 tests to see if this RETRY COUNT is less than a specific limit. It is currently preferred that his limit be either 16 or 32. This means that routine of FIG. 22A will attempt to repeat a transaction either 16 or 32 times before it ceases trying any further attempts.

If the RETRY count is less than the RETRY limit, Steps 728 and 730 are performed. In Step 728, the node asserts the TRANSACTION_REQUEST line on the BCI bus. In Step 730, the chip responds to this TRANSACTION_REQUEST by re-arbitrating for control of the bus. Since the chip is in its RETRY STATE, it will not load a new instruction into the Master Command and Master Address Register during this arbitration. Thus, these registers will continue to hold the command/address information of the last transaction requested in the NON-RETRY STATE, which will be the transaction aborted as a result the NO ACK or RETRY. Thus, once the chip obtains control of the bus, it will reattempt the aborted transaction. Furthermore, if the Master Command and Master Address Registers specify that the transaction to be repeated is a WRITE command, the RETRY STATE prevents the chip from prompting the node for the Data Cycle 1 data during the Imbedded Arbitration cycle of the repeated transaction. Instead it causes the chip to use the Data Cycle 1 data which was latched in from the node during the Imbedded Arbitration cycle of the NON-RETRY-STATE transaction aborted by the NO ACK or RETRY.

If the test at the top of Step 726 finds that the RETRY count is greater than or equal to the RETRY limit, indicating that attempts have been made to retry the current transaction more than the number of times allowed by that limit, the COM device performs Steps 732, 734, 736, and 738. In Step 732, the node asserts the MASTER ABORT, or MAB, signal on the BCI. In Step 734, the chip responds to the assertion of the MAB signal by setting itself to its NON-RETRY state, and by setting its Master State Machine to its Master Idle state, which causes the chip to perform no further functions as a Bus Master until the next time that it receives a TRANSACTION_REQUEST or DMA_REQUEST. In Step 736, the node resets its RETRY count to 0, so that the next time the COM device is Bus Master in the NON-RETRY STATE and receives either a RETRY or NO ACK in the first data cycle, it will be able to re-attempt that transaction the full number of times allowed by the RETRY LIMIT. Finally, in Step 738, the node sets an error flag in its own software to indicate that it has been unable to complete the attempted transaction. The particular response made by the node to this setting of this error flag can be controlled in the software of the node's microprocessor.

It should be noted that the node does not set Bit 20 of its Bus Error Register when it fails to complete a transaction within the number of retries allowed by the RETRY LIMIT. It does not because the BER[20] bit indicates that the chip has attempted 4,096 retries without completing tee transaction, which is more than two orders of magnitude more than the RETRY LIMIT. Thus, it is important not to confuse a failure to complete a transaction within the COM device's much lower RETRY LIMIT, and the BI protocol's much higher limit of 4,096 retries. This is particularly true, since it is intended that the software controlling COM devices will often cause them to reattempt, as entirely new transactions, transactions which are aborted after a failure to be completed within the RETRY LIMIT allowed by the test of Step 726.

If the logic on a COM chip indicates that a bus transaction, in which its device is the Master, has been successfully completed, Step 712, shown in FIG. 22B, will cause Steps 740 and 742 to be performed. In Step 740, the chip sends a transaction complete event summary code to the node on the event lines, as indicated in the last cycles of TABLE ONE. The node responds to the transaction complete code by clearing its RETRY count in Step 742. This, like the Step 736, insures that the next time the COM device attempts a NON-RETRY-STATE transaction as Master the transaction will be allowed the full number of retries allowed by the RETRY LIMIT used in the test at the top of Step 726.

It should be remembered, as is indicated above, that BI chips respond differently to NO ACK's and RETRY's received during the first data cycle of a transaction in which they are Bus Master. BI bus interface chips send different event codes to their corresponding nodes if they receive a NO ACK than if they receive such a RETRY.

N. COM Abstention from Replacing Stall with Retry

COM devices respond with the same CNF signals as BI devices when they are Slaves in the first data cycle of a transaction. Thus, when a COM device is acting as a Slave during such a first data cycle it can make the following CNF responses: It can place an ACK on the system bus when it has an indication that it can perform the first data cycle on schedule. It can place a NO ACK on the system bus when it has an indication it cannot perform the first data cycle at all. It can place a STALL o the system bus when it has an indication it will probably be able to complete the transaction in a short enough period that it is more efficient to extend the transaction than to retry it. Finally, it can place a RETRY on the system bus when it has an indication that it will be able to complete the transaction, but only after a delay so long that it be inefficient to extend the transaction by use of a STALL.

But there is a distinction between the COM first data cycle CNF response and that of BI devices. As is indicated above, the BI patents indicate that BI devices are designed with circuitry that monitors the number of cycles, if any, in which STALL is asserted during a first data cycle of a transaction. If the number of cycles in which STALL is asserted exceeds a predetermined limit, the BI device causes a RETRY signal to be generated to replace that STALL signal. It should be noted, that COM devices, unlike BI devices, have no circuitry for replacing a STALL signal with a RETRY signal during any transaction.

O. COM Detection of Command/Address Cycles

COM devices do not detect Command/Address cycles in the same manner as do BI devices. In particular, COM devices do not use the status of the NO ARB line in determining whether or not to respond to a cycle as a Command/Address cycle, as do BI devices.

As is indicated above, BI devices detect a cycle as being a Command/Address cycle if it is a busy-edge and if, in the cycle before that busy-edge, the NO ARB line was asserted. In addition, although it is not specified above, BI devices will not respond to a cycle as a Command/Address cycle to which it should respond by transferring information on the COM information and data lines if it detects bad parity during that cycle, or if the command contained in the COM information lines is not a command to which the BI device has been set up to respond to. BI devices, like COM device, check for odd parity during transaction cycles. In particular, BI devices check for odd parity in each cycle in which a busy-edge is detected and which is preceded by a cycle in which NO ARB is asserted. If none of the DIP lines are asserted during such a cycle, BI devices will detect bad parity and, thus, will not treat the cycle as a Command/Address cycle to which they should respond as a Slave. Also, since most BI devices, like COM devices, are not set up to respond to any of the undefined "reserved" commands indicated in FIG. 5A, they will not treat a cycle in which the information lines are all deasserted as a Command/Address cycle to which they should respond as a slave.

A COM device decides to respond to a cycle as a Command/Address cycle instructing it to transfer information on the COM information and data lines if the following conditions are met: First, it requires that the cycle be a busy-edge. Second, it requires that there be good parity during the cycle, which requires that at least one bit on the DIP lines be asserted. And third, it requires that the values on the COM information lines during the cycle correspond to a command which its COM chip has been set up to respond to by performing a data transfer. But the COM device does not in any way base its decision of whether or not it should respond to a cycle as a Command/Address cycle on the status of the NO ARB line.

The COM chip has been designed so that a COM device will never respond to the reserved command in which all the information lines are deasserted, which we call the "Zero Reserved" command, as a command to which it is to respond by performing an information transfer. Because COM devices never interpret a cycle in which the information lines contain the Zero Reserved command as a Command/Address cycle to which it should respond, it will never confuse the busy-edge on the first cycle of a loop-back transaction, in which the COM information lines are always deasserted, with a Command/Address cycle to which it should respond. As a result, the COM device has no need to monitor the NO ARB line to prevent it from confusing the first cycle of loop-back transactions with a Command/Address cycles, as apparently the designers of the BI device felt was necessary for the BI device to do.

Referring now to FIGS. 23-26, a more detailed explanation of the Command/Address cycle detection used by COM devices will be made.

Figure 23:
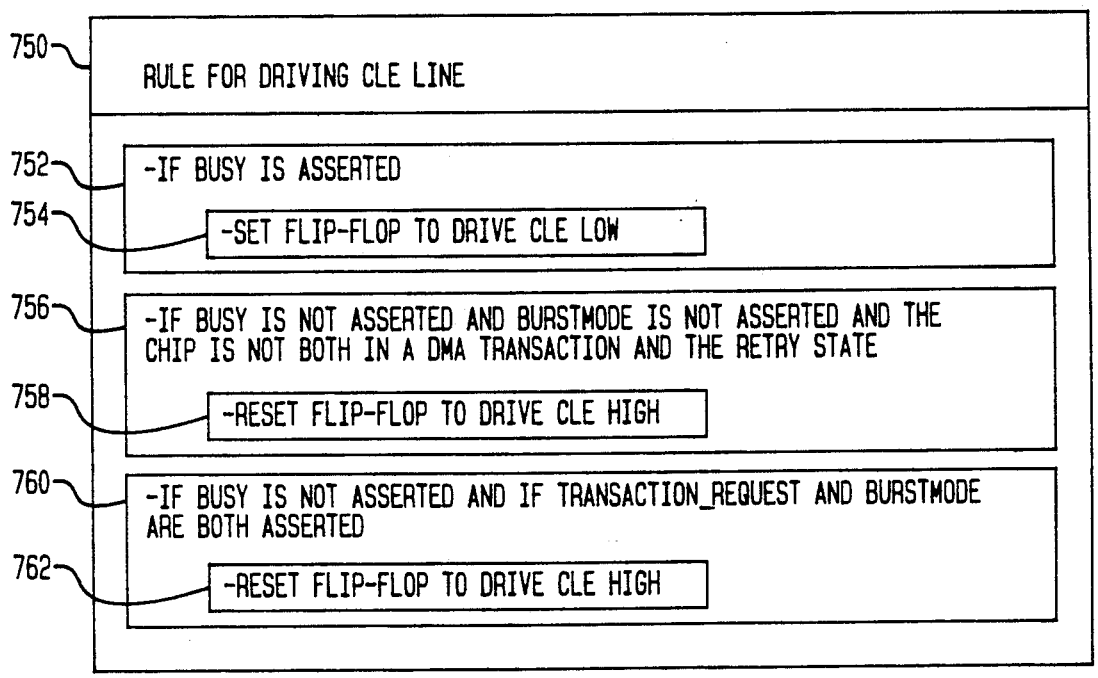
FIG. 23 is a schematic representation of the logic used by the COM chip to control its output on the CLE line.

FIG. 23 is a simplified schematic representation of the Rule 750 used for controlling the assertion or deassertion of the COMMAND LATCH ENABLE, or CLE line. The rule is as follows: if a Test 752 determines that the busy line is asserted during a given cycle, Step 754 will set a flip-flop which causes the CLE line to have a continuously low voltage until that CLE flip-flop is reset. A Test 756 checks to see if the following three conditions are met: one, that the BUSY line is deasserted; two, that BURSTMODE is not asserted; and three, that the chip is not in the DMA RETRY MODE described above, that is, that it is not both in a DMA transaction and in a RETRY STATE. If these three conditions of test 756 are all met, Step 758 resets the CLE flip-flop, causing the CLE line to have a high voltage. Finally, a Test 760 checks to see if BUSY is deasserted and if both the TRANSACTION_REQUESTline and the BURSTMODE line are asserted during the current cycle. If so, Step 762 resets the CLE flip-flop, causing CLE to be driven high.

Thus, it can be seen that the CLE line normally goes from a high to a low voltage whenever there is a busy-edge. The CLE line normally stays low until the BUSY line is next deasserted. CLE will normally be returned to a high voltage in the cycle after BUSY is deasserted, since normally BURSTMODE will not be asserted and the device will not be in a DMA transaction. If, however, BURSTMODE is asserted, the return of CLE to a high voltage will not take place until the TRANSACTION_REQUESTof the next individual transaction occurring during the burstmode transaction, or until BURSTMODE is deasserted while BUSY is also deasserted. If the device is currently performing a DMA transaction, the low output of the CLE line normally ends as soon as the BUSY signal is deasserted. But if the COM device enters the RETRY STATE during the DMA, the CLE line will be kept low until the DMA RETRY STATE is terminated. As is explained above, this is done because the falling edges of the CLE line are counted by the node during a DMA to keep track of how many of the DMA's desired sequentially addressed individual transactions have been completed.

The CLE line is a significant part of the command-/address detection, because whenever the CLE line on the BCI bus drops in voltage from an deasserted to an asserted state, the node responds by latching the current values on the BCI information and data lines. The COM interface chip passes the values on the COM information and data lines through to the corresponding lines on the BCI bus on each cycle during which the BCI I and D lines are not required for some other purpose. Thus, the CLE line will normally cause the values on the information and data lines of the COM bus to be latched by the node during an cycle in which there is a busy-edge, unless the COM device is in its DMA RETRY STATE. As will be explained below, if the node receives a Select signal on the SEL lines and Select codes on the SC lines of the BCI bus, it will respond to command/address information, latched in response to a CLE falling edge, as command/address information to which it should respond.

Figure 24:
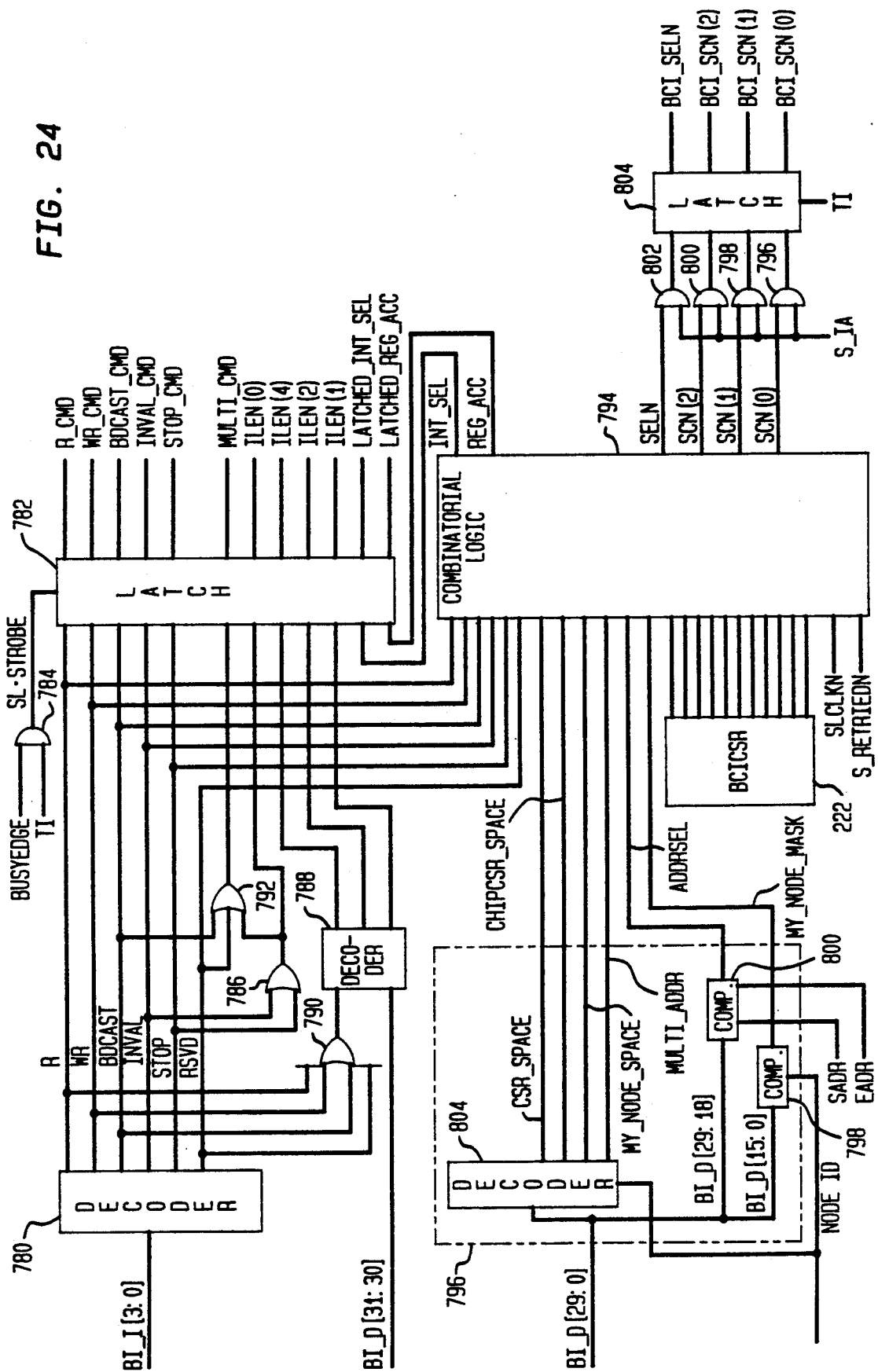
FIG. 24 is a schematic block diagram representing part of the logic, circuitry on the COM chip used to control a COM device's response to a cycle as a Command/Address cycle.

Referring now to FIG. 24, a simplified schematic diagram is given of the logic which decodes the values on the COM information and data lines during each cycle, and which latches those values in response to Command/Address cycles. The circuitry shown in the figure includes a Command Decoder 780, which receives the values on the four COM information lines during each cycle. This Decoder 780 continuously decodes these four lines to determine if the current four bits on those lines corresponds to one of specific types of commands for which it has an associated command decode output line. The first of these command decode lines is the R, or READ, command decode line, which is asserted if the value on the COM information line corresponds to a READ, INTERLOCK READ WITH CACHE INTENT, or a READ WITH CACHE INTENT command, as illustrated in FIG. 5A, above. The second of the Command Decode lines is the WR, or WRITE, line, which will be asserted by the decoder if the value on the COM information lines corresponds to the WRITE, WRITE WITH CACHE INTENT, UNLOCK WRITE MASK WITH CACHE INTENT, or WRITE MASK WITH CACHE INTENT commands, as shown in FIG. 5A. The BDCAST, INVAL, and STOP command decode lines are asserted, respectively, if the value on the COM information lines corresponds to the BROADCAST, INVALIDATE and STOP commands indicated in FIG. 5A. The command decode lines also include a RSVD, or RESERVED line, which is asserted by the Decoder 780 if the value on the COM information lines corresponds to the hexadecimal A or B values associated with 2 of the 3 reserved commands indicated in FIG. 5A. If, however, the value or the COM information lines corresponds to the Zero Reserved command, that is, if none of the information lines are asserted, the Decoder 780 does not assert any command decode line at all.

All of the command decode lines, except for the RESERVED line, are supplied as inputs to a Latch 782. This latch causes the values which are supplied to it as inputs to be latched whenever the SL_STROBE signal is asserted. This signal is asserted by the output of an AND gate 784 whenever the BUSY-EDGE signal is asserted, indicating that a busy-edge has been detected, and the TI internal clocking signal is asserted, indicating that it is the first quarter of the current bus cycle. The BUSY-EDGE signal is asserted from approximately 100 NS, or halfway, in the cycle in which the busy-edge exists, until approximately 100 NS into the next cycle. Thus, when a busy-edge occurs, the assertion of the BUSY-EDGE signal and the TI signal will cause the output SL_STROBE to go high at the start of the cycle immediately following that in which the busy-edge was detected. Normally, this will correspond to the start of the Imbedded Arbitration cycle which follows immediately after a Command/Address cycle.

The Latch 782 also receives inputs other than the command decode lines previously described. It receives an input from an OR gate 786, which indicates whether or not the current values on the COM information lines correspond to a command which has no data cycles. This OR GATE receives inputs from the INVAL and STOP command decode lines. If any of these command decode lines are asserted, the output of the OR GATE 786 is also high.

The Latch 782 also receives input from a Decoder 788, which indicates if the current value on the information and data lines is associated with a command having one, two, or four data cycles. The Decoder 788 receives as an input the top two most significant bits from the COM data lines, and it decodes these two bits to see whether they are representing a transaction length of one, two, or four data cycles. The Decoder 788 also receives a controlling input from an OR GATE 790, which receives as inputs the outputs of the R, WR, BDCAST, and RESERVE command decode lines. If any of these lines are asserted, the output of the OR GATE 790 will cause the Decoder 788 to operate. Otherwise, the output of the Decoder 788 will remain deasserted, regardless of the values of the top two bits of the COM data lines.

The Latch 782 also receives an input from an OR gate 792, which indicates whether or not the current values on the COM information lines correspond to a command which is addressed to more than one Slave device. The OR gate 792 receives as inputs the BDCAST and RESERVE command decode lines, and also receives as an input the output of the OR GATE 786. Thus, the output of the OR gate 792 will be asserted if either the BDCAST, RESERVE, INVAL or STOP command decode lines are asserted.

The final two inputs, shown in FIG. 24, to the Latch 782 are the INT_SEL, or the Internal Select, line and the REG_ACC, or Register Access, line. INT_SEL is an outputs of the combinatorial logic represented by the functional block 794 shown in FIG. 24. The REG_ACC line is also shown as an output of logic 794. It should be pointed out, however, that FIG. 24's representation of REG_ACC is highly simplified. In the embodiment of the COM chip which has been made, REG_ACC is not actually produced by the logic 794, and is not latched by the latch 782. The command and address decode inputs which are used to derive the REG_ACC line, unlike those supplied to the combinatorial logic 794, are themselves latched, and, thus, there is no need to latch the REG_ACC line. For purposes of simplification, however, the REG_ACC line is shown in FIG. 24, and is described below, as being generated by the logic 794 and being latched by the latch 782. This is appropriate because, for the purposes of the present specification, REG_ACC could be derived from the inputs supplied to the combinatorial logic 794, and because the fact that REG_ACC is actually derived from signals that are themselves latched causes its value to behave, for purposes of the specification, as if the signal itself were latched.

As is explained below, when either INT_SEL or REG_ACC is asserted it indicates that the values on the information and data lines of the COM bus correspond to a command which is addressed to the COM device. The REG_ACC line is asserted if a Read-type or Write-type command is addressed to one of the COM chip's on-chip registers. The INT_SEL is asserted if other types of commands are addressed to the COM device.

The values latched in the Latch 782, at the beginning of a cycle immediately following a busy-edge, are used as internal command/address information by the COM chip. This information is used by the chip to control its response as a Slave in a transaction, if the Slave State Machine described below with regard to FIG. 26 indicates that the chip is, in fact, to function as such a Slave.

The command/address decoding circuitry includes address decoding logic 796, shown within the dotted box labeled 796 in FIG. 24. This logic continuously decodes the values on the COM data lines, and, in response, continuously produces corresponding output values on a plurality of device-addressed lines. These device-addressed lines indicate whether the values currently on the data lines correspond to an address associated with the COM device's various address spaces. These device-addressed lines include the MY_NODE_MASK, ADDRSEL, MULTI_ADDR, MY_NODE_SPACE, CHIP_CSR_SPACE, and CSR_SPACE lines.

The MY_NODE_MASK line is the output of a Comparator 798, which compares bits 0–15 on the COM data lines with the 16 bit pattern which has one bit asserted to indicate the ID number of the COM device. This is the same 16 bit pattern which is asserted by the COM device in the high and low halves of the data bus when it arbitrates. The MY_NODE_MASK line is used to indicate whether or not the node is addressed in commands such as the STOP and BROADCAST commands, which address Slave devices by placing their ID bit on the bottom half of the data lines during the Command/Address cycle.

The ADDRSEL, or ADDRESS SELECT, signal is generated by the output of a Comparator 800, which compares the bits 18–29 of the COM data lines with the corresponding bits stored in the SADR, or Starting Address Register, and the EADR, or Ending Address Register, described above in FIGS. 7J and 7K. The ADDRSEL line is asserted when the value on the data line corresponds to an address within the range of memory addresses associated with the COM device. It will be asserted if the READ, READ WITH CACHE INTENT, INTERLOCK READ, WRITE, WRITE WITH CACHE INTENT, WRITE MASK WITH CACHE INTENT, and UNLOCK WRITE MASK commands are addressed to the device.

The MULTI_ADDR, MY_NODE_SPACE, CHIP_CSR_SPACE and CSR_SPACE lines are all shown in FIG. 24 as outputs of a Decoder 804. This decoder compares the first 30 bits of the COM data lines with a four bit representation of the COM device's node ID, and with various address ranges which, in conjunction with those four bits, define various address areas associated with each COM device.

The MULTI_ADDR line is asserted when the address on the data lines of the COM bus refers to a Multicast address space, which is part of the address space provided in the BI architecture.

The MY_NODE_SPACE line is asserted when the decoder 804 determines that the I/O address on the COM data lines refers to the nodespace associated with the given CO device. This nodespace includes the address spaces associated with both the CHIP_CSR_SPACE and the CSR_SPACE signals, described next. The CHIP_CSR_SPACE line indicates that the current value of the first 30 bits on the COM data bus corresponds to an address range of 256 bytes associated with the on-chip registers of the COM device, including the COM equivalent of the register file shown in FIG. 7A.

The CSR_SPACE line is asserted whenever the value on the COM data lines corresponds to an address space which ranges from 256 bytes to 8 K bytes above the base address associated with the device's node ID. This address is associated with possible registers that might be located in the node of a COM device and which can be addressed in the I/O address mode.

All of the device-addressed lines are supplied as inputs to the block of combinatorial logic 794. This combinatorial logic also receives each of the command decode lines produced by the output of the Decoder 780. It also receives from the BCICSR Register 222, shown in FIG. 7L, the output of the enable bits contained in that register.

The state of individual enable bits within the BCI Command and Status Register, shown in FIG. 7, determines whether or not the register's corresponding node will be notified of command and address information of the type associated with each such bit. For example, the READ/WRITE/ENABLE bit, BCICSR[15] determines whether or not the COM device is supposed to be notified of Read-type or Write-type commands addressed to the device's address space. The BDCAST_ENABLE, STOP_ENABLE, RESERVE_ENABLE, and INVAL_ENABLE bits, shown in FIG. 7L, determine whether or no the node is to be notified of BDCAST, STOP, RESERVE, and INVAL commands, respectively. The WRITE_NOT_TO_CHIP_ENABLE bit, BCICSR[9], indicates whether or not the node is to be informed of a Write-type command addressed to a memory location not associated with the chip. This bit would be enabled, for example, if the COM device used a caching scheme which wanted to monitor if any writes had been made to memory on another device which has been copied into the COM device's cache memory. The READ_WRITE_TO_NODE_CSR_ENABLE bit, BCICSR[8] is used to indicate if the device is to be notified of a Read/Write-type command addressed to the node's register space. The READ-WRITE-TO-CHIP'S CSR enable bit, BCI CSR[7] indicates whether or not the chip is to be told of Read/Write-type commands addressed to the 256 byte CSR_SPACE in which the chip's register file is contained.

It should be understood that it's presently intended that the COM devices will be operated with their RE- SERVE ENABLE bits disabled, causing the combinatorial Logic 794 to respond to the assertion of the RESERVE command decode line, as if no command decode line had been asserted at all.

The combinatorial Logic 794 includes logic for generating two so-called select lines, the INT_SEL, or Internal Select Line, described above with regards to the Latch 782, and the SELN, or Select line, which is used to drive the BCI Select line. The combinatorial Logic 794 includes logic for asserting both of these select lines when one of the command decode lines is asserted, one of the device-addressed lines is asserted, and the one or more enable bits, which control whether or not the combinatorial logic responds to the asserted command decode and device-addressed lines, is enabled. The combinatorial Logic 794 prevents the assertion of both the INT_SEL and SELN lines when no command decode line is asserted or when the RESERVED command decode line is asserted and the RESERVE ENABLE bit, BCICSR[12], which enables response to reserve commands, is disabled.

The combinatorial Logic 794 also includes logic generating a multi-line SC, or SELECT, code on the line SCN[2:0]. These values, when latched through to the BCI bus, have the meaning shown in FIG. 25. As can be seen from FIG. 25, they indicate the type of command-/address information represented by the current values on the COM information and data lines. When these lines are asserted they cause the node to respond to the information latched in from the BCI I and D lines on the falling edge of the CLE line as command/address information to which the node should respond.

The combinatorial Logic 794 includes logic for generating that one of the Select Codes shown in FIG. 25 which represents the combination of the currently asserted command decode line, the currently asserted device-addressed line, and the value of the one or more enable bits associated with the combination of the currently asserted command decode and device-addressed lines. This logic includes means for generating the default SC code when either no command decode line is asserted by the Decoder 780, or the RESERVED command decode line is asserted and the RESERVE_ENABLE bit, BCICSR[12], is not enabled. This default SC code is that in which none of the SC lines are asserted. In the negative logic used on the BCI_SCN lines, this is associated with a binary value of "111", or the decimal value of 7. This is the value labeled "not active" in FIG. 25, The SELN and SCN[2:0]outputs are fed into four AND gates 796, 798, 800, and 802, each of which has another input connected to the SLAVE_IMBEDDED_ARBITRATION, or S_IA, signal. This S_IA signal is asserted during the entire Imbedded Arbitration cycle by the Slave State Machine which is described below with regard to FIG. 26. The output of the AND gates 796-802 are provided to the inputs of a Latch 804. This latch is latched by the T1 signal, which is asserted from 0-50 NS in each bus clock cycle. The outputs of the Latch 804 are supplied directly to the SELN line and the three SC lines of the BCI bus. Since the outputs of the AND gates 796-802 are deasserted at all times, except during the Imbedded Arbitration cycle, the values latched by the Latch 804 onto the BCI bus at the start or each cycle are deasserted during all cycles, except the Imbedded Arbitration cycle. At the start of the Imbedded Arbitration cycle, however, the S_IA signal lets the Latch 804 latch the SELN and SCN[2:0] output calculated by the combinatorial logic 794 for the values placed on the COM information and data lines in the cycle before. The Latch 804 continues to supplies these values to the BCI bus until the start of the cycle after the Imbedded Arbitration cycle.

Figure 26:
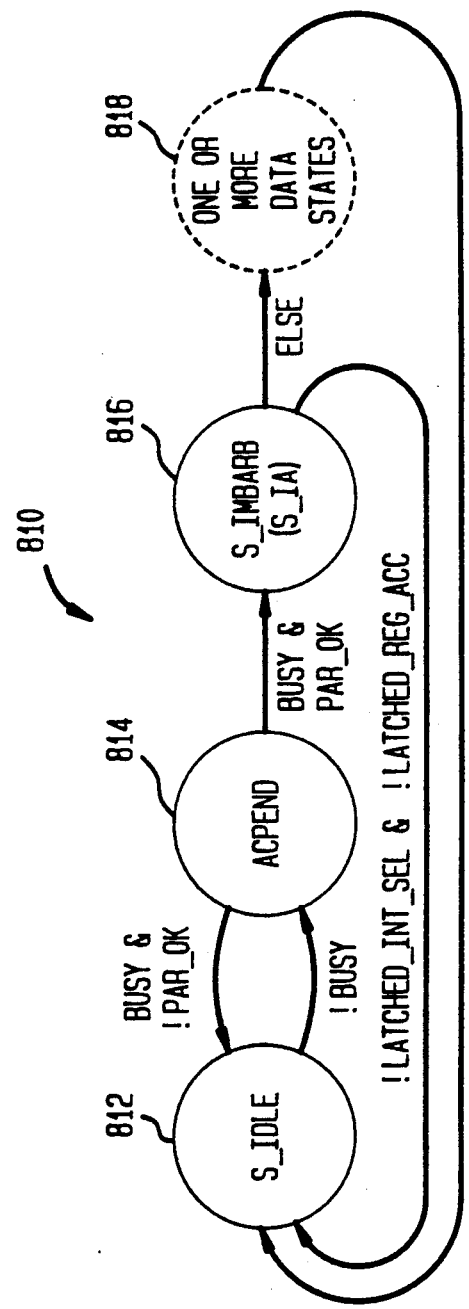
FIG. 26 is a partial schematic representation of the Slave State Machine on the COM chip, which helps control the chip's response to transactions addressed to the COM device as a slave.

Referring now to FIG. 26, a partial representation is shown of the Slave State Machine located on the COM bus interface chip. The purpose of this state machine is to help determine if there has been a Command/Address cycle on the COM bus, and, if that Command/Address cycle is addressed to the COM device, to help sequence the COM device through one or more cycles of that transaction as a Slave device. The notation used to represent the Slave State Machine is like that used in FIG. 11 to represent the Arbitration State Machine, except that in FIG. 26, a signal name, S_IA, is placed in the circle representing one of the state machine states, the S_IMBARB state, to indicate that the S_IA signal is generated during the entire cycle that the state machine is in the S_IMBARB state. The Slave State Machine, like the Arbitration State Machine, only makes a transition between states at the start of the bus cycle after the conditions required for that transition are met.

The Slave State Machine 810 spends most of its time in either the S_IDLE, or SLAVE IDLE, state 812 or the ACPEND, or ADDRESS/COMMAND PENDING, state 814. When the state machine is in S_IDLE, it will stay in that state until the BUSY line is deasserted. If BUSY is deasserted, the state machine will change to the ACPEND state at the start of the next cycle. When the state machine is in ACPEND, it will stay in that state until the start of the first cycle after one of two sets of conditions have been met. The first set of conditions requires that BUSY be asserted during a cycle in which the parity on the COM DIP lines is incorrect, that is, in which the total number of bits asserted on those lines is an even number. If this first set of conditions is met, the cycle associated with the assertion of BUSY cannot be a proper Command/Address cycle, because of the bad parity, and thus, the state machine will make a transition from the ACPEND state back to the S_IDLE state. The second set of conditions require that BUSY be asserted in a cycle in which the parity on the COM DIP lines is correct, that is, in which the total number of bits asserted in those lines is an odd number. If this second set of conditions is met, the state machine makes a transition at the start of the next bus cycle to the S_IMBARB, or SLAVE IMBEDDED ARBITRATION, state. This transition causes the S_IA signal to be turned during the entire cycle in which the state machine stays in S_IMBARB. This assertion of the S_IA, or SLAVE IMBEDDED ARBITRATION, signal, turns on the AND gates 796-802, described above with regard to FIG. 24, and making the SELN and SCN[2:0]outputs of the combinatorial Logic 794 available for latching through the Latch 804 onto the BCI bus.

The state machine stays in the SLAVE IMBEDDED ARBITRATION state for just one cycle. The transition out of S_IMBARB will be to the S_IDLE state 812, if neither the LATCHED_INT_SEL, or LATCHED INTERNAL SELECT, line nor the LATCHED_REG_ACC, or LATCHED REGISTER ACCESS, line are asserted. The LATCHED_INT_SEL and LATCHED_REG_ACC lines are the value latched into the Register 782 from the INT_SEL and REG_ACC output of the combinatorial Logic 794, respectively, as a result of the busy-edge which gives rise to the transition from ACPEND to S_IMBARB. If neither LATCHED_INT_SEL nor LATCHED_REG_ACC are asserted, it indicates that the combinatorial logic 794 has determined that the current busy-edge is not a Command/Address cycle addressed to the current device, and, thus, a transition is made to the S_IDLE state so that the state machine can wait to detect the next busy-edge. When this transition is made out of S_IMBARB, the assertion of the S_IA line is turned off to indicate that the Imbedded Arbitration cycle is over.

If, either LATCHED_INT_SEL or LATCHED_REG_ACC is asserted while the Slave State Machine is in S_IMBARB, indicating that a Command-/Address cycle has been addressed to the COM device, the state machine will makes a transition to one or more data cycle states at the start of the cycle after the Imbedded Arbitration cycle. These Slave states are represented in the FIG. 26 by the Numeral 818. The exact number of such data states through which the Slave State Machine will pass is a function of such variables as the command length value, ILEN(0), ILEN(1), ILEN(2), or ILEN(4), which has been latched into the Latch 782. The path through such data states will also be affected if one or more STALL signals are, or if a NO ACK or RETRY signal is, generated by the Slave.

Once the cycles associated with these one or more data states are completed, the state machine will make a transition back to the S_IDLE state 812, where it will again begin to look for the next busy-edge.

From the above description, it can be seen that the COM device's command/address detection and response circuitry, described with regard to FIGS. 23-26, is capable of distinguishing between a Command/Address cycle to which the device is to respond as a Slave and the busy-edge associated with the start of a loop-back transaction. It can do this even though it does not in any way monitor the COM NO ARB line. In fact, the only logic on the COM device which monitors the status of the NO ARB line is 1) the circuitry used to detect whether or not NO ARB is asserted 50 NS into a bus cycle for use in the Arbitration State Machine shown in FIG. 11, 2) circuitry which monitors the COM NO ARB line to insure that it is asserted at times when the logic on the COM chip indicates that the COM chip should be asserting that line, and 3) circuitry which monitors the NO ARB line to insure that the COM device is not asserting tri-cycle jamming which is out of phase with the tri-cycle jamming being asserted by another COM device on the same bus.

The COM device will not respond to the first cycle of a loop-back as a Command/Address cycle to which it should respond as a Slave because the Decoder 780 will respond to the idle COM information lines during the first cycle of such a loop-back by failing to assert any of its command decode output lines. As a result, the combinatorial Logic 794 will not assert either the INT_SEL or REG_ACC line. This will cause the corresponding outputs of the Latch 782, LATCHED_INT_SEL and LATCHED_REG_ACC, to be deasserted, making the Slave State Machine return to the S_IDLE state 812 after being in the S_IMBARB state 816, and preventing it from entering any of the data states 818 which it must enter in order to act as a Slave during one or more data cycles. The combinatorial Logic 794 will also respond to the failure to assert any command decode lines by failing to assert any of the SELN or SCN[2:0] lines. This will indicate to the COM node that the COM device has not been selected as a Slave in a transaction, and it will cause the node to ignore the values latched in from the BCI I and D lines in response to the CLE falling edge caused by the busy-edge on the first cycle of the loop-back.

If a BI device has arbitrated during the first cycle of a loop-back instruction, there is a reasonable chance that the number of bits asserted by the arbitration on the COM DIP lines will be an even number, and thus, that the parity will be bad. If the parity is bad during the first cycle of a loop-back, the Slave State Machine, which will be residing in ACPEND during that cycle will respond to the bad parity on that busy-edge by making the transition back to S_IDLE immediately after the end of that busy-edge cycle. This also will prevent the first cycle of such a loop-back from being detected as a proper Command/Address cycle.

Thus, it can be seen that a COM device responds to the first cycle of a loop-back as if it were a Command/Address cycle in which the ZERO RESERVED command is used or in which the parity is bad. This is sufficient to keep the COM device from mistakenly responding to the a first cycle of a loop-back as if it were a proper Command/Address cycle.

It should be noted that, unlike BI devices, COM devices have been designed so that they will never set the BER[23] bit of the Bus Error Register shown in FIG. 7D. Thus, COM devices will not set BER[23] if they detect a parity error when their Slave State Machine is in ACPEND. This is done because the state machine does not know if a busy-edge is a Command/Address cycle, in which case such a parity error would be a real error, or the first cycle in a loop-back, in which case it would not be.

It should also be noted that the combinatorial Logic 794 normally asserts the INT_SEL line and the SELN line at the same time. There are, however, some situations in which the logic will not assert both of these signals at the same time.

One of these situations arises when the information on the COM information and data lines corresponds to a Write-type command addressed to another bus device. In this situation, the INT_SEL line is not generated because the logic on the COM chip is not supposed to respond to such a command. However, the combinatorial Logic 794 will assert the SELN line and the SC code 1, shown in FIG. 25. This SC code informs the node that the values on the COM I and D lines correspond to an INVAL or a WRITE command to another device's memory or I/O space. Of course, the SELN and SC code will only be asserted if the appropriate enable bit in the BCICSR Register are enabled, including the WRITE_NOT_TO_CHIP_ENABLE Bit BCICSR[8]. The combinatorial Logic 794 has been designed to be able to generate these outputs to the node, in case the node is capable of caching a copy of memory or I/O information contained on other devices, and needs to be kept up-to-date on any changes which have been made to the information of which it has made a such a copy.

A second situation in which the INT_SEL and SELN line will not both be asserted at the same time occurs is when a Read-type or Write- type transaction is made to the COM chip's registers, that is, when the device-addressed signal CHIP_CSR_SPACE is asserted. In this case, the INT_SEL line will not be asserted. Instead REG_ACC is asserted to indicate that the values on the COM information and data lines correspond to a Command/Address to the chip's registers. This REG_ACC signal will be generated regardless of whether or not the READ/WRITE_TO_CHIP_CSR_ENABLE bit BCICSR[7] is asserted. But the assertion of this BCICSR bit will determine whether or not the combinatorial Logic 794 generates an assertion on the SELN line and the READ/WRITE TO CSR CODE 6 on the SCN lines.

P. COM Bus Waveforms

Referring now to FIGS. 27, 28, and 29A–29C, a description will be given of certain waveforms produced on the COM bus by COM devices.

Figure 27:
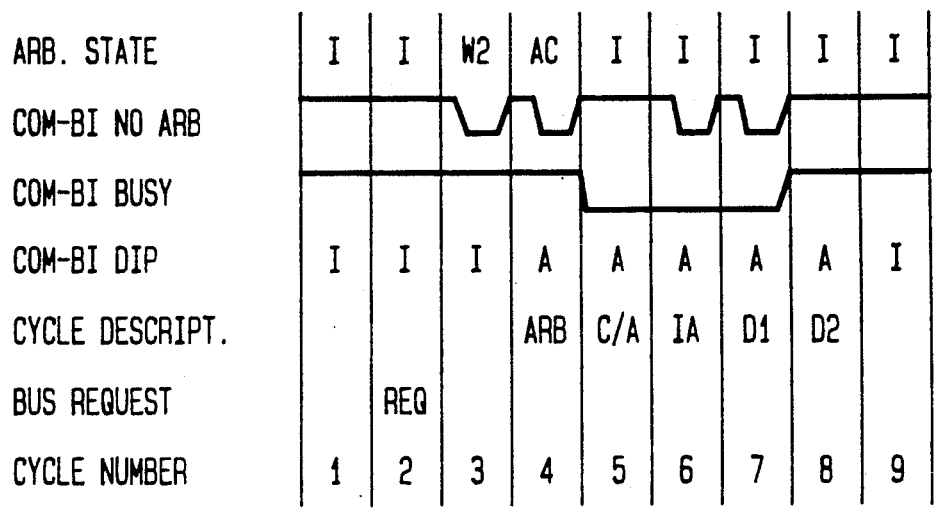
FIG. 27 is a schematic representation of NO ARB and BUSY waveforms produced by a COM chip which is not in jamming mode during a transaction in which it is Bus Master, with indications for each bus cycle of the chip's arbitration state and whether or not it is asserting any DIP lines.

FIG. 27 provides schematic representation of the NO ARB and BUSY waveforms which are produced on the COM bus by a COM device which is in its less preferred non-jamming mode. In this figure, the row labeled "Cycle Number" numbers each of shown bus cycles to make reference to individual cycles easier. It should be understood that there is no signal on either the COM bus or within COM devices corresponding to these numbers. The row labeled "Bus Request" is used to indicate the cycle in which the COM device receives a request to obtain control of the COM bus, either in the form of a TRANSACTION_REQUEST or a DMA_REQUEST. The row labeled "Cycle Descript." stands for cycle description. It is used to describe the nature of each bus cycle being performed by the Bus Master. The next row is labeled "COM DIP". It indicates whether the COM data, information, and parity lines are either all idle, indicated by "I", or have one or more lines asserted, indicated by "A". The next row of information is labeled "COM BUSY". It contains the waveform of the BUSY line of the COM bus. Above that is the COM NO ARB waveform. Finally, the top row is labeled "ARB-STATE". It indicates the current state of the Arbitration State Machine of FIG. 11 in each cycle. In the example of FIG. 27, the Arbitration State Machine starts out in the IDLE state 442, indicated by "I"; the DIP lines are idle during cycles 1–3; and the COM device receives its bus request during cycle 2. As can be seen from FIG. 11, since the DIP lines are idle in both cycles 1 and 2, it makes no difference whether the COM device is in BIMODE or !BIMODE when it receives the request in cycle 2, In either case, the Arbitration State Machine makes a transition from IDLE to the WAIT 2, and starts WANTBUS NO ARB assertion, at the start of cycle 3.

In Cycle 3, WANTBUS causes the NO ARB signal to be asserted from 75 to 175 nanoseconds into the cycle. During this cycle the DIP lines are idle and the NO ARB line is deasserted at 50 NS into the cycle. As a result, at the start of Cycle 4, the state machine makes a transition to the ARB CYCLE state, as is indicated by the letters "AC" in FIG. 27. During cycle 4, the COM device asserts its arbitration bit on both the high and low priority halves of the COM data lines and it asserts the NO ARB line from 75–175 NS, since the WANTBUS has not yet been turned off.

In the example of FIG. 27, the COM device wins the arbitration in cycle 4, since it is the only device arbitrating. As a result, the WIN signal causes the Arbitration State Machine to transfer from ARB CYCLE to IDLE at the beginning of cycle 5. When this transition is made, the ARBCYC signal is turned off, indicating that the Arbitration cycle is over, and WANTBUS is turned off, which ceases further assertion of NO ARB by the Arbitration State Machine.

In the example of FIG. 27, the COM device is in the non-jamming mode. When a COM device is in the non-jamming mode, its Master State Machine asserts NO ARB from 75 to 175 nanoseconds during the Imbedded Arbitration cycle and each of the standard data cycles after the Imbedded Arbitration cycle, except for the last. When a COM device is in the non-jamming mode, its Master State Machine does not assert the NO ARB during the Command/Address cycle. This enables BI devices, if any, that desire to perform an Imbedded Arbitration the opportunity to do so. This is shown in FIG. 27, in which the NO ARB signal is not asserted during Cycle 5, the Command/Address cycle of the illustrated transaction, but is asserted during the Imbedded Arbitration cycle and the first of the two data cycles of that transaction.

It can also be seen from FIG. 27 that the COM device's Master State Machine asserts the BUSY line, starting with the start of Cycle 5, the Command/Address cycle of the transaction, and keeps it asserted up to the end of cycle 7, the transaction's second to the last data cycle. As would be expected, the DIP lines are active from the Arbitration cycle 4 through the last data cycle 8.

Figure 28:
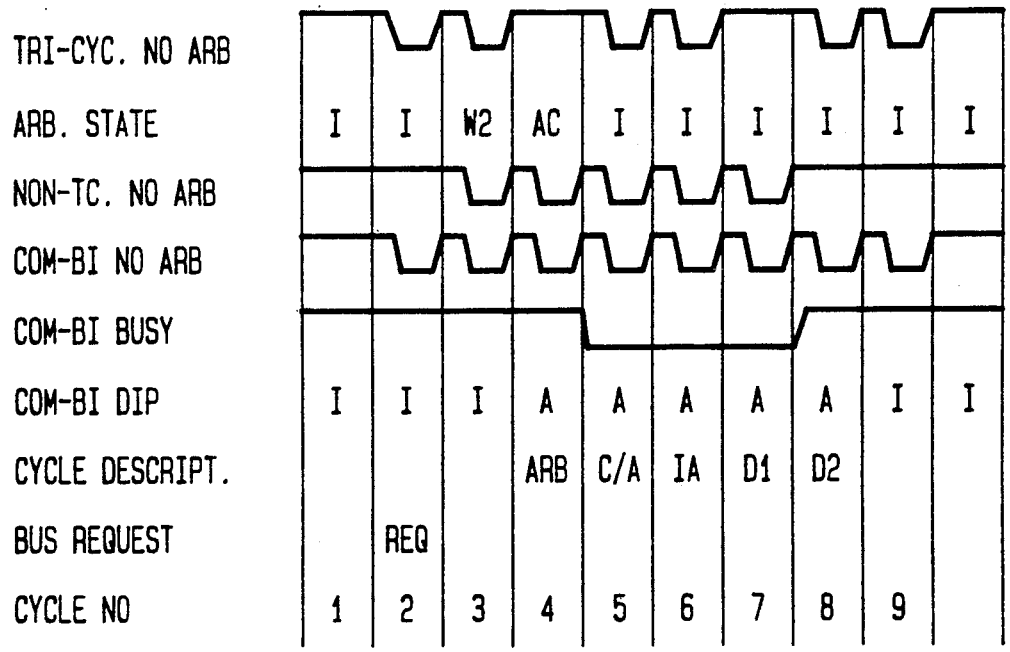
FIG. 28 is a schematic representation of NO ARB and BUSY waveforms, similar to that shown in FIG. 2, except that in it the COM chip is in jamming mode.

FIG. 28 is a schematic diagram very similar to FIG. 27, except that it illustrates waveforms produced by a COM device which is in jamming mode. The rows of information contained in FIG. 28 are the same as those in FIG. 27, with the following exceptions:

First, an additional row is added at the top, which represents the component of the COM device's NO ARB output which is generated by tri-cycle jamming circuitry which obeys the logic described above with regard to FIG. 14. As can be seen from FIG. 28, this TRI-CYCLE NO ARB signal repeatedly causes the NO ARB line to be asserted from 75–175 nanoseconds during two consecutive system bus cycles, followed by a bus cycle in which it does not assert the NO ARB line at all. This pattern of two cycles on and one cycle off is repeated continuously throughout the operation of a COM device when it is in the jamming mode.

Second, another additional row is added which is labeled "NON-TC NO ARB". This represents the non-tri-cycle component of the device's NO ARB output. It covers the output of all the logic on the COM chip which drives NO ARB independently of the tri-cycle jamming signal. This includes all assertions of NO ARB by the chip's Arbitration State Machine, its Master State Machine, its logic which implements Bus Master Jamming of FIG. 13, and its logic which implements Loop-Back Jamming of FIG. 15.

Third, the row labeled "COM NO ARB" shows the actual NO ARB signal which is asserted on the COM bus. As can be seen from the figure, this signal is a logical ORing of the assertions shown in the device's TRI-CYCLE NO ARB and NON-TRI-CYCLE NO ARB signal.

As can be seen by comparing FIGS. 27 and 28, the only difference between them is 1) that when the device is in the jamming mode, as in FIG. 28, its NON-TRI-CYCLE NO ARB signal causes it to generate a NO ARB signal from 75–175 NS during the Command/Address cycle, so as to prevent Imbedded Arbitration from taking place, and 2) its TRI-CYCLE NO ARB signal causes the COM NO ARB line to be asserted two out of every three cycles, regardless of how many times it is asserted by the NON-TRI-CYCLE NO ARB signal.

Figure 29C:
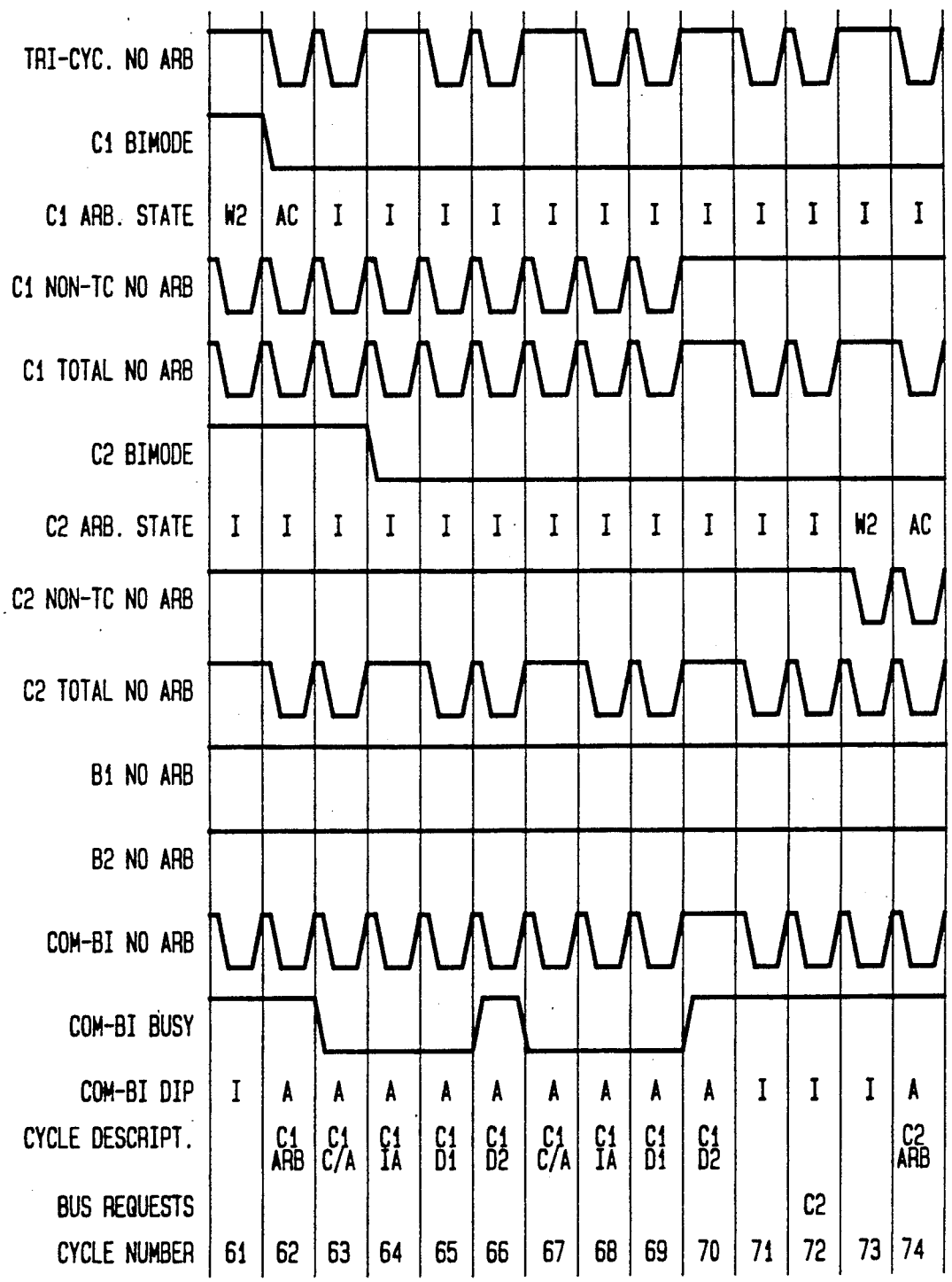

Referring now to FIGS. 29A-29C, the waveform shown in these figures are of the same basic type as those shown in FIG. 28, except that FIGS. 29A-29C simultaneously give the waveforms for two separate COM devices labeled C1 and C2, and two separate BI devices labeled B1 and B2, which are all connected to the same COM bus.

In these figures, the waveform "TRI-CYC NO ARB" is used to show the tri-cycle jamming output produced by both C1 and C2. This one waveform is used to represent the tri-cycle jamming of both COM devices, since, as is explained above with regard to FIG. 14, the tri-cycle jamming of all COM devices on a given COM bus is synchronized, and thus, their tri-cycle jamming signals are virtually identical.

The two waveforms labeled "CI BIMODE" and "C2 BIMODE" are used to indicate the state of the Master Mode Bit on the C1 and C2 COM devices, respectively. When one of these BIMODE waveforms has its low value it is in the !BIMODE and when it has its high value it is in the BIMODE.

The state of the Arbitration State Machine of the C1 and C2 COM devices are shown by the rows labeled "CI ARB. STATE" and "C2 ARB. STATE", respectively.

The state of the non-tri-cycle component of the C1 and C2 COM device's NO ARB signal is indicated in the rows labeled "C1 NON-TC NO ARB" and "C2 NON-TC NO ARB", respectively.

Finally, there are waveforms labeled "CI TOTAL NO ARB" and "C2 TOTAL NO ARB", which indicate the total NO ARB output for the C1 and C2 COM devices, respectively. These signals are produced for each COM device by logically ORing the assertions, or low values, of its TRI-CYCLE NO ARB and NON-TRI-CYCLE NO ARB signals.

FIGS. 29A-29C also include waveforms "BI NO ARB" and "B2 NO ARB", which respectively show the NO ARB outputs of the B1 and B2 BI devices.

The "COM NO ARB" waveform represents the voltage on the NO ARB line of the COM bus. This waveform is pulled low whenever any of the NO ARB outputs of any of the devices connected to the COM bus go low. In the example shown in FIG. 29, this waveform goes low whenever one or more of the C1 TOTAL NO ARB, C2 TOTAL NO ARB, B1 NO ARB, or B2 NO ARB waveforms go low.

The "COM BUSY" waveform shown in FIGS. 29A-29C represents the voltage on the BUSY line of the COM bus, and this voltage is pulled low when any of the devices connected to the COM bus asserts BUSY.

It is assumed that in the first cycle, cycle 1, of the example shown in FIGS. 29A-29C the DIP, or data, information and parity lines, of the COM bus are all idle and that no transaction is currently taking place. It is also assumed that both the COM devices, C1 and C2, are in the COM Master Mode, or !BIMODE, and that neither of them have received any pending bus requests. As a result, both their Arbitration State Machines are in their IDLE states 442 (cf. FIG. 11). These IDLE states are indicated by the "I" in the C1 and C2 ARB. STATE rows of FIG. 29A.

It is further assumed, as is indicated in the "BUS REQUESTS" row of FIG. 29A that the B1 BI device has received a bus request and the B2 BI device has received a request to perform a loop-back transaction. It is assumed that the timing of both these requests is such that B1 will start its arbitration, and B2 will start its loop-back, both in cycle 2 of FIG. 29A. In FIG. 29A we have shown B1 receiving its request in cycle 1. This is appropriate, since we believe that BI devices can arbitrate on the cycle immediately after they receive a bus request, provided NO ARB is not asserted. B2's request for a loop back is shown in cycle 1 with an back arrow, indicating that the request was made in a previous cycle. This is appropriate since we believe that a BI device cannot respond to a loop-back request until at least the second cycle after it receives a loop-back request.

In cycle 2, B2 starts its loop-back transaction, causing it to assert both the BUSY and NO ARB lines during cycles 2 and 3, as is indicated in the B2 NO ARB, COM NO ARB, and COM BUSY rows of the figure. In cycle 2, B1 arbitrates for control of the bus, causing it to assert the NO ARB line during that cycle as is indicated in the BI NO ARB waveform. Since no other device arbitrates against B1, it wins the arbitration and become the Pending Master. It remains, and continuously asserts its NO ARB line as, the Pending Master until cycle 5, the cycle after cycle 4 in which BUSY is first deasserted by B2.

In cycle 5, B1 becomes Bus Master of a BI block transaction in which, for purposes of simplicity, it performs only two transactions. During this BI block transaction, B1 continuously asserts its NO ARB line from the start of the first Command/Address cycle of the block's first transaction in cycle 5 up through the last data cycle of the block's last individual transaction in cycle 14. B1 performs the first individual transaction's Command/Address cycle ("B1 C/A") in cycle 5, its Imbedded Arbitration cycle ("BI IA") in cycle 6, and its two data cycles ("B1 D1"and "B1 D2") in cycle 7 and 8.

As is indicated by the "I" in the COM DIP row of FIG. 29A, the DIP lines are idle in cycles 9, 10 and 11 as B1 performs the necessary delays required between individual transactions of BI block transaction. For purposes of the example, we have assumed three cycle are required between the individual transactions of the block. The exact number of cycles required would appear to depend on the hardware of the node used with the BIIC on B1. It would appear, however, from our understanding of the BI bus interface chip, that the chip requires at a least one cycle delay while command address information is supplied from the BI device's node to its bus interface chip. In cycles 12 through 14 the second, and last, individual transaction of B1's block transaction is performed. The block's last individual transaction contains a Command/Address cycle 12, an Imbedded Arbitration cycle 13, and a single data cycle 14.

BI devices enter their burst, or block, mode when either a loop-back transaction or a system bus transaction sets the BURSTEN, or Burst Enable, Bit on the BCI Control and Status Register of the Device's BIIC. Once this bit is set, the next time the device obtains control of the bus it will be in burst, or block, mode and will continue to assert NO ARB until either of two events occurs: 1) the BIIC receives a Master Abort, or MAB, signal from its node, in which case it will terminate burst mode until the BIIC next receives a bus request and obtains control or the bus; or 2) a write transaction resets the BIIC's BURSTEN Bit, in which case the device will stay out of burst mode until the next time the BURSTEN Bit is set. In the example of FIG. 29A, we have assumed that B1's BURSTEN bit had already been set before it received a bus request in cycle 1, and that the transaction in cycles 12-14 reset the BURSTEN Bit, so as to end the burst mode. FIG. 29A also assumes that B1 turns off NO ARB at the end of cycle 14 in which the BURSTEN bit is reset, although we are not certain of the exact relationship between the resetting of BURSTEN and the deassertion of NO ARB.

In the example of FIGS. 29A-29C, C1, C2 and B2 receive bus requests in cycles 3, 6, and 7, respectively. When C1 receives its bus request in cycle 3, its Arbitration State Machine is in the IDLE state 442, its Master Mode Bit is in the !BIMODE mode, and the BUSY line is asserted. This causes the state machine to enter the WAIT CMD OVER state 462 ("WCO" in the C1 ARB. STATE row of FIG. 29A) at the start of cycle 4. In cycle 4, the combination of the !BIMODE state of the mode bit, the deassertion of BUSY ("!BUSY"), and the idle DIP lines ("IDLE") cause the arbitration state machine to make a transition to the WAIT 1, or W1, state at the beginning of cycle 5. In cycle 5, the combination of !BIMODE and BUSY cause the state machine to re-enter WAIT CMD OVER, or WCO, at the start of cycle 6.

At the start of cycle 6, the Master Mode Bits of the C1 and C2 COM devices are set to the BI Master Mode, or BIMODE, as is shown in the C1 and C2 BIMODE Waveforms. This results from the fact that when the Mode Bit Setting Routine of FIG. 10 in the COM chips of both C1 and C2 detects a busy-edge in cycle 2, it finds in the test at the top of Step 422 of FIG. 10 that both the data lines are active and that the information lines are idle. This results from the combination of a loop-back start and Arbitration Cycle which occur in cycle 2. As a result, Step 424 of FIG. 10 sets the Arbitration/Loop-Back Flag. Thus when the next busy-edge is detected in cycle 5, the test at the top of Step 416 of FIG. 10 finds that the Arbitration/Loop-Back Flag is currently set, causing Step 418 to set the Master Mode Bit to the BI Master Mode, or BIMODE, at the end of cycle 5.

Because the Master Mode Bit is in BIMODE in cycle 6, the Arbitration State Machine of C1 makes a transition from WCO, or WAIT CMD OVER, to WI, or WAIT 1, at the beginning of cycle 7. As can be seen from FIG. 11, when a transition is made from WCO to W1 as a result of BIMODE, the WANTBUS flip-flop is set, starting the continuous assertion of the NON-TRI-CYCLE NO ARB output of C1 from 75 to 175 nanosecond each cycle, as is shown in FIG. 29A. This assertion of NO ARB each cycle continues until the WANTBUS flip-flop is reset, which does not occur until after the COM device has arbitrated.

C1's Arbitration State Machine stays in W1 until cycle 10. This is because cycle 9 is the first cycle in which the conditions required for a subsequent transfer from W1 to the WAIT 2, or W2, state are meet. These conditions are the combination of deasserted BUSY and DIP lines, giving rise to the signals !BUSY and IDLE. As stated above, cycle 10 is an idle cycle between individual transactions of B1's block transactions. In cycle 10, C1's Arbitration State Machine finds that the DIP lines are idle, but that the NO ARB line, which is being continuously asserted during B1's block transaction is asserted at 50 nanoseconds into the cycle. This being the case the signal EARLY NO ARB is generated, rather than !EARLY_NO_ARB as is required for the transition from W2 to ARB CYCLE, the Arbitration Cycle state. Thus the state machines stays in W2 during cycles 11 and 12. In cycle 12, the activity on the DIP lines, causes the state machine to receive a !IDLE input. As a result, the state machine goes to W1 at the start of cycle 13.

The C1 Arbitration State Machine stays in W1 until cycle 16, because, the Master Mode Bit is in BIMODE, and thus, the state machine can not exit W1 until the cycle after it receives both !BUSY and IDLE. This does not occur until cycle 15, the first cycle after the B1's block transaction is complete. Thus, it is not until the start of cycle 16 that the state machine enters W2. In that cycle, the state machine detects an idle DIP, generating the IDLE signal. It also detects that NO ARB is not asserted 50 nanoseconds into the cycle 16, generating the !EARLY_NO_ARB signal, even though both C1 and C2 assert NO ARB from 75 to 175 nanoseconds in both cycles 15 and 16. As soon as the IDLE and !EARLY_NO_ARB signal are received in cycle 16, the ARBNEXT signal is generated to inform logic on C1's COM chip that the next cycle will be the Arbitration Cycle. Then at the start of cycle 17, C1's Arbitration State Machine enters ARB CYCLE ("AC") and the ARBCYC signal is generated to indicate to the logic on the C1 COM chip that the current cycle is the Arbitration Cycle. This causes C1 to arbitrate by asserting its arbitration bit on both the high and low priority halves of the COM data bus.

In the example of FIG. 29A, C2 receives a bus request in cycle 6. At this time its Master Mode Bit is in BIMODE and the DIP lines are not idle. As a result, C2's Arbitration State Machine makes a transition to W1 and starts the continuous assertion NO ARB from 75 to 175 nanoseconds each cycle at the start of cycle 7. C1 and C2 both have the same Arbitration State Machine 440, both monitor the same BUSY, IDLE and NO ARB signals from the COM bus, and both have the same value in their Master Mode Bits (with occasional brief exceptions which will be explained below). Thus from cycle 7 to 17 the Arbitration State Machine of C2 follows exactly the states of C1's state machine, which are described above. As a result, C1 and C2 both arbitrate on the same cycle, cycle 17.

According to Step 415 of FIG. 10, both C1 and C2 set their Master Mode Bit to the COM Master Mode, that is, !BIMODE at the very end of the cycle before they arbitrate, to indicate that a COM device will be the last device to have won the bus once the arbitration in the next cycle is complete.

In the example of FIGS. 29A-29C, it is assumed that C1 has a higher arbitration priority than C2. As a result, C1 wins the arbitration in cycle 17, causing its Arbitration State Machine to receive the WIN signal. This causes the machine to make a transition to the IDLE, or "I", state at the beginning of cycle 18. The C1 state machine stays in this I state until cycle 28, the cycle after it receives its next bus request. When the transition to the I state is made, ARBCYC is turned off, indicating that the Arbitration Cycle is over, and the continuous assertion of WANTBUS is turned off, ending the assertion of NO ARB every cycle under the control of the Arbitration State Machine. The WIN signal also causes C1's Master State Machine, which is not shown in the figures, to take control of the COM bus at the start of the next cycle, cycle 18, and to start performing a bus transaction. As is indicated in the Cycle Description row of FIG. 29A, this transaction has a Command/Address cycle in cycle 18, an Imbedded Arbitration Cycle in cycle 19, and four data cycles in cycles 20-23. C1's Master State Machine cause both BUSY and NON-TRI-CYCLE NO ARB to be asserted during cycles 18-22, that is during each of the cycles that C1's transaction is on the COM bus, except for its last data cycle. The NON-TRI-CYCLE NO ARB is asserted during C1's Command/Address cycle, cycle 18, because in the example of FIGS. 29A-29C both C1 and C2 are in the jamming mode.

When C2 loses the arbitration in cycle 17, the !WIN signal received by its Arbitration State Machine causes that state machine to make a transition to WC0 at the start of the next cycle. This transition also turns off ARBCYC and WANTBUS, turning off C2's NON-TRI-CYCLE NO ARB signal. C2's Arbitration State Machine stays in WC0 until cycle 24, because it cannot leave WC0 as long as both !BIMODE and BUSY are asserted. The state machine enters WAIT 0, or W0, at the start of cycle 24 because of the deassertion of BUSY during the previous cycle 23, the last data cycle of C1's transaction. In cycle 24, the combination of !BUSY and IDLE causes that state machine to enter W1 at the start of cycle 25. In cycle 25, !BUSY and IDLE cause the state machine to enter W2 and turn on WANTBUS at the start of cycle 26. Turning on WANTBUS causes C2's NON-TRI-CYCLE NO ARB signal to be asserted every cycle from cycle 26 through cycle 35, the cycle in which C2 next gets to arbitrate.

In the example, it is assumed that B2 receives a bus request in cycle 7. But according to the BI protocol, B2 is not allowed to arbitrate until the next cycle following a cycle in which NO ARB is not asserted. Thus B2 is prevented from arbitrating during cycles 7–15 by the continuous assertion of NO ARB during B1's block transaction. It is prevented from arbitrating in cycles 16–18 by the assertion of NO ARB in response to the WANTBUS signals generated by C1 and C2's Arbitration State Machines. In cycles 19–23 it is prevented from arbitrating by C1's assertion of NO ARB as a Bus Master in the COM jamming mode. Starting with cycle 23, however, neither B1, nor any of the Arbitration or Master State Machines of C1 or C2 are asserting NO ARB. But, in our example, C1 and C2 are in jamming mode, and thus, BI devices are prevented from arbitrating in two out of every three cycles by C1's and C2's TRI-CYCLE NO ARB signal, regardless or whether or not the NON-TRI-CYCLE NO ARB outputs of those COM devices are asserted. In the example, when the Master State Machine of C1 ceases asserting NO ARB in cycle 23, the tri-cycle component of the NO ARB signal asserted by C1 and C2 causes NO ARB to be asserted in cycles 23 and 24. Thus, the first time after B2 receives its bus request in cycle 7 that NO ARB is deasserted on the COM bus is cycle 25. As a result, B2 arbitrates in the next cycle, cycle 26. Since no other BI device arbitrates against B2 in that cycle, it wins the bus.

Cycles 23-26 of FIG. 29A provide an example of the fact, explained above with regard to FIG. 11, that, if that last device to control the bus is a COM device, COM Arbitration State Machines will allow BI devices at least one chance to arbitrate before they start the WANTBUS assertion of NO ARB. Note that C2's state machine causes three bus cycles to pass between C1's deassertion of its NON-TRI-CYCLE NO ARB signal on the last data cycle of its transaction, cycle 23, and the start of C2's WANTBUS generated NON-TRI-CYCLE NO ARB assertion on cycle 26. This allowance of three cycles, cycles 23, 24, and 25, without NON-TRI-CYCLE NO ARB assertion, assures that there will be one cycle, in this case cycle 25, in which the TRI-CYCLE NO ARB signal is deasserted, allowing BI devices a chance to arbitrate.

After B2 wins the bus in the arbitration of cycle 26, it becomes Bus Master in the next cycle, causing there to be a transaction with a Command/Address cycle in cycle 27, an Imbedded Arbitration Cycle in cycle 28, and four data cycles in cycles 29–32.

B2's transaction starting on cycle 27 illustrates how tri-cycle jamming normally prevent imbedded arbitration from occurring when a BI device is Bus Master. According to the BI protocol, a BI device starts its Command/Address cycle on the cycle immediately after the cycle in which it wins an arbitration, provided, as in this transaction, no other device is asserting the BUSY signal. Thus, in this case, the BI device deasserts NO ARB to allow for imbedded arbitration in the Command/Address cycle, cycle 27, which occurs exactly one cycle after it arbitrates in cycle 26, and exactly two cycles after cycle 25 in which the deassertion of NO AR allowed for that arbitration. But tri-cycle jamming's one-cycle-off-two-cycle-on assertion of NO ARB assures that, if NO ARB is deasserted on cycle 25 to allow a BI device to arbitrate and win the bus, NO ARB will be asserted in the resulting Command/Address cycle 27 two cycles late in which the BI device deasserts NO ARB to allow for imbedded arbitration. Thus, tri-cycle jamming will always prevent imbedded arbitration when a BI device takes control of the bus immediately after arbitrating.

Since tri-cycle jamming always prevents imbedded arbitration when a BI device takes control of the bus immediately after arbitrating, the only situation, during tri-cycle jamming, in which a BI device can ever become a Pending Master is when it arbitrates during the start of a Loop-Back transaction, such as is shown on cycle 2 of FIG. 29A. In this case, it is possible that tri-cycle jamming will fail to prevent imbedded arbitration, since the number of cycles between the deassertion of NO ARB that gives rise to the arbitration in which the BI device becomes a Pending Master and the subsequent Command/Address cycle depends on how many cycles the loop-back transaction keeps the BUSY line asserted, and, as far as we know, this number can vary. The Loop-Back Jamming Rules discussed above in FIG. 15 are provided to handle this situation. According to these rules when a COM device in jamming mode, such as C1 or C2, detect a cycle, such as cycle 2, in which a loop-back is starting and a BI arbitration is taking place, the device will assert NO ARB on the next busy-edge (cycle 5). This busy-edge will be the Command/Address cycle of the BI device which won the arbitration during the first cycle of the loop-back transaction. Asserting NO ARB during this Command/Address cycle prevents imbedded arbitration from taking place in the following Imbedded Arbitration Cycle, cycle 6. In FIG. 29A the NON-TRI-CYCLE NO ARB signals of C1 and C2 both are asserted during cycle 5. In fact, the NON-TRI-CYCLE NO ARB signal of C2 is asserted during this cycle only because of the Loop-Back Jamming Rule. As it turns out, however, this loop-back jamming is not needed in cycle 5 because B1's block transaction in cycles 5–14 continuously asserts NO ARB, making imbedded arbitration impossible in cycle 5, even without such Loop-Back jamming.

We left the discussion of the C2 Arbitration State Machine with the transition to state W2 at the start of cycle 26 which turned on WANTBUS. The !IDLE signal resulting in cycle 26 from B2's arbitration make the state machine transit to W1 at the start of cycle 27. The combination of !BIMODE on the Master Mode Bit and the BUSY signal generated by the start of B2's transaction in cycle 27 causes the state machine to enter WCO at the start of cycle 28. The C2 Arbitration State Machine, however, does not stay in WCO very long. This is because the busy-edge associated with B2's Command/Address cycle on cycle 27 is preceded by a BI Arbitration Cycle in which the bits in the top and bottom halves of the COM data bus do not match. As a result, at the end of cycle 27, the Master Mode Bits of both C1 and C2 are set to the BIMODE. The resulting BIMODE signal in cycle 28 causes the C2 Arbitration State Machine to enter W1 at the start of cycle 29. The state machine stays in W1 until cycle 34 shown in FIG. 29B, because it is not until cycle 33, the first cycle after the completion of B2's transaction, that both BUSY and the DIP lines are deasserted, as is required for a transition to W2. Once this transition is made to W2 at the start of cycle 34, the combination of the IDLE and !EARLY_NO_ARB, cause the state machine to enter ARB CYCLE, or AC, at the start of cycle 35.

In the example of FIG. 29A, C1 receives a bus request on cycle 27. During this cycle the Master Mode Bit is in !BIMODE and BUSY is asserted. This makes the C1 Arbitration State Machine enter WCO at the start of cycle 28. Thus at cycle 28 the C1 state machine is in the same state as the C2 state machine, and thus, from cycle 28 until after cycle 35 when C1 and C2 arbitrate, the behavior of the C1 Arbitration State Machine is exactly like that of the C2 state machine, just described.

Just before the start of cycle 35, shown in FIG. 29B, Step 415 of the Master Mode Bit Setting Routine shown in FIG. 10 sets the Master Mode Bits of both C1 and C2 to the !BIMODE, to indicate that a COM device will become Bus Master within about a cycle. In cycle 35, C1 and C2 arbitrate, and C1 wins, because it has the higher priority. The resulting WIN signal causes C1's Arbitration State Machine to return to the IDLE state, where it stays until cycle 44, and to turn off WANT-BUS. It also causes C1's Master State Machine to start performing C1's requested transaction on the COM bus starting in the next cycle, cycle 36. This transaction has a command address cycle in cycle 36, an Imbedded Arbitration Cycle in cycle 37 and a single data cycle in cycle 38.

The !WIN signal which C2 receives when it loses the arbitration in cycle 35 causes its Arbitration State Machine to enter the WCO state and to turn off its NON-TRI-CYCLE NO ARB assertion, starting with cycle 36. Because it is in !BIMODE, the state machine stays in WCO until the start of cycle 39, at which time it enters W0 as a result of the deassertion of BUSY on the previous cycle. The combination of IDLE and !BUSY in cycle 39 causes a transition to W1 at the start of cycle 40. This same combination during cycle 40 causes a transition to W2, and the turning on of WANTBUS and it associated assertion of the NON-TRI-CYCLE NO ARB, at the start of cycle 41. The combination of IDLE and !EARLY_NO_ARB in cycle 41 causes the C2 Arbitration State Machine to enter ARB CYCLE in cycle 42, causing C2 to arbitrate in that cycle.

Cycles 38–42 illustrate another example of a case in which a COM device, C2, in !BIMODE allows a three cycles opportunity (in cycles 38–40) in which NON-TRI-CYCLE NO ARB outputs are deasserted, so as to allow, even with tri-cycle jamming, at least one cycle in which no COM device will assert NO ARB. This insures that BI devices will have at least one cycle in which to arbitrate. As soon as these three cycles have passed, C2 starts its continuous assertion of NON-TRI-CYCLE NO ARB on cycle 41. Since no BI device arbitrates in cycle 41 in response to the deassertion of COM NO ARB signals in cycle 40, C2 arbitrates in cycle 42.

Since C2 is the only device arbitrating in cycle 42, it wins the arbitration and starts its transaction on the COM bus in the next cycle. In the example, this transaction comprises a COM-style atomic read-modify-write using burstmode, of the type discussed above with regard to TABLE TWO. This is the same type of atomic read-modify-write which is used in Steps 620 and 622 of the Delegated Interrupt Routine shown in FIG. 21A. In FIG. 29B, the READ of this read-modify-write includes a Command/Address cycle 43, an Imbedded Arbitration Cycle 44 and a single data cycle 45. The WRITE of this read-modify-write includes a Command/Address cycle 49, an Imbedded Arbitration Cycle 50, and a single data cycle 51. The three idle cycles 46–48 between the READ and WRITE result from the delay while the node's microprocessor processes the data read during the READ, before it writes that data back in the WRITE. In most situations the actual delay resulting from such manipulation of data by the node will take longer than three cycles shown in the example.

The one important difference between the read-modify-write shown in cycles 42–51 of FIG. 29B and that shown in TABLE TWO is that the read-modify-write in FIG. 29B deasserts its BURSTMODE before the data cycle of the write. This is evidenced in FIG. 29 by the deassertion of C2's NON-TRI-CYCLE NO ARB starting with the last data cycle of that write. This is the time that the NON-TRI-CYCLE NO ARB output of a write is deasserted in the absence of the assertion of either BURSTTMODE or DMA_REQUEST. In the transaction described in TABLE TWO the BURSTMODE signal is not deasserted until one or more cycles after the transaction complete or other summary code on the event lines has informed the node that the last transaction of the burst is complete. This is the time in which current COM nodes turn off BURSTMODE. It should be understood, however, that the BURSTMODE signal can be deasserted anytime after the Command/Address cycle of the last transaction in the burst. FIG. 29B, shows BURSTMODE being turned off early, since turning it off early would improve performance and enables more examples to be fit into FIGS. 29A–29C.

In the example of FIGS. 29A–29C, C1 and B1 receive bus requests in cycles 43 and 46, respectively, during C2's BURSTMODE read-modify-write. In cycle 43, when C1 receives the request, the Master Mode Bit is in the !BIMODE and BUSY is asserted. This causes C1's Arbitration State Machine to make a transition to WCO at the start of cycle 44. The !BIMODE and BUSY signals in cycle 44 keep the state machine in WCO through cycle 45. The deassertion of BUSY in cycle 45 causes the state machine to enter W0 in cycle 46. The state machine stays in W0 through cycle 49 because, during the three idle cycles 46–48 between individual transactions of C2's BURSTMODE, the COM parity line is asserted, generating a !IDLE signal, even though all the other DIP lines are, in fact, idle. The parity line is asserted because COM devices always assert the parity line when they are in burstmode and are not currently performing an individual transaction on the COM bus. The reassertion of BUSY in the Command/Address cycle 49 causes C1's Arbitration State Machine to re-enter WC0 in cycle 50. It stays in WC0 until the deassertion of BUSY in cycle 51 causes it to make a transition to W0 in cycle 52. The deassertion of both BUSY and the DIP lines causes it to make a transition to W1 at the start of cycle 53.

In cycle 53, B1, which receives a bus request in cycle 46, arbitrates. It does so because the previous cycle, 52, is the first cycle after the deassertion of the NON-TRI-CYCLE NO ARB signal by C2's burstmode transaction in which the tri-cycle jamming leaves the COM NO ARB signal deasserted. B1 wins this arbitration and performs a transaction on the COM bus in cycles 54–59. It can be seen that imbedded arbitration is prevented from occurring in this transaction by the assertion of the TRI-CYCLE NO ARB during B1's Command/Address cycle 54.

The activity on the DIP lines in cycle 53 caused by B1's arbitration keeps C1's Arbitration State Machine in W1 during cycle 54. The combination of !BIMODE and BUSY in cycle 54, makes the C1 state machine enter WC0 again during cycle 55. The busy-edge in cycle 54, which is preceded by BI arbitration in cycle 53, sets C1's and C2's Master Mode Bit to BIMODE at the very end of cycle 54. The resulting BIMODE signal in cycle 55 causes C1's state machine to enter W1, and start WANTBUS NO ARB assertion, starting with cycle 56. The C1 state machine stays in W1 until after the completion of B1's transaction in cycle 59. In cycle 60 the resulting combination of IDLE and !BUSY causes the C1 state machine it to enter W2 at the start of cycle 61 shown in FIG. 29C. The combination of IDLE and !EARLY_NO_ARB in cycle 61 cause the state machine to enter ARB CYCLE in cycle 62. Since C1 is the only device arbitrating in this cycle, its state machine receives a WIN signal. This causes the state machine to enter its IDLE state, in which it stays until after it receives its next bus request in cycle 84.

It should be noted that C1 and C2's Master Mode Bits have different states during cycles 62 and 63. This difference results from the fact that C1 knows that it, a COM device, is going to arbitrate by the end of cycle 61, and thus, is able to change its Master Mode Bit to the !BIMODE at that time. C2, on the other hand, since it is not arbitrating, doesn't know that a COM device has arbitrated until near the end of cycle 63 in which it detects the busy-edge of the Command/Address cycle following C1's arbitration. Thus, it is not able to make the corresponding change to its Master Mode Bit until the end of cycle 63. This two cycle difference in the change of the Master Mode Bit, however, is normally of little consequence.

After C1 wins Bus Mastership in cycle 62, it starts a DMA transaction of the type shown in TABLE THREE and FOUR. The DMA transaction shown in cycles 63–70, like that of TABLES THREE and FOUR, only has two data cycles per individual transaction and only two individual transaction for the purpose of brevity. As is stated above, however, each DMA transaction could have more data cycles per individual transaction and more individual transactions, so as to increase the overall data transfer rate of such DMA transactions. The first individual transaction of the DMA includes a Command/Address cycle 63, an Imbedded Arbitration Cycle 64, and two data cycles 65 and 66. The Command/Address cycle 67 of the second individual transaction of the DMA follows immediately after the last data cycle 66 of the first individual transaction. It is followed by an Imbedded Arbitration Cycle 68 and two data cycles 69 and 70.

As is illustrated in FIG. 29C, C1 asserts its NON-TRI-CYCLE NO ARB each cycle the DMA transaction is on the COM bus except the last data cycle of the last transaction. It also asserts the COM BUSY line during the individual transactions of the DMA as it would during normal transactions, that is, from the start of the Command/Address cycle up to, but not including, the start of the last data cycle of each individual transaction. This means that the BUSY line is not asserted on cycle 66, the last data cycle of the first individual transaction. It should be noted, however, that even if the data placed on the top and bottom halves of the COM data lines in cycle 66 does not match, the Master Mode Setting Routine of FIG. 10 will not respond to the busy-edge in cycle 67 by changing the state of the Master Mode Bit. This is because the test at the top of Step 426 shown in FIG. 10, requires that the BUSY line be deasserted on both the first and second cycles before a busy-edge in order for the value of the Master Mode Bit to be changed. The requirement that BUSY be deasserted two cycles before a busy-edge, insures that the last data cycle of an individual transaction of a DMA will not be confused with a BI arbitration.

In the example of FIG. 29C, C2 is shown as receiving a bus request in cycle 72. This is done to illustrate that, even if a COM device is in !BIMODE when it receives a bus request, as C2 is in cycle 72, its state machine will make a transition to W2 and start the WANTBUS NO ARB assertion in the next cycle, if the IDLE and WASIDLE signals indicate the DIP lines have been idle for two consecutive cycles. If, in the next cycle, as in cycle 73, IDLE and !EARLY_NO_ARB are generated, indicating that the DIP lines are again idle and that NO ARB is not asserted 50 nanoseconds into the bus cycle, the state machine will enter the ARB CYCLE on the subsequent cycle, as it does in cycle 74.

Thus, even if a COM device is in !BIMODE, it will arbitrate on the second cycle after it receives a bus request, if the bus was idle on the cycle before the request was received and stays idle for the next two cycles, provided no BI device asserts NO ARB. This still tends to insure that BI devices will get a chance to arbitrate, since the requirement of two idle cycles before turning on WANTBUS NO ARB assertion normally means that there will be three cycles, such as cycles 70–72, without NON-TRI-CYCLE NO ARB assertion before WANTBUS is turned on, and this means that, even with tri-cycle jamming, BI devices will have at least one opportunity to arbitrate.

In the example of FIG. 29C, C1 receives a bus request in cycle 84. This is used to illustrate that if a COM device in BIMODE receives a bus request during a cycle, such as cycle 84, in which the bus is idle, its Arbitration State Machine advances directly to W2, and starts the assertion of WANTBUS, at the start of the next cycle. If the next cycle, like cycle 85, has idle DIP lines and no assertion of NO ARB 50 nanoseconds into the cycle, the state machine causes the COM device to start arbitration on the subsequent cycle, as is shown in cycle 86. Thus if a COM device in BIMODE receives a bus request when the COM bus is idle, it will start to assert NO ARB on the next cycle, and, if the bus stays idle on that next cycle, it will arbitrate on the cycle after that.

Q. The Invention is not Limited to the Preferred Embodiment

It should be understood that the present invention is not limited to the particular features of the COM device described above. For example, the invention is not limited to use with the COM or BI protocols. Those skilled in the art of computer bus devices will understand that its concepts can be used in conjunction with other bus protocols as well. Accordingly, the present invention should not be considered to be limited by the description herein of the preferred embodiment, but rather should be interpreted in accordance with the following claims.

TABLE ONE
BCI BUS, AND RELATED COM BUS, BEHAVIOR
DURING READ AND WRITE TRANSACTIONS

```
-REQUEST CYCLE
    -COM
        -UNRELATED TO REQUESTED TRANSACTION
    -BCI
        -WHEN ATTEMPTED MASTER
            -NODE ASSERTS TRANSACTION_RE-
            QUEST
-ONE OR MORE PRE-ARBITRATION CYCLES
    -COM
        -WHEN ATTEMPTED MASTER
            -CHIP PERFORMS PRE-ARBITRATION BE-
            HAVIOR
    -BCI
        -WHEN ATTEMPTED MASTER
            -NODE ASSERTS TRANSACTION_RE-
            QUEST
-ARBITRATION CYCLE
    -COM
        -WHEN ATTEMPTED MASTER
            -CHIP ASSERTS ARBITRATION BIT ON
            BOTH HIGH AND LOW 16 BITS OF DATA
            LINES
    -BCI
        -WHEN ATTEMPTED MASTER
            -CHIP ASSERTS MASTER DATA ENABLE
            (MDE) INDICATING, SINCE RAK HAS NOT
            BEEN ASSERTED, THAT NODE IS TO
            PLACE COMMAND/ADDRESS INFOR-
            MATION ON BCI INFORMATION AND
            DATA LINES
            -NODE RESPONDS BY PUTTING
            COMMAND/ADDRESS ON BCI
            -CHIP LATCHES C/A INFORMATION ON T3
            -NODE ASSERTS TRANSACTION_RE-
            QUEST
    -WHEN ATTEMPTED MASTER
        -IF DEVICE LOSES ARBITRATION
            -IT GOES BACK TO PRE-ARBITRATION
            CYCLES, BUT DOES NOT RE-REQUEST
            COMMAND/ADDRESS FROM NODE
            DURING SUBSEQUENT ARBITRATION
            CYCLE
        -OTHERWISE
            -ADVANCE TO COMMAND/ADDRESS
            CYCLE
-COMMAND/ADDRESS CYCLE
    -COM
        -WHEN MASTER
            -CHIP ASSERTS COMMAND/ADDRESS
            INFORMATION RECEIVED FROM NODE
            LAST CYCLE
        -WHEN SLAVE
            -CHIP RESPONDS TO BUSY_EDGE AS AN
            INDICATION OF COMMAND/ADDRESS
            CYCLE AND PASSES THROUGH VALUES
            ON COM INFORMATION AND DATA
            LINES TO THE CORRESPONDING LINES
            OF THE BCI BUS
    -BCI
        -WHEN MASTER
            -CHIP ASSERTS RAK (AND CONTINUES TO
            ASSERT IT THROUGHOUT REST OF
```

TABLE ONE-continued
BCI BUS, AND RELATED COM BUS, BEHAVIOR
DURING READ AND WRITE TRANSACTIONS

```
            TRANSACTION), INDICATING THAT
            DEVICE HAS WON ARBITRATION AND
            THAT NODE SHOULD CONTINUE WITH
            TRANSACTION
            -NODE DEASSERTS TRANSACTION_RE-
            QUEST IN RESPONSE TO CHIP'S
            ASSERTION OF RAK
        -WHEN SLAVE
            -CHIP ASSERTS CLE TO INDICATE THAT
            THIS IS COMMAND/ADDRESS CYCLE
            -CHIP PLACES THE C/A VALUES ON COM
            INFORMATION AND DATA LINES
            THROUGH TO THE BCI NEAR END OF
            CYCLE
            -THE NODE LATCHES THESE C/A VALUES
-IMBEDDED ARBITRATION CYCLE
    -COM
        -WHEN JAMMING IS ON
            -CHIP ASSERTS ALL FOUR INFORMATION
            LINES PLUS PARITY BIT
        -WHEN MASTER WITH JAMMING OFF
            -CHIP ASSERTS FIRST BUS MASTER'S ID
            AND CORRESPONDING PARITY BIT ON
            INFORMATION AND PARITY LINES
    -BCI
        -WHEN MASTER IN WRITE
            -CHIP ASSERTS RAK, INDICATING IT HAS
            CONTROL OF THE BUS, MDE, INDI-
            CATING TO NODE THAT SINCE RAK IS
            ASSERTED THE NODE IS TO TRANSFER
            INFORMATION, AND NEXT, INDICATING
            NODE IS TO PERFORM NEXT DATA
            TRANSFER IN THIS CYCLE
            -NODE RESPONDS BY PUTTING D1 DATA
            ON BCI DATA AND INFORMATION LINES
            -CHIP THEN LATCHES THAT DATA
        -WHEN MASTER IN READ
            -CHIP ASSERTS RAK
        -WHEN SLAVE
            -CHIP ASSERTS
                -SEL LINE TO INDICATE DEVICE HAS
                BEEN SELECTED BY COMMAND/
                ADDRESS CYCLE IF IT HAS BEEN
                SELECTED
                -SC LINES TO INDICATE TYPE OF
                INSTRUCTION IF NOT ZERO RESERVE
                INSTRUCTION
            -WHEN READ
                -CHIP ASSERTS SLAVE DATA ENABLE
                LINE (SDE) TO INDICATE NODE
                SHOULD SUPPLY DATA ONTO BCI
                D AND I LINES
                -NODE RESPONDS BY PUTTING DATA
                ON BCI DATA LINES, STATUS ON
                INFORMATION LINES, AND AN ACK
                ON THE RS LINES
                -CHIP THEN LATCHES THAT DATA
            -WHEN SLAVE IN WRITE
                -NODE ASSERTS ACK ON RS LINES
                TO INDICATE READY TO ACCEPT
                DATA ON NEXT CYCLE
-DATA 1 CYCLE
    -COM
        -WHEN MASTER IN READ
            -CHIP LATCHES IN INFORMATION AND
            DATA LINES FROM COM
        -WHEN MASTER IN WRITE
            -CHIP ASSERTS THE DATA ON THE COM
            LINES THAT NODE PLACED ON BCI IN
            PRIOR CYCLE
        -WHEN SLAVE IN READ
            -CHIP ASSERTS
                -INFORMATION AND DATA LINES ON
                COM LINES THAT NODE PLACED ON
                BCI IN PRIOR CYCLE
                -CNF LINES IN RESPONSE TO SIGNAL
                ON THE BCI'S RS LINES IN THE LAST
                CYCLE
        -WHEN SLAVE IN WRITE
            -CHIP LATCHES IN INFORMATION AND
```

TABLE ONE-continued
BCI BUS, AND RELATED COM BUS, BEHAVIOR DURING READ AND WRITE TRANSACTIONS

```
            DATA LINES FROM COM
            -CHIP ASSERTS CNF SIGNALS BASED ON
             RS LINES ASSERTED BY NODE IN LAST
             CYCLE AND PARITY ON BUSES
    -BCI
        -WHEN SLAVE IN WRITE
            -CHIP ASSERTS VALUES FROM COM
             DATA LINES ON BCI DATA LINES NEAR
             END OF CYCLE
            -NODE HAS RESPONSIBILITY TO READ
             THESE DATA LINES BY END OF CYCLE
             IF IT ASSERTED ACK (THERE IS NO DATA
             STROBE)
        -WHEN MASTER
            -CHIP ASSERTS RAK
-1ST CYCLE AFTER DATA 1
    -COM
        -WHEN MASTER IN READ
            -CHIP ASSERTS 1ST POST DATA ACK ON
             CNF LINES TO INDICATE CORRECT
             RECEIPT OF DATA
        -WHEN MASTER IN WRITE
            -CHIP RECEIVES 1ST POST DATA ACK
             FROM SLAVE ON CNF LINES INDICATING
             SLAVE'S CORRECT RECEIPT OF DATA
        -WHEN SLAVE IN READ
            -CHIP RESPONDS TO MASTER'S 1ST POST
             DATA ACK
        -WHEN SLAVE IN WRITE
            -CHIP PLACES 1ST POST DATA ACK ON
             CNF LINES IF RECEIVED DATA PROPER-
             LY
    -BCI
        -WHEN MASTER IN READ
            -CHIP PUTS D1 ON BCI, AND STROBES
             NEXT
            -NODE RESPONDS BY LATCHING DATA
             FROM BCI ON LEADING EDGE OF NEXT
            -CHIP ASSERTS RAK
        -WHEN MASTER IN WRITE
            -CHIP ASSERTS RAK
        -WHEN SLAVE IN WRITE
            -CHIP PUTS DATA ON BCI INFORMATION
             AND DATE LINES
            -NODE LATCHES THAT DATA
-2ND CYCLE AFTER DATA 1
    -COM
        -WHEN MASTER IN READ
            -CHIP ASSERTS 2ND POST DATA ACK ON
             CNF LINES TO INDICATE CORRECT
             RECEIPT OF DATA AND PROPER PARITY
        -WHEN MASTER IN WRITE
            -CHIP RECEIVES 2ND POST DATA ACK
             FROM SLAVE ON CNF LINES INDICATING
             SLAVES CORRECT RECEIPT OF DATA
        -WHEN SLAVE IN READ
            -CHIP RESPONDS TO MASTER'S 2ND POST
             DATA ACK
        -WHEN SLAVE IN WRITE
            -CHIP PLACES 2ND POST DATA ACK ON
             CNF LINES IF RECEIVED DATA PROPER-
             LY
    -BCI
        -WHEN MASTER IN A READ
            -CHIP DEASSERTS RAK AT BEGINNING
             OF CYCLE AND SENDS TRANSACTION
             COMPLETE OR ERROR SUMMARY CODE
             ON EVENT LINES, COMPLETING TRANS-
             ACTION
        -WHEN MASTER IN WRITE
            -CHIP ASSERTS RAK
        -WHEN SLAVE IN READ
            -CHIP SENDS EVENT CODE TO NODE
             INDICATING RECEIPT OF SECOND POST
             DATA ACK
-3RD CYCLE AFTER DATA 1
    -BCI
        -WHEN MASTER OF WRITE
            -CHIP DEASSERTS RAK AT BEGINNING
             OF CYCLE AND SENDS TRANSACTION
```

TABLE ONE-continued
BCI BUS, AND RELATED COM BUS, BEHAVIOR DURING READ AND WRITE TRANSACTIONS

```
             COMPLETE OR ERROR SUMMARY CODE
             ON EVENT LINES, COMPLETING TRANS-
             ACTION
        -WHEN SLAVE IN READ
            -SENDS TRANSACTION COMPLETE OR
             ERROR SUMMARY CODE ON EVENT
             LINES, COMPLETING TRANSACTION
```

TABLE TWO
BCI BUS, AND RELATED COM BUS, BEHAVIOR DURING ATOMIC READ-MODIFY-WRITE TRANSACTION USING BURSTMODE

```
-REQUEST CYCLE
    -COM
        -UNRELATED TO RMW TRANSACTION
    -BCI
        -NODE ASSERTS TRANSACTION REQUEST
        -NODE TURNS ON DRIVER FOR CONTINU-
         ALLY ASSERTING BURSTMODE
-ONE OR MORE PRE-ARBITRATION CYCLES
    -COM
        -CHIP PERFORMS PRE-ARBITRATION BE-
         HAVIOR
    -BCI
        -NODE ASSERTS
            -BURSTMODE
            -TRANSACTION_REQUEST
-ARBITRATION CYCLE
    -COM
        -CHIP ASSERTS ARBITRATION BIT ON HIGH
         AND LOW 16 BITS OF DATA LINES
    -BCI
        -CHIP ASSERTS MASTER DATA ENABLE (MDE)
         INDICATING, SINCE RAK HAS NOT BEEN
         ASSERTED THAT NODE IS TO PLACE
         COMMAND/ADDRESS INFORMATION ON BCI
         I AND D LINES
        -NODE RESPONDS BY PUTTING COMMAND/
         ADDRESS OF A READ TRANSACTION ON BCI
        -CHIP LATCHES C/A INFORMATION ON T3
        -NODE ASSERTS
            -BURSTMODE
            -TRANSACTION_REQUEST
    -IF DEVICE LOSES ARBITRATION
        -IT GOES BACK TO PRE-ARBITRATION
         CYCLES, BUT DOES NOT RE-REQUEST
         COMMAND/ADDRESS FROM NODE DURING
         SUBSEQUENT ARBITRATION CYCLE
    -OTHERWISE
        -ADVANCE TO COMMAND/ADDRESS CYCLE
-READ COMMAND/ADDRESS CYCLE
    -COM
        -CHIP ASSERTS COMMAND/ADDRESS
         INFORMATION FOR READ WHICH IT RE-
         CEIVED FROM NODE ON PREVIOUS CYCLE
    -BCI
        -CHIP ASSERTS RAK (AND CONTINUES TO
         ASSERT IT THROUGH REST OF FIRST READ
         TRANSACTION), INDICATING THAT DEVICE
         HAS WON ARBITRATION AND THAT NODE
         SHOULD CONTINUE WITH TRANSACTION
        -NODE DEASSERTS TRANSACTION_REQUEST
         IN RESPONSE TO ASSERTION OF RAK
        -NODE ASSERTS BURSTMODE
-READ IMBEDDED ARBITRATION CYCLE
    -COM
        -CHIP ASSERTS ALL 4 INFORMATION LINES
         AND THE PARITY LINES
    -BCI
        -CHIP ASSERT RAK
        -NODE ASSERTS BURSTMODE
-READ DATA 1 CYCLE
    -COM
        -CHIP LATCHES IN INFORMATION AND DATA
         LINES FROM COM
        -SLAVE PUTS ACK ON COM
    -BCI
```

TABLE TWO-continued
BCI BUS, AND RELATED COM BUS, BEHAVIOR DURING ATOMIC READ-MODIFY-WRITE TRANSACTION USING BURSTMODE

```
            -CHIP ASSERTS RAK
            -NODE ASSERTS BURSTMODE
-1ST CYCLE AFTER READ DATA 1
    -COM
        -CHIP ASSERTS 1ST POST DATA ACK ON CNF
        LINES INDICATING CORRECT RECEIPT OF
        READ DATA
    -BCI
        -CHIP PUTS D1 ON BCI, AND STROBES NEXT
        -NODE RESPONDS BY LATCHING DATA
        FROM BCI
        -CHIP ASSERTS RAK
        -NODE ASSERTS BURSTMODE
-2ND CYCLE AFTER READ DATA 1
    -COM
        -CHIP PLACES 2ND POST DATA ACK ON CNF
        LINES INDICATING CORRECT RECEIPT OF
        READ DATA
    -BCI
        -CHIP
            -DEASSERTS RAK AT BEGINNING OF
            CYCLE
            -GENERATES TRANACTION COMPLETE
            CODE OR ERROR SUMMARY CODE ON
            EVENT LINES
        -NODE ASSERTS BURSTMODE
-CYCLES WHILE NODE DECIDES WHAT TO DO
    -IF DECIDES TO CONTINUE BURSTMODE
        -BCI
            -NODE
                -ADVANCES TO REQUEST CYCLE
                BELOW
                -ASSERTS BURSTMODE
    -OTHERWISE
        -BCI
            -NODE
                -DEASSERTS BURSTMODE
                -EXITS THIS BURSTMODE ROUTINE
-REQUEST CYCLE
    -BCI
        -NODE ASSERTS
            -TRANSACTION_REQUEST
            -BURSTMODE
-BCI COMMAND/ADDRESS CYCLE
    -BCI
        -CHIP ASSERTS MASTER DATA ENABLE
        (MDE) INDICATING, SINCE RAK HAS NOT
        BEEN ASSERTED THAT NODE IS TO PLACE
        COMMAND/ADDRESS INFORMATION ON BCI
        INFORMATION AND DATA LINES
        -NODE RESPONDS BY PUTTING COMMAND/
        ADDRESS FOR A WRITE ON BCI
        -CHIP LATCHES C/A INFORMATION IN ON T3
        -NODE ASSERTS
            -TRANSACTION_REQUEST
            -BURSTMODE
-WRITE COMMAND/ADDRESS CYCLE
    -COM
        -CHIP ASSERTS COMMAND/ADDRESS
        INFORMATION FOR A WRITE TRANSACTION
        WHICH IT RECEIVED FROM BCI IN PRE-
        VIOUS CYCLE
    -BCI
        -CHIP ASSERTS RAK (AND CONTINUES TO
        ASSERT IT THROUGHOUT REST OF TRANS-
        ACTION), INDICATING THAT DEVICE HAS
        CONTROL OF BUS AND THAT NODE SHOULD
        CONTINUE WITH TRANSACTION
        -NODE DEASSERTS TRANSACTION_REQUEST
        IN RESPONSE TO RAK
        -NODE ASSERTS BURSTMODE
-WRITE IMBEDDED ARBITRATION CYCLE
    -COM
        -CHIP ASSERTS ALL INFORMATION AND
        PARITY LINES
    -BCI
        -CHIP ASSERTS RAK, INDICATING IT HAS
        CONTROL OF THE BUS, MDE, INDICATING
        TO NODE THAT SINCE RAK IS ASSERTED
        THE NODE IS TO TRANSFER INFORMATION,
        AND NEXT, INDICATING NODE IS TO PER-
        FORM NEXT DATA TRANSFER IN THIS
        CYCLE
        -NODE RESPONDS BY PUTTING D1 DATA ON
        BCI DATA LINES
        -CHIP THEN LATCHES THAT DATA
        -NODE ASSERTS BURSTMODE
-WRITE DATA 1 CYCLE
    -COM
        -SLAVE ASSERTS ACK ON CNF TO INDICATE
        READY TO RECEIVE DATA
        -CHIP ASSERTS THE D1 DATA ON COM DATA
        LINES WHICH IT RECEIVED FROM THE
        NODE IN THE PRIOR CYCLE
    -BCI
        -CHIP ASSERTS RAK
        -NODE ASSERTS BURSTMODE
-1ST CYCLE AFTER WRITE DATA 1
    -COM
        -SLAVE ASSERTS 1ST POST DATA ACK IF IT
        RECEIVED DATA PROPERLY
    -BCI
        -CHIP ASSERTS RAK
        -NODE ASSERTS BURSTMODE
-2ND CYCLE AFTER WRITE DATA 1
    -COM
        -SLAVE ASSERTS 2ND POST DATA ACK ON
        CNF LINES IF IT RECEIVED DATA PROPERLY
    -BCI
        -CHIP ASSERTS RAK
        -NODE ASSERTS BURSTMODE
-3RD CYCLE AFTER WRITE DATA 1
    -COM
        -NOTHING RELATING TO RMW TRANSACTION
    -BCI
        -CHIP
            -DEASSERTS RAK AT BEGINNING OF
            CYCLE
            -ASSERTS TRANSACTION COMPLETE OR
            ERROR SUMMARY CODE ON EVENT LINES
            ENDING TRANSACTION
        -NODE ASSERTS BURSTMODE
-4th OR SUBSEQUENT CYCLE AFTER WRITE DATA 1
    -COM
        -NOTHING RELATING TO RMW TRANSACTION
    -BCI
        -NODE DEASSERTS BURSTMODE AND
        TRANSACTION IS COMPLETE
```

TABLE THREE
BCI BUS, AND RELATED COM BUS, BEHAVIOR DURING DMA WRITE TRANSACTION

```
-CYCLES PRIOR TO REQUEST CYCLE
    -NODE SETS UP ITS DMA STATE MACHINE TO
    PERFORM SPECIFIED NUMBER OF WRITE
    TRANSACTIONS STARTING AT SPECIFIED
    ADDRESS
-REQUEST CYCLE
    -COM
        -NOT INVOLVED IN DMA TRANSACTION
    -BCI
        -NODE STARTS CONTINOUS ASSERTION OF
        DMA_REQUEST
-ONE OR MORE PRE-ARBITRATION CYCLE
    -COM
        -CHIP PERFORMS PRE-ARBITRATION
        ROUTINE
    -BCI
        -NODE CONTINUES TO ASSERT DMA_RE-
        QUEST
-ARBITRATION CYCLE
    -COM
        -CHIP ASSERTS DEVICE'S ARBITRATION BIT
        ON BOTH HIGH AND LOW 16 BITS OF DATA
        LINES
```

TABLE THREE-continued
BCI BUS, AND RELATED COM BUS, BEHAVIOR DURING DMA WRITE TRANSACTION

- -BCI
  - -CHIP ASSERTS MDE, WHICH INDICATES, SINCE RAK HAS NOT BEEN ASSERTED, THAT THE NODE IS TO PLACE COMMAND/ADDRESS INFORMATION ON BCI I AND D LINES
  - -NODE RESPONDS BY PUTTING COMMAND/ADDRESS FOR A WRITE TO A GIVEN ADDRESS ON BCI
  - -CHIP LATCHES COMMAND/ADDRESS INTO ITS MASTER COMMAND AND MASTER ADDRESS REGISTERS ON T3
  - -NODE CONTINUES TO ASSERT DMA_REQUEST
- -IF DEVICE LOSES ARBITRATION
  - -IT GOES BACK TO PRE-ARBITRATION CYCLES, BUT DOES NOT RE-REQUEST COMMAND/ADDRESS FROM NODE DURING SUBSEQUENT ARBITRATION CYCLE
- -OTHERWISE
  - -ADVANCE TO COMMAND/ADDRESS CYCLE
- -COMMAND/ADDRESS CYCLE
  - -COM
    - -CHIP ASSERTS COMMAND/ADDRESS INFORMATION STORED IN ITS MASTER COMMAND AND MASTER ADDRESS REGISTERS
  - -BCI
    - -CHIP STARTS CONTINUOUS ASSERTION OF RAK, INDICATING THAT DEVICE HAS CONTROL OF BUS
    - -NODE CONTINUES TO ASSERT DMA_REQUEST
- -IMBEDDED ARBITRATION CYCLE
  - -COM
    - -CHIP ASSERTS ALL INFORMATION AND PARITY LINES
  - -BCI
    - -CHIP ASSERTS MDE, INDICATING TO NODE THAT SINCE RAK IS ASSERTED THE NODE IS TO TRANSFER INFORMATION, AND NEXT, INDICATING NODE IS TO PERFORM NEXT DATA TRANSFER IN THIS CYCLE
    - -NODE RESPONDS BY PUTTING D1 DATA ON BCI DATA LINES
    - -CHIP LATCHES D1 DATA INTO ITS DATA AND INFORMATION REGISTERS
    - -NODE CONTINUES TO ASSERT DMA_REQUEST
    - -CHIP CONTINUES TO ASSERT RAK
- -DATA 1 CYCLE
  - -COM
    - -SLAVE ASSERTS ACK ON CNF LINES TO ACCEPT D1 DATA
    - -CHIP ASSERTS D1 DATA ON COM INFORMATION AND DATA LINES
  - -BCI
    - -CHIP ASSERTS
      - -MDE AND
      - -NEXT
    - -NODE RESPONDS BY PUTTING D2 DATA ON BCI DATA AND INFORMATION LINES
    - -CHIP LATCHES D2 DATA INTO ITS DATA AND INFORMATION REGISTERS (CHIP CAN ASSERT D1 AND LATCH D2 IN THE SAME CYCLE BECAUSE IT HAS TWO SEPARATE DATA LATCHES)
    - -NODE CONTINUES TO ASSERT DMA_REQUEST
    - -CHIP CONTINUES TO ASSERT RAK
- -DATA 2 CYCLE
  - -COM
    - -SLAVE ASSERTS ACK ON CNF LINES TO SIGNAL READY TO ACCEPT D2
    - -CHIP ASSERTS D2 DATA ON COM INFORMATION AND DATA LINES
  - -BCI
    - -NODE CONTINUES TO ASSERT DMA_REQUEST
    - -CHIP CONTINUES TO ASSERT RAK

TABLE THREE-continued
BCI BUS, AND RELATED COM BUS, BEHAVIOR DURING DMA WRITE TRANSACTION

- -COMMAND/ADDRESS CYCLE
  - -COM
    - -CHIP ASSERTS COMMAND/ADDRESS INFORMATION STORED IN ITS MASTER COMMAND AND MASTER ADDRESS REGISTERS, WITH ADDRESS INCREMENTED BY ON-CHIP LOGIC
    - -SLAVE SENDS 1ST POST-DATA ACK
  - -BCI
    - -NODE CONTINUES TO ASSERT DMA_REQUEST
    - -CHIP CONTINUES TO ASSERT RAK
- -IMBEDDED ARBITRATION CYCLE
  - -COM
    - -CHIP ASSERTS ALL INFORMATION AND PARITY LINES
    - -SLAVE SENDS 2ND POST-DATA ACK
  - -BCI
    - -CHIP ASSERTS
      - -MDE, INDICATING NODE IS TO TRANSFER INFORMATION, SINCE RAK IS ASSERTED
      - -NEXT, INDICATING NODE IS TO PERFORM NEXT DATA TRANSFER IN THIS CYCLE
    - -NODE RESPONDS BY PUTTING D1 DATA ON BCI DATA LINES
    - -CHIP LATCHES D1 DATA INTO ITS DATA AND INFORMATION REGISTERS
    - -NODE DEASSERTS DMA_REQUEST TO INDICATE CHIP IS TO END THE SUCCESSION OF DMA TRANSACTIONS AFTER THIS CURRENT TRANSACTION (BUT DON'T HAVE TO UNTIL BEFORE 150 NS DURING LAST DATA CYCLE, AT TAIL END OF R CLOCK)
    - -CHIP CONTINUES TO ASSERT RAK
- -DATA 1 CYCLE
  - -COM
    - -SLAVE ASSERTS ACK INDICATING READY TO RECEIVE DATA
    - -CHIP ASSERTS D1 DATA ON COM INFORMATION AND DATA LINES
  - -BCI
    - -CHIP ASSERTS
      - -MDE AND
      - -NEXT
    - -NODE RESPONDS BY PUTTING D2 DATA ON BCI DATA AND INFORMATION LINES
    - -CHIP LATCHES D2 DATA INTO ITS DATA AND INFORMATION REGISTERS
    - -CHIP CONTINUES TO ASSERT RAK
- -DATA 2 CYCLE
  - -COM
    - -SLAVE ASSERTS ACK INDICATING READY TO RECEIVE DATA
    - -CHIP ASSERTS D2 DATA ON COM INFORMATION AND DATA LINES
  - -BCI
    - -CHIP CONTINUES TO ASSERT RAK
- -CYCLE AFTER DATA 2
  - -COM
    - -SLAVE ASSERTS 1ST POST-DATA ACK
  - -BCI
    - -(CHIP MAY INDICATE ERROR ON EVENT LINES IF 1ST POST-DATA ACK NOT RECEIVED FROM SLAVE, OTHERWISE, THIS ACK GOES INTO FORMULATION OF TRANSACTION COMPLETE EVENT CODE BY CHIP IF NO ERROR)
    - -CHIP CONTINUES TO ASSERT RAK
- -2ND CYCLE AFTER DATA 2
  - -COM
    - -SLAVE ASSERTS 2ND POST-DATA ACK
  - -BCI
    - -(CHIP MAY INDICATE ERROR ON EVENT LINES IF 2ND POST-DATA ACK NOT RECEIVED FROM SLAVE, OTHERWISE, THIS ACK GOES INTO FORMULATION OF TRANSACTION COMPLETE EVENT CODE BY CHIP IF NO ERROR)

TABLE THREE-continued
BCI BUS, AND RELATED COM BUS, BEHAVIOR DURING DMA WRITE TRANSACTION -CHIP CONTINUES TO ASSERT RAK
-3RD CYCLE AFTER DATA 2
    -COM
        -UNRELATED TO TRANSACTION
    -BCI
        -CHIP
            -DEASSERTS RAK AT BEGINNING OF
                CYCLE (0 NS)
            -ASSERTS TRANSACTION COMPLETE OR
                SUMMARY ERROR CODE ON EVENT LINES,
                COMPLETING TRANSACTION

TABLE FOUR
BCI BUS, AND RELATED COM BUS, BEHAVIOR DURING DMA READ TRANSACTION

-CYCLES PRIOR TO REQUEST CYCLE
    -NODE SETS UP ITS DMA STATE MACHINE TO
        PERFORM SPECIFIED NUMBER OF READ TRANS-
        ACTIONS STARTING AT SPECIFIED ADDRESS
-REQUEST CYCLE
    -COM
        -NOT INVOLVED IN DMA TRANSACTION
    -BCI
        -NODE STARTS CONTINOUS ASSERTION OF
            DMA_REQUEST
-ONE OR MORE PRE-ARBITRATION CYCLES
    -COM
        -CHIP PERFORMS PRE-ARBITRATION
            ROUTINE
    -BCI
        -NODE CONTINUES TO ASSERT DMA_RE-
            QUEST
-ARBITRATION CYCLE
    -COM
        -CHIP ASSERTS DEVICE'S ARBITRATION BIT
            ON BOTH HIGH AND LOW 16 BITS OF DATA
            LINES
    -BCI
        -CHIP ASSERTS MDE, WHICH INDICATES,
            SINCE RAK HAS NOT BEEN ASSERTED, THAT
            THE NODE IS TO PLACE COMMAND/
            ADDRESS INFORMATION ON BCI I AND D
            LINES
        -NODE RESPONDS BY PUTTING COMMAND/
            ADDRESS FOR A READ ON BCI
        -CHIP LATCHES COMMAND/ADDRESS INTO
            ITS MASTER COMMAND AND MASTER
            ADDRESS REGISTERS ON T3
        -NODE CONTINUES TO ASSERT DMA_RE-
            QUEST
    -IF DEVICE LOSES ARBITRATION
        -IT GOES BACK TO PRE-ARBITRATION
            CYCLES, BUT DOES NOT RE-REQUEST
            COMMAND/ADDRESS FROM NODE DURING
            SUBSEQUENT ARBITRATION CYCLE
    -OTHERWISE
        -ADVANCE TO COMMAND/ADDRESS CYCLE
-COMMAND/ADDRESS CYCLE
    -COM
        -CHIP ASSERTS COMMAND/ADDRESS
            INFORMATION STORED IN ITS MASTER
            COMMAND AND MASTER ADDRESS REGIS-
            TERS
    -BCI
        -CHIP STARTS CONTINOUS ASSERTION OF
            RAK, INDICATING THAT DEVICE HAS CON-
            TROL OF BUS
        -NODE CONTINUES TO ASSERT DMA_RE-
            QUEST
-IMBEDDED ARBITRATION CYCLE
    -COM
        -CHIP ASSERTS ALL INFORMATION AND
            PARITY LINES
    -BCI
        -NODE CONTINUES TO ASSERT DMA_RE-
            QUEST
        -CHIP CONTINUES TO ASSERT RAK

TABLE FOUR-continued
BCI BUS, AND RELATED COM BUS, BEHAVIOR DURING DMA READ TRANSACTION -DATA 1 CYCLE
    -COM
        -SLAVE ASSERTS ACK TO INDICATE READY
            TO PERFORM READ
        -CHIP LATCHES D1 DATA PUT ON COM
            INFORMATION AND DATA LINES BY SLAVE
            INTO ITS DATA AND INFORMATION
            REGISTERS
    -BCI
        -NODE CONTINUES TO ASSERT DMA_RE-
            QUEST
        -CHIP CONTINUES TO ASSERT RAK
-DATA 2 CYCLE
    -COM
        -SLAVE ASSERTS ACK TO INDICATE READY
            TO PERFORM THIS CYCLE
        -CHIP LATCHES D2 DATA PUT ON COM
            INFORMATION AND DATA LINES BY SLAVE
    -BCI
        -CHIP
            -ASSERTS NEXT (BUT NOT MDE, SINCE
                MDE IS USED TO INDICATE DATA IS TO
                COME FROM NODE)
            -PUTS D1 DATA ON BCI DATA AND
                INFORMATION LINES
        -NODE RESPONDS BY LATCHING D1 DATA
        -NODE CONTINUES TO ASSERT DMA_RE-
            QUEST
        -CHIP CONTINUES TO ASSERT RAK
-COMMAND/ADDRESS CYCLE
    -COM
        -CHIP ASSERTS COMMAND/ADDRESS
            INFORMATION STORED IN ITS MASTER
            COMMAND AND MASTER ADDRESS REG-
            ISTERS AS INCREMENTED BY ON-CHIP
            LOGIC
        -CHIP ASSERTS 1ST POST-DATA ACK TO INDI-
            CATE PROPER RECEIPT OF READ DATA
    -BCI
        -CHIP
            -ASSERTS NEXT
            -PUTS D2 DATA ON BCI DATA AND
                INFORMATION LINES
        -NODE RESPONDS BY LATCHING D2 DATA
        -NODE CONTINUES TO ASSERT DMA_RE-
            QUEST
        -CHIP CONTINUES TO ASSERT RAK
-IMBEDDED ARBITRATION CYCLE
    -COM
        -CHIP ASSERTS ALL INFORMATION AND
            PARITY LINES
        -CHIP ASSERTS 2ND POST-DATA ACK TO IN-
            DICATE PROPER RECEIPT OF READ DATA
    -BCI
        -NODE DEASSERTS DMA_REQUEST TO
            INDICATE THAT THE SUCCESSION OF DMA
            TRANSACTIONS IS TO END AFTER THIS
            CURRENT TRANSACTION (BUT COULD WAIT
            UP UNTIL BEFORE 150 NS IN LAST DATA
            CYCLE TO MAKE THIS DEASSERTION)
        -CHIP CONTINUES TO ASSERT RAK
-DATA 1 CYCLE
    -COM
        -CHIP
            -ASSERTS ACK ON CNF LINES TO INDI-
                CATE READY TO ACCEPT D1
            -LATCHES D1 DATA PUT ON COM INFOR-
                MATION AND DATA LINES BY SLAVE
                INTO ITS DATA AND INFORMATION
                REGISTERS
    -BCI
        -CHIP CONTINUES TO ASSERT RAK
-DATA 2 CYCLE
    -COM
        -CHIP
            -ASSERTS ACK ON CNF TO INDICATE
                READY TO ACCEPT D2
            -LATCHES D2 DATA PUT ON COM INFOR-
                MATION AND DATA LINES BY SLAVE
    -BCI TABLE FOUR-continued

BCI BUS, AND RELATED COM BUS, BEHAVIOR DURING DMA READ TRANSACTION

```
    -CHIP
        -ASSERTS NEXT
        -PUTS D1 DATA ON BCI DATA AND IN-
           FORMATION LINES
        -NODE RESPONDS BY LATCHING D1 DATA
        -CHIP CONTINUES TO ASSERT RAK
-CYCLE AFTER DATA 2
    -COM
        -CHIP ASSERTS A 1ST POST-DATA ACK
           TO INDICATE PROPER RECEIPT OF DATA
    -BCI
        -CHIP
            -ASSERTS NEXT
            -PUTS D2 ON BCI DATA AND INFOR-
               MATION LINES
            -NODE RESPONDS BY LATCHING D2 DATA
            -CHIP CONTINUES TO ASSERT RAK
-2ND CYCLE AFTER DATA 2
    -COM
        -CHIP ASSERTS A 2ND POST-DATA ACK TO
           INDICATE PROPER RECEIPT OF DATA
    -BCI
        -CHIP
            -DEASSERTS RAK AT VERY BEGINNING
               OF CYCLE
            -ASSERTS TRANSACTION COMPLETE OR
               ERROR SUMMARY ON EVENT LINES
```

What We claim is:

1. A bus device of a first type which uses a first-type bus communications protocol, and which is designed for use in a computer system having a system bus which has a plurality of bus lines, including confirmation lines for carrying ACK, NO ACK, STALL, and RETRY signals, and one or more other bus devices connected to the system bus, including possible additional first-type bus devices and one or more bus devices of a second type, which second-type devices use a second bus communications protocol according to which:

when a device which acts as a master in a system bus transaction addresses such a transaction to another device on the system bus which is to act as the responding, or slave, device in the transaction, the slave device is given a specified period in which to perform a function specified by the transaction;

if the slave device determines it can perform the specified function within the specified period it places an ACK signal on the system bus;

the master device responds to said ACK signal by proceeding with the transaction;

if the slave device determines it will be able to complete the specified function, but only after one of a first class of delays, it places a STALL signal on the system bus;

the master device responds to said STALL signal by extending the transaction of which it is master so as to accommodate said delay in the performance of said specified function by said slave;

if the slave device is absent from the bus or determines it cannot perform the specified function, the slave device will not assert any of said confirmation lines, which lack of assertion is equivalent to said NO ACK signal;

the master responds to said NO ACK signal by terminating the transaction in a first manner;

if the slave determines it will be able to complete the specified function, but only after one of a second class of delays, where said delays of said second class are generally longer than delays of said first class, the slave places a RETRY signal on the system bus;

the master device responds to said RETRY signal by terminating the transaction in a second manner and then attempting to repeat the transaction later; and when the slave device places a STALL signal on the system bus to extend a transaction, it monitors how long it asserts that STALL signal on the system bus, and, if it has been asserting that signal for over a specified length of time, it replaces that STALL signal with a RETRY signal;

said first-type bus device comprising:

a bus interface integrated circuit;

circuitry which is not in said integrated circuit, but which communicates to the system bus through said integrated circuit, said circuitry being collectively called the node;

a bus, called the node bus, which connects the interface integrated circuit with said node, said node bus including event lines for carrying event codes, information lines for carrying, among other things, command information, and data lines for carrying, among other things, address information;

means in said node for generating a bus request signal on said node bus;

means in said node for placing command and address information on said node bus;

command and address registers in said integrated circuit for storing said command and address information placed on said node bus by said node;

means in said integrated circuit for enabling said integrated circuit to be in a retry-mode;

means in said integrated circuit for enabling said integrated circuit to be in a non-retry mode;

non-retry mode means in said integrated circuit for, when said integrated circuit is in said non-retry mode, responding to a bus request signal from said node by:

placing a signal on said node bus which prompts the node to place command and address information on said node bus;

storing that command and address information in said command and address registers;

arbitrating for control of the system bus; and once said integrated circuit has obtained control of the system bus and, thus, has become bus master, placing the command and address information stored in said command and address registers on the system bus to identify which of the devices on the system bus is to respond to the bus master's transaction as the slave device, and to identify the function the slave device is to perform;

retry mode means in said integrated circuit for, when said integrated circuit is in said retry mode, responding to a bus request from said node by:

arbitrating for control of the system bus; and once said integrated circuit has obtained control of the system bus and, thus, has become bus master, placing the command and address information placed in said command and address registers when the integrated circuit was last in the non-retry mode on the system bus to identify which of the devices on the system bus is to respond to the bus master's transaction as the slave device, and to identify the function the slave device is to perform;

means in said integrated circuit for responding to an ACK signal on said confirmation lines of said system bus, and to a MASTER ABORT signal on said node bus, by setting said integrated circuit to said non-retry mode;

means in said integrated circuit for responding in the same manner to both a NO ACK or RETRY signal on said confirmation lines of said system bus, that is by:
terminating said integrated circuit's participation in the current transaction and placing an EVENT-LINES-RETRY signal on said event lines of said node bus; and
setting said integrated circuit to said retry mode;

means in said node for keeping a retry count;

means in said node for responding to said EVENT-LINES-RETRY signal on the event lines of said node bus by:
terminating said node's participation in the transaction during which said EVENT-LINES-RETRY signal is placed on the node bus;
incrementing said retry count;
checking if the retry count has met a predetermined limit;
generating a bus request on said node bus if the count is less than a predetermined limit, which will cause the integrated circuit, which is in retry mode to attempt to repeat the transaction during which the EVENT-LINES-RETRY signal was placed on the node bus;
placing a MASTER ABORT signal on the node bus, if the count is more than or equal to said predetermined limit; -means on said integrated circuit for responding to the placement of a MASTER ABORT signal on the node bus by setting the integrated circuit to said non-retry state;

means in said integrated circuit for generating a transaction complete signal on said event lines when said integrated circuit receives a predetermined number of ACK signals on the system bus indicating that it has completed a transaction properly;

means in said node for resetting said retry count in response to said transaction complete signal; and means for acting as a slave in a bus transaction in which one of said second-type bus devices is the bus master, which transaction experts the slave to perform a specified function within a specified period, said means for acting as said slave including;

means in said integrated circuit for placing an ACK on the system bus when said integrated circuit determines said first-type device can perform said specified function in said specified period;

means in said integrated circuit for placing a NO ACK signal on the system bus when said integrated circuit determines said first-type device cannot perform said specified function;

means in said integrated circuit for placing a STALL signal on he system bus when said integrated circuit determines said first-type device will be able to complete the transaction, but only after one of a third class of delays;

means in said integrated circuit for placing a RETRY signal on the system bus when said integrated circuit determines said first-type device will be able to complete the transaction, but only after one of a fourth class of delays, where said delays of said fourth class are are generally longer than delays of said third class; and wherein said bus device does not include any means for replacing on said system bus, during a transaction in which the first-type device is a slave device, a STALL signal with a RETRY signal.

2. A bus device of a first type which uses a first-type bus communications protocol, and which is designed for use in a computer system having a system bus which has a plurality of bus lines, including confirmation lines for carrying ACK, NO ACK, STALL, and RETRY signals, and one or more other bus devices connected to the system bus, including possible additional first-type bus devices and one or more bus devices of a second type, which second-type devices use a second bus communications protocol according to which:

when a device which acts as a master in a system bus transaction addresses such a transaction to another device on the system bus which is to act as the responding, or slave, device in the transaction, the slave device is given a specified period in which to perform a function specified by the transaction;

if the slave device determines it can perform the specified function within the specified period it places an ACK signal on the system bus;

the master device responds to said ACK signal by proceeding with the transaction;

if the slave device determines it will be able to complete the specified function, but only after one of a first class of delays, it places a STALL signal on the system bus;

the master device responds to said STALL signal by extending the transaction of which it is master so as to accommodate said delay in the performance of said specified function by said slave;

if the slave device is absent from the bus or determines it cannot perform the specified function, the slave device will not assert any of said confirmation lines, which lack of assertion is equivalent to said NO ACK signal;

the master responds to said NO ACK signal by terminating the transaction in a first manner;

if the slave determines it will be able to complete the specified function, but only after one of a second class of delays, where said delays of said second class are generally longer than delays of said first class, the slave places a RETRY signal on the system bus; and the master device responds to said RETRY signal by terminating the transaction in a second manner and then attempting to repeat the transaction later;

said first-type bus device comprising:
a bus interface integrated circuit;
circuitry which is not in said integrated circuit, but which communicates to the system bus through said integrated circuit, said circuitry being collectively called the node;
a bus, called the node bus, which connects the interface integrated circuit with said node, said node bus including event lines for carrying event codes, information lines for carrying, among other things, command information, and data lines for carrying, among other things, address information;

means in said node for generating a bus request signal on said node bus;

means in said node for placing command and address information on said node bus;

command and address registers in said integrated circuit for storing said command and address information placed on said node bus by said node;

means in said integrated circuit for enabling said integrated circuit to be in a retry-mode;

means in said integrated circuit for enabling said integrated circuit to be in a non-retry mode;

non-retry mode means in said integrated circuit for, when said integrated circuit is in said non-retry mode, responding to a bus request signal from said node by:

placing a signal on said node bus which prompts the node to place command and address information on said node bus;

storing that command and address information in said command and address registers;

arbitrating for control of the system bus; and once said integrated circuit has obtained control of the system bus and, thus, has become bus master, placing the command address information stored in said command and address registers on the system bus to identify which of the devices on the system bus is to respond to the bus master's transaction as the slave device, and to identify the function the slave device is to perform;

retry mode means in said integrated circuit for, when said integrated circuit is in said retry mode, responding to a bus request from said node by:

arbitrating for control of the system bus; and once said integrated circuit has obtained control of the system bus and, thus, has become bus master, placing the command and address information placed in said command and address registers when the integrated circuit was last in the non-retry mode on the system bus to identify which of the devices on the system bus is to respond to the bus master's transaction as the slave device, and to identify the function the slave device is to perform;

means in said integrated circuit for responding to an ACK or STALL signal on said confirmation lines of said system bus, and to a MASTER ABORT signal on said node bus, by setting said integrated circuit to said non-retry mode;

means in integrated circuit for responding in the same manner to both a NO ACK or RETRY signal on said confirmation lines of said system bus, that is by:

terminating said integrated circuit 's participation in the current transaction and placing an EVENT-LINES-RETRY signal on said event lines of said node bus; and setting said integrated circuit to said retry mode;

means in said node for keeping a retry count;

means in said node for responding to said EVENT-LINES-RETRY signal on the event lines of said node bus by:

terminating said node's participation in the transaction during which said EVENT-LINES-RETRY signal is placed on the node bus);

incrementing said retry count;

checking if the retry count has met a predetermined limit;

generating a BUS REQUEST on said node bus if the count is less tan a predetermined limit, which will cause the integrated circuit, which is in retry mode to attempt to repeat the transaction during which the EVENT-LINES-RETRY signal was placed on the node bus;

placing a MASTER ABORT signal on the node bus, if the count is more than or equal to said predetermined limit; -means on said integrated circuit for responding to the placement of a MASTER ABORT signal on the node bus by setting the integrated circuit to said non-retry state;

means in said integrated circuit for generating a transaction complete signal on said event lines when said integrated circuit receives a predetermined number of ACK signals on the system bus indicating that it has completed a transaction properly;

means in said node for resetting said retry count in response to said transaction complete signal.

3. A bus device of a first type which uses a first bus communications protocol, and which is designed for use in a computer system having a bus, comprising a plurality of bus lines, including lines for carrying ACK, NO ACK, and RETRY signals, and one or more other bus devices connected to the bus, including possible additional first-type bus devices and one or more bus devices of a second type, which second-type devices use a second bus communications protocol according to which:

when a device which acts as a master in a system bus transaction addresses such a transaction to another device on the system bus which is to act as the responding, or slave, device in the transaction, the slave device is given a specified period in which to perform a function specified by the transaction;

if the slave device determines it can perform the specified function within the specified period it places an ACK signal on the system bus;

the master device responds to said ACK signal by proceeding with the transaction;

if the slave device is absent from the bus or determines it cannot perform the specified function, the slave device will not assert any of said confirmation lines, which lack of assertion is equivalent to said NO ACK signal;

the master responds to said NO ACK signal by terminating the transaction in a first manner;

if the slave determines it will be able to complete the specified function, but only after a certain delay, the slave places a RETRY signal on the system bus;

the master device responds to said RETRY signal by terminating the transaction in a second manner and then attempting to repeat the transaction later;

said first-type bus device comprising:

means for acting as master in a bus transaction by commencing a given transaction with a another device connected to the bus, making that other device the slave device during said transaction;

means for responding, when acting as a master, to the receipt of either a NO ACK or a RETRY from a slave by generating a common signal indicating the receipt of either a NO ACK or RETRY signal; and means for responding to said common signal by terminating said given transaction and attempting to repeat it later.

4. A first-type bus device as in claim 3, further including:

means for keeping a count of the number of said common signals, indicating the receipt of either a NO ACK or a RETRY signal, generated in response to repeated attempts to complete said given transaction; and means for aborting further attempts to repeat said given transaction if said count exceeds a given number.

5. A bus device of a first type which uses a first bus communications protocol, and which is designed for use in a computer system having a system bus which has a plurality of bus lines, including confirmation lines for carrying ACK, NO ACK, STALL, and RETRY signals, and one or more other bus devices connected to the system bus, including possible additional first-type bus devices and one or more bus devices of a second type, which second-type devices use a second bus communications protocol according to which:

when a device which acts as a master in a system bus transaction addresses such a transaction to another device on the system bus which is to act as the responding, or slave device in the transaction, the slave device is given a specified period in which to perform a function specified by the transaction;

if the slave device determines it can perform the specified function within the specified period it places an ACK signal on the system bus;

the master device responds to said ACK signal by proceeding with the transaction;

if the slave device determines it will be able to complete the specified function, but only after one of a first class of delays, it places a STALL signal on the system bus;

the master device responds to said STALL signal by extending the transaction of which it is master so as to accommodate said delay in the performance of said specified function by said slave;

if the slave device is absent from the bus or determines it can not perform the specified function, the slave device will not assert any of said confirmation lines, which lack of assertion is equivalent to said NO ACK signal;

the master responds to said NO ACK signal by terminating the transaction in a first manner;

if the slave determines it will be able to complete the specified function, but only after one of a second class of delays, where said delays of said second class are generally longer than delays of said first class, the slave places a RETRY signal on the system bus;

the master device responds to said RETRY signal by terminating the transaction in a second manner and then attempting to repeat the transaction later; and when the slave device places a STALL signal on the system bus to extend a transaction, it monitors how long it asserts that STALL signal on the system bus, and, if it has been asserting that signal for over a specified length of time, it replaces that STALL signal with a RETRY signal;

said first-type bus device comprising:

means for acting as a slave in a bus transaction in which one of said second-type bus devices is the bus master, in which transaction the slave is given a specified period in which to perform a function specified by the transaction;

means for placing an ACK on the system bus when said first-type device, acting as a slave, determines it can perform said specified function in said specified period;

means for placing a NO ACK signal on the system bus when said first-type device, acting as a slave, determines it cannot perform said specified function;

means for placing a STALL signal on the system bus when said first-type device, acting as a slave, determines it will be able to complete the specified function, but only after one of a third class of delays;

means for placing a RETRY signal on the system bus when said first-type device, acting as a slave, determines it will be able to complete the specified function, but only after one of a fourth class of delays, where said delays of said fourth class are generally longer than delays of said third class; and said bus device not including any means for replacing on said system bus, during a given transaction in which the first-type device is acting as a slave device, a STALL signal with a RETRY signal.

6. A given bus device designed for use in a computer system having a system bus which has a plurality of bus signals, including confirmation lines for carrying ACK, NO ACK, STALL, and RETRY signals, and one or more other bus devices connected to the system bus which have the following behavioral characteristics:

when one of said other devices wants to perform a transaction with another device on said bus, it arbitrates for control of the bus;

when such a device obtains control of the bus, thus becoming a bus master, it addresses such a transaction to another device on he bus which is to act as the responding, or slave, device in the transaction;

during such a transaction, the slave device is given a specified period in which to perform a specified function and the slave device generate one of said ACK, STALL, NO ACK, or RETRY signals to indicate whether or not it can perform said specified function, and if so when;

such a master device responds to an ACK signal generated by the slave device by proceeding with the transaction of which it is master;

such a master device responds to a STALL signal generated by the slave device by extending the transaction of which it is master so as to accommodate a delay in the performance of said specified function by said slave;

such a master responds to said NO ACK signal generated by the slave device by terminating the transaction of which it is master;

such a master device responds to said RETRY signal generated by the slave device by terminating the transaction of which it is master and attempting to repeat the same transaction later;

said given bus device comprising:

means for acting as a slave in a bus transaction in which one of said other bus devices is the bus master, in which transaction the slave is given a specified period in which to perform a specified function;

means for placing an ACK signal on the system bus when said given bus device, acting as a slave, determines it can perform said specified function in said specified period;

means for placing a NO ACK signal on the system bus when said given bus device, acting as a slave, determines it cannot perform said specified function;

means for placing a STALL signal on the system bus when said given bus device, acting as a slave, determines it will be able to complete the specified function, but only after one of a first class of delays; and;

means for placing a RETRY signal on the system bus when said given bus device, acting as a slave, determines it will be able to complete the specified function, but only after one of a second class of delays, where said delays of said second class are generally longer than delays of said first class;

wherein said given bus device does not include any means for replacing, on said system bus, during a given transaction in which the first-type device is acting as a slave device, a STALL signal with a RETRY signal.

* * * * *